United States Patent
Jung et al.

(10) Patent No.: US 8,271,365 B2
(45) Date of Patent: Sep. 18, 2012

(54) REAL-WORLD PROFILE DATA FOR MAKING VIRTUAL WORLD CONTACTS

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 743 days.

(21) Appl. No.: 12/221,254

(22) Filed: Jul. 30, 2008

(65) Prior Publication Data

US 2009/0055246 A1   Feb. 26, 2009

Related U.S. Application Data

(63) Continuation-in-part of application No. 11/283,551, filed on Nov. 18, 2005, and a continuation-in-part of application No. 11/274,759, filed on Nov. 15, 2005, and a continuation-in-part of application No. 11/264,824, filed on Nov. 1, 2005, and a continuation-in-part of application No. 11/256,695, filed on Oct. 21, 2005, and a continuation-in-part of application No. 11/236,875, filed on Sep. 27, 2005, and a continuation-in-part of application No. 11/213,442, filed on Aug. 26, 2005, and a continuation-in-part of application No. 11/202,964, filed on Aug. 12, 2005, and a continuation-in-part of application No. 11/192,320, filed on Jul. 28, 2005, and a continuation-in-part of application No. 11/107,380, filed on Apr. 15, 2005, and a continuation-in-part of application No. 11/107,381, filed on Apr. 15, 2005, and a continuation-in-part of application No. 11/096,265, filed on Mar. 30, 2005, and a continuation-in-part of application No. 11/096,212, filed on Mar. 30, 2005, and a continuation-in-part of application No. 11/069,906, filed on Feb. 28, 2005, and a continuation-in-part of application No. 11/051,514, filed on Feb. 4, 2005.

(51) Int. Cl.
*G06Q 40/00* (2012.01)
(52) U.S. Cl. .......................................... 705/35; 705/39
(58) Field of Classification Search ................... 705/39
See application file for complete search history.

(56) References Cited

U.S. PATENT DOCUMENTS 4,569,526 A    2/1986  Hamilton
(Continued)

FOREIGN PATENT DOCUMENTS

EP           1 326 170 A1     7/2003
(Continued)

OTHER PUBLICATIONS

Online: The hot favourite: As Grand National weekend approaches, Jim McClellan looks at how online gambling has grown into a huge money spinner, Jim McClellan. The Guardian. London (UK): Apr. 1, 2004. p. 23.*

(Continued)

*Primary Examiner* — William Rankins

(57) ABSTRACT

A method and system provides arrangements creating a relationship between a real-world entity and a virtual world environment. A virtual world patron can participate in various virtual world activities and transactions. Feedback may be provided and records kept regarding the virtual world activities and transactions. The virtual world patron may be a possible recipient of a real-world consequence or benefit based on a virtual world occurrence. In some instances confirmation of an awarded real-world benefit may be provided via a communication interconnection. Real-world profile data may be used in connection with promotional activities in a virtual world environment.

20 Claims, 92 Drawing Sheets

U.S. PATENT DOCUMENTS

| | | |
|---|---|---|
| 5,008,853 A | 4/1991 | Bly et al. |
| 5,192,854 A | 3/1993 | Counts |
| 5,203,848 A | 4/1993 | Wang |
| 5,220,657 A | 6/1993 | Bly et al. |
| 5,241,466 A | 8/1993 | Perry et al. |
| 5,261,045 A | 11/1993 | Scully et al. |
| 5,323,315 A | 6/1994 | Highbloom |
| 5,333,868 A | 8/1994 | Goldfarb |
| 5,337,407 A | 8/1994 | Bates et al. |
| 5,388,196 A | 2/1995 | Pajak et al. |
| 5,513,129 A | 4/1996 | Bolas et al. |
| 5,643,088 A | 7/1997 | Vaughn et al. |
| 5,651,117 A | 7/1997 | Arbuckle |
| 5,696,965 A | 12/1997 | Dedrick |
| 5,788,574 A | 8/1998 | Ornstein et al. |
| 5,791,991 A | 8/1998 | Small |
| 5,795,228 A | 8/1998 | Trumbull et al. |
| 5,802,296 A | 9/1998 | Morse et al. |
| 5,806,045 A | 9/1998 | Biorge et al. |
| 5,808,612 A | 9/1998 | Merrick et al. |
| 5,823,879 A | 10/1998 | Goldberg et al. |
| 5,850,442 A | 12/1998 | Muftic |
| 5,870,030 A | 2/1999 | DeLuca et al. |
| 5,884,029 A | 3/1999 | Brush, II et al. |
| 5,890,995 A | 4/1999 | Bobick et al. |
| 5,926,179 A | 7/1999 | Matsuda et al. |
| 5,937,391 A | 8/1999 | Ikeda et al. |
| 5,938,196 A | 8/1999 | Antoja |
| 5,946,664 A | 8/1999 | Ebisawa |
| 5,956,038 A | 9/1999 | Rekimoto |
| 5,956,700 A | 9/1999 | Landry |
| 5,964,660 A | 10/1999 | James et al. |
| 5,964,661 A | 10/1999 | Dodge |
| 5,978,780 A | 11/1999 | Watson |
| 5,983,003 A | 11/1999 | Lection et al. |
| 5,983,196 A | 11/1999 | Wendkos |
| 6,009,458 A | 12/1999 | Hawkins et al. |
| 6,024,643 A | 2/2000 | Begis |
| 6,036,601 A | 3/2000 | Heckel |
| 6,057,856 A | 5/2000 | Miyashita et al. |
| 6,106,395 A | 8/2000 | Begis |
| 6,119,229 A | 9/2000 | Martinez et al. |
| 6,135,646 A | 10/2000 | Kahn et al. |
| 6,152,856 A | 11/2000 | Studor et al. |
| 6,246,991 B1 | 6/2001 | Abe et al. |
| 6,251,017 B1 | 6/2001 | Leason et al. |
| 6,253,193 B1 | 6/2001 | Ginter et al. |
| 6,267,675 B1 | 7/2001 | Lee |
| 6,282,522 B1 | 8/2001 | Davis et al. |
| 6,298,374 B1 | 10/2001 | Sasaki et al. |
| 6,330,547 B1 | 12/2001 | Martin |
| 6,332,127 B1 | 12/2001 | Bandera et al. |
| 6,375,466 B1 | 4/2002 | Juranovic |
| 6,380,952 B1 | 4/2002 | Mass et al. |
| 6,396,509 B1 | 5/2002 | Cheng |
| 6,450,407 B1 | 9/2002 | Freeman et al. |
| 6,467,686 B1 | 10/2002 | Guthrie et al. |
| 6,476,830 B1 | 11/2002 | Farmer et al. |
| 6,505,773 B1 | 1/2003 | Palmer et al. |
| 6,523,829 B1 | 2/2003 | Walker et al. |
| 6,545,682 B1 | 4/2003 | Ventrella et al. |
| 6,571,216 B1 * | 5/2003 | Garg et al. ................. 705/14.25 |
| 6,591,250 B1 | 7/2003 | Johnson et al. |
| 6,609,970 B1 | 8/2003 | Luciano, Jr. |
| 6,616,533 B1 | 9/2003 | Rashkovskiy |
| 6,625,578 B2 | 9/2003 | Spaur et al. |
| 6,632,142 B2 | 10/2003 | Keith |
| 6,643,751 B2 | 11/2003 | Rosenquist et al. |
| 6,663,105 B1 | 12/2003 | Sullivan et al. |
| 6,672,961 B1 | 1/2004 | Uzun |
| 6,726,427 B2 | 4/2004 | Jarvis et al. |
| 6,729,884 B1 | 5/2004 | Kelton et al. |
| 6,769,691 B1 | 8/2004 | Kim |
| 6,791,549 B2 | 9/2004 | Hubrecht et al. |
| 6,793,580 B2 | 9/2004 | Sinclair et al. |
| 6,850,643 B1 | 2/2005 | Smith, II et al. |
| 6,884,166 B2 | 4/2005 | Leen et al. |
| 6,935,952 B2 | 8/2005 | Walker et al. |
| 6,950,169 B2 | 9/2005 | Ma et al. |
| 6,954,728 B1 | 10/2005 | Kusumoto et al. |
| 6,965,868 B1 | 11/2005 | Bednarek |
| 7,020,632 B1 | 3/2006 | Kohls et al. |
| 7,036,082 B1 | 4/2006 | Dalrymple et al. |
| 7,054,830 B1 * | 5/2006 | Eggleston et al. ......... 705/14.26 |
| 7,055,740 B1 | 6/2006 | Schultz et al. |
| 7,115,034 B2 * | 10/2006 | Kuwahara ...................... 463/42 |
| 7,124,088 B2 | 10/2006 | Bauer et al. |
| 7,147,562 B2 | 12/2006 | Ohara et al. |
| 7,169,051 B1 | 1/2007 | Mossbarger |
| 7,169,501 B2 | 1/2007 | Suganuma et al. |
| 7,228,260 B2 | 6/2007 | Fujino et al. |
| 7,249,139 B2 | 7/2007 | Chuah et al. |
| 7,275,987 B2 | 10/2007 | Shimakawa et al. |
| 7,289,130 B1 | 10/2007 | Satoh et al. |
| 7,319,992 B2 | 1/2008 | Gaos |
| 7,333,943 B1 | 2/2008 | Charuk et al. |
| 7,373,377 B2 * | 5/2008 | Altieri .......................... 709/203 |
| 7,455,221 B2 | 11/2008 | Shaeffer |
| 7,483,857 B2 | 1/2009 | Bansal et al. |
| 7,494,416 B2 | 2/2009 | Walker et al. |
| 7,523,486 B1 | 4/2009 | Turner |
| 7,593,864 B2 | 9/2009 | Shuster |
| 7,614,944 B1 | 11/2009 | Hughes et al. |
| 7,620,592 B2 | 11/2009 | O'Mara et al. |
| 7,660,778 B1 | 2/2010 | Nichols |
| 7,672,884 B2 | 3/2010 | Schuster et al. |
| 7,690,997 B2 | 4/2010 | Van Luchene et al. |
| 7,698,178 B2 | 4/2010 | Chu |
| 7,722,453 B2 | 5/2010 | Lark et al. |
| 7,913,176 B1 | 3/2011 | Blattner et al. |
| 2001/0027430 A1 | 10/2001 | Sabourian |
| 2001/0037316 A1 | 11/2001 | Shiloh |
| 2001/0040341 A1 | 11/2001 | Kamille |
| 2001/0047328 A1 | 11/2001 | Triola |
| 2001/0054003 A1 | 12/2001 | Chien et al. |
| 2001/0056383 A1 | 12/2001 | Shuster |
| 2001/0056399 A1 | 12/2001 | Saylors |
| 2002/0013722 A1 | 1/2002 | Kanaga |
| 2002/0016655 A1 | 2/2002 | Joao |
| 2002/0019744 A1 | 2/2002 | Yamamoto |
| 2002/0022516 A1 | 2/2002 | Forden |
| 2002/0029252 A1 | 3/2002 | Segan et al. |
| 2002/0032037 A1 | 3/2002 | Segawa |
| 2002/0073043 A1 | 6/2002 | Herman et al. |
| 2002/0087465 A1 | 7/2002 | Ganesan et al. |
| 2002/0090985 A1 | 7/2002 | Tochner et al. |
| 2002/0091635 A1 | 7/2002 | Dilip et al. |
| 2002/0095375 A1 | 7/2002 | Taneda et al. |
| 2002/0095523 A1 | 7/2002 | Shimakawa et al. |
| 2002/0107756 A1 | 8/2002 | Hammons et al. |
| 2002/0113809 A1 | 8/2002 | Akazawa et al. |
| 2002/0120554 A1 | 8/2002 | Vega |
| 2002/0125312 A1 | 9/2002 | Ogilivie |
| 2002/0128952 A1 | 9/2002 | Melkomian et al. |
| 2002/0138445 A1 | 9/2002 | Laage et al. |
| 2002/0142841 A1 * | 10/2002 | Boushy .......................... 463/42 |
| 2002/0142842 A1 * | 10/2002 | Easley et al. ................... 463/42 |
| 2002/0147669 A1 | 10/2002 | Taylor et al. |
| 2002/0152155 A1 | 10/2002 | Greenwood et al. |
| 2002/0152152 A1 | 10/2002 | Tyson-Quah |
| 2002/0174055 A1 | 11/2002 | Dick et al. |
| 2002/0178120 A1 | 11/2002 | Reid et al. |
| 2002/0186244 A1 | 12/2002 | Matsuda et al. |
| 2002/0188760 A1 | 12/2002 | Kuwahara |
| 2002/0198735 A1 | 12/2002 | Tobert |
| 2003/0014266 A1 | 1/2003 | Brown et al. |
| 2003/0014423 A1 | 1/2003 | Chuah et al. |
| 2003/0036987 A1 | 2/2003 | Omiya |
| 2003/0037101 A1 | 2/2003 | Torabi |
| 2003/0046689 A1 | 3/2003 | Gaos |
| 2003/0064807 A1 | 4/2003 | Walker et al. |
| 2003/0069787 A1 | 4/2003 | Tendon et al. |
| 2003/0097331 A1 | 5/2003 | Cohen |
| 2003/0105688 A1 | 6/2003 | Brown et al. |
| 2003/0105705 A1 | 6/2003 | Eyre |
| 2003/0107173 A1 | 6/2003 | Satloff et al. |
| 2003/0115132 A1 | 6/2003 | Iggland |

| | | | |
|---|---|---|---|
| 2003/0118575 | A1 | 6/2003 | Grob et al. |
| 2003/0144940 | A1 | 7/2003 | Kochansky et al. |
| 2003/0154092 | A1 | 8/2003 | Bouron et al. |
| 2003/0155715 | A1 | 8/2003 | Walker et al. |
| 2003/0156134 | A1 | 8/2003 | Kim |
| 2003/0187768 | A1 | 10/2003 | Ryan et al. |
| 2003/0216184 | A1 | 11/2003 | Kigoshi |
| 2003/0220884 | A1 | 11/2003 | Choi et al. |
| 2004/0051718 | A1 | 3/2004 | Bennett et al. |
| 2004/0058731 | A1 | 3/2004 | Rossides |
| 2004/0073488 | A1 | 4/2004 | Etuk et al. |
| 2004/0082377 | A1 | 4/2004 | Seelig et al. |
| 2004/0128518 | A1 | 7/2004 | Cavers et al. |
| 2004/0133472 | A1 | 7/2004 | Leason et al. |
| 2004/0148221 | A1 | 7/2004 | Chu |
| 2004/0158492 | A1 | 8/2004 | Lopez et al. |
| 2005/0010534 | A1 | 1/2005 | Groz |
| 2005/0021472 | A1 | 1/2005 | Gettman et al. |
| 2005/0043094 | A1 | 2/2005 | Nguyen et al. |
| 2005/0051965 | A1* | 3/2005 | Gururajan ............ 273/292 |
| 2005/0059480 | A1* | 3/2005 | Soukup et al. .......... 463/25 |
| 2005/0060260 | A1 | 3/2005 | Masuda et al. |
| 2005/0137015 | A1 | 6/2005 | Rogers et al. |
| 2005/0137904 | A1 | 6/2005 | Lane et al. |
| 2005/0148388 | A1 | 7/2005 | Vayra et al. |
| 2005/0153766 | A1 | 7/2005 | Harmon |
| 2005/0153771 | A1 | 7/2005 | Ghela |
| 2005/0170883 | A1* | 8/2005 | Muskin ................ 463/25 |
| 2005/0177492 | A1 | 8/2005 | Camping |
| 2005/0182693 | A1 | 8/2005 | Alivandi |
| 2005/0192071 | A1 | 9/2005 | Matsuno et al. |
| 2005/0203835 | A1 | 9/2005 | Nhaissi et al. |
| 2005/0216346 | A1 | 9/2005 | Kusumoto et al. |
| 2005/0235008 | A1 | 10/2005 | Camping et al. |
| 2005/0288963 | A1 | 12/2005 | Parrish |
| 2006/0026044 | A1 | 2/2006 | Smith, II |
| 2006/0080613 | A1 | 4/2006 | Savant |
| 2006/0111934 | A1 | 5/2006 | Meggs |
| 2006/0206376 | A1 | 9/2006 | Gibbs et al. |
| 2006/0224480 | A1 | 10/2006 | Bent et al. |
| 2006/0234795 | A1 | 10/2006 | Dhunjishaw et al. |
| 2007/0061202 | A1 | 3/2007 | Ellis et al. |
| 2007/0087820 | A1 | 4/2007 | Van Luchene et al. |
| 2007/0087822 | A1 | 4/2007 | Van Luchene |
| 2007/0117615 | A1 | 5/2007 | Van Luchene |
| 2007/0179867 | A1 | 8/2007 | Glazer et al. |
| 2008/0139318 | A1 | 6/2008 | Van Luchene et al. |
| 2009/0006124 | A1 | 1/2009 | Sinclair et al. |
| 2009/0204420 | A1 | 8/2009 | Ganz |

FOREIGN PATENT DOCUMENTS

| | | |
|---|---|---|
| JP | 11143944 A | 5/1999 |
| WO | WO 02/20111 A2 | 3/2002 |
| WO | WO 02/067178 A1 | 8/2002 |
| WO | WO 02/077758 A2 | 10/2002 |
| WO | WO 2005/064502 A1 | 7/2005 |

OTHER PUBLICATIONS

Biggs, Stuart; "Enter danger zone, Matrix-style Governments worry about the hazardous reality-blurring effects of online gaming"; South China Morning Post; bearing a date of Aug. 30, 2005; pp. 1-2; © 2005 South China Morning Post Publishers Ltd.

Krotoski, Aleks; "Online: Virtual trade gets real: Buying virtual goods on the internet is one thing; killing for it is quite another"; The Guardian; bearing a date of Jun. 16, 2005; pp. 1-5; ProQuest; London (UK); printed on Nov. 10, 2009.

Kushner, David; "My Avatar, My Self"; Technology Review; bearing a date of Apr. 2004; pp. 50-55; vol. 107 No. 3; printed on Nov. 9, 2009.

Langberg, Mike; "Virtual World There Innovative to an Extent"; bearing a date of Nov. 27, 2003; San Jose Mercury News; p. 1G; printed on Nov. 9, 2009.

Stephens, Molly; "Sales of in-game assets: An illustration of the continuing failure of intellectual property law to protect digital creators"; Texas Law Review; bearing a date of May 2002; pp. 1513-1535; vol. 80, No. 6; printed on Nov. 6, 2009.

White, Mark; "War of the Worlds"; Independent on Sunday; bearing a date of Jul. 31, 2005; pp. 1-4; Financial Times; © 2005 Independent Digital UK Ltd.

U.S. Appl. No. 12/291,349, Jung et al.
U.S. Appl. No. 12/291,336, Jung et al.
U.S. Appl. No. 12/291,160, Jung et al.
U.S. Appl. No. 12/291,020, Jung et al.
U.S. Appl. No. 12/290,679, Jung et al.
U.S. Appl. No. 12/290,674, Jung et al.
U.S. Appl. No. 12/290,653, Jung et al.
U.S. Appl. No. 12/290,458, Jung et al.
U.S. Appl. No. 12/290,358, Jung et al.
U.S. Appl. No. 12/658,618, Jung et al.
U.S. Appl. No. 12/658,613, Jung et al.
U.S. Appl. No. 12/658,609, Jung et al.
U.S. Appl. No. 12/658,600, Jung et al.

Bartle, Richard A.; "Pitfalls of Virtual Property"; Themis Group; bearing a date of Apr. 2004; pp. 1-22.

Grimmelmann, James; "Virtual Worlds as Comparative Law"; New York Law School Law Review; bearing a date of Dec. 8, 2004; pp. 147-184; vol. 49.

U.S. Appl. No. 12/661,997, Jung et al.
U.S. Appl. No. 12/661,996, Jung et al.

"MicroLoans take offbeat collateral"; The Wall Street Journal. Sunday Gazette—Mail; Bearing a date of Feb. 13, 2005; p. 5.D; Charleston, W.V.; printed on Apr. 19, 2010.

"About Deposits and Withdrawals"; Project Entropia; pp. 1; located at http://www.project-entropia.com/Content.ajp?id=1303; printed on Jan. 27, 2005.

"About Project Entropia"; Project Entropia; pp. 1; located at http://www.project-entropia.com/about/Index.ajp; printed on Jan. 27, 2005.

"Bank Account Game"; pp. 1-2; located at http://www.educational-learninggames.com/bank-account-game.asp; Educational Learning Games.com; printed on Dec. 10, 2004.

Becker, David; "Real cash for virtual goods"; CNET News.Com; bearing a date of Feb. 8, 2005; pp. 1-4; CNET Networks, Inc.; located at http://news.com.com/2102-1043_3-5566704.html?tag=st.util.print; printed on Feb. 8, 2005.

Book, Betsy; "Moving Beyond the Game: Social Virtual Worlds"; State of Play 2 Conference, Nov. 1804; Cultures of Play Panel; pp. 1-13; printed on Jul. 14, 2005.

"Charge It! Math and Money Board Games"; pp. 1-2; located at http://www.educationallearninggames.com/charge-it-board-game-money-board-game.asp; Educational Learning Games.com; printed on Jan. 27, 2005.

Cringely, Robert X.; "The Wild Ones, The Best Way to Protect Sales of Virtual Goods Can Be Found Inside the Game, Itself"; bearing a date of May 13, 2004; pp. 1-3; located at http://www.pbs.org/cringley/pulpit/pulpit20040513.html; printed on Jul. 14, 2005.

"Escrow.com Protects Online Buyers and Sellers from Fraud"; bearing a date of 1999-2005; pp. 1; Escrow.com; located at: https://www.escrow.com/index.asp; printed on Jul. 13, 2005.

"'Game theft' led to fatal attack"; pp. 1-2; located at http://news.bbc.co.uk/2/hi/technology/4397159.stm; BBC News; bearing a date of Mar. 31, 2005; printed on Apr. 11, 2005.

"Gaming Open Market—The next generation of game commodity trading. Frequently asked questions"; pp. 1-4; located at http://www.gamingopenmarket.com/faq.php; printed on Jul. 13, 2005.

Gentile, Gary; "Advertisers seek piece of video-game action"; Seattle Post-Intelligencer; May 21, 2005; pp. A1 and A11.

Gentile, Gary; "Products Places Liberally in Video Games"; May 23, 2005; pp. 1-3; abcNews; located at http://abcnews.go.com/Business/print?id=778965; printed on Jun. 17, 2005.

Graham-Rowe, Duncan; "Gamers turn cities into a battleground"; NewScientist.com; Jun. 12, 2005; pp. 1-3; located at: http://www.newscientist.com/article.ns?id=dn7498; printed on Jun. 17, 2005.

Haines, Lester; "Spurned woman deletes ex's gaming data"; pp. 1-2; located at http://www.theregister.co.uk/2005/01/21/spurned_womans_revenge/; The Register; bearing a date of Jan. 21, 2005; printed on Apr. 14, 2005.

Harrow, Jeffrey R.; "Future Brief, A Publication of New Global Initiatives, Inc."; bearing a date of 2004; pp. 1-5; located at http://www.futurebrief.com/Harrow-12.pdf; printed on Jul. 13, 2005.

Hershman, Tania; "Advertisers: Game On"; pp. 1; located at http://www.technologyreview.com/articles/05/05/issue/forward_advertisers.asp?p=1;.TechnologyReview.com; bearing a date of May 2005; printed on Apr. 14, 2005.

Hilts, Peter; "Boys are from Neopets, Girls are from Barbie.com" Computer Bits; Jun. 2003, pp. 1-4; vol. 13 No. 6; located at http://info.neopets.com/computerbits.html; printed on May 17, 2005.

"IGE Frequently Asked Questions"; IGE; pp. 1-12; located at http://www.ige.com/FrequentyAskedQuestions.aspx; printed on Jan. 27, 2005.

Knight, Will; "Smart shoes decide on television time"; May 18, 2005; pp. 1-2; located at http://newscientist.com/article.ns?id=dn7395&print=true; NewScientist.com; printed on Jun. 17, 2005.

Kushner, David; "Engineering Everquest Online Gaming Demands Heavyweight Data Centers"; IEEE Spectrum; Jul. 2005; pp. 34-39; Institute of Electrical and Electronics Engineers, Inc.; New York, NY.

Kushner, David; "Engineering Everquest Online gaming demands heavyweight data centers"; IEEE Spectrum Online; Jul. 11, 2005; pp. 1-7; bearing a date of Jun. 30, 2005; located at http://www.spectrum.ieee.org/WEBONLY/publicfeature/jul05/0705eq.html; printed on Jul. 11, 2005.

"Monopoly Tycoon"; Atari Australia & New Zealand; pp. 1; located at http://www.atari.com.au/games/info.do?id=191; Atari Australia Pty Ltd.; printed on Mar. 1, 2005.

"New World Notes: Business Model Prototype"; Jun. 2, 2005; pp. 1-3; located at http://secondlife.blogs.com/nwn/2005/06/business_model_.html#more; printed on Jun. 8, 2005.

"Our Business"; IGE; bearing a date of 2001-2004; pp. 1-2; located at http://www.ige.com/corporate.aspx?lang=en; printed on Jan. 27, 2005.

"Penn State Behrend Establishes Credit Card Research Center"; Penn State Erie: The Behrend College; bearing dates of Nov. 22, 2004 and Sep. 27, 2004; pp. 1-2; located at http://www.pserie.psu.edu/newscal/news2004/november-creditcenter.htm; printed on Dec. 8, 2004.

Sandhana, Lakshmi; "Pacman comes to life virtually"; pp. 1-3; BBC News; bearing a date of Jun. 6, 2005; located at http://news.bbc.co.uk/1/hi/technology/4607449.stm; printed on Jun. 17, 2005.

"Second Life: Your World. Your Imagination."; bearing a date of 2005; pp. 1; Linden Research, Inc.; located at http://secondlife.com/; printed on Jun. 8, 2005.

"Spending Challenge"; The Mint: It Makes Cents; bearing a date of 2002; pp. 1-3; Northwestern Manual; located at http://www.themint.org/tryit/spendingchallenge.php; printed on Jan. 26, 2005.

Terdiman, Daniel; "Sony Gets Real on Virtual Goods"; Wired News; bearing a date of Apr. 20, 2005; pp. 1-3; Lycos Inc.; located at http://wired.com/news/print/0,1294,67280,00.html; printed on Apr. 21, 2005.

Terdiman, Daniel; "Virtual Trade Tough Nut to Crack"; Wired News; bearing a date of Dec. 20, 2004; pp. 1-3; Lycos Inc.; located at http://wired.com/news/print/0,1294,66074,00.html; printed on Jan. 27, 2005.

"The Entertainment of the Future is already here"; Project Entropia; bearing a date of Jan. 27, 2005; pp. 1; located at http://www.project-entripia.com/Index.ajp; printed on Jan. 27, 2005.

Thompson, Clive; "Game Theories"; The Walrus Magazine; pp. 1-21; bearing a date of 2004; located at http://www.walrusmagazine.com/article.pl?sid=04/05/06/1929205&mode=nested&tid=1; printed on Jun. 17, 2005.

"TradEnable (I-escrow): Online Payment Service"; bearing a date of 2004; pp. 1-3; Stylusinc.om; located at http://stylusinc.com/WebEnable/Sales/tradenable.php; printed on Jul. 13, 2005.

Walker, Frank; "Coming soon: a PC combat game that shoots back"; The Sydney Morning Herald; bearing a date of Apr. 3, 2005; pp. 1-2; located at http://www.smh.com.au/news/World/Coming-soon-a-PC-combat-game-that-shoots-back/2005/04/02/1112302293552.html?oneclick=true; printed on Apr. 11, 2005.

Ward, Mark; "Life lessons in virtual adultery"; BBC News; bearing a date of Apr. 11, 2005; pp. 1-2; located at http://news.bbc.co.uk/2/hi/technology/4432019.stm; printed on Apr. 14, 2005.

U.S. Appl. No. 11/654,398, Jung et al.
U.S. Appl. No. 11/653,092, Jung et al.
U.S. Appl. No. 11/652,379, Jung et al.
U.S. Appl. No. 11/642,991, Jung et al.
U.S. Appl. No. 11/607,794, Jung et al.
U.S. Appl. No. 11/605,939, Jung et al.
U.S. Appl. No. 11/601,599, Jung et al.
U.S. Appl. No. 11/600,602, Jung et al.
U.S. Appl. No. 11/599,631, Jung et al.
U.S. Appl. No. 11/589,318, Jung et al.
U.S. Appl. No. 11/582,837, Jung et al.
U.S. Appl. No. 11/540,911, Jung et al.
U.S. Appl. No. 11/364,895, Jung et al.
U.S. Appl. No. 11/364,498, Jung et al.
U.S. Appl. No. 11/342,368, Jung et al.
U.S. Appl. No. 11/340,832, Jung et al.
U.S. Appl. No. 11/314,967, Jung et al.
U.S. Appl. No. 11/305,878, Jung et al.
U.S. Appl. No. 11/274,759, Jung et al.
U.S. Appl. No. 11/251,624, Jung et al.
U.S. Appl. No. 11/242,647, Jung et al.
U.S. Appl. No. 11/242,619, Jung et al.
U.S. Appl. No. 11/238,684, Jung et al.
U.S. Appl. No. 11/234,878, Jung et al.
U.S. Appl. No. 11/234,867, Jung et al.
U.S. Appl. No. 11/234,848, Jung et al.
U.S. Appl. No. 11/234,847, Jung et al.
U.S. Appl. No. 11/228,043, Jung et al.
U.S. Appl. No. 11/203,686, Jung et al.
U.S. Appl. No. 11/192,342, Jung et al.
U.S. Appl. No. 11/191,252, Jung et al.
U.S. Appl. No. 11/191,248, Jung et al.
U.S. Appl. No. 11/191,233, Jung et al.
U.S. Appl. No. 11/185,524, Jung et al.
U.S. Appl. No. 11/185,446, Jung et al.
U.S. Appl. No. 11/184,567, Jung et al.
U.S. Appl. No. 11/184,564, Jung et al.
U.S. Appl. No. 11/069,905, Jung et al.
U.S. Appl. No. 11/069,894, Jung et al.
U.S. Appl. No. 11/068,736, Jung et al.
U.S. Appl. No. 12/005,047, Jung et al.
U.S. Appl. No. 12/004,110, Jung et al.
U.S. Appl. No. 11/982,393, Jung et al.
U.S. Appl. No. 11/981,635, Jung et al.
U.S. Appl. No. 11/980,315, Jung et al.
U.S. Appl. No. 11/975,723, Jung et al.
U.S. Appl. No. 11/975,367, Jung et al.
U.S. Appl. No. 11/974,515, Jung et al.
U.S. Appl. No. 11/974,174, Jung et al.
U.S. Appl. No. 11/906,777, Jung et al.
U.S. Appl. No. 11/827,376, Jung et al.

Baig, Edward C.; "Slip into a second skin with an online avatar"; USA Today; bearing a date of Nov. 11, 2003; pp. 1-3; located at http://www.usatoday.com/tech/columnist/edwardbaig/2003-11-11-baig_x.htm; printed on Apr. 1, 2008.

Bartle, Richard A.; "Designing Virtual Worlds: Bibliography"; bearing a date of Jun. 17, 2003; pp. 1-36; located at http://www.mud.co.uk/dvw/bibliography.html; printed on Mar. 24, 2008.

Burgess et al.; "Controlling the Virtual World: Governance of On-Line Communities"; bearing a date of 1999; pp. 1-2; located at http://cse.stanford.edu/classes/cs201-projects-98-99/controlling-the-virtual-world/case/index.html; printed on Mar. 24, 2008; Stanford University.

Castronova, Edward; "Virtual Worlds: A First-Hand Account of Market and Society on the Cyberian Frontier"; bearing a date of Dec. 2001; pp. 1-40; located at http://papers.ssrn.com/abstract=294828; Munich, Germany.

Rhode, Steve; "Avoid credit card balance transfers requiring new purchases"; Gannett News Service; bearing a date of Jul. 18, 2003; pp. 1-3; Myvesta.org Inc.; printed on Apr. 8, 2008.

"Star Wars Galaxies: An Empire Divided"; Adventure Manual; bearing a date of Jun. 26, 2003; total pp. 1-9; LucasFilm Entertainment Company Ltd.

"Star Wars Galaxies: An Empire Divided"; Adventure Manual; bearing a date of Jun. 26, 2003; total pp. 75; LucasFilm Entertainment Company Ltd.

"There, Inc. Delivers a Brave New Online World to Consumers; Company Unveils There 'Limited Access' and Teams With Industry Leaders Including ATI, HP, and iVillage to Provide Consumers with compelling 3D World; Nike and Levi's Provide Immersive Brand Experience to Members."; Goliath Business Knowledge on Demand; bearing a date of Oct. 27, 2003; pp. 1-7; PR Newswire; Menlo Park, CA; printed on Apr. 8, 2008.

European Search Report; European App. No. EP 06 78 8839; pp. 1-6.

U.S. Appl. No. 12/221,446, filed Jul. 31, 2008, Jung et al.

U.S. Appl. No. 12/221,459, filed Jul. 31, 2008, Jung et al.

U.S. Appl. No. 12/221,447, filed Jul. 31, 2008, Jung et al.

U.S. Appl. No. 12/220,675, filed Jul. 24, 2008, Jung et al.

Bloomfield, Robert; "Patenting Virtual World Commerce"; Metanomics—Business and Policy in the Metaverse; bearing a date of Jun. 21, 2008; printed on Jun. 25, 2008; pp. 1-2; located at http://www.metanomics.net/21-jun-2008/patenting-virtual-commerce.

Bloomfield, Robert; "Patenting Virtual World Commerce"; TerraNova; bearing a date of Jun. 21, 2008; printed on Jun. 25, 2008; pp. 1-5; located at http://terranova.blogs.com/terra_nova/2008/06/last-week-i-rec.html#more.

U.S. Appl. No. 12/286,532, Jung et al.

U.S. Appl. No. 12/286,530, Jung et al.

U.S. Appl. No. 12/286,127, Jung et al.

U.S. Appl. No. 12/286,096, Jung et al.

U.S. Appl. No. 12/231,298, Jung et al.

U.S. Appl. No. 13/373,358, Jung et al.

"American Express and Zynga Announce Strategic Relationship to Make Virtual Goods and Game Cards Available for Purchase Using Membership Rewards® Points"; News: Press Release; About.American.Express.com; bearing a date Nov. 30, 2010; printed on Jan. 20, 2010; pp. 1-2; New York; located at: http://about.americanexpress.com/news/pr/2010/zynga.aspx.

Ashby, Alicia; "MindArk Brings Real Banking Into Entropia Universe"; Engage Digital; bearing a date of Mar. 18, 2009; printed on Jan. 20, 2012; pp. 1-3; located at http://www.engagedigital.com/blog/2009/03/18/mindark-brings-real-banking-into-entropia-universe/.

"Discontinuation of MetaCard Service on Feb. 28, 2010"; MetaCard Announcement; FirstMeta; printed on Jan. 20, 2012; pp. 1-4; located at: http://www.firstmeta.com/public/MCannounce.html.

"EpicWin"; iTunes Preview; Apple Store iTunes; printed on Jan. 16, 2012; pp. 1-3; located at http://itunes.apple.com/us/app/epicwin/id372927221?mt=8&ign-mpt=uo%3D4.

"EpicWin Gives You Loot for Doing Your Chores"; STP World: Slide to Play; bearing a date of Aug. 18, 2010; printed on Jan. 16, 2010; located at: http://www.slidetoplay.com/story/epicwin-gives-you-loot-for-doing-your-chores.

"EpicWin: Pre-Release Trailer"; Video, posted on YouTube; printed on Jan. 16, 2012; pp. 1-3; located at: http://www.youtube.com/watch?v=AmKwF_Si734&feature=popt00us03.

Goad, Libe; "Zynga Reinstates Offers in PetVille and Other Games"; Blog Games; bearing a date of Jun. 13, 2010; printed on Jan. 20, 2012; pp. 1-3; located at: http://blog.games.com/2010/01/13/zynga-reinstates-offers-in-farmville-and-other-games/.

Gomez, Mel; "Chinese Insurance Company Insures Virtual Goods", www.tek-lado.com; bearing a date of Jul. 11, 2011; printed on Jan. 20, 2012; pp. 1-4; Tek Lado; located at: http://www.tek-lado.com/2011/07/11/chinese-insurance-company-insures-virtual-goods/.

"Join Xbox LIVE Rewards"; rewards.xbox.com; bearing a date of 2012; printed on Jan. 20, 2012; pp. 1-2; Microsoft Corporation; located at: http://rewards.xbox.com/.

"Legacy Locker—Return Home"; Legacy Locker; bearing a date of 2009; printed on Jan. 20, 2012; pp. 1-4; located at: http://legacylocker.com/.

"MetaCard™"; FirstMeta; bearing a date of 2007; printed on Jan. 20, 2012; one (1) page; located at http://firstmeta.com/consumers.

Morales, Angela; "FarmVille Netflix Sponsored Link: 150 Free Farm Cash"; Blog Games; bearing a date of Aug. 16, 2010; printed on Jan. 20, 2012; pp. 1-3; located at: http://blog.games.com/2010/08/16/farmville-netflix-sponsored-link-150-free-farm-cash/.

Osborne, Emily, et al.; "Digital Legacy", Step Journal; bearing a date of May 2010; printed on Jan. 23, 2012; pp. 1-2; located at: http://www.stepjournal.org/journal_archive/2010/step_journal_may_2010/digital_legacy.aspx.

Saint, Nick; "Wacky: Zynga Gives Away Free FarmVille Cash With Purchases of Real Life Vegetables"; Business Insider; bearing a date of May 21, 2010; pp. 1-2; located at: http://articles.businessinsider.com/2010-05-21/tech/30016153_1_zynga-virtual-currency-farmville.

Simon, Mallory; "New Services Promise Online Life After Death"; CNN.com/technology; bearing a date of May 18, 2009; printed on Jan. 20, 2012; pp. 1-3; located at: http://www.cnn.com/2009/TECH/05/18/death.online/index.html?iref=t2test_techmon.

"World of Warcraft Rewards Visa$_{ADDAC;AXA}$®"; us.battle.net; bearing a date of 2012; printed on Jan. 20, 2012; pp. 1-2; Blizzard Entertainment, Inc.; located at: http://us.battle.net/wow/en/services/rewards-visa/.

Fugazi, Nobody (Taran Rampersad); "The Evolution of Business in Second Life"; Avvenimenti Iblei Magazine Online—Business & SL; Feb. 28, 2000; printed on Feb. 7, 2011; pp. 1-4; No. 4; located at: http://www.avvenimentiiblei.com/the-evolution-of-business-in-second-life-by-nobody-fugazi-taran-rampersad.

* cited by examiner

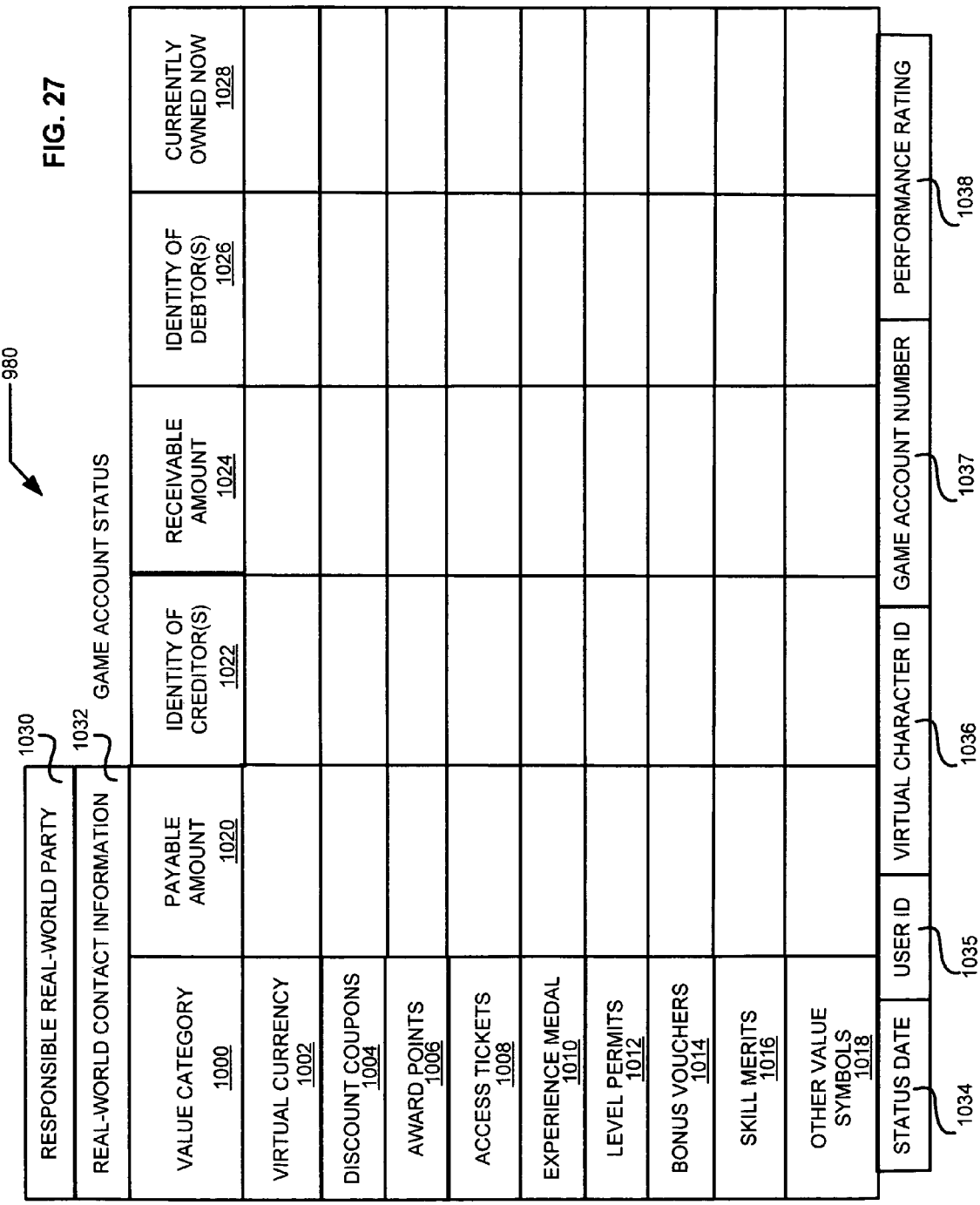

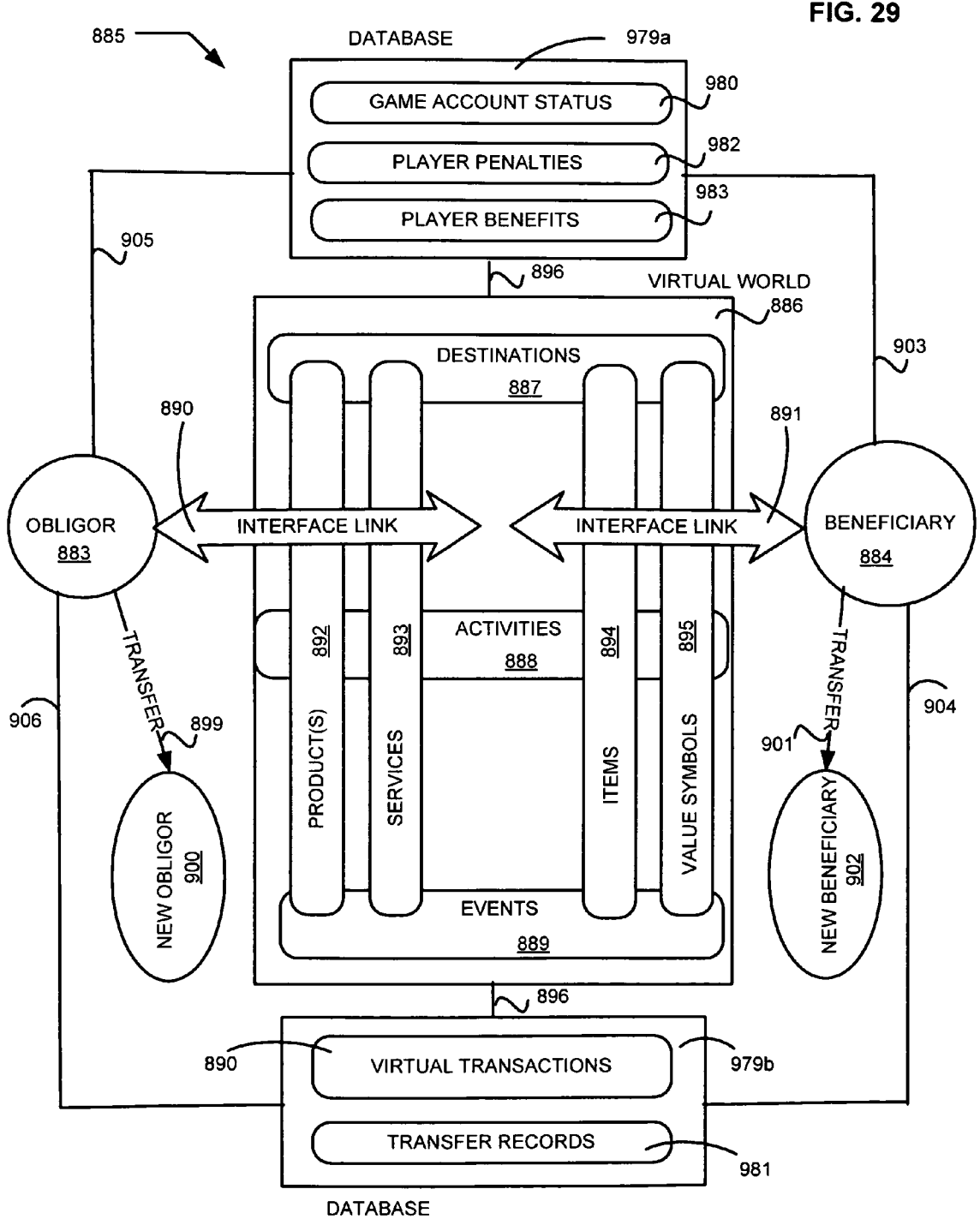

REAL-WORLD PROFILE DATA FOR MAKING VIRTUAL WORLD CONTACTS

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the herein listed application(s) to the extent such subject matter is not inconsistent herewith; the present application also claims the earliest available effective filing date(s) from, and also incorporates by reference in its entirety all subject matter of any and all parent, grandparent, great-grandparent, etc. applications of the herein listed application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part. The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

For purposes of the USPTO extra-statutory requirements, the present application constitutes a continuation in part of the following currently co-pending commonly owned United States patent applications. The subject matter of the applications listed below are incorporated by reference in their entirety in the present application to the extent such subject matter is not inconsistent herewith.

Ser. No. 11/283,551 filed on Nov. 18, 2005, entitled "Real-World Profile Data for Making Virtual World Contacts", naming Edward K. Y. Jung, Royce A. Levien, Robert W. Lord, Mark A. Malamud, and John D. Rinaldo, Jr. as inventors.

Ser. No. 11/051,514 filed on Feb. 4, 2005, entitled "Virtual Credit In Simulated Environments", naming Edward K. Y. Jung, Royce A. Levien, Mark A. Malamud, and John D. Rinaldo, Jr. as inventors.

Ser. No. 11/069,906 filed on Feb. 28, 2005, entitled "Hybrid Charge Account for Virtual World Credit", naming Edward K. Y. Jung, Royce A. Levien, Mark A. Malamud, and John D. Rinaldo, Jr. as inventors.

Ser. No. 11/096,212 filed on Mar. 30, 2005, entitled "Multi-Player Game Using Simulated Credit Transactions", naming Edward K. Y. Jung, Royce A. Levien, Mark A. Malamud, and John D. Rinaldo, Jr. as inventors.

Ser. No. 11/096,265 filed on Mar. 30, 2005, entitled "Virtual Credit with Transferability", naming Edward K. Y. Jung, Royce A. Levien, Mark A. Malamud, and John D. Rinaldo, Jr. as inventors.

Ser. No. 11/107,381 filed on Apr. 15, 2005, entitled "Follow-Up Contacts with Virtual World Participants", naming Edward K. Y. Jung, Royce A. Levien, Mark A. Malamud, and John D. Rinaldo, Jr. as inventors.

Ser. No. 11/107,380 filed on Apr. 15, 2005, entitled "Participation Profiles of Virtual World Players", naming Edward K. Y. Jung, Royce A. Levien, Mark A. Malamud, and John D. Rinaldo, Jr. as inventors.

Ser. No. 11/192,320 filed on Jul. 28, 2005, entitled "Rating Notification for Virtual World Environment", naming Edward K. Y. Jung, Royce A. Levien, Robert W. Lord, Mark A. Malamud, and John D. Rinaldo, Jr. as inventors.

Ser. No. 11/202,964 filed on Aug. 12, 2005, entitled "Rating Technique for Virtual World Environment" naming Edward K. Y. Jung, Royce A. Levien, Robert W. Lord, Mark A. Malamud, and John D. Rinaldo, Jr. as inventors.

Ser. No. 11/213,442 filed on Aug. 26, 2005, entitled "Virtual World Escrow User Interface", naming Edward K. Y. Jung, Royce A. Levien, Robert W. Lord, Mark A. Malamud, and John D. Rinaldo, Jr. as inventors.

Ser. No. 11/236,875 filed on Sep. 27, 2005, entitled "Real-World Incentives Offered to Virtual World Participants", naming Edward K. Y. Jung, Royce A. Levien, Robert W. Lord, Mark A. Malamud, and John D. Rinaldo, Jr. as inventors.

Ser. No. 11/256,695 filed on Oct. 21, 2005, entitled "Disposition of Component Virtual Property Rights", naming Edward K. Y. Jung, Royce A. Levien, Robert W. Lord, Mark A. Malamud, and John D. Rinaldo, Jr. as inventors.

Ser. No. 11/264,824 filed on Nov. 1, 2005, entitled "Virtual World Interconnection Technique", naming Edward K. Y. Jung, Royce A. Levien, Robert W. Lord, Mark A. Malamud, and John D. Rinaldo, Jr. as inventors.

Ser. No. 11/274,759 filed on Nov. 15, 2005, entitled "Use of Patron Profiles in Virtual World Environment", naming Edward K. Y. Jung, Royce A. Levien, Robert W. Lord, Mark A. Malamud, and John D. Rinaldo, Jr. as inventors.

TECHNICAL FIELD

This application relates generally to transactions and activities in virtual world environments.

BACKGROUND

Virtual world environments often include imaginary characters participating in fictional events, activities and transactions. There are educational, entertainment and promotional benefits in creating new and challenging ways to relate virtual world environments with real-world experiences.

SUMMARY

Methods and systems for implementing relationships between a real-world entity and patrons of a virtual world environment as disclosed herein may take different forms. For example, one or more computer program products having process instructions may be incorporated in a computerized system.

Some system embodiments for making one or more real-world benefits available, may include a data record of profile information for current or prospective clientele, a listing of one or more real-world benefits correlated with the profile information, a real-world entity that is a provider of the one or more real-world benefits, and a program module authorized by the real-world entity for making the one or more real-world benefits available in a selected virtual world environment.

Other aspects disclosed herein include a method of making a particular benefit available to a party, including obtaining profile data relating to one or more current or prospective clientele of a real-world entity, establishing a possible real-world benefit correlated with the profile data, and making an arrangement for the possible real-world benefit to be made available to the clientele in connection with the clientele's participation in a virtual world environment Other process embodiments may be implemented in a method of providing a real-world opportunity, including obtaining real-world profile data for one or more persons; and selecting a possible real-world benefit, which possible real-world benefit is correlated with information in the real-world profile data. Additional process features may include identifying a virtual world environment in which the one or more persons participate, and making an arrangement for offering the possible real-world benefit in the virtual world environment.

Some embodiments are implemented in a computer program product having program instructions configured to perform a process that associates information in a computer system. The process may include identifying one or more persons that are current or potential patrons of a real-world entity, listing real-world profile data related to the one or more persons, listing one or more real-world benefits provided by the real-world entity, and correlating the one or more real-world benefits with the one or more persons as a basis for making a possible benefit available in a virtual world environment. The computer program product may be implemented in computer readable media for encoding the instructions, which computer readable media may include a storage medium or a transmission medium.

The virtual world environment and related real-world activities which are disclosed herein for purposes of illustration may involve many different types of participants and/or entities, depending on various advantages arising from embodiments and implementations that may be desired by the participants, the players, virtual environment owner, game world operator, third party virtual and real-world businesses, and others having an interest or involvement in the systems and processes disclosed herein.

Additional features, aspects and benefits will be understood by those skilled in the art from the following drawings and detailed description for various exemplary and preferred embodiments.

BRIEF DESCRIPTION OF THE DRAWINGS

FIG. 27 illustrates exemplary database records for a player's virtual world game account status.

FIG. 29 is a schematic block diagram for an exemplary virtual world wherein a participant obligation and/or a participant beneficiary right may be transferable to another party.

DETAILED DESCRIPTION

Figure 1:
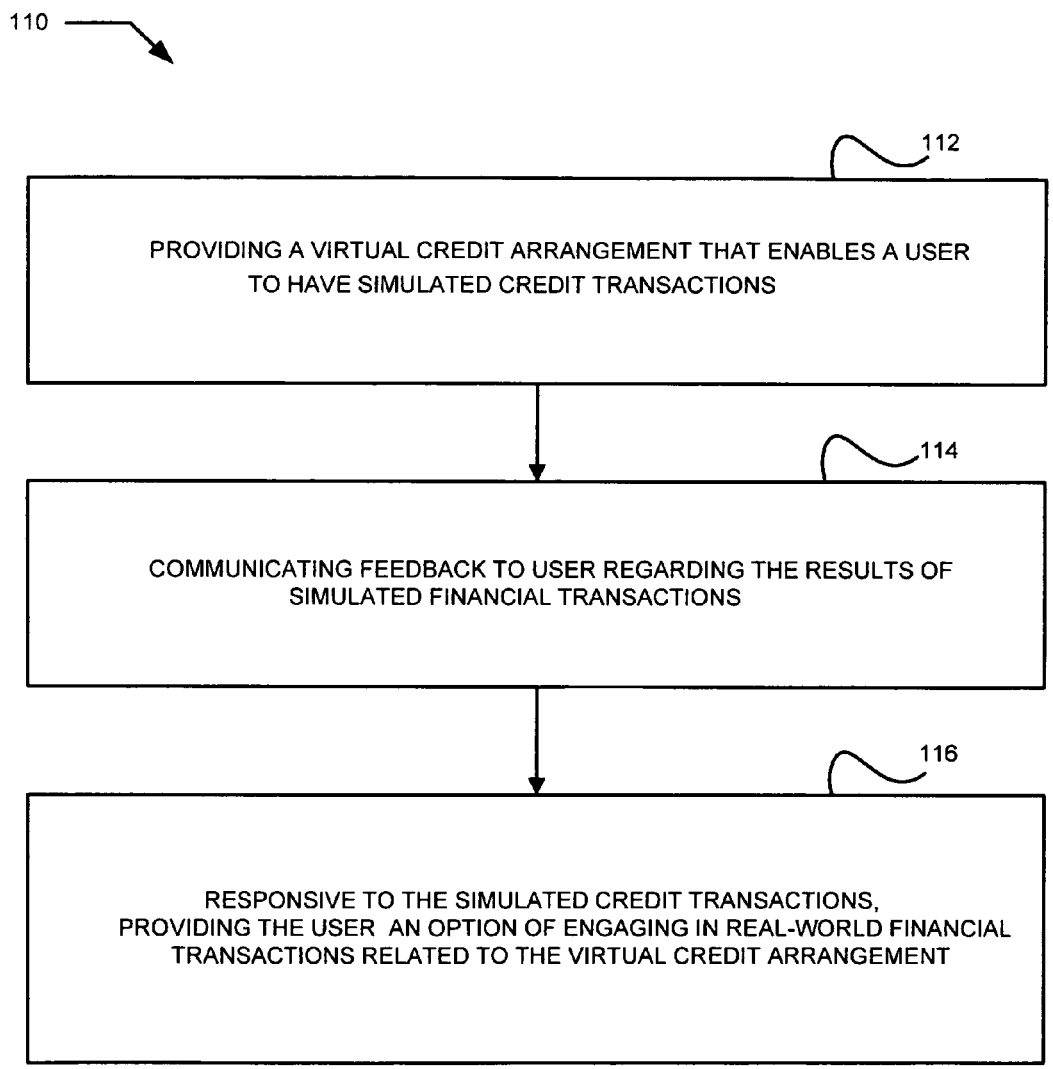
FIG. 1 is a high level flow chart showing an exemplary process for some embodiments.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

As described in more detail herein, this disclosure describes a method and system for a virtual credit arrangement that enables a user to have simulated credit transactions. Feedback is communicated to the user regarding results of the simulated credit transactions. Responsive to the simulated credit transactions, the user is provided an option of engaging in real-world financial transactions related to the virtual credit arrangement.

In one aspect of the method and system disclosed herein, a virtual account is provided to a user. The user is enabled to make simulated purchases of foods and/or services and/or items of value. The user receives feedback regarding results of the simulated purchases. Responsive to an experience of making the simulated purchases and receiving the feedback, a transition by the user to usage of an actual financial account is facilitated. A further aspect relates to selection of credit terms for simulated purchases of virtual goods and/or services and/or items of value. In some embodiments, certain virtual account terms are programmed—e.g. automatically by a machine under program control—based on user demographic information or other past performance records. In other embodiments certain virtual account terms are varied by the user.

In some embodiments, users are enabled to make simulated purchases or incur simulated credit obligations that are posted to virtual accounts, and users are enabled to make simulated compensation against balances due or obligations owed for virtual accounts. In some instances, users are enabled to make remuneration with something of real value. In other instances, users are enabled to make remuneration with something of virtual value.

The completion of performance benchmarks may be required in some embodiments before allowing transfer to a higher participation level of a virtual credit account. Completion of performance benchmarks may be required before facilitating transition of a user to an actual financial account. In some instances, a user may have an unrestricted option to make transition to an actual financial account.

In some implementations, the system and method provides a simulated environment that enables purchases of various virtual products and/or virtual services and/or virtual items to be made by a plurality of users at different locations. Such purchases may involve credit transactions based on role playing world activities.

Referring to a process 110 shown in the exemplary flow chart of FIG. 1, a virtual credit arrangement is provided in order to enable a user to have simulated credit transactions (block 112). Feedback is communicated to the user regarding results of the simulated financial transactions (block 114). Responsive to the simulated credit transactions, the user is provided with an option of engaging in real-world financial transactions (block 116) related to the virtual credit arrangement. As discussed in more detail herein, such virtual credit arrangements can involve various types of credit arrangements made by the user, under standard or customized credit terms that may involve different forms of compensation such as real-world money, fictional money, action commitments, bartered items, etc.

Figure 2:
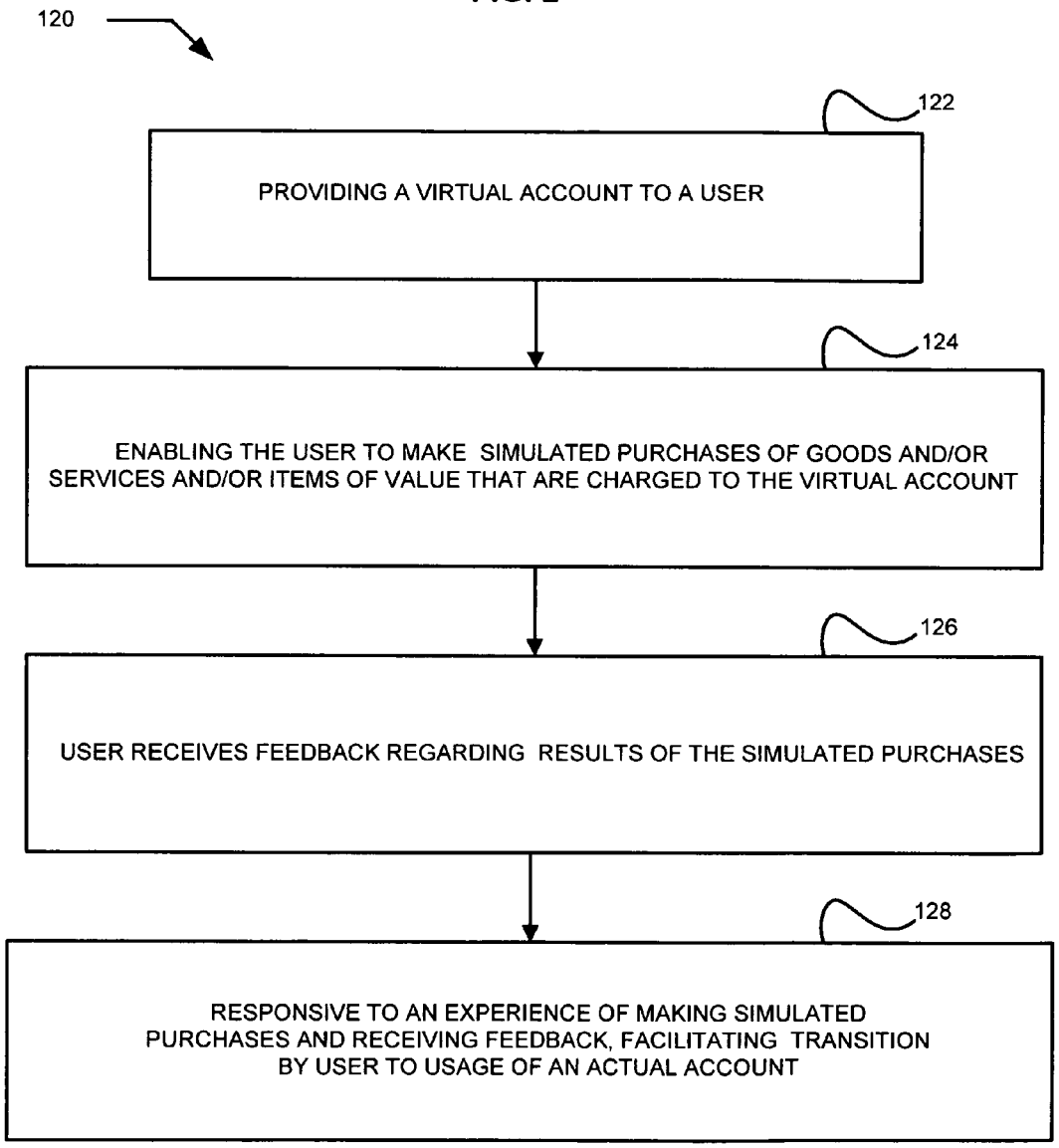
FIG. 2 is another high level flow chart showing a different exemplary process for other embodiments.

Another process 120 shown in the exemplary flow chart of FIG. 2 provides a virtual account to a user (block 122). The user is enabled to make simulated purchases of goods and/or services and/or items of value that are charged to the virtual account (block 124). The user receives feedback (block 126) regarding results of the simulated purchases. Responsive to the user's experience of making simulated purchases and receiving feedback, a transition of the user to usage of an actual account is facilitated (block 128).

The processes of FIGS. 1 and 2 can be implemented with various types of technology, including but not limited to hardware, firmware and/or software systems based on computerized data communications and processing as discussed in more detail herein.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

Figure 3:
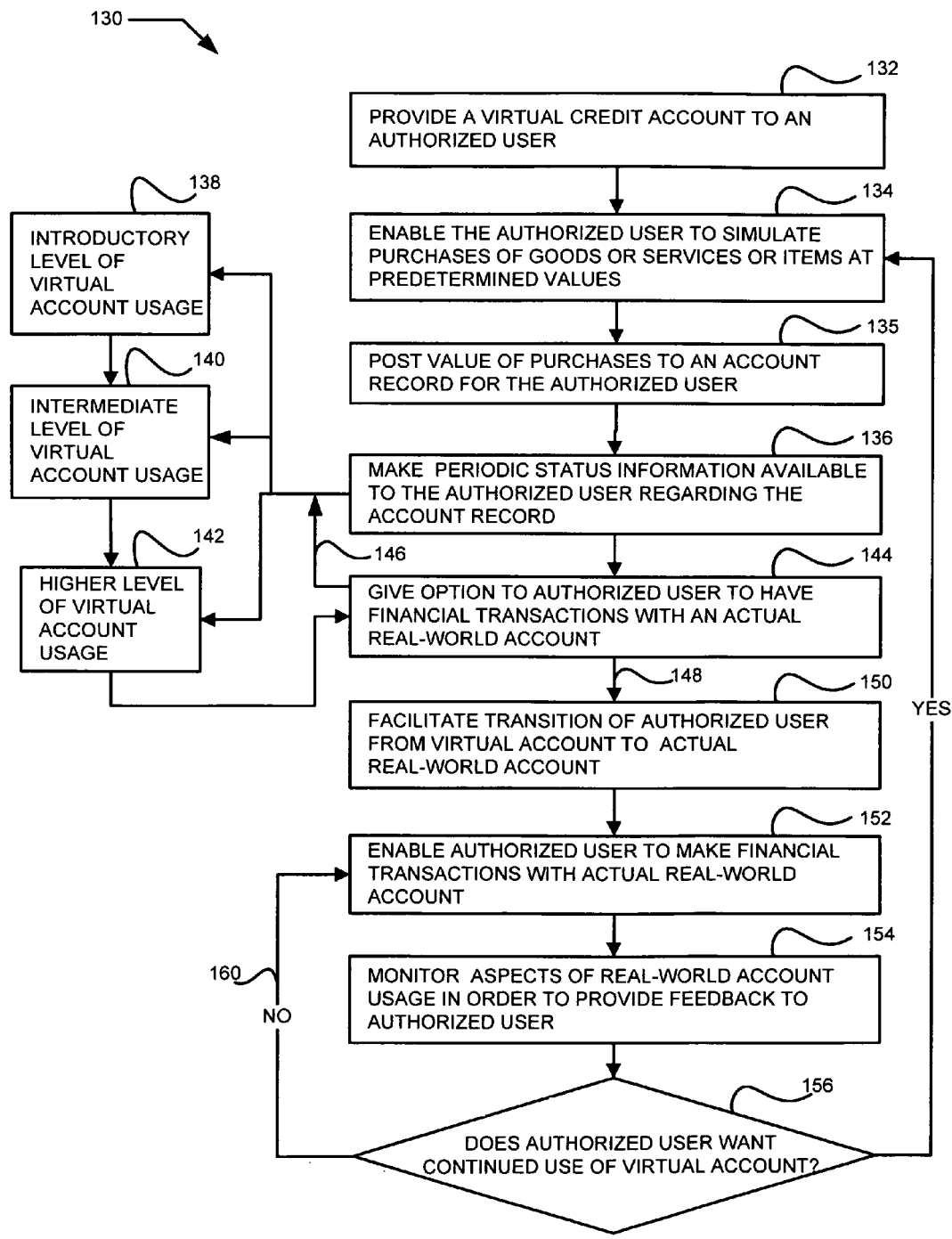
FIG. 3 is a more detailed flow chart showing a further exemplary process for additional embodiments.

A more detailed exemplary flow chart of FIG. 3 shows a process 130 involving alternative usage of both a virtual credit account and a real-world account. As an initial step for new users, a virtual credit account is provided to an authorized user (block 132). The authorized user is enabled to simulated purchases of goods or services or items at predetermined values (block 134). The value of the purchases is posted to an account record (block 135). Periodic feedback including status information is made available to the authorized user regarding the virtual credit account record (block 136).

Various levels of participation are provided for usage of the virtual credit account. Of course any number of levels with different types of credit opportunities for virtual account usage could be incorporated into embodiments, perhaps depending upon the desired financial, educational, and entertainment goals of a system designer as well as possibly depending upon the skill, experience and sophistication of the authorized user. By way of example only, the illustrated process 130 of FIG. 3 includes an introductory level (block 138), an intermediate level (block 140) and a higher level (block 142). After participating in one or more levels of virtual account usage, an authorized user is given an option to have financial transactions with an actual real-world account (block 144). The authorized user may choose to continue (see arrow 146) using the virtual credit account, or take the option (see arrow 148) for transition to the actual real-world account. In some embodiments, the user may have an unrestricted option to make the transition to the actual real-world account. Some embodiments may allow the user to have the option of using either the virtual credit account or an actual financial account during given time periods.

If the option for transition to the actual real-world account is exercised, the transition of the authorized user is facilitated from the virtual credit account to the actual real-world account (block 150). The authorized user can then be enabled to make financial transactions with the actual real-world account (block 152). Aspects of usage of the real-world account may be monitored (block 154) in order to provide feedback to the authorized user. It is to be emphasized that usage of the real-world account does not preclude continued use of the virtual credit account. If the authorized user wants to continue use of the virtual credit account (block 156), then such continued use is made available. Continued use of the real-world account is also made available (see arrow 160).

Figure 4:
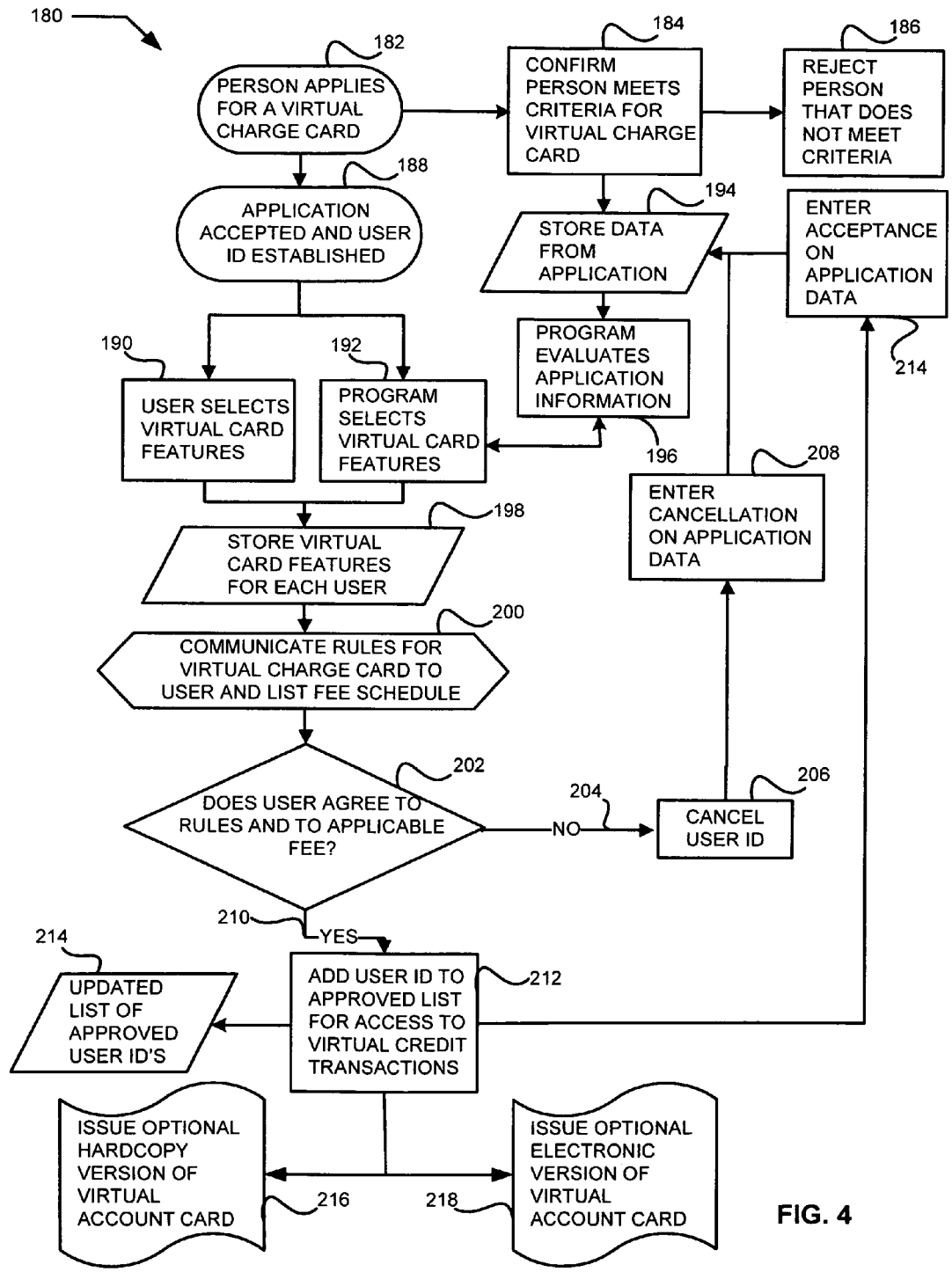
FIG. 4 is another more detailed flow chart showing an exemplary application process for a virtual charge card.

The detailed exemplary flow chart of FIG. 4 shows a process 180 for implementing an application procedure for a virtual charge card. A person who is not already an authorized user can make application (block 182) for a virtual charge card. An evaluation or screening confirms whether or not the person meets predetermined criteria (block 184) for having the virtual charge card. Persons that do not meet the criteria are rejected (block 186). When a person does meet the criteria, their application is accepted and a user ID established (block 188).

In some instances the virtual card features such as credit terms, payment terms, penalties, benefits, and the like may be selected by the user (block 190). In other instances a program may select the virtual card features (block 192), which features may be determined from stored application data (block 194) that is evaluated by the program (block 196). The virtual card features that are selected for each user are stored (block 198) for future reference. Where virtual account terms for a virtual card are being programmed for a new user, such programming may be based on user demographic information.

As part of the application procedure, a fee schedule and virtual card rules are presented to the user (block 200) for consideration. In order to continue the application process, the user decides whether to agree to the rules and applicable fees (block 202). If no agreement occurs (see arrow 204), the user ID is canceled (block 206), and the cancellation is entered (block 208) for storage with the other application data. If agreement is confirmed (see arrow 210), the user ID is added to the approved list (blocks 212, 214) that controls the access to virtual credit transactions involving the virtual credit cards, and the acceptance is also entered (block 214) for storage with the other application data.

A further feature offered to an approved user is the optional issuance of a hardcopy version of the virtual account card (block 216), and also the optional issuance of an electronic version of the virtual account card (block 218).

Figure 5:
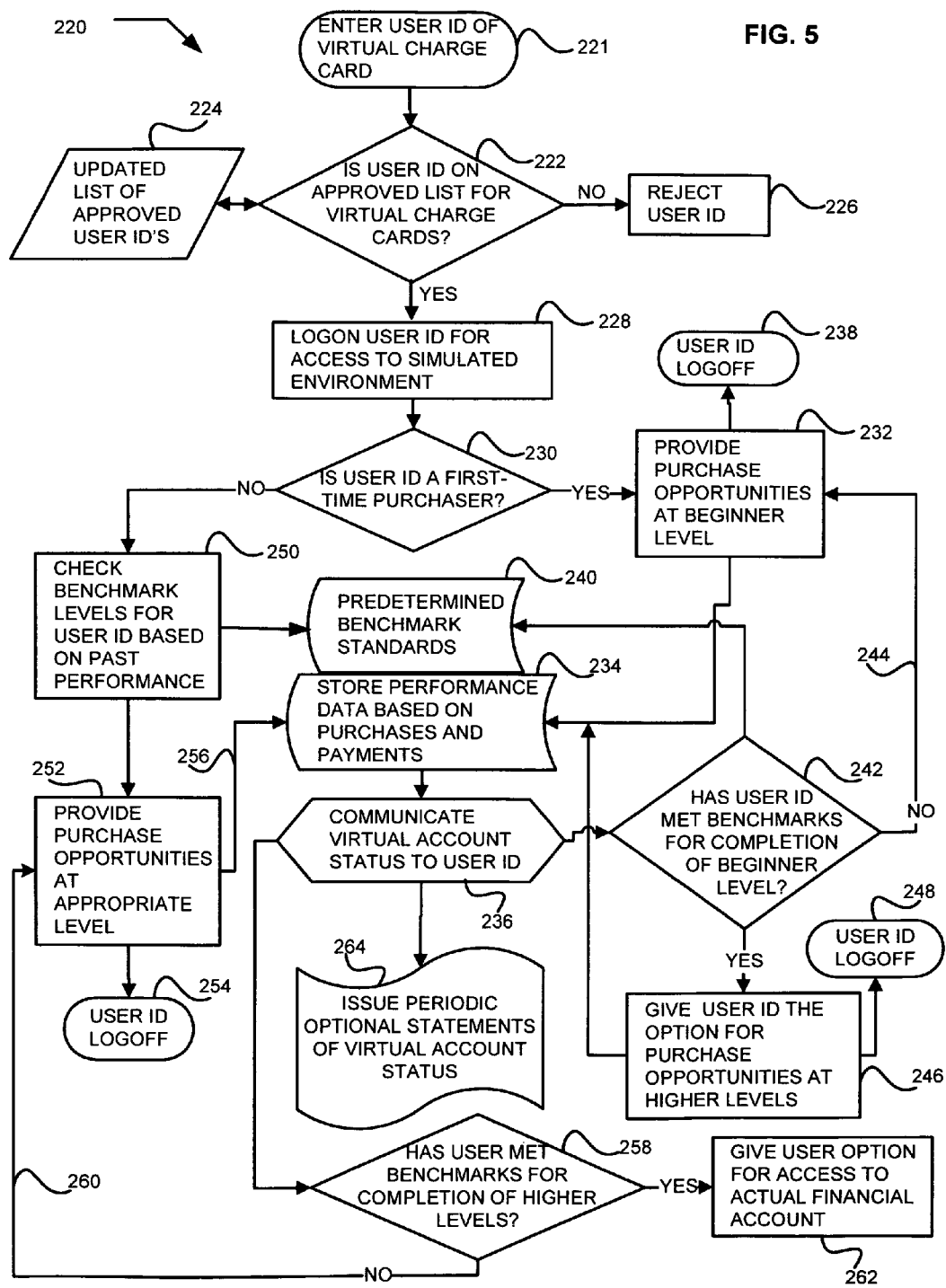
FIG. 5 is a detailed flow chart showing an exemplary manner of using a virtual charge card.

The detailed exemplary flow chart of FIG. 5 shows a process 220 for incorporating benchmark completion as a basis for giving an authorized user the option of having access to an actual financial account. A person is requested to enter the user ID (block 221) of a virtual charge card. The user ID is processed (block 222) to determine whether it is on an updated approved list (block 224). If not found on the updated approved list, the user ID is rejected (block 226). If found on the update approved list, the user ID is approved for logon to have access to a simulated environment (block 228).

A determination may be made to detect a user ID that is a first-time purchaser (block 230). If so, purchase opportunities are made available to the user ID at a beginner level (block 232). Any purchases and/or payments involving the virtual charge card are stored (block 234) as part of a performance data base for future reference. In some instances, revised virtual account terms for the virtual charge card may be programmed based on past performance records maintained in the performance data base. The virtual account status is periodically communicated to the user (block 236). There is no urgency imposed on the user to advance to another participation level, and user logoff (block 238) is available from the beginner level.

A user at the beginner level in this embodiment qualifies for advancement to another participation level when it has been determined that such user has met predetermined benchmark standards (block 240) for completion of the beginner level (block 242). Upon failure to meet such a beginner level benchmark standard, the user can return (see arrow 244) to purchase opportunities at the beginner level. In the event the beginner level benchmarks standards have been met, the user ID is given the option for purchase opportunities at higher levels (block 246). User logoff (block 248) is also available to exit from such higher levels.

When an approved user ID is not a first-time purchaser, a query is made (block 250) to check the stored past performance data (block 234) as compared to the stored benchmark standards (block 240) for this particular user ID. Based on the results of the query, purchase opportunities are provided at the appropriate participation level (block 252), along with a previously described user ID logoff (block 254). Any purchases and/or payments involving virtual credit transactions at these higher participation levels are also stored (see arrow 256) in the performance data base (block 234). The virtual account status is also periodically communicated (block 236) to the users at these higher participation levels.

When a review (block 258) determines that benchmark standards for completion at higher levels have not been met, the user can return (see arrow 260) for further purchase opportunities at such higher levels. Upon satisfactory completion of the higher level benchmark standards, the user has an option for access to an actual financial account (block 262). It is noted that this process embodiment provides for the issuance of periodic optional statements (block 264) indicating the status of the virtual charge card accounts.

Figure 6:
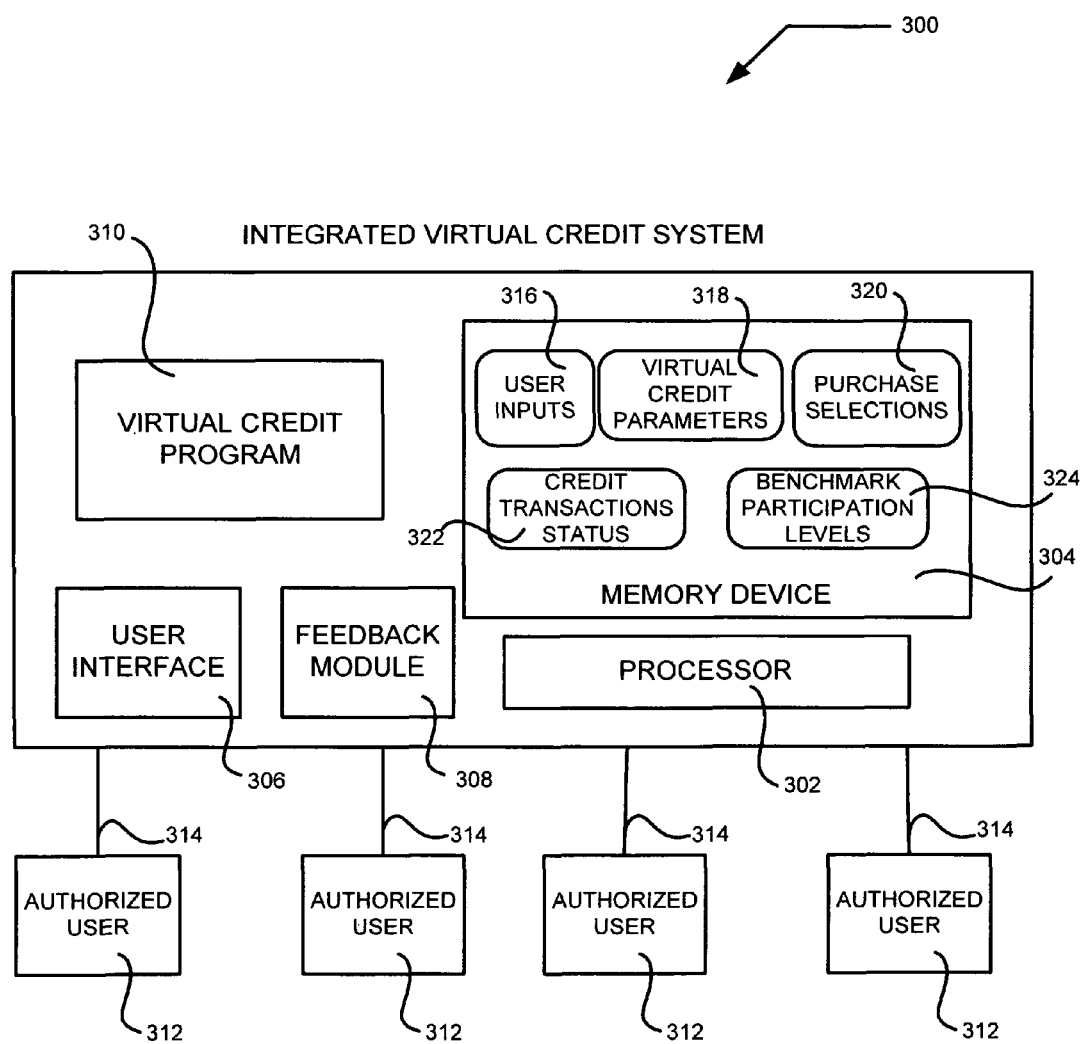
FIG. 6 is a schematic block diagram for an exemplary implementation of some embodiments.

Referring to the schematic block diagram of FIG. 6, an exemplary embodiment of an integrated virtual credit system 300 includes a processor 302, memory device 304, user interface 306, feedback module 308, and virtual credit program 310. A plurality of authorized users 312 who may be at different locations have bi-directional communication links 314 with the virtual credit system 300 in order to submit inputs via the user interface 306 and to receive informational messages from the feedback module 308. The virtual credit program 310 may include one or more computer program products with a carrier medium having program instructions thereon. Such computer program products may run on multiple computer devices or run on an integrated computer system, depending on the circumstances.

The memory device 304 provides re-writable storage capability associated with each authorized user 312. The various categories of data stored in the memory device 304 include user inputs 316, virtual credit parameters 318, purchase selections 320, credit transactions status 322, and benchmark participation levels 324. This system enables multiple users to make simulated purchases or incur simulated credit obligations that are associated with and posted to different virtual accounts. The multiple users are also enabled to make simulated compensation against balances due or obligations owed for the different virtual accounts.

Figure 7:
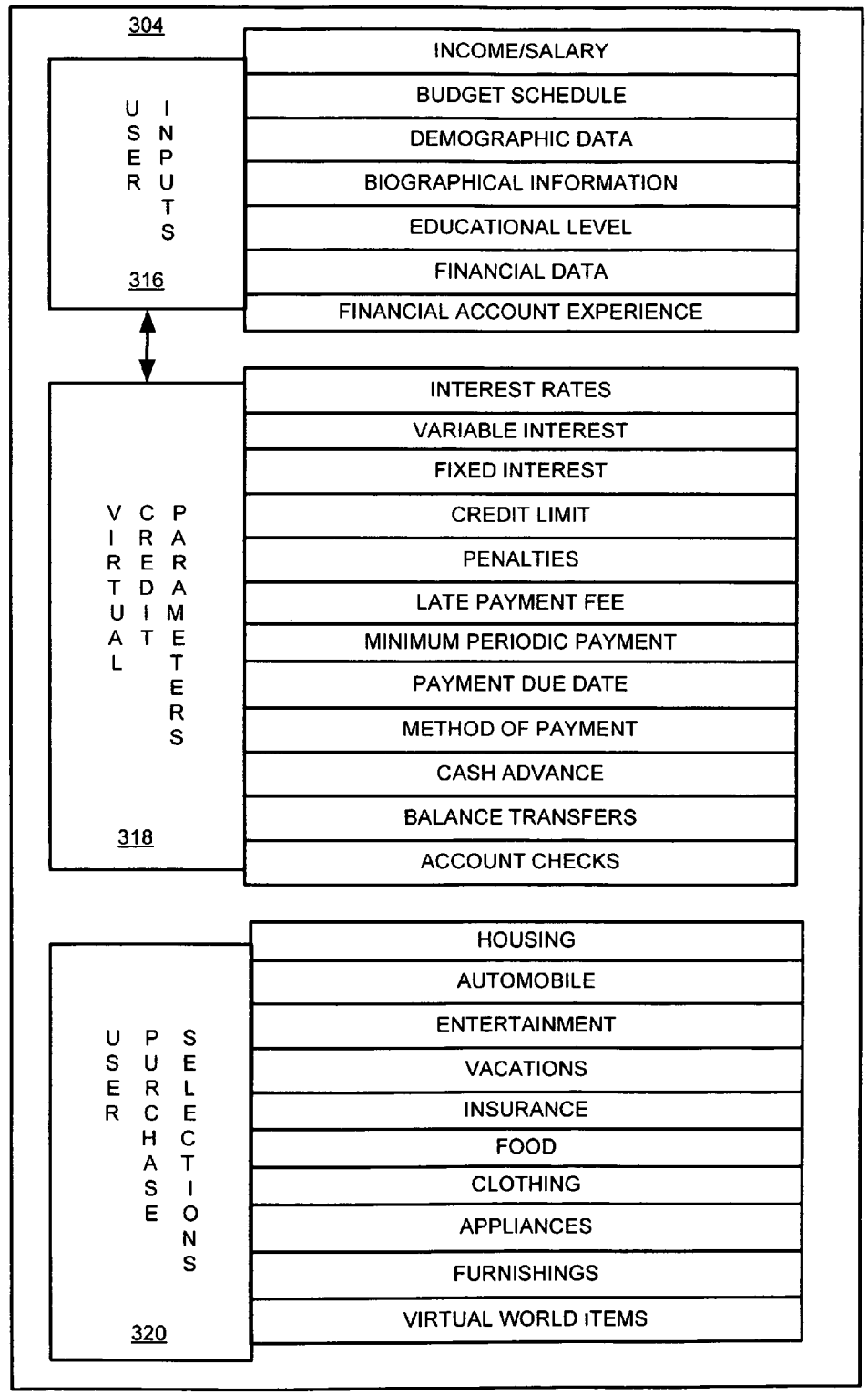
FIG. 7 is a schematic block diagram showing exemplary categories of informational data that may be involved in some embodiments.

The schematic block diagram of FIG. 7 shows an illustrative but not exhaustive list of data categories that can be accessed in the memory 304 by the user interface 306 and the feedback module 308. For example, user inputs 316 may include categories such as income/salary, budget schedule, demographic data, biographical information, educational level, financial, and financial account experience. As an additional example, virtual credit parameters 318 may include categories such as interest rates, variable interest, fixed interest, credit limit, penalties, late payment fee, minimum periodic payment, payment due date, method of payment, cash advance, balance transfers, and account checks. As a further example, user purchase selections 320 may include categories such as housing, automobile, entertainment, vacations, insurance, food, clothing, appliances, furnishings, and virtual world items.

Figure 8:
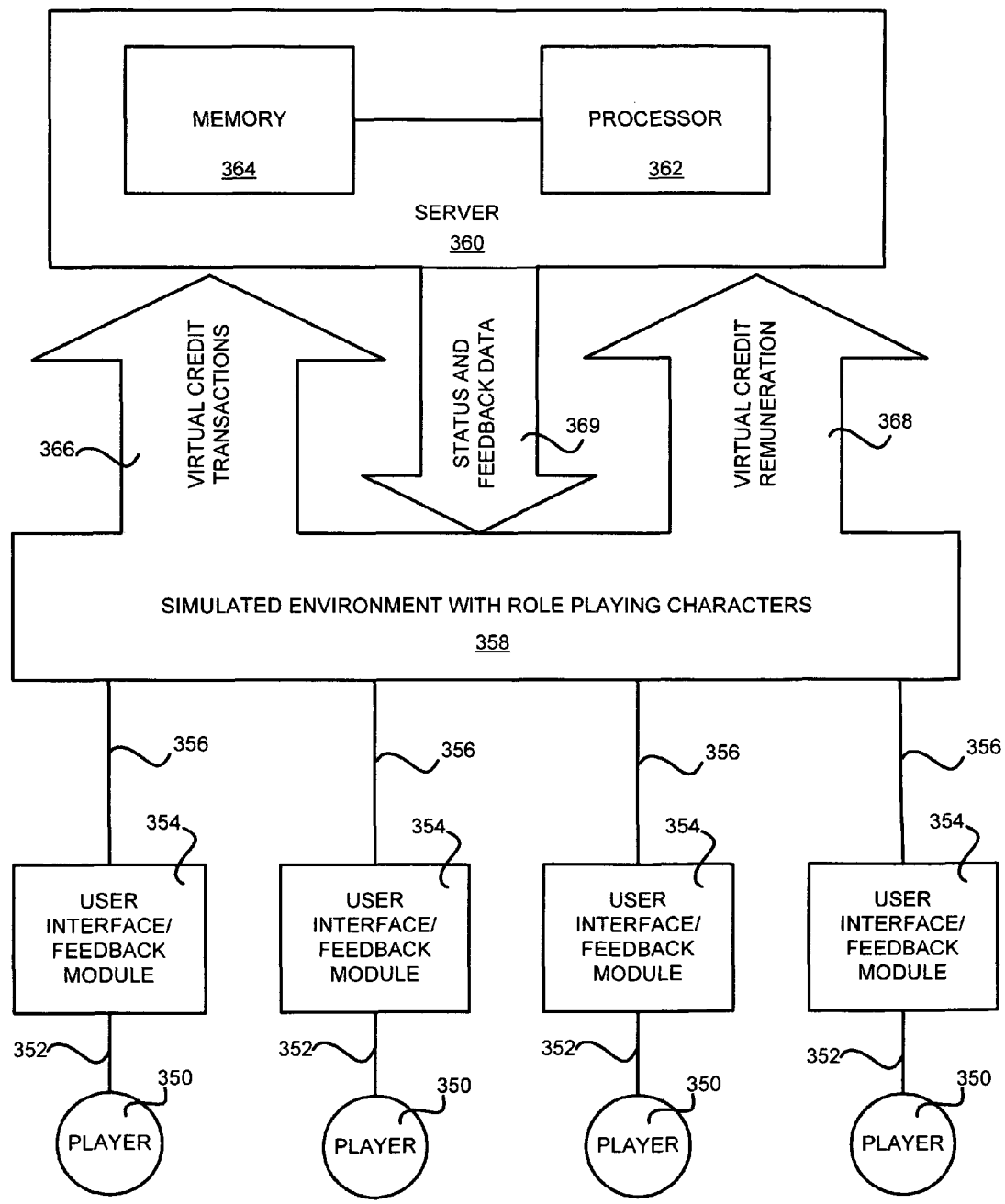
FIG. 8 is a schematic functional diagram showing a possible implementation in a simulated environment with role playing characters.

The schematic block diagram of FIG. 8 shows an exemplary embodiment for a multi-player system implemented in a simulated environment with role playing characters. Of course, other types of simulated environments have the capability for practicing the disclosed methods and techniques, particularly where multiple players interact with the simulated environment over extended periods of time. In many instances the players can logon for a period of participation, and from time to time logoff in order to carry out their real-world activities and obligations, sometimes perpetuating the fictional role playing over many weeks and months.

As shown in FIG. 8, individual players 350 have access via a first bi-directional communication link 352 to a user interface/feedback module 354 with connects through a second bi-directional communication link 356 to a simulated environment 358. Such players can interact with each other or with characters, events, purchase opportunities, competitions, and the like that are provided in the simulated environment 358. The bi-directional communication links also serve to provide player access to products and/or services and/or other items of value that can be acquired pursuant to a virtual credit arrangement.

A server 360 includes a processor 362 connected with a memory 364 in order to receive, store, update, process, and transmit information data and messages regarding virtual credit arrangements related to the simulated environment 358. In that regard, various details regarding virtual credit transactions are transmitted through a third communication link 366 to the server 360. Similarly various details regarding virtual credit remuneration or compensation are transmitted through a fourth communication link 368 to the server. Another communication link 369 enables status and feedback information to be communicated back to the simulated environment 358, and in some instances back to the players 350.

Figure 9:
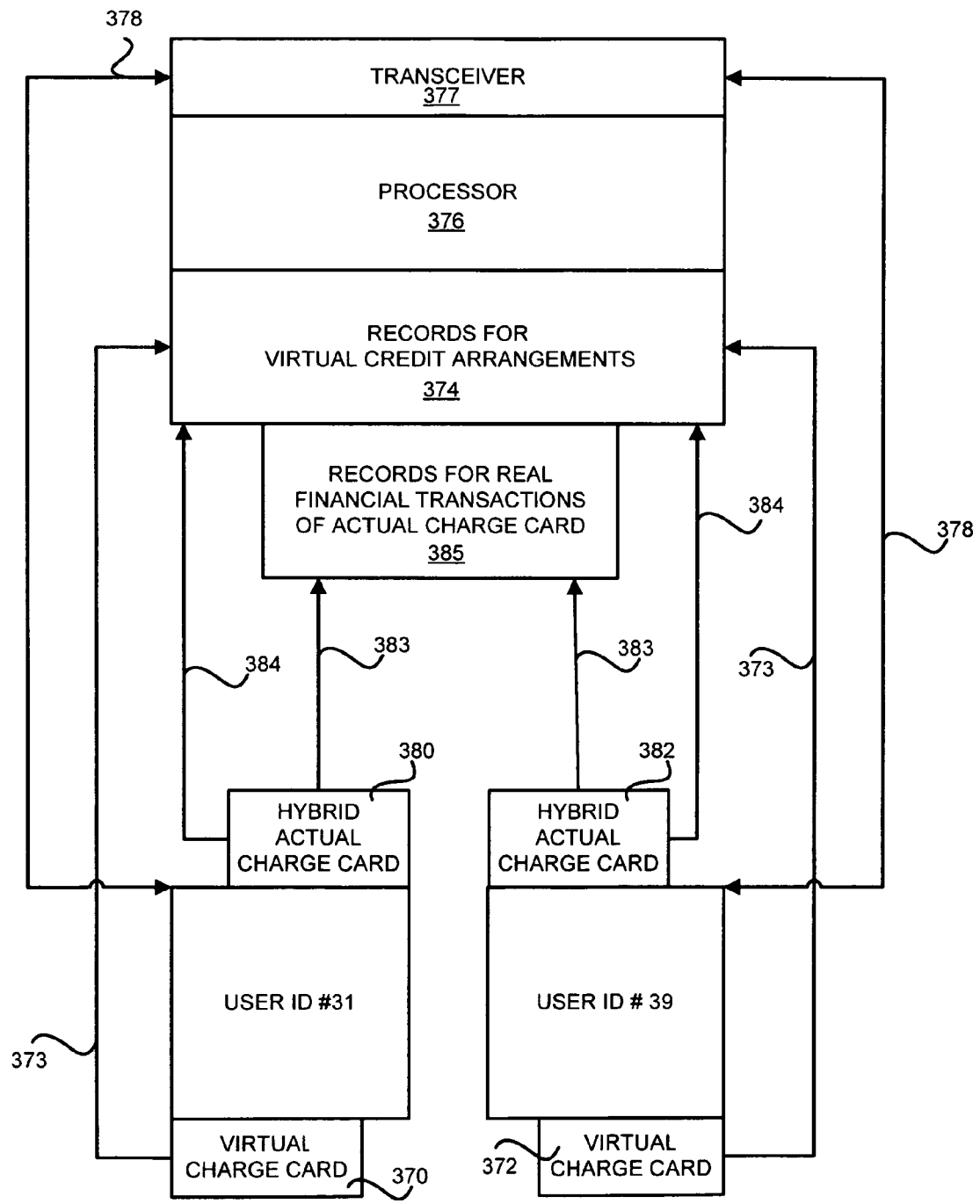
FIG. 9 is a schematic functional diagram for an exemplary system that embodies various features.

The schematic block diagram of FIG. 9 shows an exemplary embodiment wherein multiple users (e.g., user ID #31 through user ID #39) can use virtual accounts such as virtual charge cards 370, 372 in order to participate in virtual financial transactions. When the virtual charge card is used, a record of the transaction is transmitted as indicated by arrows 373 for storage in a memory device 374 that keeps records for virtual credit arrangements. A processor 376 is operatively coupled to the memory device 374 and also to a transceiver 377 for bi-directional communication regarding the virtual financial transaction through link 378 with the users #31 through #39.

These same users #31 through #39 also have access to hybrid actual charge cards 380, 382 in order to participate in actual real-world financial transactions. When the hybrid actual charge card is used, a record of the transaction is transmitted as indicated by arrows 383 for storage in a memory device 385 that keeps records for real financial transactions. Such real financial transactions may or may not be related to a virtual credit arrangement. However in some instances the hybrid actual charge card usage may be directly or indirectly related to a virtual credit arrangement, including but not limited to down payments, guarantees, compensation, renegotiation, resolution, transferability, etc. The details of such relationship will be communicated to the virtual credit arrangements storage memory device 374 as indicated by arrows 384. The bi-directional communication link 378 serves shared functional purposes for both the virtual charge card and the actual charge card, including but not limited to transmitting messages regarding credit terms associated with each different user ID account as well as feedback and status information for purchases, payments, negotiations, remuneration, and resolution involving the virtual credit arrangements.

It will be understood that the processor 376 and bi-directional link 378 are also operatively coupled with the memory device 385 in order to provide bi-directional communication regarding hybrid charge card transactions through link 378 with the users #31 through #39. Such communications may include the results or consequences of purchases and/or payments made regarding the actual charge card transactions. Such communications may also relate to terms of a credit transaction.

It will be further understood that all of the references herein to communication links with virtual account users and real-world account users may include interactive communications involving question/answer sequences, prompt/selection sequences, option/choice sequences, and the like.

It will also be understood by those skilled in the art that the various communication links can be separated into different communication channels or media as well as combined into an integrated broadband or narrowband link such as wired, wireless, cable, etc. It is further understood that integrated or separate modules can be provided for user interface functions and/or for feedback functions. The particular exemplary systems disclosed herein are provided only for illustration.

Figure 10:
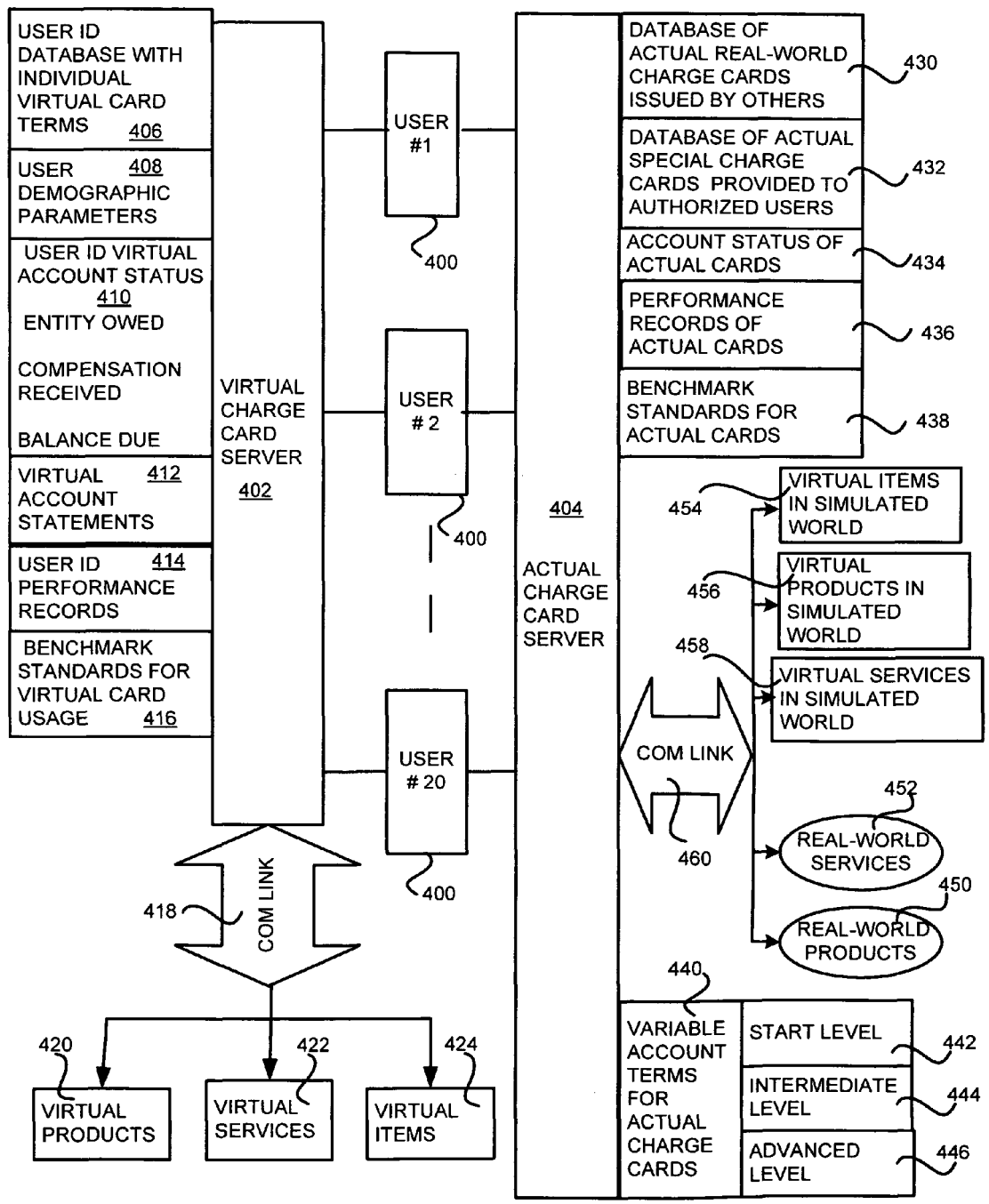
FIG. 10 is a more detailed schematic functional diagram for some embodiments that incorporate virtual charge cards and real-world charge cards.

Referring to the schematic block diagram of FIG. 10, a plurality of persons 400 (e.g., user #1, user #2 through user #20) have access to both a virtual charge card server 402 and an actual charge card server 404. The disclosed system provides for monitoring any action taken to make resolution or provide compensation that may be required by a virtual credit arrangement.

The embodiment of FIG. 10 provides a server apparatus including a memory and a processor for maintaining information regarding credit transactions involving purchases by a user of various virtual products and/or services and/or virtual items. A bi-directional user interface is provided for exchanging information messages between the user and the server apparatus regarding credit terms associated with the purchases. As described in more detail herein, the embodiment of FIG. 10 is an exemplary implementation of a system and method wherein credit transactions are capable of resolution by virtual-world compensation and by real world compensation.

The access shown for the multiple users in FIG. 10 is for purposes of illustration, and persons skilled in the art will understand that various types of communication links can be utilized to achieve the necessary functional data and message exchanges between the users and the computerized data processing and storage systems exemplified by the servers.

Also, various types of virtual credit arrangements and real-world financial accounts can be incorporated into the type of system as disclosed herein. In some instances, specific terms of a virtual credit arrangement or transaction may be based on one or more factors such as demographic information, financial account records, experience levels, completion of performance benchmarks, role play world activities, and user negotiations.

The virtual charge card server 402 includes various predetermined data records as well as other dynamically updated records that are used by the server to help provide virtual credit services based on different types of credit arrangements and accounts. Exemplary categories of records available to the virtual charge card server 402 include user ID data and related individual virtual card terms 406, user demographic parameters 408, user ID virtual account status data 410 (e.g., entity/person owed, compensation already received, and remaining balance due), virtual account statements 412, user ID performance records 414, and benchmark standards for virtual card usage 416.

A bi-directional communication link 418 enables the users 400 to have access for engaging in credit transactions involving virtual products 420, virtual services 422, and virtual items 424. When a credit transaction has been completed based on advertised or negotiated terms, the informational details are transmitted via communication link 418 to the server for appropriate processing and storage. This allows any balance due or obligation owed to be posted to the user's virtual credit account. When remuneration is made by one of the multiple users with something of real value against such balances due or obligations owed, such activity is also posted to the appropriate virtual credit account.

The actual charge card server 404 includes various predetermined data records as well as other dynamically updated records that are used by the server to help provide actual credit services based on different types of credit arrangements and accounts. Exemplary categories of records available to the actual charge card server 404 includes a database 430 of actual real-world charge cards issued to users by others such as third party issuers, a database 432 for actual special charge cards provided to authorized users, account status records 434 for actual charge cards, and performance records 436 for actual charge cards. These records help to identify actual real-world accounts selected by a user, including the actual special charge cards created for the user.

Other categories of records include benchmark standards 438 for actual charge cards, and variable account terms 440 for actual charge cards. These variable account terms 440 may be divided between exemplary levels such as start level accounts 442, intermediate level accounts 444, and advanced level accounts 446. The actual charge card server 404 may enable a user to have an option to move between different participation levels. In some instances completion of performance benchmarks may be required before allowing the user to move to a high participation level.

Many of the functional capabilities and possibilities attributable to virtual credit accounts may also be provided to actual hybrid charge card accounts. For example, the user may be enabled to vary one or more of the credit terms such as interest rate, due date, grace period, penalties, credit limit, service charge, transferability, weekly or monthly or annual fees, automatic repayment, payment of other obligations, monetary advance, re-negotiated debt, and exchange value.

Some of the actual charge cards are primarily suitable for use in purchasing real-world products 450 and real-world services 452. This may especially be true of actual charge cards issued by third parties. However, some actual financial accounts issued by third parties as well as some actual special cards such as hybrid cards described herein may also have capability to purchase or otherwise become involved in transactions related to simulated credit arrangements such as simulated purchases of virtual world items 454, virtual world products 456, and virtual world services 458. As indicated in the drawing, such virtual items, products and/or services may often be found in a simulated environment such as a role playing fictional world. A bi-directional communication link 460 enables the users to engage in the various credit transactions, and provide for transaction details to be processed by the actual charge card server 404 and stored or updated in the appropriate database.

It will be understood from the embodiments of FIGS. 9 and 10 that hybrid charge accounts can be associated with a plurality of users, respectively, for use with credit transactions involving purchases of various virtual products and/or virtual services and/or virtual items. Furthermore, an aspect of the disclosed methods and systems for hybrid charge accounts provides for their credit terms to be established or changed based at least partially on user selections, demographics, user performance, user experience, and/or benchmark parameters.

The embodiments of FIGS. 8, 9 and 10 further illustrate computer apparatus that provides virtual credit including storing and processing virtual credit transactions involving products or services or items that are available in a simulated environment. An interactive communication link with the computer apparatus enables a user to participate in the virtual credit transactions. A user interface is capable of operable connection to the interactive communication link in order for the user to transmit informational inputs and to make selections that help to provide a basis for credit terms of the virtual credit transactions.

The interactive communication link also enables the user to make remuneration of a debt or an obligation resulting from the virtual credit transactions. Such remuneration may be in the form of real-world money or fictional-world money.

Based on the foregoing descriptions and drawing disclosures of exemplary embodiments, many new and advantageous features provide benefit to the virtual credit account users, as well as benefits to the entities that provide financial account services, and benefits to entities that provide simulated role playing environments. In that regard, some embodiments enable multiple users to make remuneration with something of virtual value against balances due or obligations owed for virtual credit accounts. In some embodiments multiple users can make remuneration with something of real value as resolution of virtual debts or obligations.

Features disclosed herein also include billing simulated purchases to a virtual account that allows carry-over balances. Feedback is communicated to the user regarding results of carry-over balances such as non-payment, partial payment, and full payment of balances due. Feedback is also communicated to the user regarding consequences of related purchase and payment activity for virtual credit accounts. In some instances, the system and method provides monitoring of actions taken to make resolution or provide compensation required by a virtual credit account arrangement.

Other features include periodically changing various credit terms for a virtual credit arrangement, such as interest rates, due dates, grace periods, penalties, credit limits, service charges, transferability, weekly or monthly or annual fees, automatic repayment provisions, payment of other obligations, monetary advances, re-negotiation of the debt, and exchange value as compared to real-world or fictional money. In certain instances, the user may have the option to vary one or more of these virtual account terms.

Various types of virtual credit accounts as well as actual financial accounts can be incorporated into the disclosed methods, processes, systems and apparatus including accounts allowing carry-forward balance, accounts requiring full payment, debit cards, accounts with free benefits, accounts with extra-cost benefits, accounts providing discount promotions, cash advance accounts, accounts with beneficial links, insurance product accounts, accounts with value added benefits, business and financial institution charge cards, checking accounts, lines of credit, vouchers, and installment promissory notes accounts.

Performance benchmarks for virtual credit arrangements or accounts in accordance with certain aspects of the disclosure herein may be based on the credit record of virtual accounts; credit record of real financial accounts, test results, fictional role playing achievements, fictional role playing skills acquired, previous experience, endorsements, and group memberships in real world and role playing environments. Completion of such performance benchmarks may be required before allowing the transfer to a higher participation level, and also before facilitating transition of the user to an actual financial account. Such performance benchmarks may be based on activities of the user in a role playing environment.

It is to be understood that different categories of purchases may be available to be charged to a virtual credit account, such as travel reservations, auctions, food, clothing, merchandise, vehicles, insurance, appliances, furnishings, recreation, competitions, other items having virtual monetary value, installment purchases, entertainment, rentals, education, books, publications, games, other items having real monetary value, and fictional role playing items.

Some embodiments contemplate using a simulated billing period for virtual credit account that occurs in real time at various intervals, such as a month, a week, a day, an hour, or lesser periods. The simulated billing period may be based on various parameters such as the number of purchase transactions, average balance owed, highest balance owed, user's age, user's education, user's experience level, and user's benchmark performance.

Virtual account terms can be based on various informational data, such as demographic information, past performance records, user negotiations, and choices selected by users. The terms of usage of hybrid charge accounts capable of both virtual account activities and real-world financial transactions can be established or changed based at least partially on user selections, user demographics, as well as other factors that are also used for determining virtual credit account terms.

Although the virtual credit arrangements may primarily involve transactions involving real-world money and/or fictional world money, some embodiments clearly contemplate virtual credit arrangements and accounts that may require remuneration with a non-monetary real-world item or action, as well as remuneration with a non-monetary fictional world item or action.

In some preferred embodiments, computerized components and systems enable multiple users to make purchases or incur obligations associated with different virtual credit accounts. Also such computerized implementations enable multiple users to provide compensation against balances due or obligations owed for different virtual accounts.

The exemplary system and apparatus embodiments shown in FIGS. 6-10 along with other components, devices, know-how, skill and techniques that are known in the art have the capability of implementing and practicing the methods and processes shown in FIGS. 1-5. It is to be understood that the methods and processes can be incorporated in one or more computer program products with a carrier medium having program instructions thereon. However it is to be further understood that other systems, apparatus and technology may be used to implement and practice such methods and processes.

Figure 11:
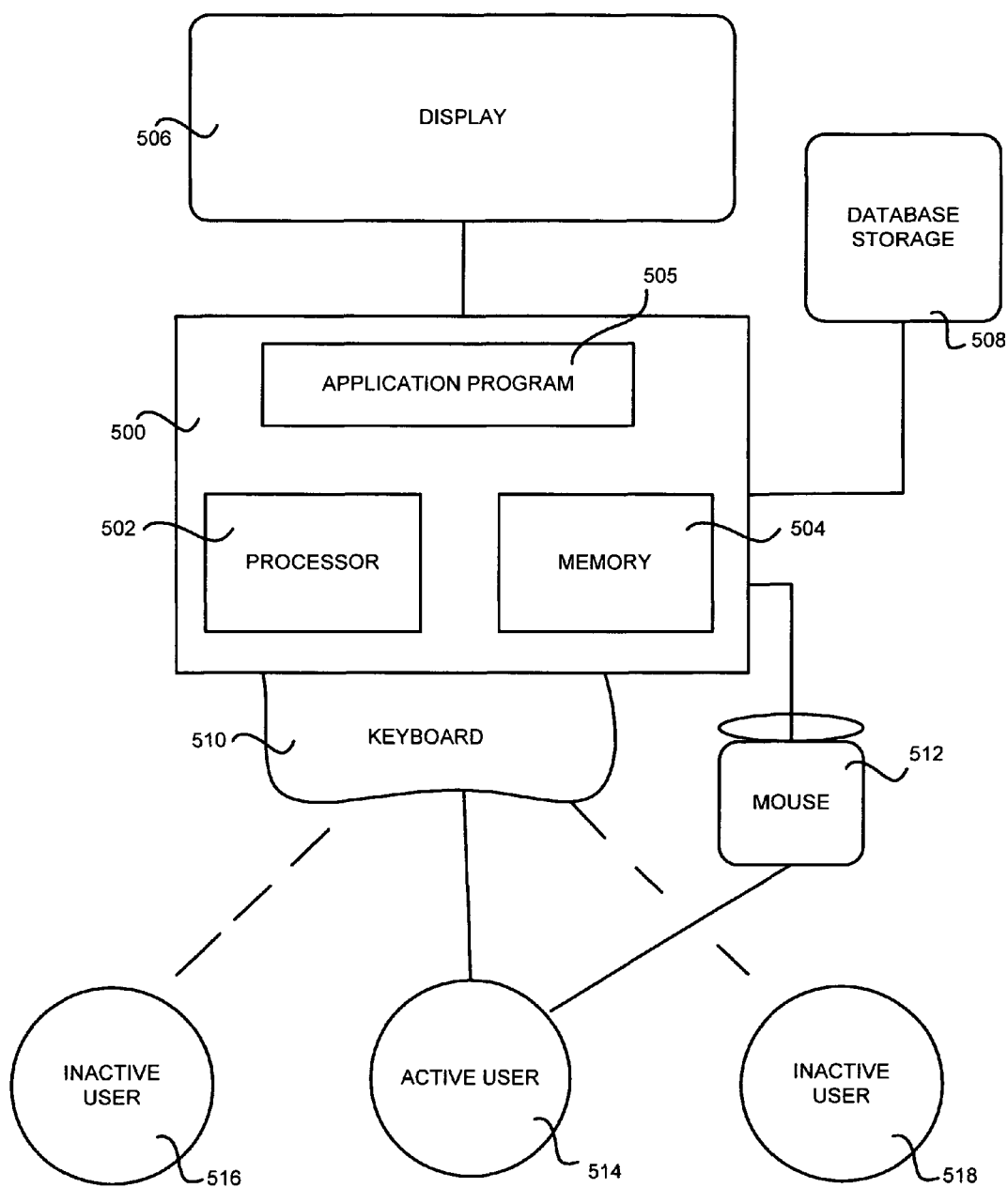
FIG. 11 is a schematic block diagram for certain embodiments implemented for one or more users sharing a computer system.

Referring to FIG. 11, a computerized implementation for the methods disclosed herein may include a computer system 500 having a processor 502 and memory 504 for running an application program 505. The application program 505 may be incorporated in one or more computer program products having a carrier medium with program instructions thereon. Peripheral components may include display 506 and database storage unit 508 as well as input devices such as keyboard 510 and mouse 512. An active user 514 may have access to features disclosed in the exemplary flowcharts of FIGS. 16-25 by running the application program 505. Inactive users 516, 518 may also periodically have access to the application program 505 including non-real time interaction through the program with each other and/or with active user 514 in order to participate in the benefits and advantages of the methods and processes disclosed herein.

Figure 12:
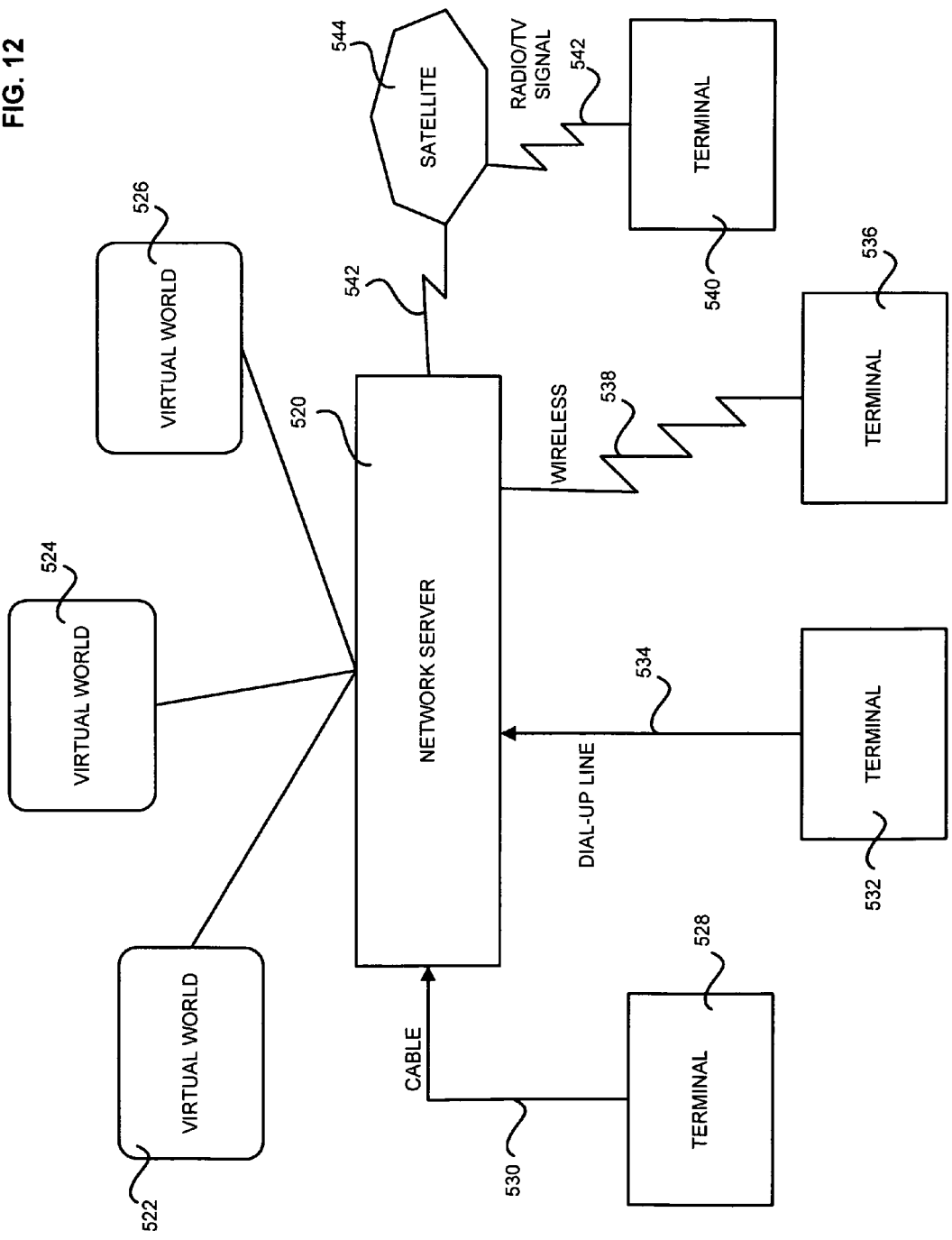
FIG. 12 is a schematic block diagram for possible implementations involving different virtual world environments accessed via exemplary types of communication links.

The schematic diagram of FIG. 12 illustrates the availability of the present methods and processes in a networking system having a network server 520 with communication links to different virtual world environments 522, 524, 526. In this exemplary version, terminal 528 has access through cable connection 530, terminal 532 has access through dial-up line 534, terminal 536 has access through wireless connection 538, and terminal 540 uses transmission signals 542 (e.g., radio or television signals) via satellite 544 for access to network server 520. As with the system of FIG. 11, players may be logged on to participate simultaneously in real-time virtual credit transactions in simulated world environments, or be respectively logged on during non-overlapping or partially overlapping time periods. Such participation may be directly with other parties or indirectly through intermediaries, depending on the circumstances involved.

Figure 13:
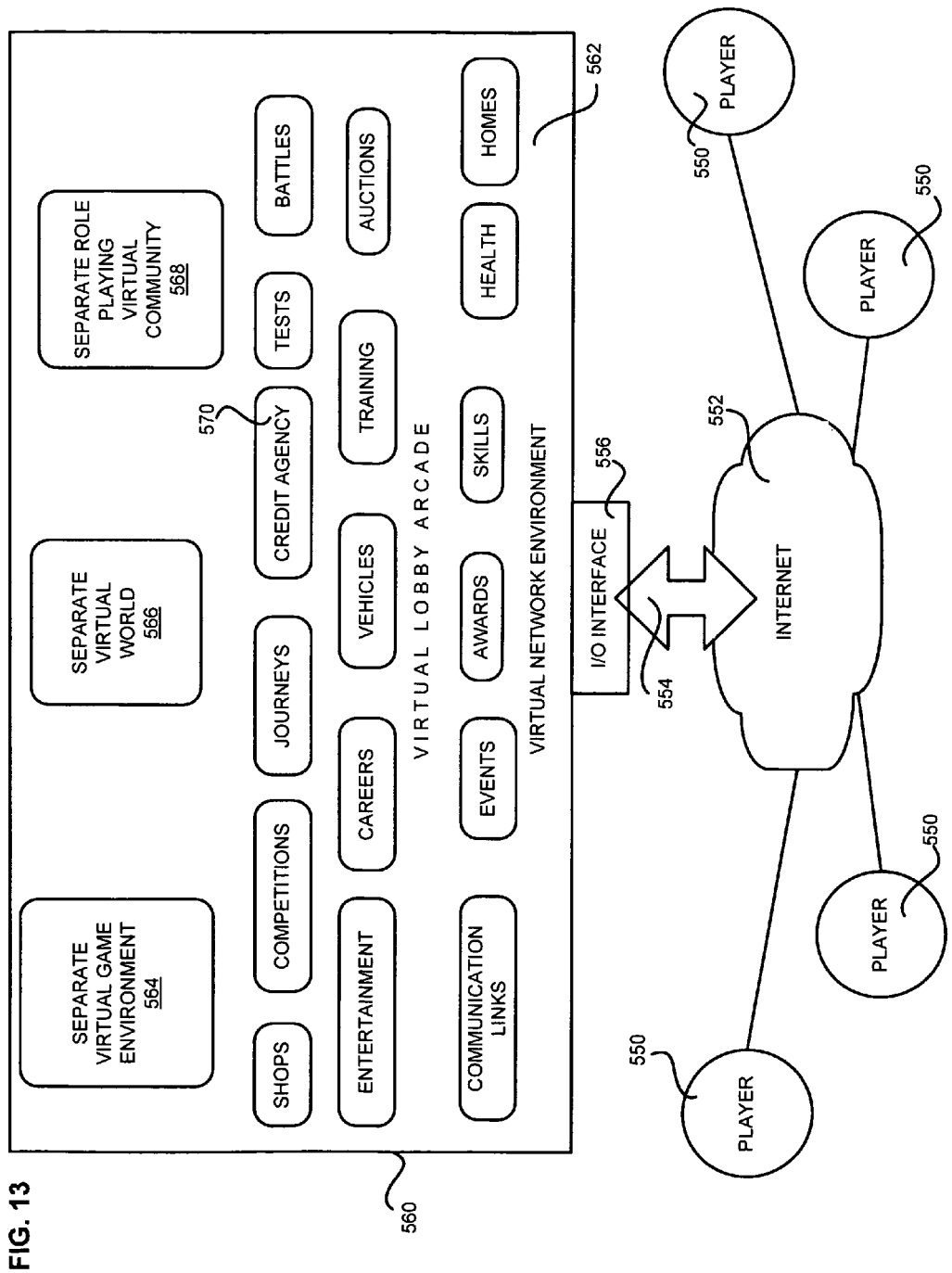
FIG. 13 is a schematic block diagram showing an embodiment providing player access via the Internet to a virtual network of separately operated virtual world environments.

Referring to the schematic diagram of FIG. 13, access to virtual network environment 560 may be accomplished for players 550 via Internet 552 having an interactive communication link 554 through I/O interface 556. Such a virtual network 560 may include a virtual lobby arcade 562 with various types of virtual opportunities. The categories for such virtual opportunities are almost unlimited, and may for example include shops, competitions, journeys, test, battles, entertainment, careers, vehicles, training, auctions, communication links, events, awards, skills, health and homes. A virtual credit agency office 570 operating, for example, as a storefront business may enable players to obtain information and issuance of virtual credit accounts usable in the virtual lobby arcade 562.

It will be understood that separately owned virtual environments may be included as part of the virtual network environment 560, including virtual game environment 564, virtual world 566, and role playing virtual community 568. The credit services of virtual credit agency office 570 may also be usable in these separate individual virtual environments based on appropriate agreements with their owners and/or operators.

Figure 14:
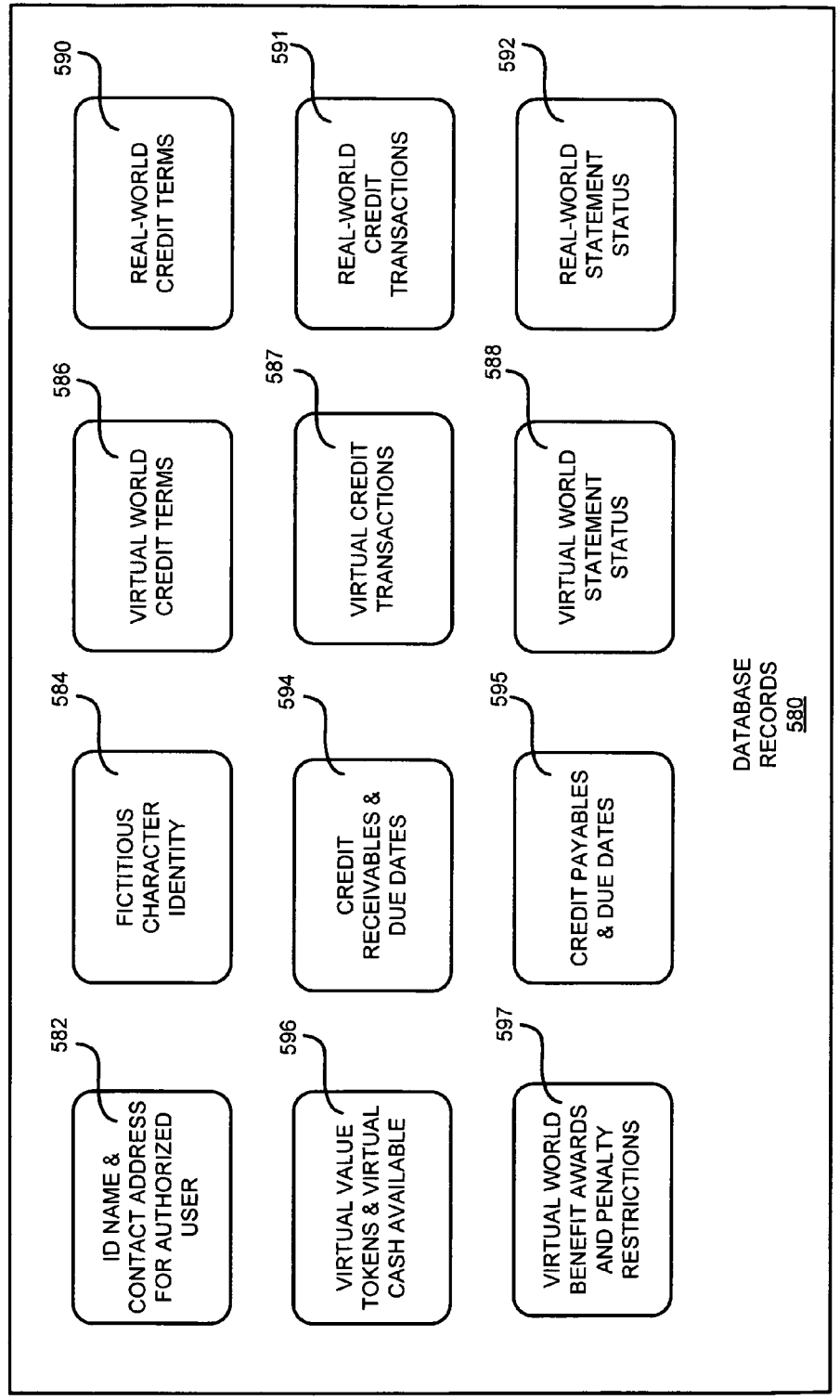
FIG. 14 shows exemplary types of database records related to real-world and virtual world credit transactions.

The schematic illustration of FIG. 14 shows exemplary database records 580 that may be used to practice the business and credit techniques disclosed herein. Various exemplary categories of records may include an ID name and contact address 582 for an authorized user, a fictitious character identity 584 for such user, virtual world credit terms 586 for a particular credit account, virtual credit transactions 587, and virtual world statement status 588. Where the credit account includes the optional features for real-world credit transactions, other exemplary categories of records may include real-world credit terms 590 for a particular credit account, real-world credit transactions 591, and real-world statement status 592.

Further exemplary categories of database records may include credit receivables and related due dates 594, credit payables and related due dates 595, virtual value tokens and virtual case available 596 for a particular player's account, and virtual world benefit awards and penalty restrictions 597 applicable to a particular player's account. It will be understood by those skilled in the art that these types of records are dynamically updated based on activity in the real-world as well as in virtual world environment. Such records are accessible as appropriate to players, credit account entities, third party business owners, virtual world environment operators and owners, and the like.

Figure 15A:
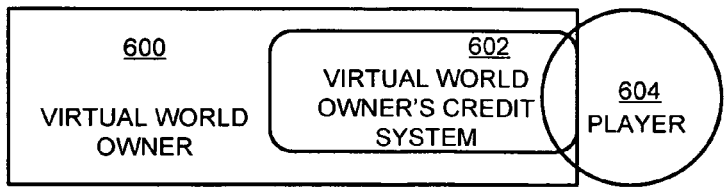
FIGS. 15A through 15E schematically illustrate some exemplary implementations of virtual credit arrangements in a simulated environment.

Various exemplary inter-relationships arising from the virtual credit transactions contemplated by the present methods and processes are illustrated in the schematic diagrams of FIGS. 15A-15E. For example, FIG. 15A depicts a virtual world publisher 600 operating a virtual world credit system 602 that extends credit to a player 604 based on the player's purchases and credit arrangements involving that particular virtual world.

Figure 15B:
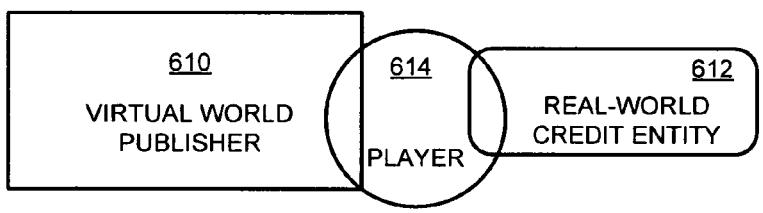

FIG. 15B shows an exemplary implementation wherein a virtual world publisher 610 engages another credit entity such as, for example, a real-world credit entity 612 for the purpose of offering virtual credit services to a player 614 who participates in that particular virtual world.

Figure 15C:
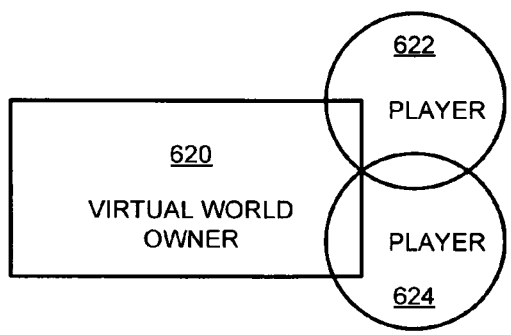

FIG. 15C shows an exemplary implementation wherein a virtual world publisher 620 enables multiple players such as 622, 624 to enter into virtual credit arrangements with each other.

Figure 15D:
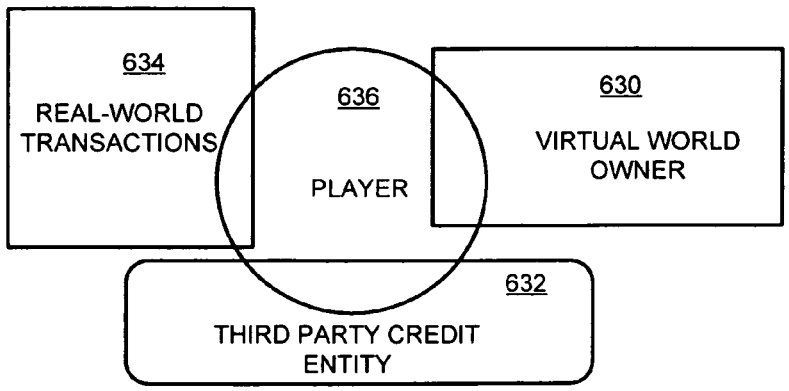

FIG. 15D shows an exemplary implementation wherein a virtual world owner 630 enables another credit entity 632 to offer either or both types of credit services: virtual world credit services to a virtual world participant or player 636, and real-world credit services involving real-world transactions 634.

Figure 15E:
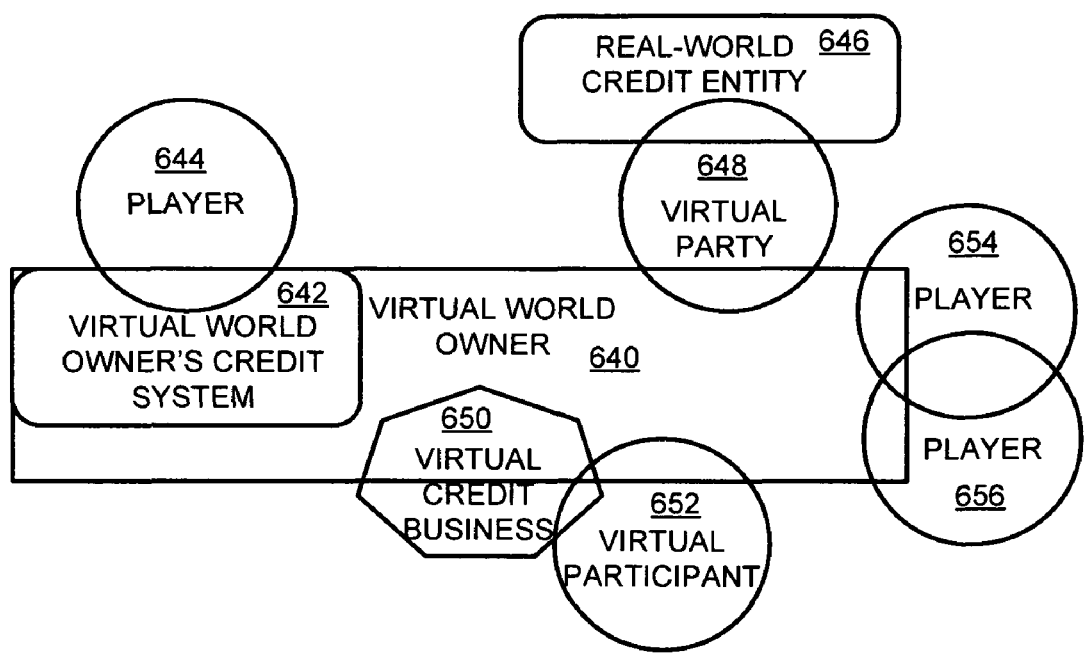

FIG. 15E shows an exemplary implementation wherein an entity or person owning virtual world rights 640 has its own virtual world credit system 642 that may involve one or more virtual participants such as player 644. A separate virtual credit business 650 operated by an authorized third party may offer its own credit account or arrangement to one or more virtual participants 652. A real-world credit entity 646 may provide virtual credit services to one or more virtual parties 648. As a final example occurring in this illustrated version of a virtual world embodiment, players 654, 656 may be enabled and allowed to arrange virtual credit transactions with each other.

It will be understood from the description and drawings herein that various embodiments of computer hardware and/or computer program products provide an opportunity for a selected credit entity to offer various types of virtual world credit services, including but not limited to virtual credit transactions between virtual world participants, virtual credit transactions between an owner or operator of the virtual world environment and one or more virtual world players, and virtual credit transactions between a third party virtual business entity and one or more virtual world players.

It will be further understood that different implementations in computer hardware and/or computer program products as disclosed herein enable a credit entity to use various forms of virtual world credit publicity and advertising including but not limited to sponsoring an event and/or an activity and/or a location in the virtual world, providing audio and/or visual and/or graphic and/or textual publicity in the virtual world, programming an activity or event in the virtual world that automatically comes to the attention of one or more virtual world players, and assuming a character role in the virtual world.

The exemplary embodiments of computer hardware and/or computer program products also enable a virtual credit card object that is issued by a credit entity to be capable of manipulation by a player in the virtual world. Such a credit entity may also have a capability of operating a real-world credit business. Such a credit entity may be controlled and/or operated by a party that also controls and/or operates the virtual world. Such a credit entity may also be involved with a credit transaction with one or more non-player third party entities in the virtual world. Such a credit entity may also be involved in a credit transaction with an owner or operator of the virtual world.

Some exemplary system embodiments disclosed herein include a processor linked to a database record and to an output device for providing a billing statement indicating payment obligations of the virtual credit account valuated in one or more of the following: fictional world money, real-world money, and non-monetary fictional world value tokens.

Some system implementations further provide a processor linked to a database record and to an output device for providing a billing statement indicating payment obligations of the virtual credit account based on one or more of the following: interest, penalties, due date, purchase activity price, real-world credit performance record, and fictional world credit performance record.

For embodiments involving special virtual credit accounts that provide both fictional world and real-world benefits, database records are capable of storing and updating advances of fictional world value given to an account user in exchange for future compensation. Such database records may be capable of storing and updating a repayment of the future compensation made one or more of the following: real-world money, fictional world money, non-monetary fictional world value tokens.

Some embodiments of the present system may include database records capable of storing and updating information relating to fictional world transactions charged to the virtual credit account. In some instances the virtual credit account may be used for real-world transactions.

One aspect of the system disclosed here includes database records that are capable of storing identity information for a real-world entity or person responsible for real-world obligations and/or fictional world obligations of the special virtual credit account. Such database records may also be capable of storing and updating information relating to real-world transactions charged to the virtual credit account.

In some instances, the virtual credit account business may provide fictional world benefits to a virtual credit account user based on performance information in the database records related to the real-world transactions charged to the special virtual credit account.

Some system embodiments may include a fictional world environment that allows purchase activity or virtual credit account business involving one or more of the following: fictional world owner, fictional world operator, third party virtual business entity, real-world credit entity, fictional world credit entity, fictional world player, fictional world participant, and fictional world character.

Figure 16:
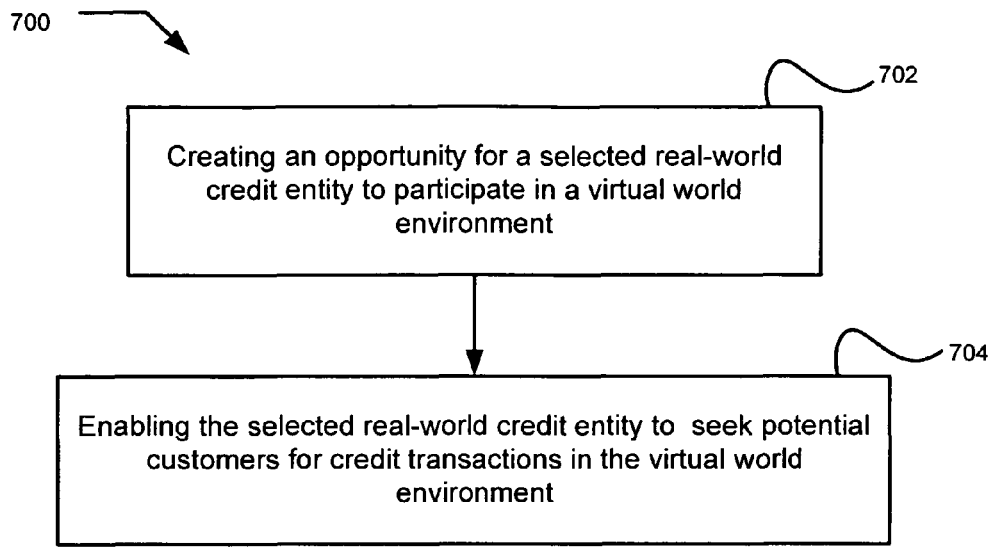
FIGS. 16 through 25 are flow charts illustrating different exemplary processes for implementing various embodiments of financial ventures involving virtual credit arrangements as disclosed herein.

Referring to the high level exemplary flow chart of FIG. 16, an exemplary process 700 creates an opportunity for a selected real-world credit entity to participate in a virtual world environment (block 702). A selected real-world credit entity is enabled to seek potential customers for credit transactions in the virtual world environment (block 704).

Figure 17:
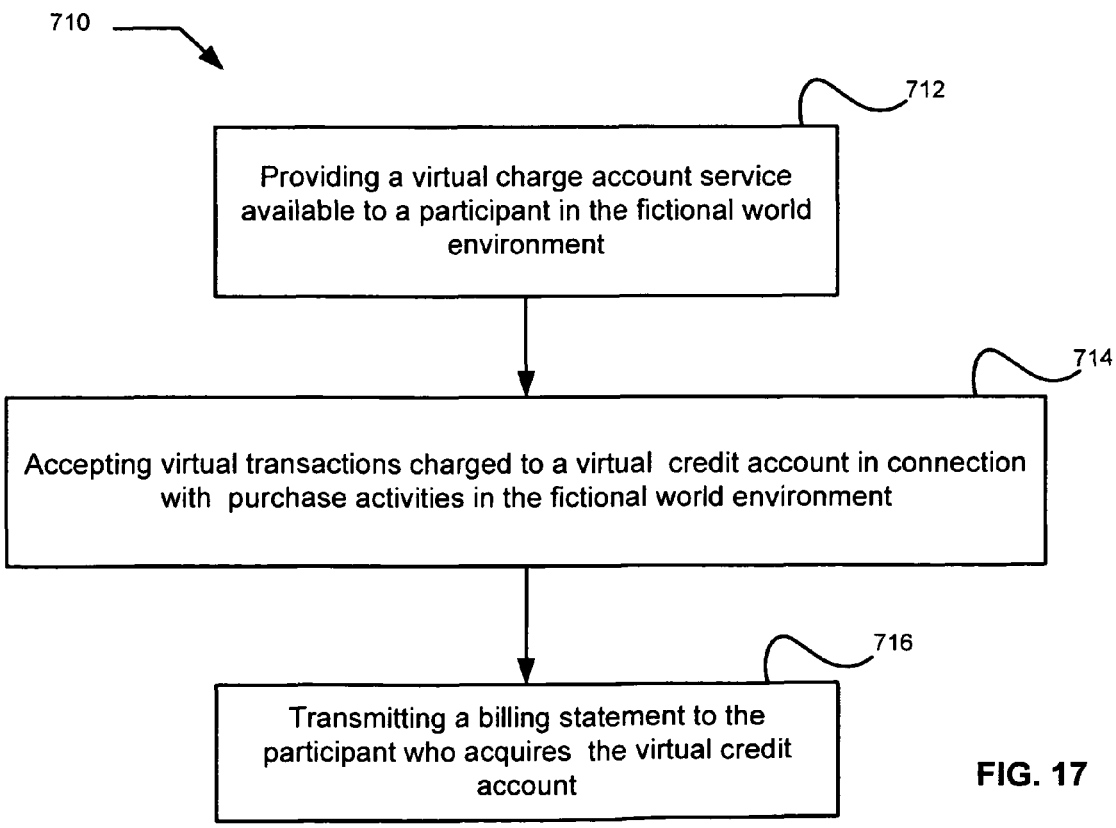

Another high level exemplary flow chart of FIG. 17 discloses a process 710 for providing a virtual charge account service available to a participant in the fictional world environment (block 712). In this implementation, the process accepts virtual transaction to be charged to a virtual credit account in connection with purchase activities in the fictional world environment (block 714). A billing statement is transmitted to the participant who acquired the virtual credit account (block 716).

Figure 18:
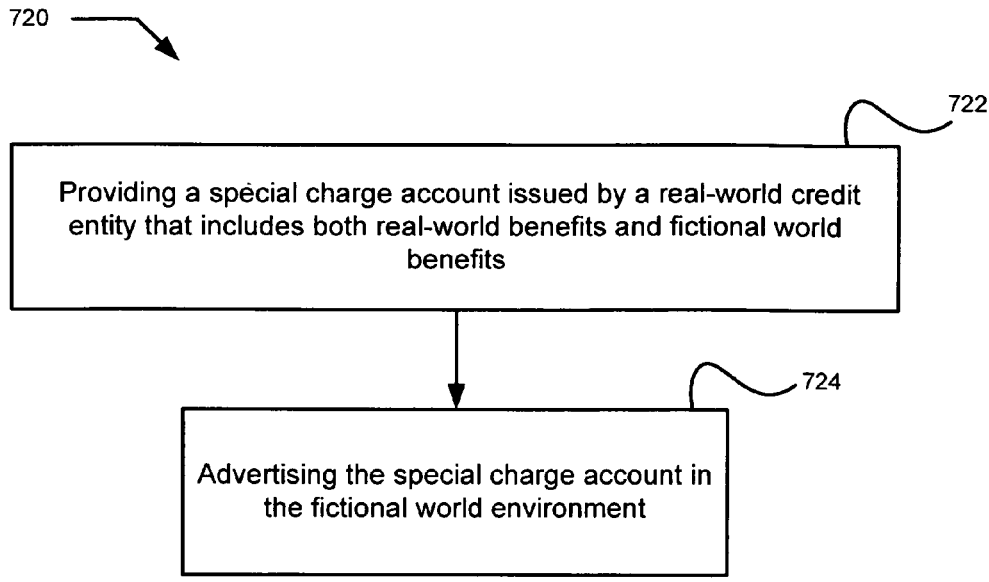

An additional process implementation 720 in the high level exemplary flow chart of FIG. 18 provides a special charge account issued by a selected credit entity that includes both real world benefits and fictional world benefits (block 722). The process further provides for advertising the special charge account in the fictional world environment (block 724).

Figure 19:
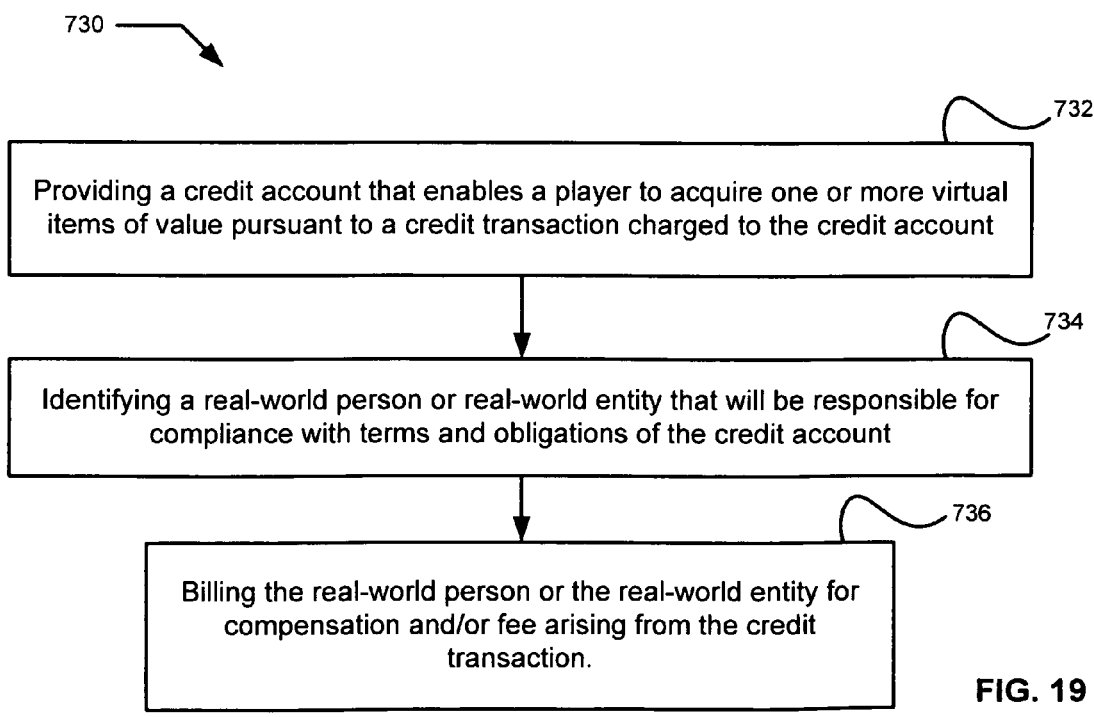

Yet another aspect of certain embodiments is disclosed in a high level exemplary process 730 of FIG. 19 that provides a credit account enabling a player to acquire one or more virtual items of value pursuant to a credit transaction charged to the credit account (block 732). A real-world person or real-world entity is identified that will be responsible for compliance with terms and obligations of the credit account (block 734). The process implements a billing to such responsible real-world person or real-world entity for compensation and/or fee arising from the credit transaction (block 736).

Figure 20:
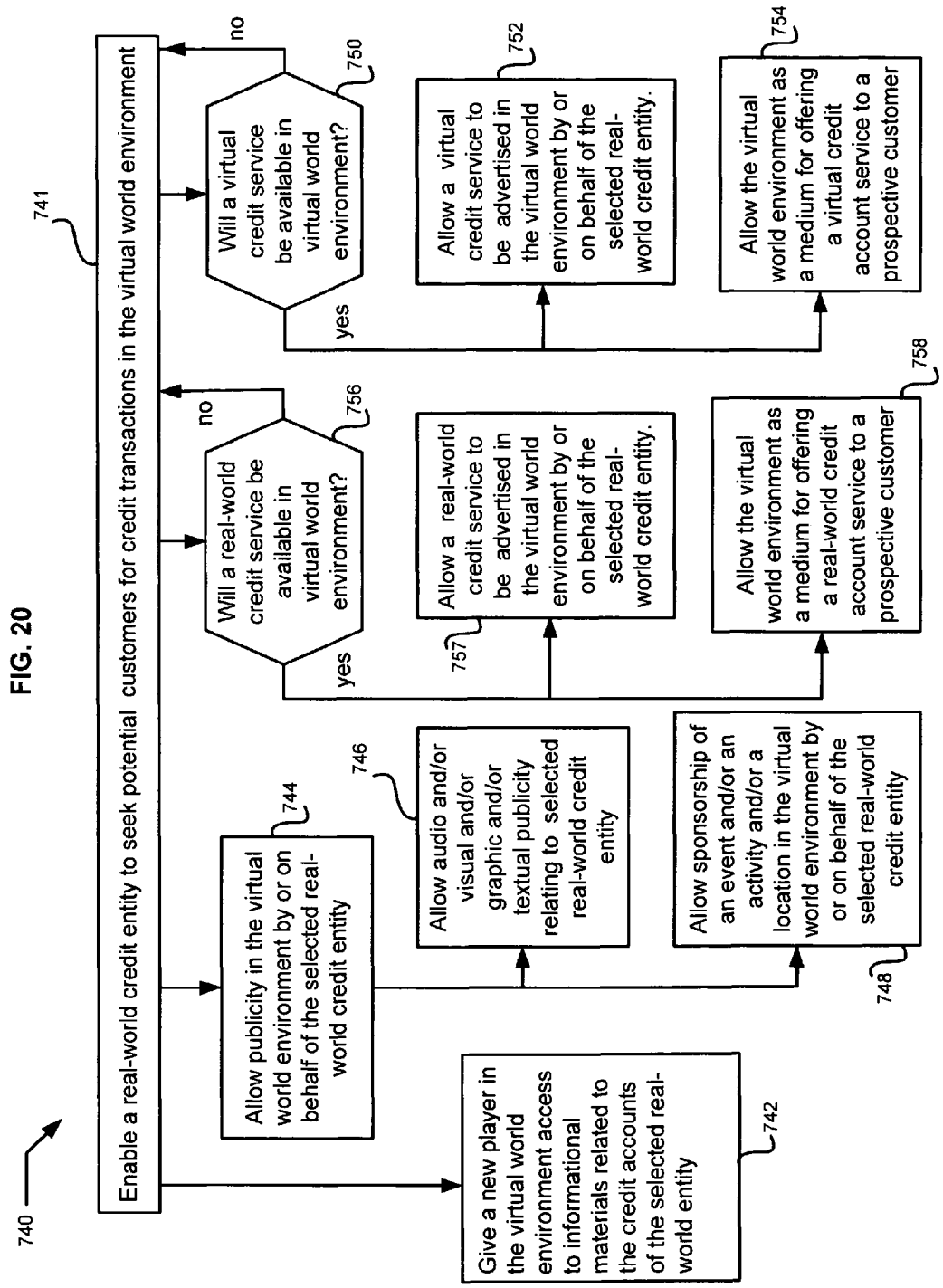

The exemplary flow chart of FIG. 20 illustrates a more detailed process 740 that enables a real-world credit entity to seek potential customers for credit transactions in the virtual world environment (block 741). One exemplary feature provides for giving a new player in the virtual world environment access to informational materials related to the credit accounts of the selected real-world entity (block 742).

Publicity is allowed in the virtual world environment by or on behalf of the selected real-world entity (block 744). Such publicity may include allowing audio and/or visual and/or graphic and/or textual publicity relating to the selected real-world entity (block 746). Other exemplary publicity may include allowing sponsorship of an event and/or an activity and/or a location in the virtual world environment by or on behalf of the selected real-world credit entity (block 748).

At some point in time a decision is made whether or not a virtual credit service will be made available in the virtual world environment (decision block 750). If not, then additional efforts seeking potential customers (block 741) may take place. If so, then the virtual credit service may be allowed to be advertised in the virtual world environment by or on behalf of the selected real-world credit entity (block 752). Also the virtual world environment may serve as a medium for actually offering the virtual credit account service to a prospective customer (block 754).

A decision is also made whether or not a real-world credit service will be made available in the virtual world environment (decision block 756). If not, then additional efforts seeking potential customers (block 741) may take place. If so, then the real-world credit service may be allowed to be advertised in the virtual world environment by or on behalf of the selected real-world credit entity (block 757). Also the virtual world environment may serve as a medium for actually offering the real-world credit account service to a prospective customer (block 758).

Figure 21:
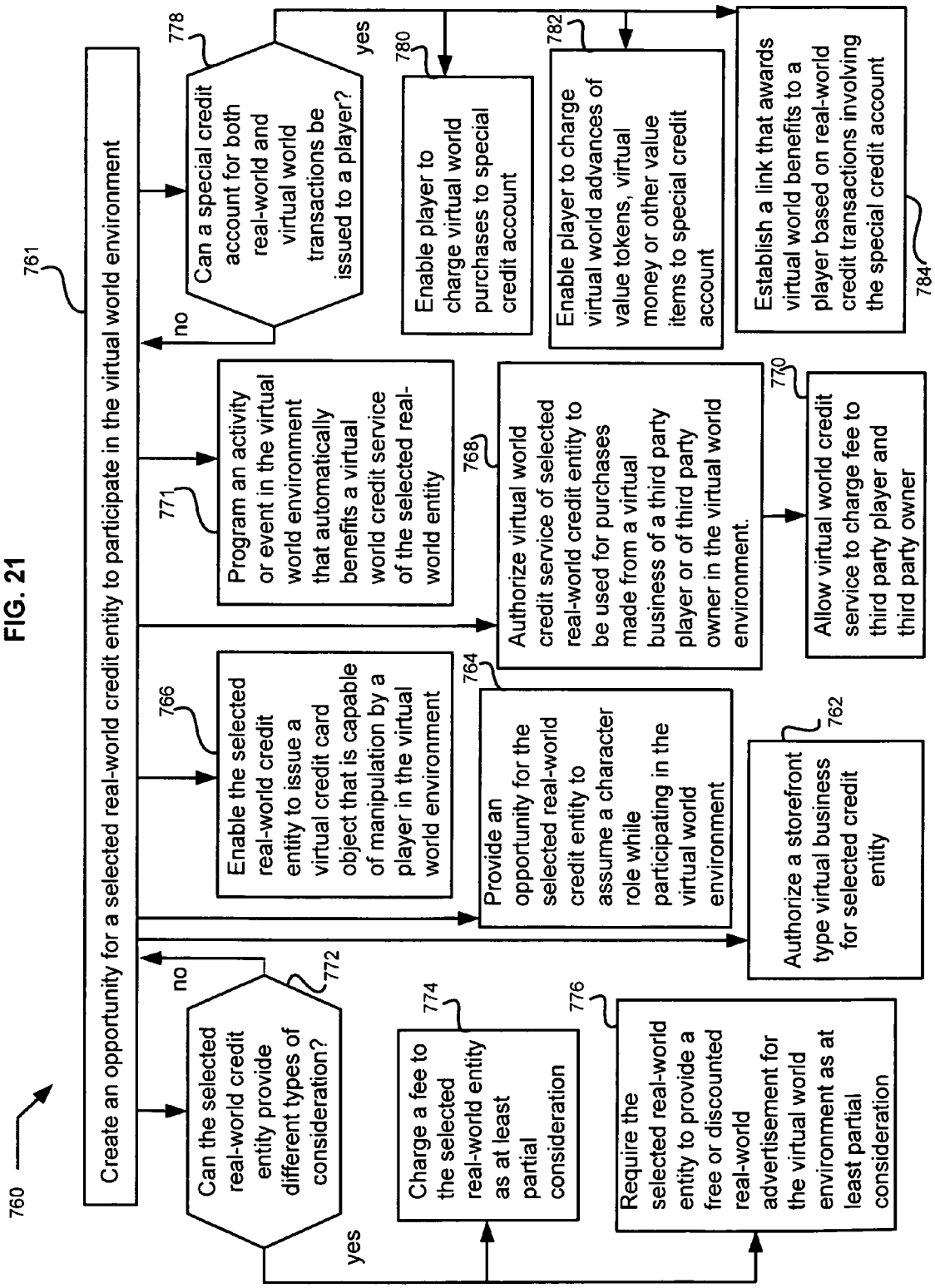

The exemplary flow chart of FIG. 21 illustrates a more detailed process 760 that creates an opportunity for a selected real-world credit entity to participate in the virtual world environment (block 761). Such an opportunity may include providing authorization for the selected credit entity to have a storefront type virtual business (block 762). Other possible opportunities for participation include the selected real-world credit entity assuming a character role while participating in the virtual world environment (block 764). Also the selected real-world credit entity may be enabled to issue a virtual credit card object that is capable of manipulation by a player in the virtual world environment (block 766).

Other types of participation may include authorizing a virtual world credit service of the selected real-world credit entity to be involved with purchases made from a virtual business of a third party player or third party owner in the virtual world environment (block 768). In some instances the virtual world credit service is allowed to charge a fee to the third party player and to the third party owner (block 770). A further type of participation may include programming an activity or event in the virtual world environment that automatically benefits a virtual world credit service of the selected real-world entity (block 771).

The participation of the selected real-world credit entity in the virtual world environment will probably require a decision about the different types of consideration to be provided by the selected real-world credit entity (decision block 772). If consideration is not considered to be necessary, then other types of participation can nevertheless proceed. When some consideration is deemed appropriate, it may be at least partially provided by charging a fee to the selected real-world credit entity (block 774). At least partial consideration may also be provided by requiring the selected real-world entity to provide a free or discounted real-world advertisement for the virtual world environment (block 776).

A choice may also involve whether a special credit account for both real-world transactions and virtual world transactions can be issued to a player (decision block 778). If the decision is negative or to be delayed, the other types of participation can still proceed. If the decision is affirmative, then various interactions involving are possible with the special credit account including but not limited to: enabling a player to charge virtual world purchases to the special credit account (block 780); and enabling a player to charge virtual world benefits received in advance such as value tokens, virtual money, or other value items to the special credit account (block 782); and establishing a link that awards virtual world benefits to a player based on real-world credit transactions involving the special credit account (block 784).

Figure 22:
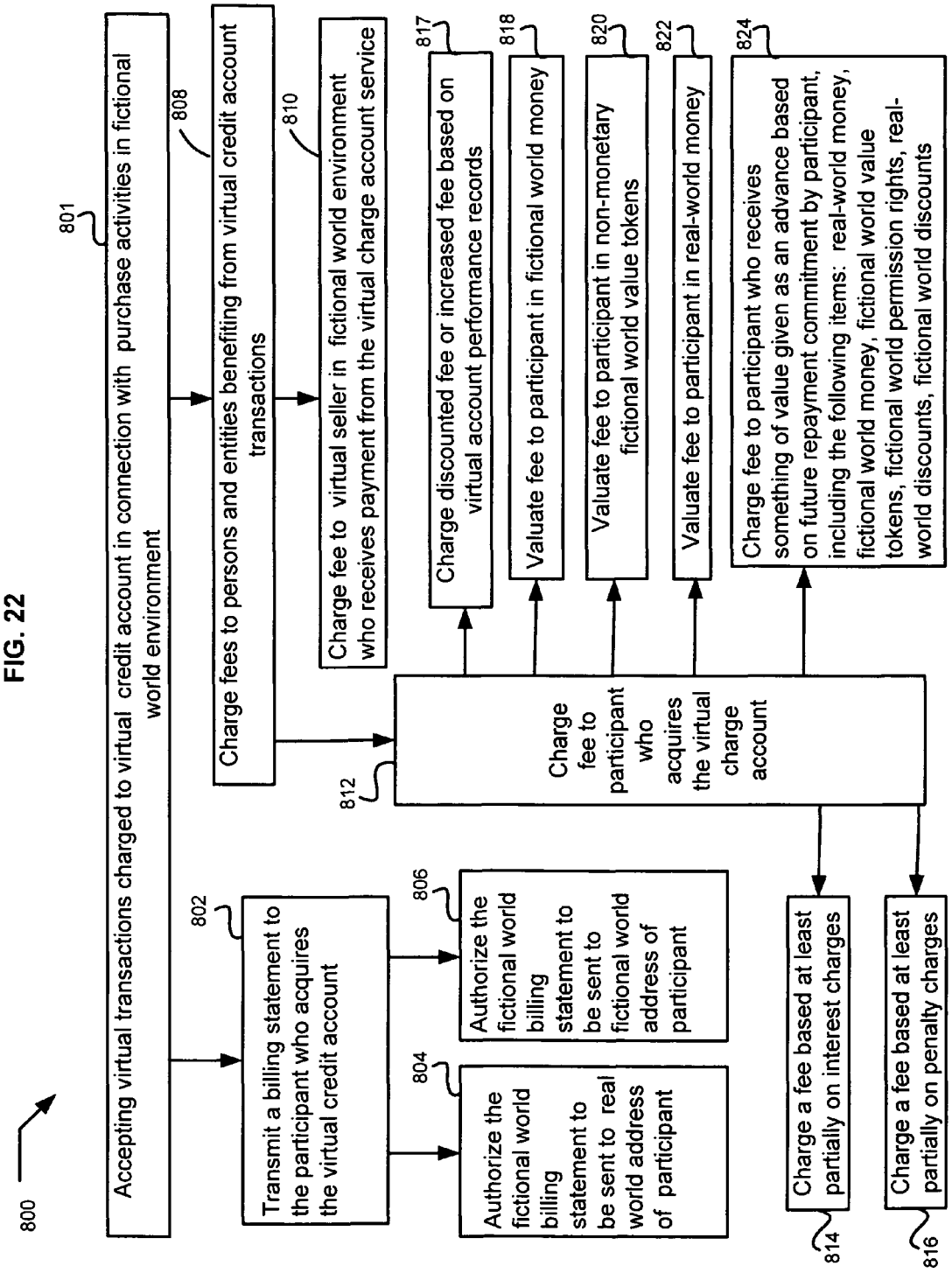

The exemplary flow chart of FIG. 22 discloses an implementation of the presently disclosed method 800 for accepting virtual transactions charged to a virtual credit account in connection with purchase activities in a fictional world environment (block 801). When such charges occur, a billing statement is transmitted to the participant who acquires the virtual credit account (block 802). Such fictional world billing statement may be authorized to be sent to a real world address of the participant account holder (block 804) or to a fictional world address of the participant account holder (block 806).

Revenue may be provided by charging fees to persons and entities benefiting from the virtual credit account transactions (block 808). Such fees may include but not be limited to the following: a fee charged to a virtual seller in the fictional world environment who receives payment from the virtual charge account services (block 810); and different types of fees charged to a participant who acquires the virtual credit account (block 812) as part of the virtual charge account service (block 812).

Examples shown for fees charged to a participant account holder may include a discounted fee or alternatively an increased fee based on the performance records for the virtual credit account (block 817). The various fees charged to a participant who owns or is responsible for the virtual credit account may be valuated in fictional world money (block 818), non-monetary fictional world value tokens (block 820), and real world money (block 822).

Another category of transactions involving the virtual credit account that may generate fees from a virtual world participant relates to advance benefits (i.e., something of value) given to the participant based on a future repayment commitment. Examples of such advance benefits funded by the virtual credit account include real-world money, fictional world money, fictional world value tokens, fictional world permission rights, real-world discounts, and fictional world discounts (block 824).

Figure 23:
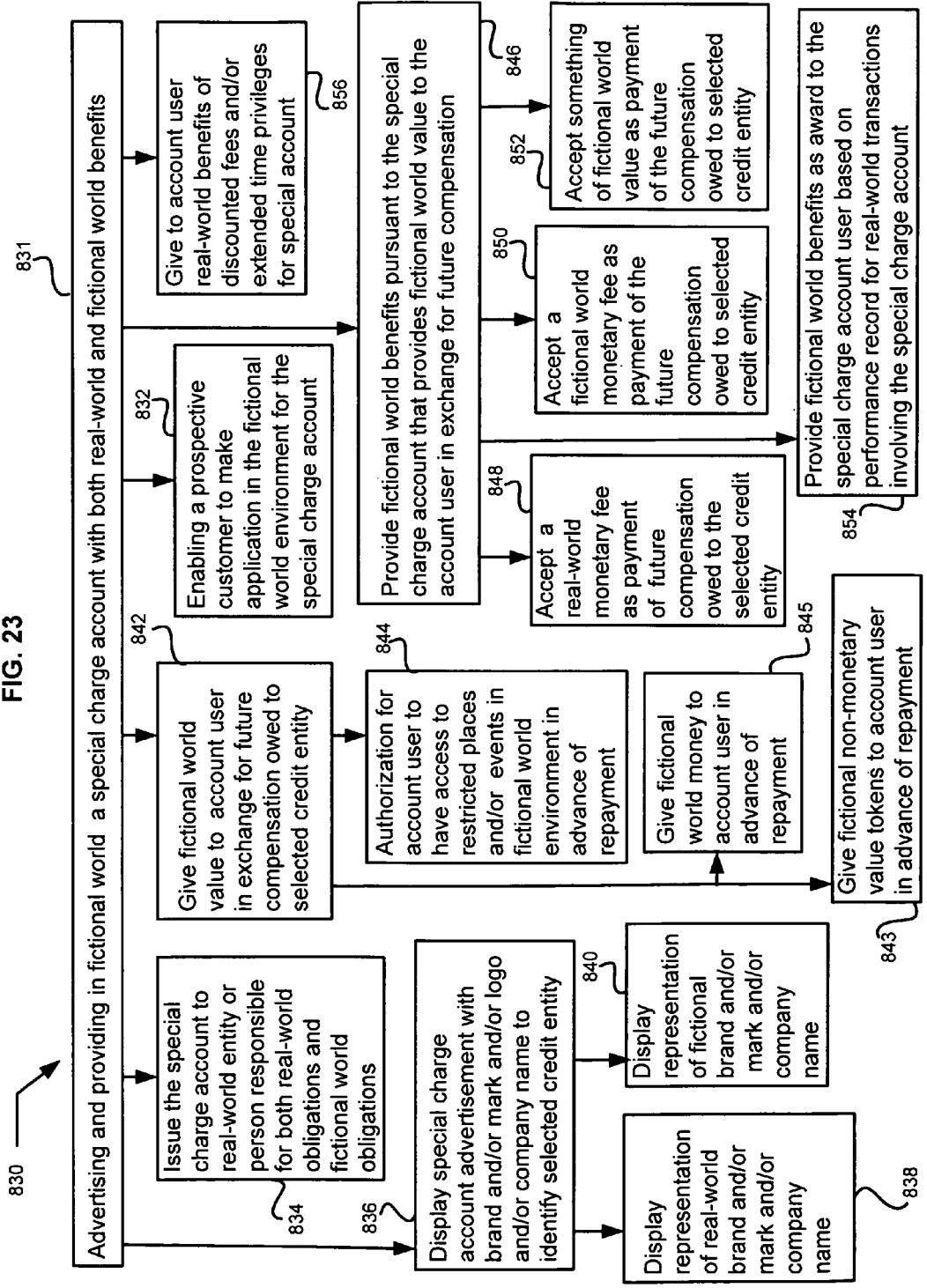

A further more detailed aspect of the method disclosed herein is shown in the process 830 of the exemplary flow chart of FIG. 23. This illustrated implementation enables a prospective customer to make application in the fictional world environment for the special charge account (block 832).

The implementation of FIG. 23 includes advertising and providing in a fictional world environment a special charge account having both real-world and fictional world benefits (block 831). Such advertising may be implemented in special charge account displays of a brand and/or mark and/or logo and/or company name identifying the real-world credit entity (block 836). Such displays may feature a real-world (block 838) as well as a fictional world (block 840) brand, mark, logo, and company name of the real-world credit entity.

Other types of special charge account activity may involve giving something of fictional world value to an account user in exchange for future compensation owed to the real-world credit entity (block 842). Such fictional world value items may include giving authorization for the account user to have access to restricted places and/or restricted events in the fictional world environment in advance of repayment (block 844). Other exemplary advance credits available with the special charge account may include giving an account user fictional non-monetary value tokens in advance of repayment (block 843). The special charge account may also give fictional world money to an account user in advance of repayment (block 845).

Some embodiments of the disclosed method provide other types of advance fictional world benefits pursuant to the special charge account services providing fictional world value to the account user in exchange for future compensation (block 846). These advance benefits may include, for example, accepting different types of future compensation for debts owed by a virtual credit account user including the accepting payment of real-world monetary fees (block 848), fictional world monetary fees (block 850), and something of fictional world value (block 852).

Fictional world award benefits may also be provided to the virtual credit account user based on the performance record for real-world transactions involving the special charge account (block 854). It is to be understood that in some embodiments such real world transactions can be directly or indirectly charged to the special charge account. Other real-world benefits may be given to special account users in the form of discounted access fees and/or extended time privileges in the fictional world environment.

Figure 24:
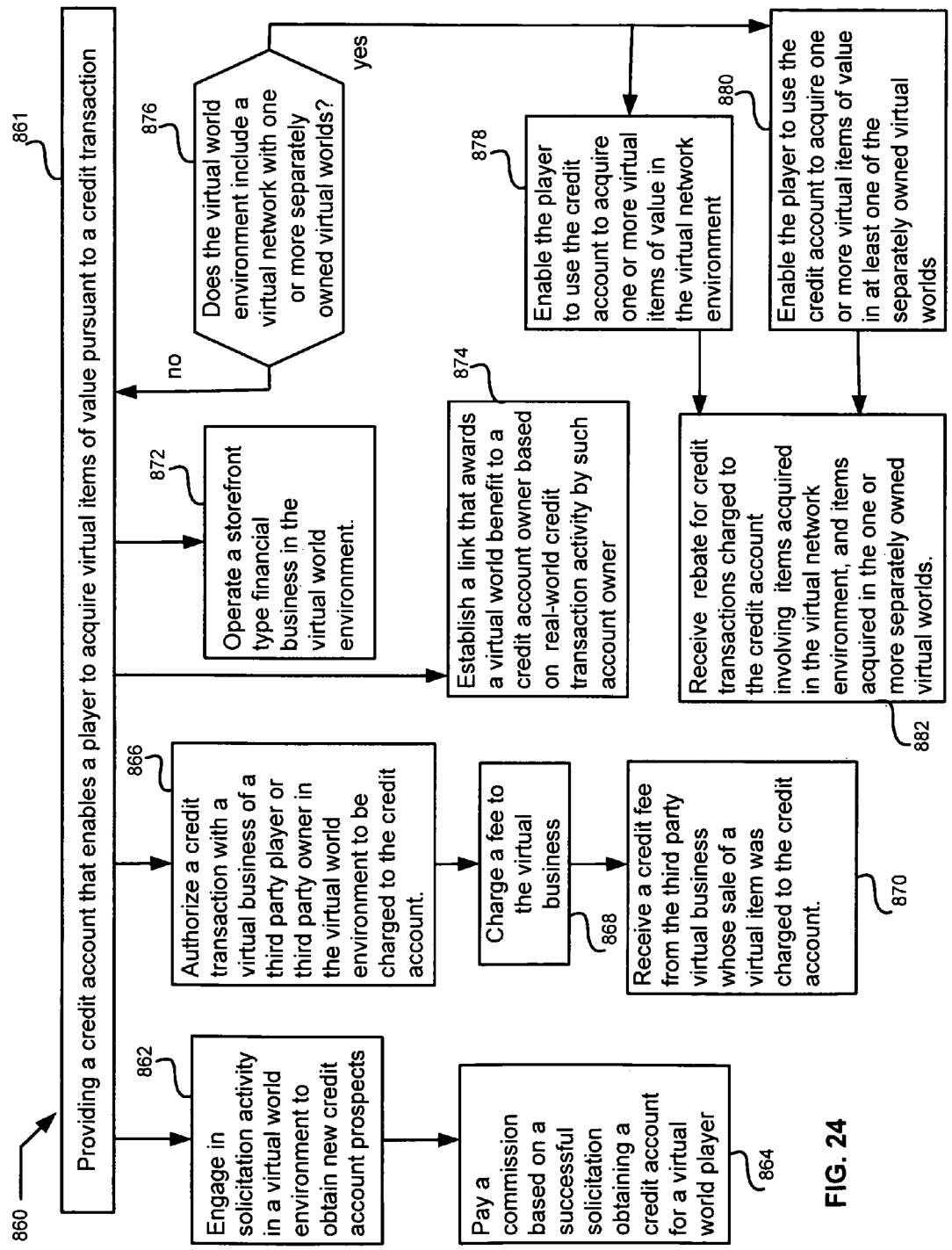

Another aspect of the presently disclosed method is illustrated in a process 860 shown in exemplary flow chart of FIG. 24 relating to providing a credit account that enables a player to acquire virtual items of value pursuant to a credit transaction (block 861). Initial activities may include engaging in solicitation activity in a virtual world environment to obtain new credit account prospects (block 862). A commission may be paid based on a successful solicitation that results in obtaining a credit account for a virtual world player (block 864).

The credit account services may include authorization of a credit transaction with a virtual business of a third party player or third party owner in the virtual world environment to be charged to the credit account (block 866). Such a credit transaction may include charging a fee to the virtual business (block 868), which may be received from the third party virtual business whose sale of a virtual item was charged to the credit account (block 870).

Other credit account activities may include operating a storefront type financial credit business in the virtual world environment (block 872). A link may be established that awards a virtual world benefit to a credit account owner based on real-world credit transaction activity by such account owner (block 874).

Some virtual world environments may be more complex, and an inquiry may determine whether the virtual world environment includes a virtual network with one or more separately owned virtual worlds (decision block 876). If not, then other activities may still be provided. If so, then it may be desirable to enable a player to use the credit account to acquire one or more virtual items of value in the virtual network environment (block 878). As a further possibility, it may be desirable to enable a player to use the credit account to acquire one or more items of value in at least one or perhaps more of the separately owned virtual worlds (block 880).

Other business relationships may be possible such as receiving a rebate for credit transactions charged to the credit account involving items acquired in the virtual network environment, as well as items acquired in the one or more separately owned virtual worlds (block 882).

Figure 25:
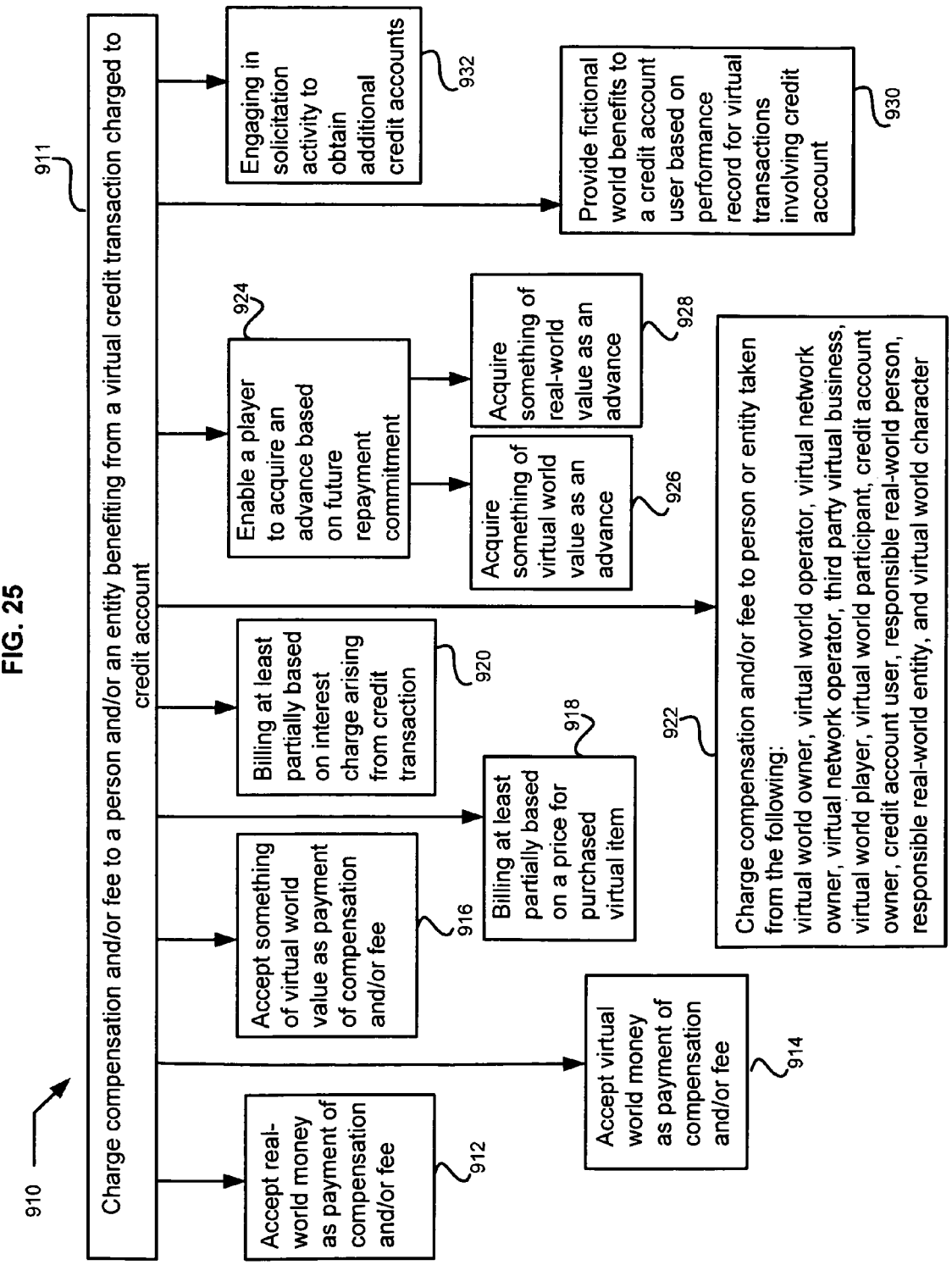

The exemplary flow chart of FIG. 25 disclosed another implementation of a method and process 910, including charging compensation and/or fee to a person and/or an entity benefiting from a virtual credit transaction charged to a credit account (block 911). Payment of the compensation and/or fee may be accepted in different forms, including but not limited to real-world money (block 912), virtual world money (block 914), and something of virtual world value (block 916). A billing such as by electronic or hardcopy statement may be at least partially based on a price for a purchased virtual item (block 918), and may also be at least partially based on an interest charge arising from the credit transaction (block 920).

It will be understood that although significant compensation and/or fees may be billed to a credit account owner or user, compensation and/or fees may be charged to one or more of the following persons or entities: virtual world owner, virtual world operator, virtual network owner, virtual network operator, third party virtual business, virtual world player, virtual world participant, credit account owner, credit account user, responsible real-world person, responsible real-world entity, and virtual world character (block 922).

Various types of credit transactions are contemplated, including enabling a player (or other interested party) to acquire an advance based on a future repayment commitment. The advance may include something or multiple things of virtual world value (block 926) as well as something or multiple things of real-world value (block 928), including combinations thereof. Of course some items that are advanced pursuant to terms of the credit account may have valuations measured or recognized in both virtual world and real-world environments.

Fictional world benefits may be provided to a credit account user based on a performance record for virtual transactions involving the credit account. It will be apparent from the present explanations that interested parties may continue to engage in solicitation activity in the virtual world environment in order to obtain additional credit accounts.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

The exemplary system, apparatus, and computer program product embodiments shown in FIGS. 6-15E and FIGS. 26-33 and FIGS. 51A-54 and FIGS. 79-82 along with other components, devices, know-how, skill and techniques that are known in the art have the capability of implementing and practicing the methods and processes shown in FIGS. 1-5 and FIGS. 16-25 and FIGS. 34-50 and FIGS. 55-67 and FIGS. 68-78 and FIGS. 83-101. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

One aspect of the present system and method enables a credit entity to participate in a virtual world environment with publicity and advertising in order to seek potential customers for credit transactions in the virtual world environment. In some implementations disclosed herein, a process for creating credit transactions in a fictional world environment includes making a virtual charge account service available to a participant in the fictional world environment. Virtual transactions are accepted and charged to a virtual credit account in connection with purchase activities in the fictional world environment, and a billing statement may be provided to the participant who acquires the virtual credit account.

Methods of operating a credit account business in a fictional world environment as disclosed herein may take different forms. For example, in some embodiments a special charge account may issued by a real-world credit entity that includes both real-world benefits and fictional world benefits, and advertisements for the special charge account are provided in the fictional world environment.

There are other exemplary methods and processes disclosed herein for operating a credit business in a virtual world environment. In some instances a credit account is provided that enables a player to acquire one or more virtual items of value pursuant to a credit transaction charged to the credit account. A real-world person or real-world entity may be identified that will be responsible for compliance with terms and obligations of the credit account, and be responsible for receiving a billing for compensation and/or fees arising from the credit transaction. Depending on the circumstances, a billing statement may be authorized to be sent to a real world address and/or a fictional world address of a credit account owner. One aspect provides a virtual charge account service available for use in a fictional world environment, wherein a billing statement charges various fees to a participant who acquires the virtual charge account. Such virtual charge account fees may be valuated in fictional world money, real-world money, or non-monetary fictional world value tokens.

The virtual credit billing system may include a database record for recording the virtual world credit transaction activities, and an output device may be coupled to the database record for communicating obligations arising from the credit transaction activities to a person or entity responsible for virtual credit account obligations.

Figure 26:
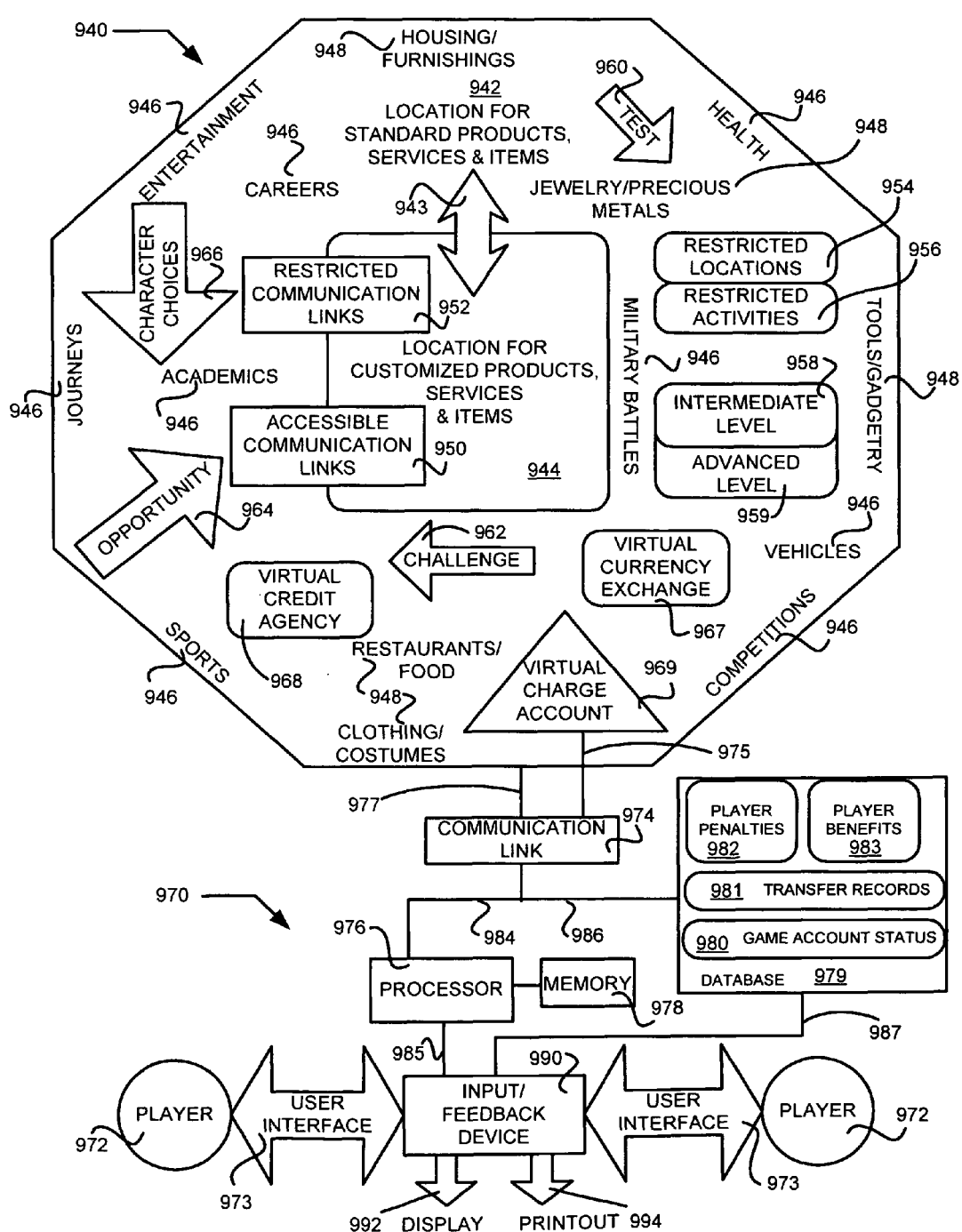
FIG. 26 is a schematic block diagram for an exemplary simulated world environment that includes an implementation of database records for player transactions.

An exemplary simulated world environment 940 is illustrated in the schematic block diagram of FIG. 26, and shows many features that may be available to one or more players 972 that participate in the simulated world environment 940. A location 942 may include standard products, services and/or items available to a player. A bi-directional access portal 943 may enable some players to visit another location 944 that includes customized products, services and/or items. Opportunities for a virtual credit transactions may be available in both locations 942, 944.

Typical exemplary activities, events and destinations may include various topics 946 such as sports, competitions, health, entertainment, journeys, vehicles, military battles, careers and academics. All of these topics are candidates for a possible virtual credit transaction. Additional combined topics 948 for activities, events and destinations involving virtual credit transactions may include clothing/costumes, restaurants/food, tools/gadgetry, jewelry/precious metals and housing/furnishings.

Further opportunities related to arranging, transferring, and/or resolving rights and obligations arising from a virtual credit transaction may be provided via accessible communication links 950, restricted communication links 952, restricted locations 954, and restricted activities 956. It will be understood by those skilled in the art that different levels of virtual credit activities may include an intermediate level 958 and an advanced level 959. A further description of such exemplary levels is provided herein with regard to FIGS. 28A and 28B.

In addition to more conventional virtual credit transactions involving products, services and potential value items, a virtual world may also include activities, events and destinations that involve other aspects of virtual credit based on participation with tests 960, challenges 962, opportunities 964, and character choices 966.

Many of the aspects related to arranging, transferring and/or resolving rights and obligations arising from a virtual credit arrangement or transaction will be facilitated by a virtual currency exchange 967, a virtual credit agency 968, and a virtual charge account 969. Of course other virtual and real world entities as well as individual players, groups of players, third parties, virtual world provides and game operators may also participate directly or indirectly in facilitating the use of virtual credit as a basis for acquiring something of possible value while logged on or otherwise participating in a virtual world environment or game.

An exemplary computerized access system 970 for the simulated world environment 940 is illustrated schematically in FIG. 26, and may include a communication link 974 operatively coupled to the virtual charge account via connection 975 and to the simulated world via connection 977. The communication link 974 is also operatively coupled via connection 984 to processor 976 and memory 978, as well as operatively coupled to database 979 via connection 986. Each player 972 may send and receive informational data and messages through user interface 973 and input/feedback device 990 via processor connection 985 and database connection 987. The input/feedback device 990 may also include a display function 992 and a printout function 994.

The database function may be implemented at various locations using many types of storage media, and may be accessed for updating and/or retrieval by many different components and signal transmissions techniques, all within the spirit and scope of the claims herein. The implementation and location shown and described are by way of example only, and may include game account status records 980, virtual credit transfer records 981, player penalty records 982 and player benefit records 983.

FIG. 27 is a schematic representation of the type of data that may be included in a player's exemplary game account status database records 980, including status date 1034, user ID 1035, virtual character ID 1036, game account number 1037, and performance rating 1038. An identification of a responsible real-world party 1030 as well as such player's real-world contact information 1032 may also be included.

Value categories 1000 for value symbols that may be involved in a virtual world credit transaction or arrangement include, by way of example, virtual currency 1002, discount coupons 1004, award points 1006, access tickets 1008, experience medals 1010, level permits 1012, bonus vouchers 1014, skill merits 1016, as well as other unlisted value symbols 1018. Exemplary data fields for each value symbol may include an owed payable amount 1020 and its related creditor(s) ID 1022, an expected receivable amount 1024 and its related debtor(s) ID 1026, and a listing of what is currently owned 1028. Other data fields may be included in addition to those disclosed herein, and in some instances some of the exemplary data fields may not be deemed desirable and therefore can be omitted.

It will be understood that participation in a virtual world credit transaction is not limited to individual players or participants, but may include multiple players or parties acting collectively as a single group. Similarly an award of benefits need not be limited to an individual debtor participant who has complied with a virtual credit obligation, but such benefits may be shared with other individual participants or groups of players or parties having a direct or indirect interest in the outcome of the virtual world credit transaction. For example, a group or individual creditor participant that assumes a risk of non-payment by the debtor participant may negotiate for a bonus such as receiving a share of awarded benefits.

Figure 28A:
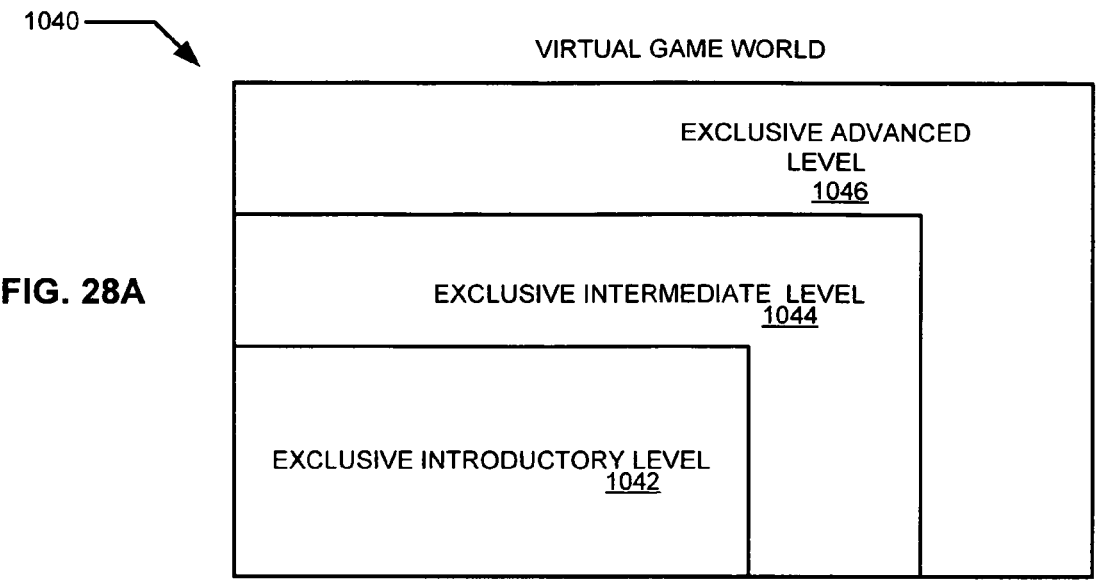
FIGS. 28A and 28B schematically illustrate different implementations of possible participation levels in an exemplary virtual game world.

In the schematic diagram of FIG. 28A, a virtual game world 1040 may include multiple participation levels based on selected admission criteria. In this exemplary implementation, an exclusive introductory level 1042 may be limited, for example, to less skilled virtual participants. An exclusive intermediate level 1044 may be limited, for example, to more experience virtual participants. An exclusive advance level 1046 may be limited, for example, to highly qualified virtual participants. Other different level admission criteria may be selected in order to achieve different goals and perhaps different game objectives.

Figure 28B:
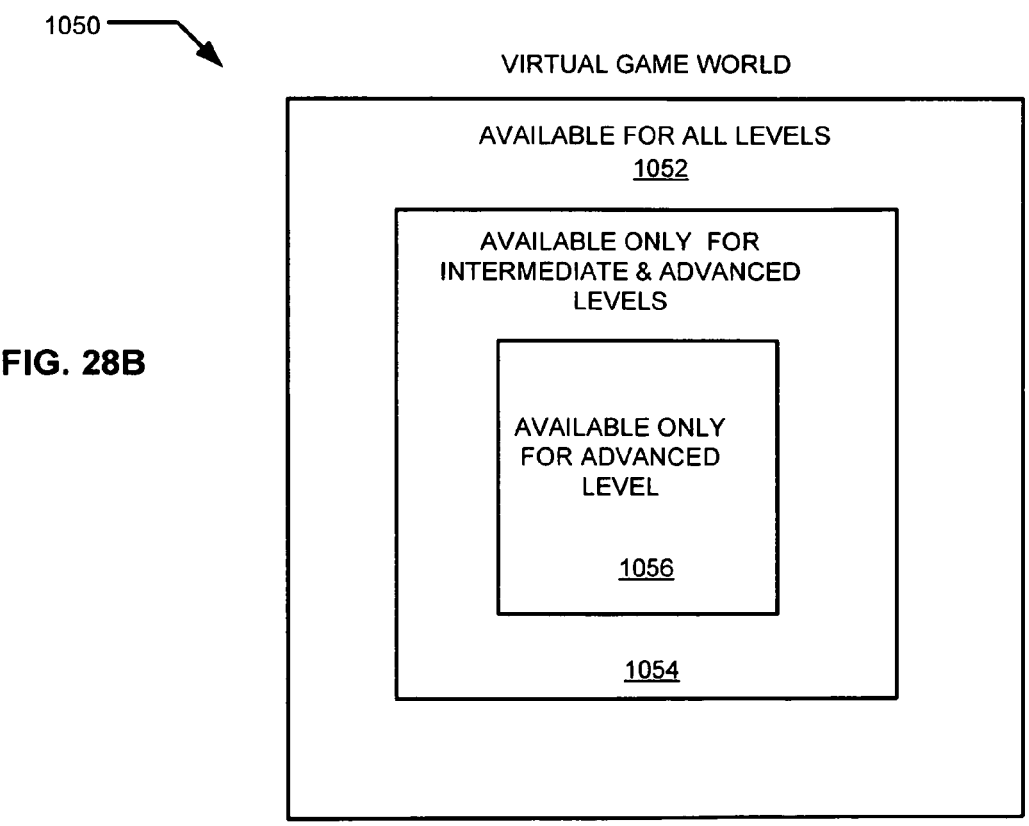

In the schematic diagram of FIG. 28B, a virtual game world 1050 may include multiple participation levels based on another scheme of selected admission criteria. In this exemplary implementation, one level 1052 may be available for all level participants. Another level 1054 may be available only for intermediate and advanced level participants. A further level 1056 may be available only for advanced level participants. This embodiment may, for example, allow more experienced or more qualified virtual participants to continue to have access to lower level virtual opportunities. Other different level admission criteria may be selected in order to achieve different goals and perhaps different game objectives.

Another embodiment of an exemplary virtual world implementation 885 is shown in the schematic drawing of FIG. 29, including a virtual world environment 886 that includes various destinations 887, activities 888 and events 889 that can be selected by one or more players and participants. Interface links 890, 891 provide access to the virtual world environment 885, including access to product(s) 892, services and/or items of value that may be acquired pursuant to a virtual world transaction or arrangement. Such acquisition may be directly or indirectly involved with the destinations 887, activities 888 and events 889 or may be separately available to players and participants.

The embodiment of FIG. 29 schematically shows database records provided at two locations. A first database 979*a* includes game account status records 980, player penalty records 982 and player benefit records 983, and a second database 979*b* includes virtual world transaction records 890 and virtual world transfer records 981. Both database 979*a* and 979*b* are operatively coupled via connections 896 to the virtual world environment 886.

A transfer arrow 899 indicates that a player who is a participant obligor 883 has acquired something of value in a virtual world transaction, and may be able to transfer an obligation to a new obligor 900. Also a transfer arrow 901 indicates that a player who is a participant beneficiary has given something of value in a virtual world credit transaction, and may be able to transfer a right to a new beneficiary 902. Such transfers may involve an updating of transfer records 981 in database 979*b* via connections 906 and 904, respectively. Also, such transfers may involve updating of game account status records 980 as well as player penalty and benefit records 982, 983 via connections 905 and 903, respectively. In some embodiments, a new obligor 900 or a new beneficiary 902 may also be a player in the virtual world environment 886. In some embodiments an obligation or right arising from a virtual world transaction may be transferable to a non-player party.

Figure 30:
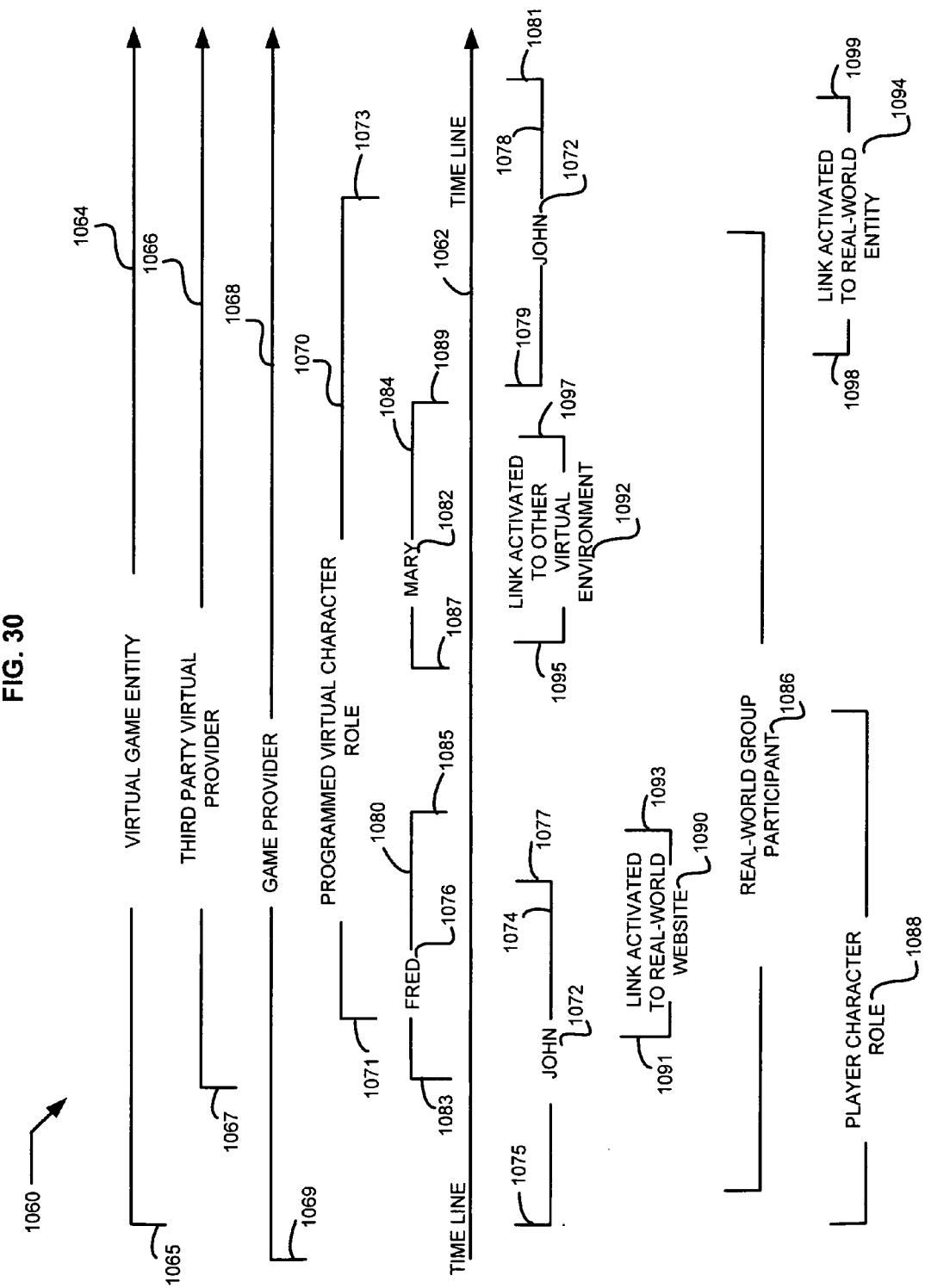
FIG. 30 is a schematic timing diagram illustrating possible virtual transaction opportunities for player interaction in a virtual world environment with other players and/or entities and/or links.

The schematic timing diagram 1060 of FIG. 30 illustrates exemplary types of virtual world opportunities that are possible in a virtual world environment among players and parties. A time line 1062 provides a reference for real time and delayed time accessibility for different virtual world and real-world entities, including a virtual game entity with an active time period 1064 commencing at 1065, a third party virtual provider with an active time period 1066 commencing at 1067, a game provider with an active time period 1068 commencing at a starting game time 1069, and a programmed virtual character role with an active time period 1070 commencing at time 1071 and terminating at time 1073. Because of the benefits of computerized technology, real time and delayed time interaction between entities are possible for purposes of practicing the methods and implementing the systems for virtual world opportunities as disclosed herein.

For example, as shown in FIG. 30, a player John 1072 having an actual logon time period 1074 commencing at time 1075 and terminating at time 1077 has the capability of having real time interaction during logon time period 1074 with player Fred 1076. It is noted that Fred's actual logon time period 1080 commencing at time 1083 and terminating at time 1085 partially overlaps with John's logon time period 1074, and similarly with active time 1066 of the third party virtual provider, as well as with an active time period of a real-world group participant 1086. It is further noted that John's logon time period 1074 completely overlaps with active period 1064 of the virtual entity, and with the active period 1068 of the game provider, and further with an active period of a player character role 1088. This enables real time interaction between entities, including repeated dialogue communications if deemed appropriate, while virtual world transactions are being negotiated, arranged, implemented, transferred, resolved, and/or canceled. Of course, it is understood that time delays between real time interactive messages may also occur intentionally, or because of system limitations.

Even though John 1072 is logged off between his termination time 1077 and his re-commencement time 1079, other entities that are active or logged on during the interim period may respond to any of John's requests, actions or questions that have been appropriately stored in memory, or may pursue their own dialogue with respect to new, pending or existing virtual world arrangements. Such other entities may include Mary 1083 whose logon period 1084 commences at time 1087 and terminates at time 1089. Similarly, John can resume his virtual world transaction participation during his new logon time period 1078 until termination at time 1081. This new period may include responses to requests, action or question previously made by Mary 1084 whose logon period does not overlap either of John's logon time periods 1074, 1078.

Further real time interaction may be initiated or received by players or other entities in the virtual world environment through links in the virtual world environment as shown by a real-world website link 1090 activated to commence at time 1091 and terminate at time 1093, a virtual environment link 1092 activated to commence at time 1095 and terminate at time 1097, and a real-world entity link 1094 activated to commence at time 1098 and terminate at time 1099. It is therefore to be understood that both unidirectional and bi-directional links across a boundary between a virtual world environment and a real-world location or real-world entity may be used to effectuate, implement, resolve or perpetuate a virtual world transaction or related real-world consequence.

As indicated in FIGS. 26 and 30, participation in a simulated or virtual world environment may include activities, events and transactions that are wholly within the simulated or virtual world environment as well as activities, events and transactions that are initiated or partly pursued in the simulated or virtual world environment. A virtual world player or participant taking a class, for example, could mean a virtual character taking a class in the virtual world to increase his virtual world skill level, as well as a player using his virtual character to interact with a real-world course (for example, to take an online class), or some combination of these.

This hybrid type of participation is illustrated in FIG. 26 where the accessible communication links 950 and the restricted communication links 952 might be links to either virtual world sites as well as real-world sites. Similarly in FIG. 30, the activated link to another virtual environment 1092 as well as activated link to a real-world web site 1090 and activated link to a real-world entity 1094 are available to players Fred 1076, Mary 1084 and John 1072.

Figure 31:
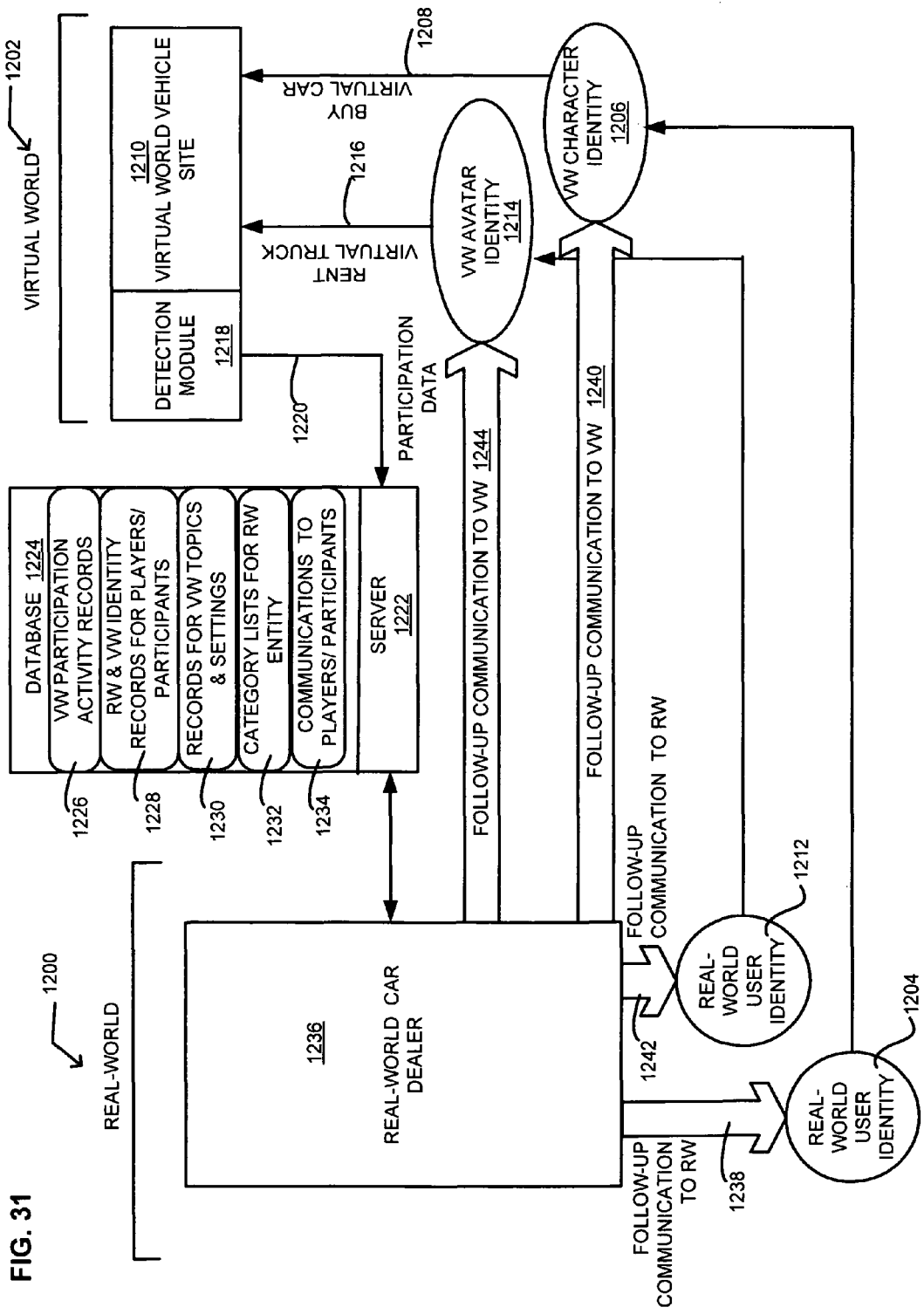
FIG. 31 is a schematic block diagram for an exemplary embodiment showing possible interactions between a real-world entity and a virtual world environment.

FIG. 31 is a schematic block diagram for an exemplary embodiment showing possible interactions between a real-world entity in a real-world environment 1200 and a virtual world 1202. A participant or player having a real-world user identity 1204 may participate in various ways in the virtual world, such as through a virtual world (VW) character identity 1206 who takes action 1208 to buy a virtual car at a VW setting such as vehicle site 1210.

Other participants or players may also at similar or different time periods be a spectator or have active involvement at the VW vehicle site 1210. For example another participant or player having a real-world user identity 1212 may use a VW avatar identity 1214 to take action 1216 to rent a virtual truck at the vehicle site 1210. A detection module 1218 associated or having a communication link with the vehicle site 1210 provides information regarding these activities by character identity 1206 and avatar identity 1214 to a computer unit such as server 1222 for processing.

Appropriate records of the participation activities available at the VW setting of vehicle site 1210 as well as actual participation or involvement at the vehicle site 1210 are kept in database 1224 accessible to server 1222. Such records may include VW participation activity records 1226, real-world and VW identity records for the VW players and participants 1228, and records of various available VW topics and related VW settings 1230. Additional records may include category lists 1232 that may be of interest to a real-world entity, and communication records 1234 for communications from such a real-world entity to player(s) and participant(s) of the virtual world environment.

Based on the information processed by server 122 and stored and updated in database 1224, a real-world entity such as car dealer 1236 may choose to make arrangements for sending follow-up communications to a player or participant. Such a communication 128 could include real-world informational data from or on behalf of the real-world entity, and be directed to an address or location associated with real-world user identity 1204. A similar or different follow-up communication 1240 including real-world informational data could be directed to a VW address and/or VW setting associated with character identity 1206.

Even though the participation activities at VW vehicle site 1210 are specifically different, the car dealer entity 1236 may nevertheless be interested in seeking follow-up contact by making arrangements to send communication 1242 to real-world address or location associated with real-world user identity 1212. A similar or different follow-up communication 1244 including real-world informational data could be directed to a VW address or VW setting associated with avatar identity 1214.

Figure 32:
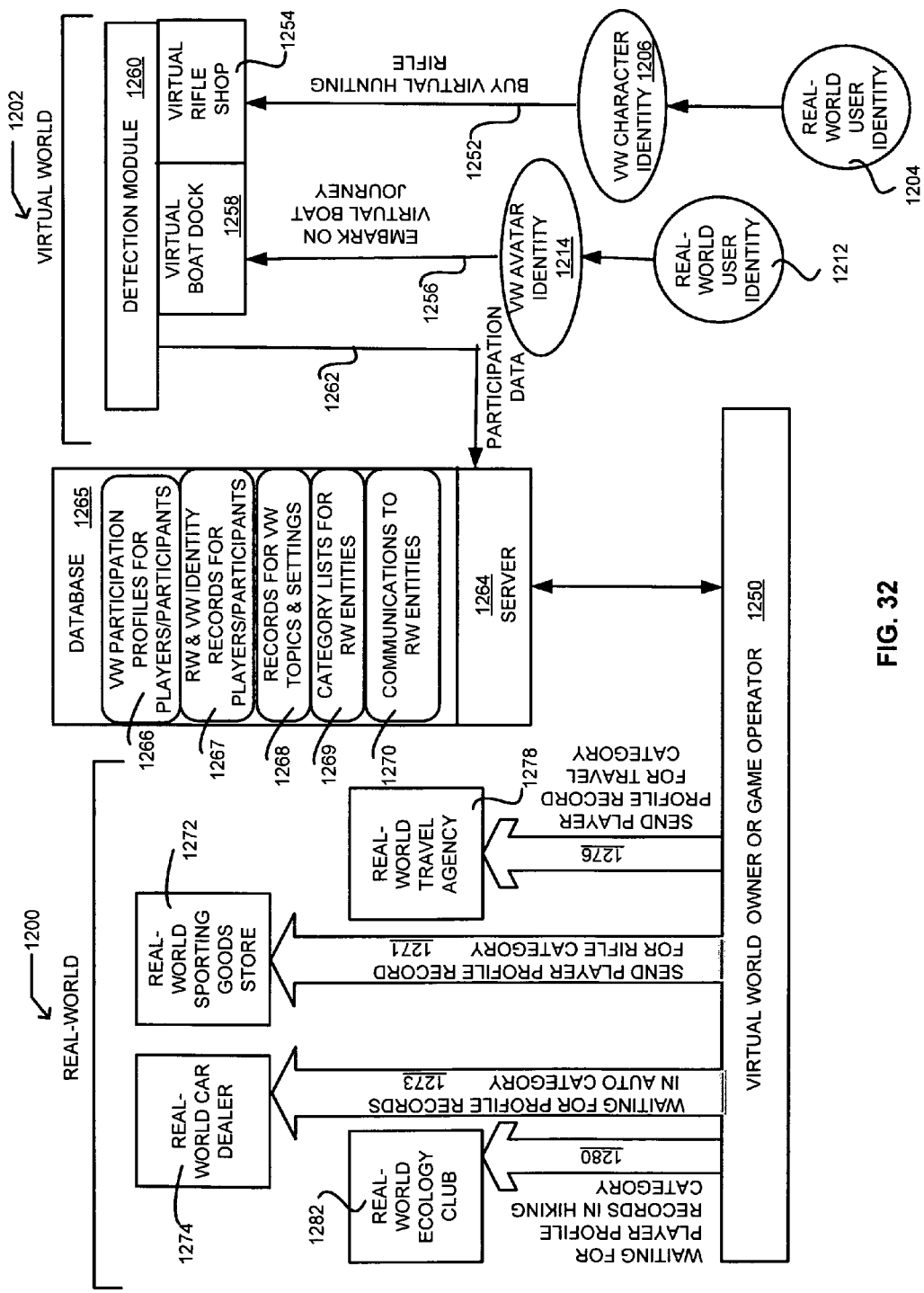
FIG. 32 is a schematic block diagram for another exemplary embodiment showing possible interactions between a virtual world environment and real-world entities.

FIG. 32 is a schematic block diagram for another exemplary embodiment showing possible interactions between a virtual world environment 1202 and entities in a real-world environment 1200. In this illustrated example, a VW owner or game operator 1250 may have access to a server 1264 and database 1265 that process and maintain records relating to virtual world activities and participation. As shown in the drawing, VW character identity 1206 may take action 1252 to buy a virtual hunting rifle at virtual rifle shop 1254. VW avatar identity 1214 may be programmed or choose to embark 1256 on a virtual boat journey at virtual boat dock 1258. Details of such activities are detected by detection module 1260 which may transmit related information via link 1262 to server 1264 and database 1265. Appropriate records maintained by the database 1265 may include VW participation profiles 1266 for players and participants, real-world and VW identity records 1267 for players and participants, records of various VW topics and settings 1268, category lists 1269 of interest to real-world entities, and information records 1270 for communications involving real-world entities.

In this illustrated embodiment, a communication 1271 may be sent to a real-world sporting goods store 1272, which communication includes a player/participant profile record for the character identity 1206 which had VW participation activity related to a "rifle" category of interest. Also a communication 1276 may be sent to a real-world travel agency entity 1278, which communication includes a player/participant profile record for the avatar identity 1214 which had VW participation activity related to a "travel" category of interest.

Other possible communications such as 1273 to a real-world card dealer 1274 are waiting for the creation or sending of participation activity profile records in an "auto" category. Similarly another possible communication such as 1280 to a real-world ecology club entity is waiting for the creation or sending of participation activity profile records in a "hiking" category.

Figure 33:
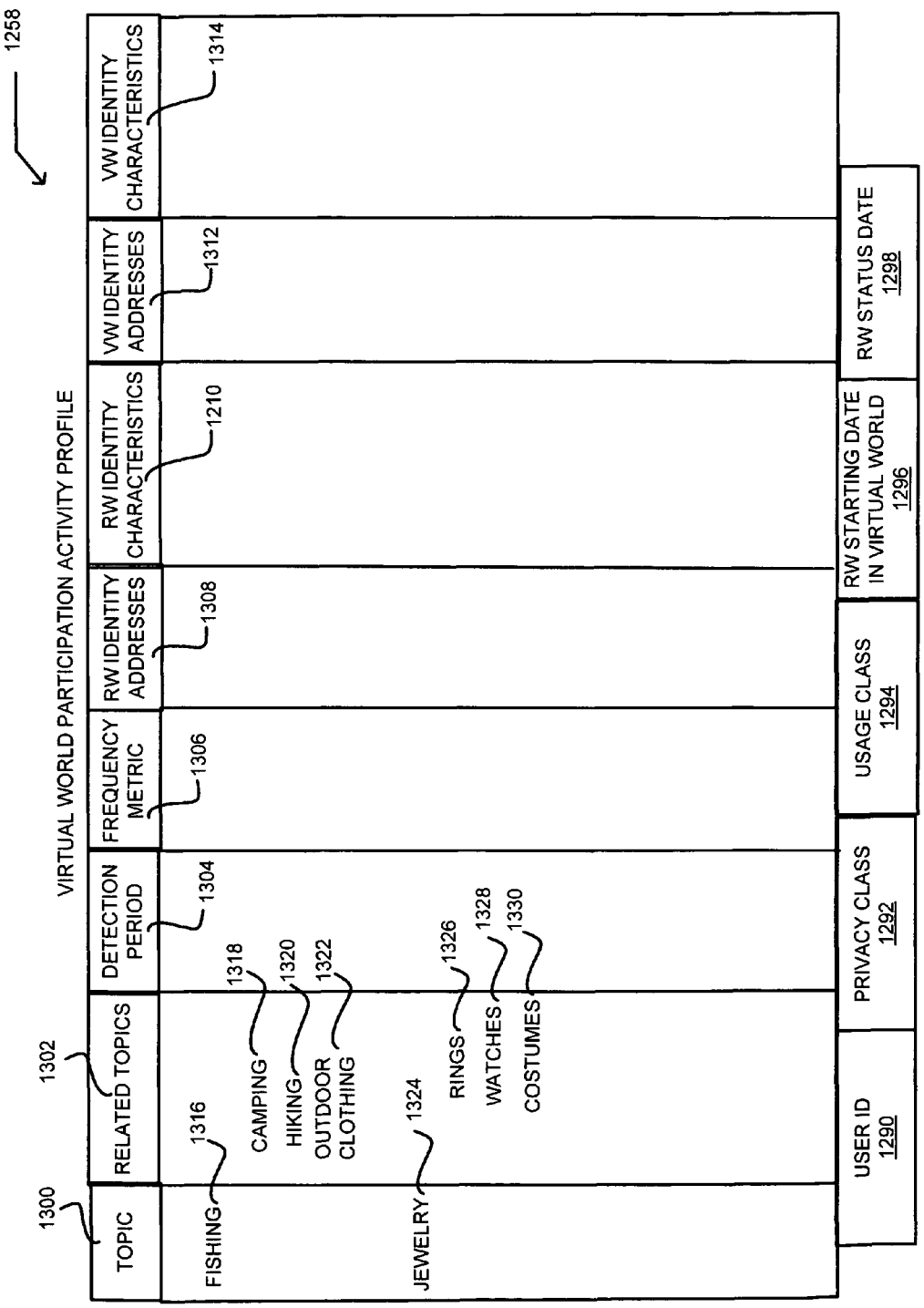
FIG. 33 illustrates exemplary database records for a virtual world participation activity profile.

FIG. 33 illustrates exemplary database records 1258 for a virtual world participation activity profile. Examples of useful data fields for a particular player or participant may include user ID 1290, privacy class 1292, and usage class 1294 that could include various detailed information regarding extent of VW participation, average VW hours logged on, and the like. Other useful data fields could include real-world starting date 1296 for VW subscriber or player, and real-world status date 1298 of the record display or printout Collected information fields for a particular player or participant could include topic 1300, related topics 1302, detection period 1304, frequency metric 1306, real-world (RW) identity addresses 1308, RW identity characteristics 1310, VW identity addresses 1312, and VW identity characteristics 1314. With respect to the topic 1300 and related topic 1302 fields, it is noted that a category or topic of fishing 1316 could be matched with camping 1318, hiking 1320 and outdoor clothing 1322. Also it is noted that the category or topic of jewelry 1324 could be matched with rights 1326, watches 1328 and costumes 1330.

Other data fields may be included in the exemplary profile records of FIG. 33 in addition to those disclosed herein, and in some instances some of the exemplary data fields may not be deemed desirable and therefore can be omitted.

Figure 34:
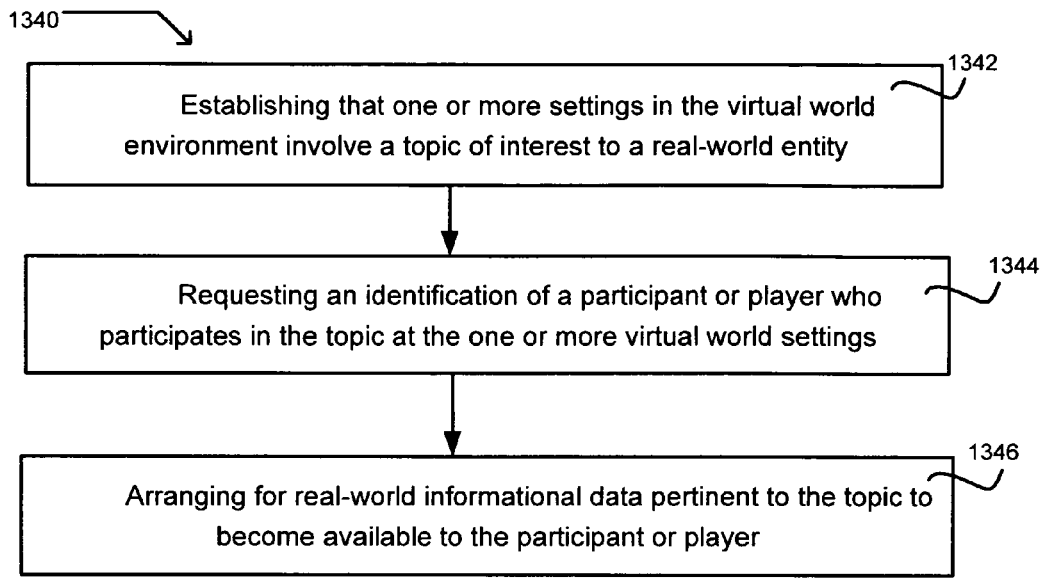
FIGS. 34-35 are high level flow charts showing exemplary processes for some embodiments.

The high level flow chart of FIG. 34 shows an exemplary process embodiment 1340 that provides for establishing that one or more settings in the virtual world environment involve a topic of interest to the real-world entity (block 1342). The process may also include requesting an identification of a participant or player who participates in the topic at the one or more virtual world settings (block 1344), and arranging for real-world informational data pertinent to the topic to become available to the participant or player (block 1346).

Figure 35:
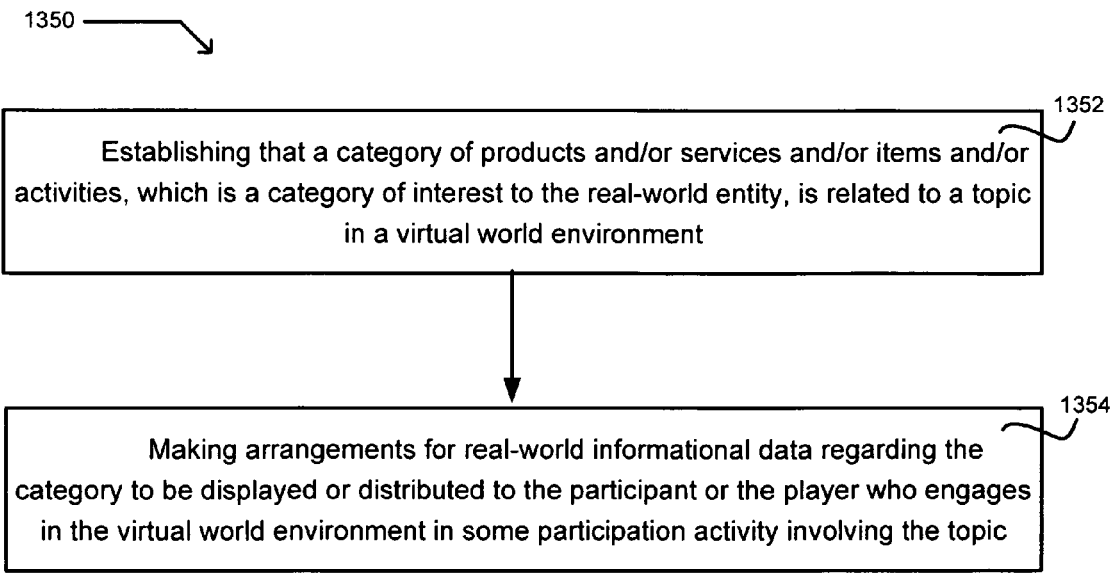

Another high level flow chart of FIG. 35 shows a different exemplary process embodiment 1350 that provides for establishing that a category of products and/or services and/or items and/or activities, which is a category of interest to the real-world entity, is related to a topic in a virtual world environment (block 1352). The process may also include making arrangements for real-world informational data, which pertains to such category, to be displayed or distributed to the participant or the player who engages in the virtual world environment in some participation activity involving the topic (block 1354).

Figure 36:
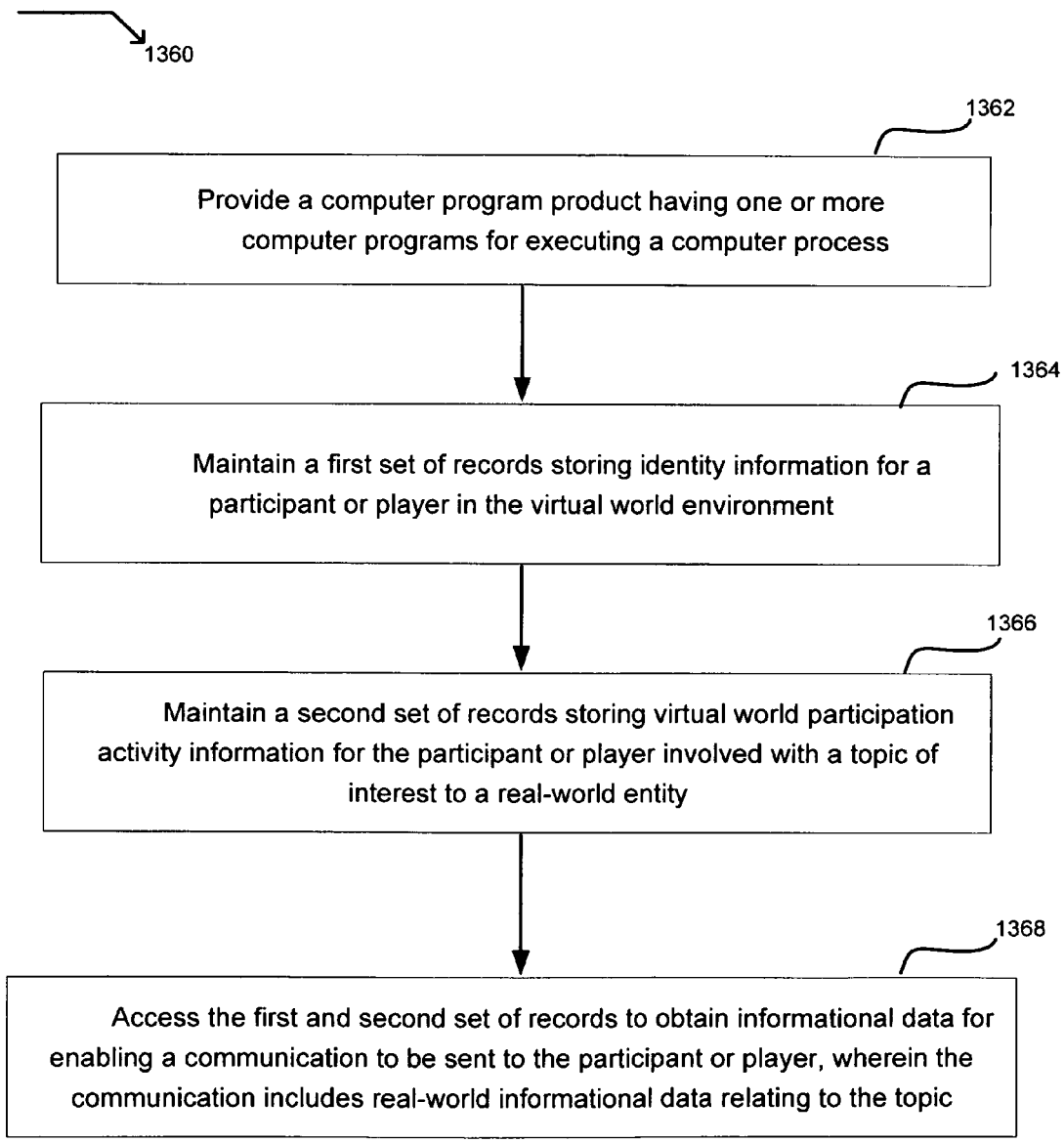
FIG. 36 is a high level flow chart showing an exemplary process incorporated in a computer program product.

The illustrated embodiment of FIG. 36 shows an implementation 1360 which provides a computer program product having one or more computer programs for executing a computer process (block 1362). The computer process may include maintaining a first set of records storing identity information for a participant or player in the virtual world environment (block 1364), and maintaining a second set of records storing virtual world participation activity information for the participant or player involved with a topic of interest to a real-world entity (block 1366). The computer process may further provide accessing the first and second set of records to obtain informational data for enabling a communication to be sent to the participant or player, wherein the communication includes real-world informational data relating to the topic (block 1368).

Figure 37:
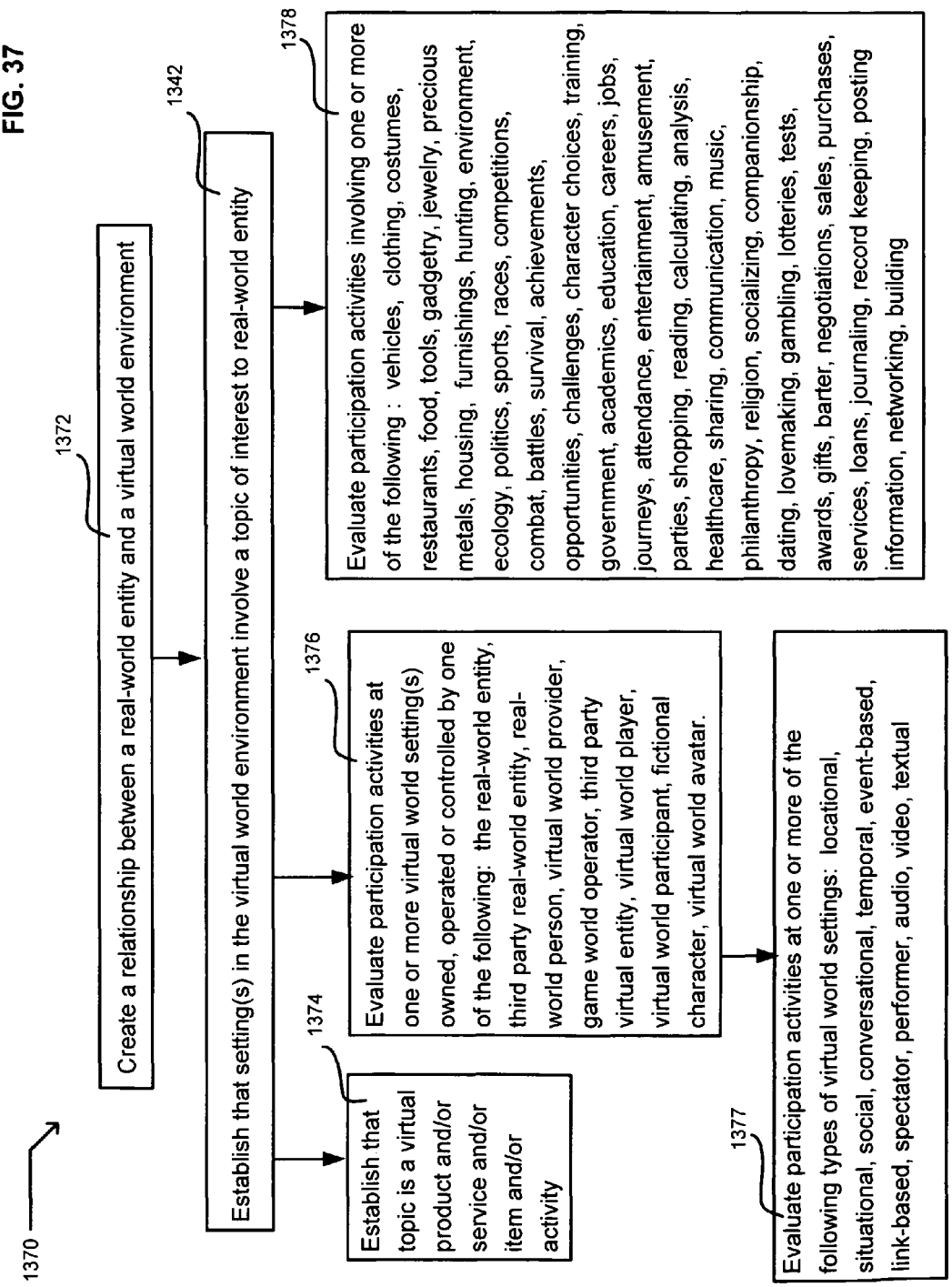
FIGS. 37-40 are more detailed flow charts showing additional exemplary processes for some embodiments.

Referring to the exemplary flow chart of FIG. 37, a process embodiment 1370 provides for creating a relationship between a real-world entity and a virtual world environment (block 1372), and for establishing that one or more settings in the virtual world environment involve a topic of interest to the real-world entity (block 1342). The process may further establish that the topic is a virtual product and/or service and/or item and/or activity (block 1374).

The process may further include evaluating participation activities at one or more virtual world settings owned, operated or controlled by one of the following: the real-world entity, third party real-world entity, real-world person, virtual world provider, game world operator, third party virtual entity, virtual world player, virtual world participant, fictional character, and virtual world avatar (block 1376). An additional feature may include evaluating participation activities at one or more of the following types of virtual world settings: locational, situational, social, conversational, temporal, event-based, link-based, spectator, performer, audio, video, and textual (block 1377).

A further feature may include evaluating participation activities involving one or more of the following: vehicles, clothing, costumes, restaurants, food, tools, gadgetry, jewelry, precious metals, housing, furnishings, hunting, environment, ecology, politics, sports, races, competitions, combat, battles, survival, achievements, opportunities, challenges, character choices, training, government, academics, education, careers, jobs, journeys, attendance, entertainment, amusement, parties, shopping, reading, calculating, analysis, healthcare, sharing, communication, music, philanthropy, religion, socializing, companionship, dating, lovemaking, gambling, lotteries, tests, awards, gifts, barter, negotiations, sales, purchases, services, loans, journaling, record keeping, posting information, networking, and building (block 1378).

Figure 38:
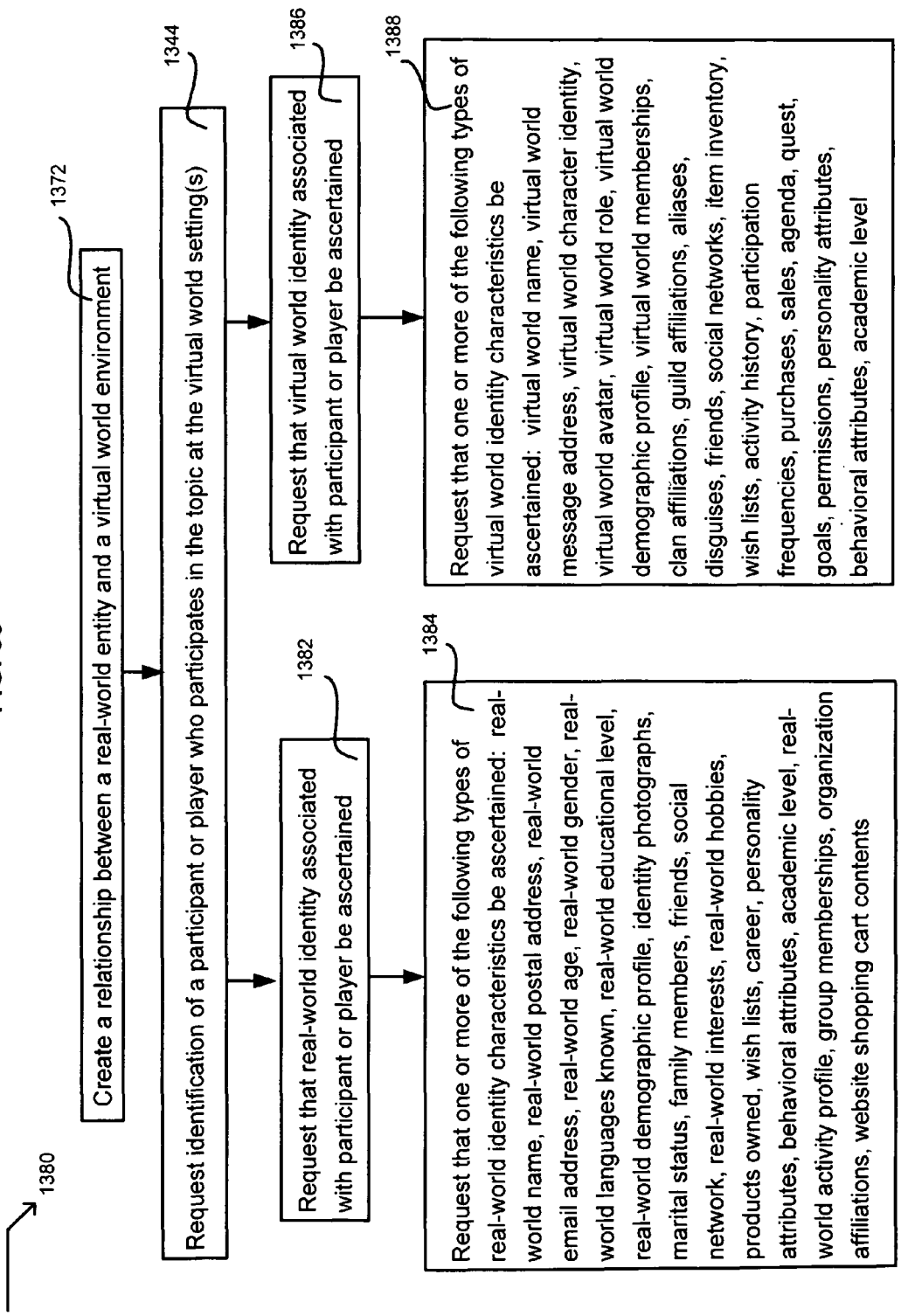

The flowchart for an exemplary process 1380 is shown in FIG. 38 wherein the process provides for creating a relationship between a real-world entity and a virtual world environment (block 1372), and for requesting an identification of a participant or player who participates in the topic at the one or more virtual world settings (block 1344).

In some instances, the process includes requesting that a real-world identity associated with a participant or a player be ascertained (block 1382). A related feature may include requesting that one or more of the following types of real-world identity characteristics be ascertained: real-world name, real-world postal address, real-world email address, real-world age, real-world gender, real-world languages known, real-world educational level, real-world demographic profile, identity photographs, marital status, family members, friends, social network, real-world interests, real-world hobbies, products owned, wish lists, career, personality attributes, behavioral attributes, academic level, real-world activity profile, group memberships, organization affiliations, websites, and website shopping cart contents (block 1384).

The process may also include requesting that a virtual world identity associated with a participant or a player be ascertained (block 1386). A related feature may include requesting that one or more of the following types of virtual world identity characteristics be ascertained: virtual world name, virtual world message address, virtual world character identity, virtual world avatar, virtual world role, virtual world demographic profile, virtual world memberships, clan affiliations, guild affiliations, aliases, disguises, friends, social networks, item inventory, wish lists, activity history, participation frequencies, purchases, sales, agenda, quest, goals, permissions, personality attributes, behavioral attributes, and academic level (block 1388).

Figure 39:
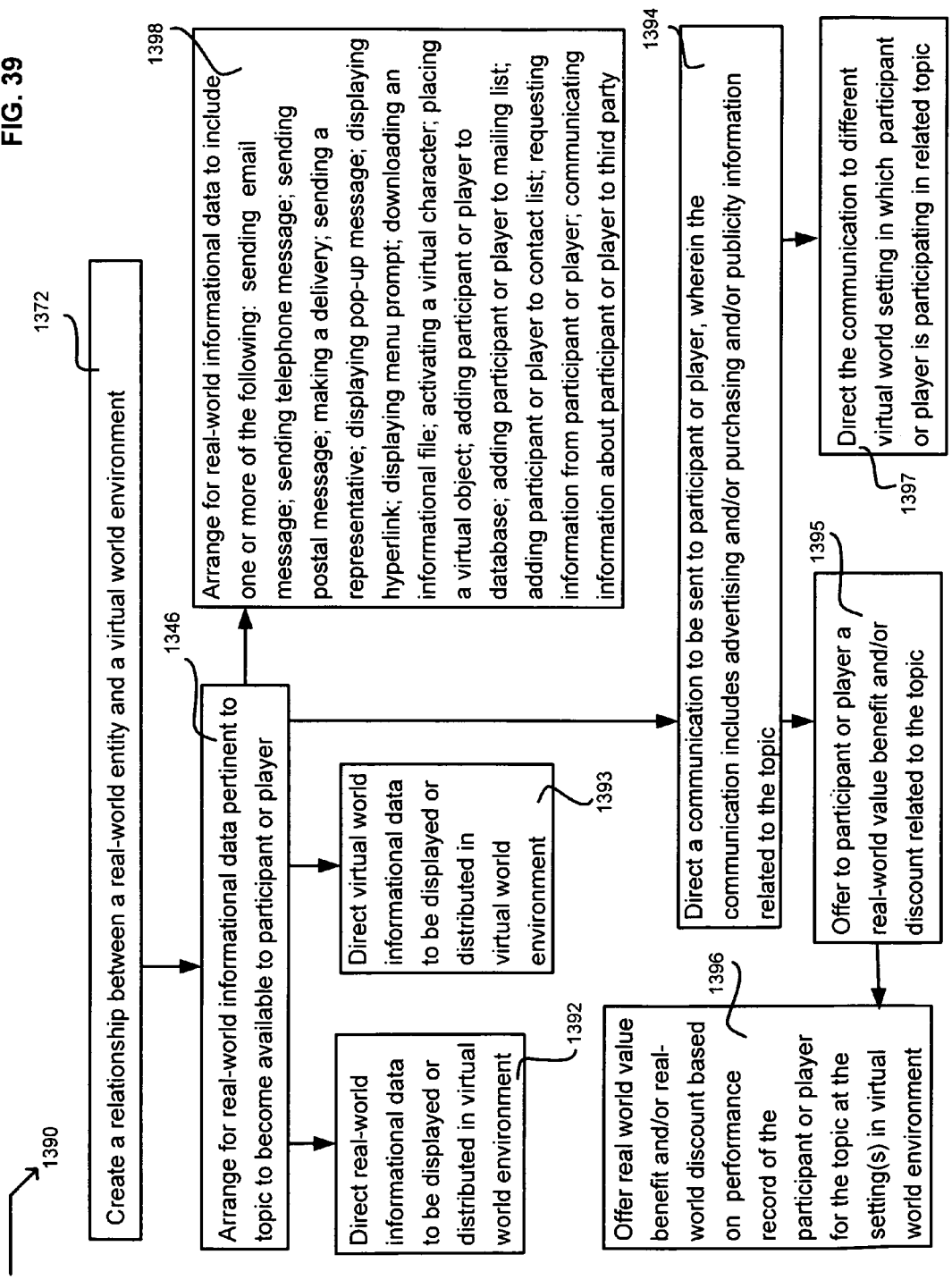

Another set of features is included in an exemplary process 1390 shown in FIG. 39 that creates a relationship between a real-world entity and a virtual world environment (block 1372). The process may include arranging for real-world informational data pertinent to a topic to become available to a participant or a player (block 1346). A related feature may include directing the real-world informational data to be displayed or distributed in the virtual world environment (block 1392). Another related feature may include directing the real-world informational data to be displayed or distributed in a real-world environment (block 1393).

Referring again to FIG. 39, the exemplary process may include directing a communication to be sent to the participant or player, wherein the communication includes advertising and/or purchasing and/or publicity information related to the topic (block 1394). A further feature may direct the communication to a different virtual world setting in which the participant or player is participating in a related topic (block 1397). Another feature may offer to the participant or player a real-world value benefit and/or real-world discount related to the topic (block 1395), which may be based on a performance record of the participant or player for the topic at the one or more settings in the virtual world environment (block 1396).

Another exemplary process feature may include arranging for real-world informational data that includes one or more of the following: sending an email message; sending a telephone message; sending a postal message; making a delivery; sending a representative; displaying a pop-up message; displaying a hyperlink; displaying a menu prompt; downloading an informational file; activating a virtual character; placing a virtual object; adding the participant or player to a database; adding the participant or player to a mailing list; adding the participant or player to a contact list; requesting information from the participant or player; and communicating information about the participant or player to a third party (block 1398).

Figure 40:
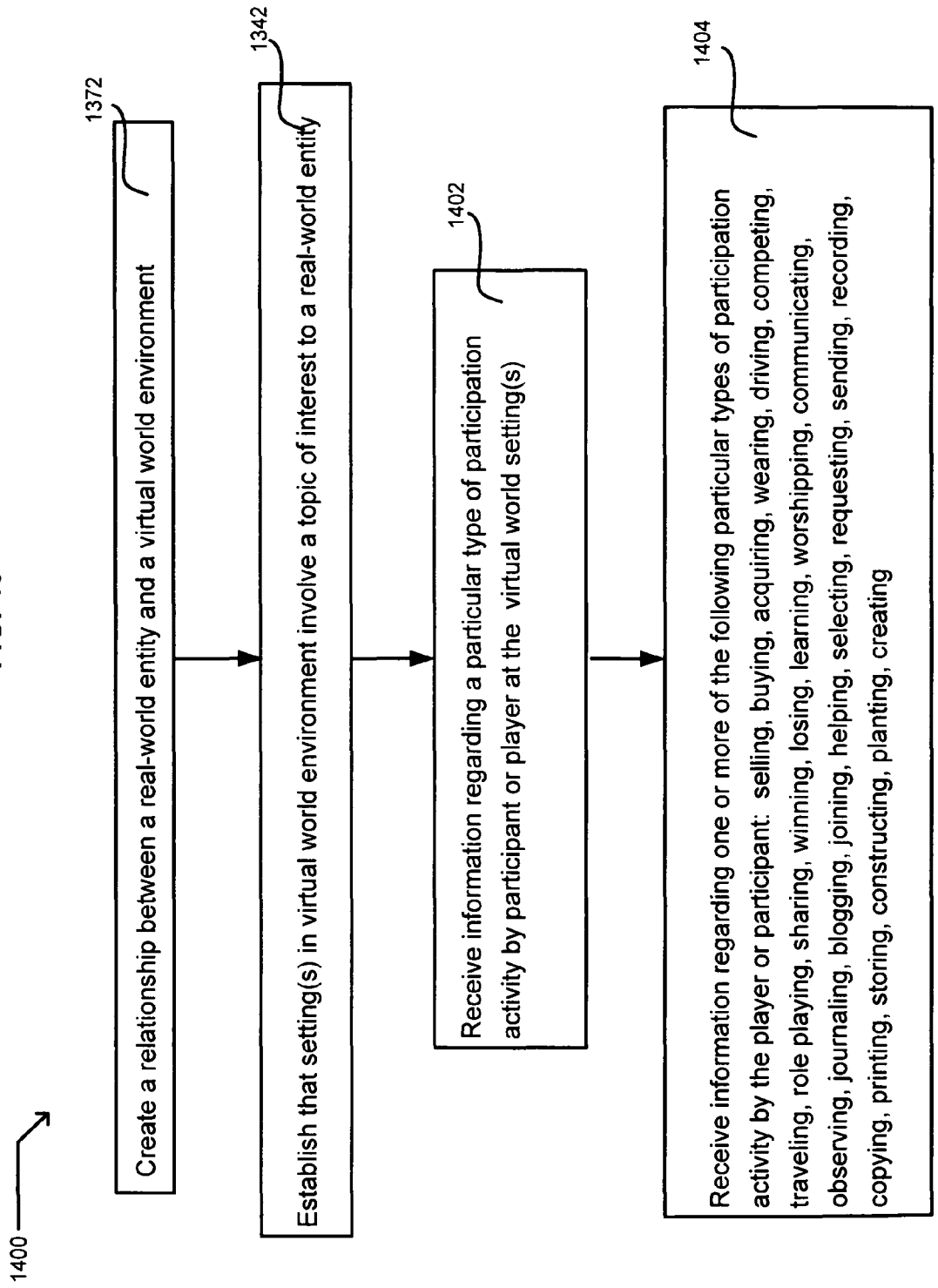

A high level flow chart of FIG. 40 shows an exemplary process 1400 that includes the previously described features of blocks 1372, 1342 as well as an additional feature of receiving information regarding a particular type of participation activity by a participant or player at one or more virtual world settings (block 1402). A related process feature may include receiving information regarding one or more of the following particular types of participation activity by the player or participant: selling, buying, acquiring, wearing, driving, competing, traveling, role playing, sharing, winning, losing, learning, worshipping, communicating, observing, journaling, blogging, joining, helping, selecting, requesting, sending, recording, copying, printing, storing, constructing, planting, and creating (block 1404).

Figure 41:
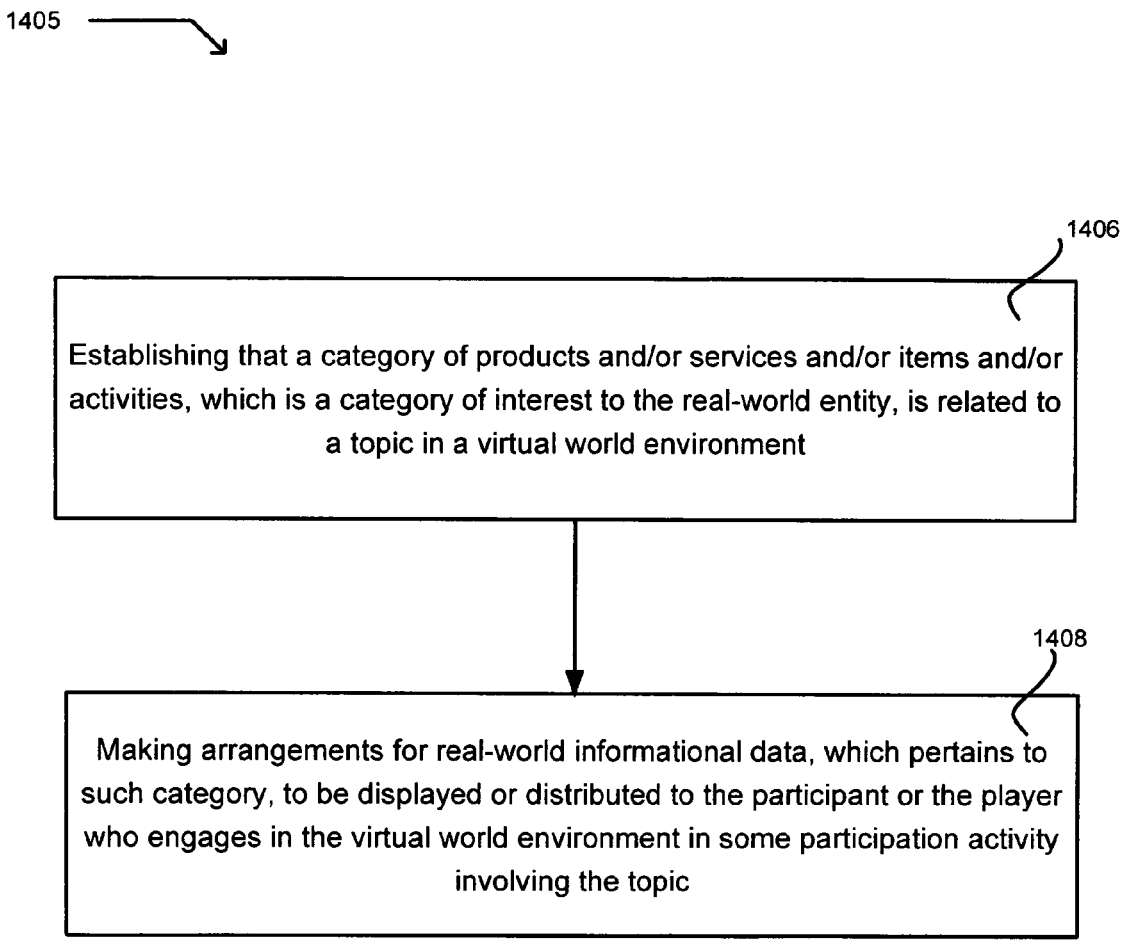
FIG. 41 is a high level flow chart showing an exemplary process for some embodiments.

FIG. 41 is a high level flow chart for an exemplary process 1405 wherein an embodiment provides for establishing that a category of products and/or services and/or items and/or activities, which is a category of interest to the real-world entity, is related to a topic in a virtual world environment (block 1406). The process may further include making arrangements for real-world informational data, which pertains to such category, to be displayed or distributed to the participant or the player who engages in the virtual world environment in some participation activity involving the topic (block 1408).

Figure 42:
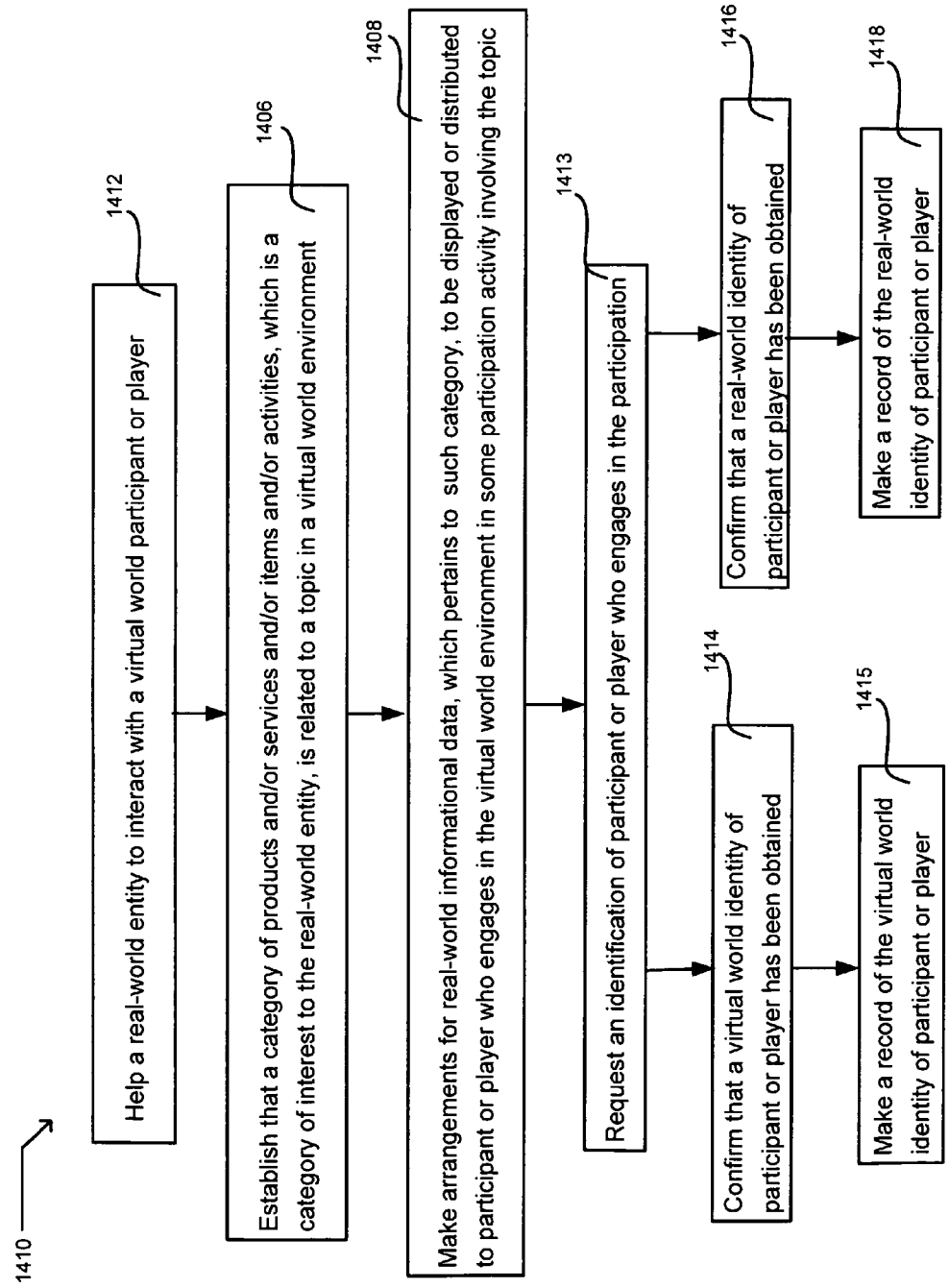
FIGS. 42-44 are more detailed flow charts showing additional exemplary processes for some embodiments.

Referring to the exemplary process 1410 of FIG. 42, another embodiment provides for helping a real-world entity to interact with a virtual world participant or player (block 1412). In addition to the previously described process features of blocks 1406, 1408, a further feature may include requesting an identification of a participant or player who engages in the participation activity (block 1413). In some instances the process includes confirming that a virtual world identity of the participant or player has been obtained (block 1414), and may also include making a record of the virtual world identity of the participant or player (block 1415). Also the process may include confirming that a real-world identity of the participant or player has been obtained (block 1416), and making a record of the real-world identity of the participant (block 1418).

Figure 43:
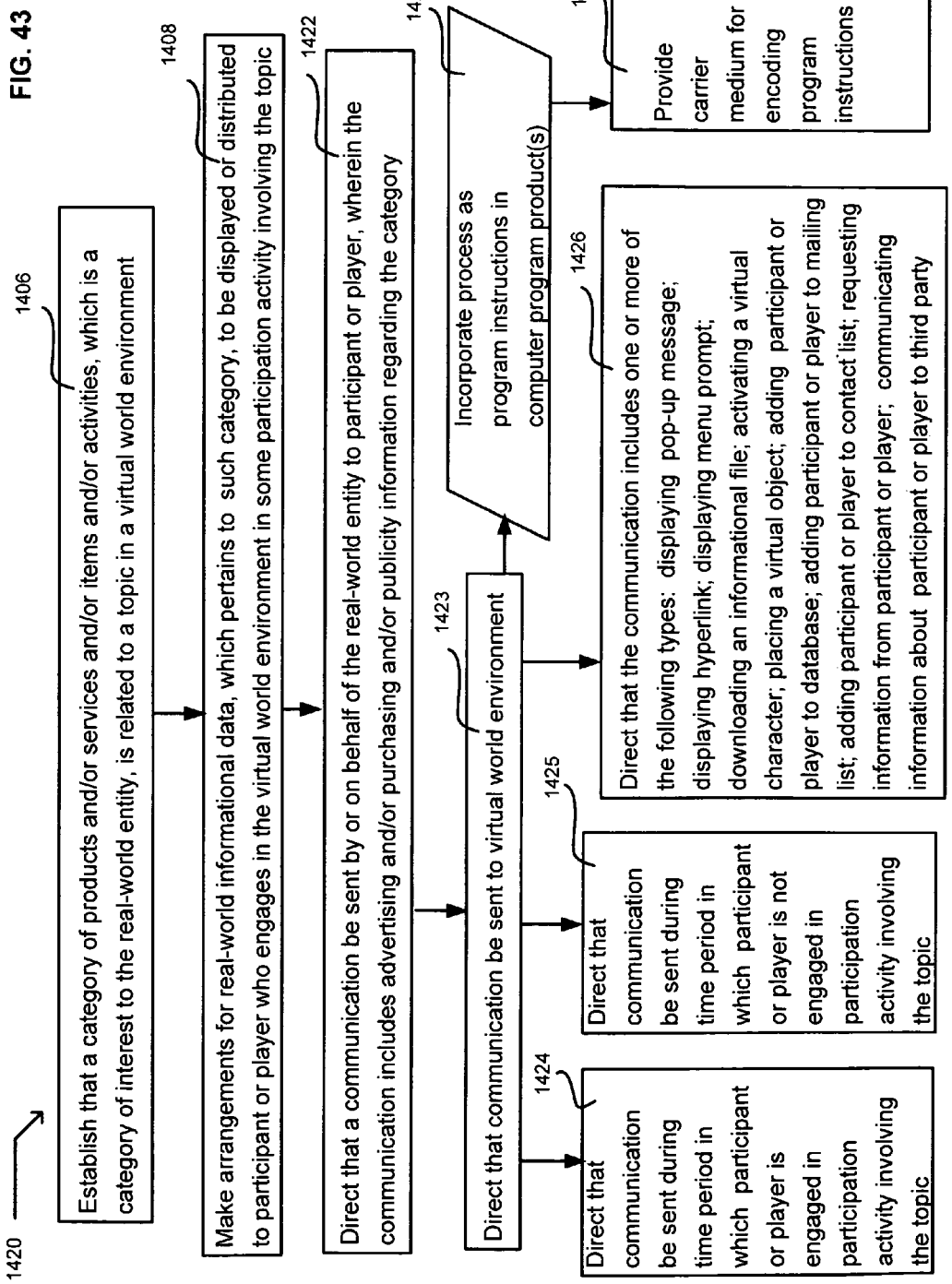

Another exemplary process 1420 is shown in FIG. 43 which includes the previously described process features of blocks 1406, 1408. The process may further include directing that a communication be sent by or on behalf of the real-world entity to the participant or player, wherein the communication includes advertising and/or purchasing and/or publicity information regarding the category (block 1422), and also directing that the communication be sent to the virtual world environment (block 1423). A related feature may prove for directing that the communication be sent during a time period in which the participant or player is engaged (block 1424) and/or is not engaged (block 1425) in participation activity involving the topic.

A further exemplary feature shown in FIG. 43 provides for directing that the communication be sent to the virtual world environment includes one or more of the following types of communications: displaying a pop-up message; displaying a hyperlink; displaying a menu prompt; downloading an informational file; activating a virtual character; placing a virtual object; adding the participant or player to a database; adding the participant or player to a mailing list; adding the participant or player to a contact list; requesting information from the participant or player; and communicating information about the participant or player to a third party (block 1426).

It will be further understood that the methods and processes disclosed herein provide for incorporating various aforementioned process steps as program instructions in one or more computer program products (block 1427), as well as providing a carrier medium for encoding the program instructions (block 1428).

Figure 44:
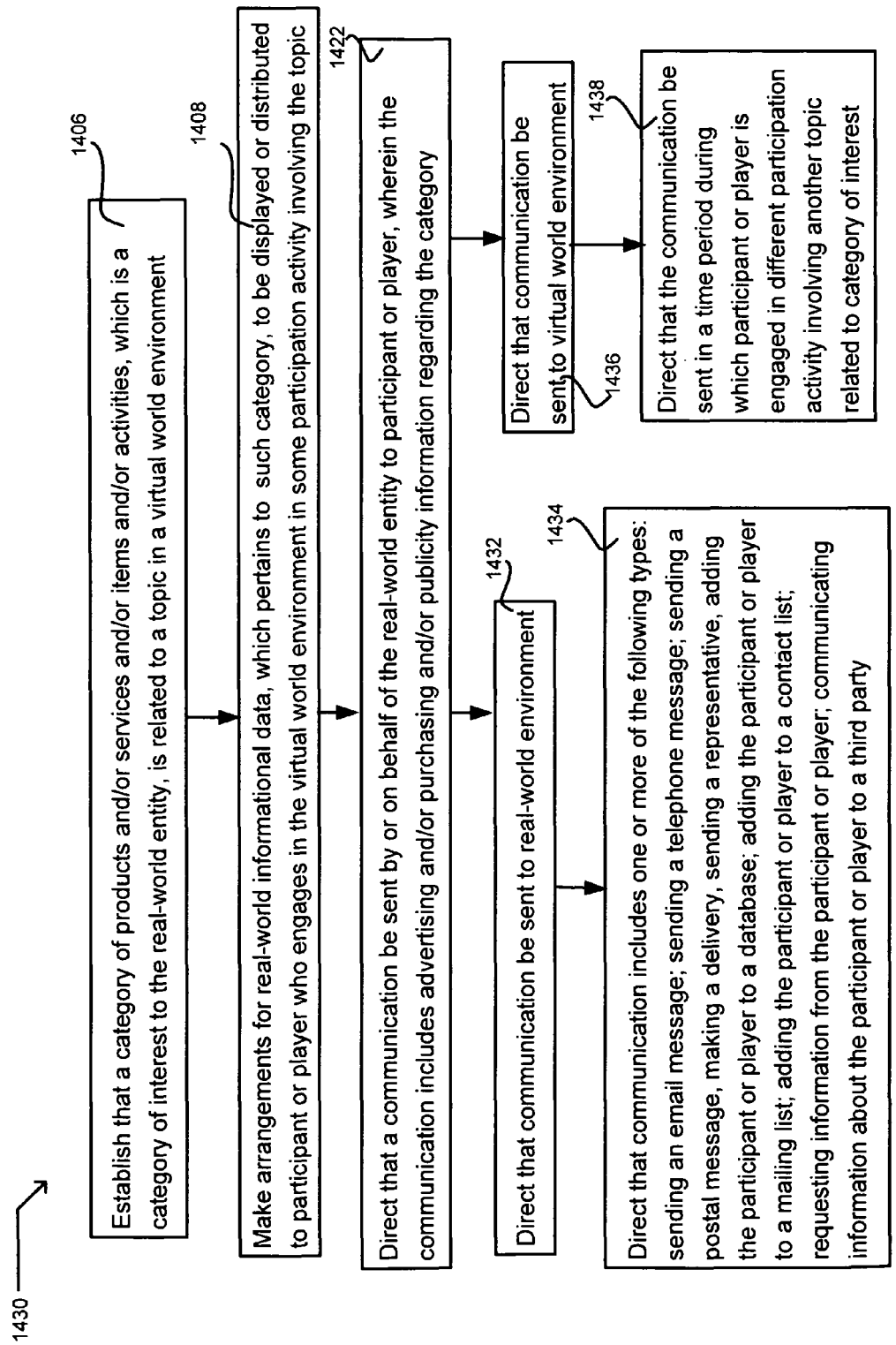

FIG. 44 shows another exemplary process 1430 that includes previous described process blocks 1406, 1408, 1422, and that may further include directing that the communication be sent to a real-world environment (block 1432). A further feature may include directing that the communication be sent to the real-world environment includes one or more of the following types of communications: sending an email message; sending a telephone message; sending a postal message, making a delivery, sending a representative, adding the participant or player to a database; adding the participant or player to a mailing list; adding the participant or player to a contact list; requesting information from the participant or player; and communicating information about the participant or player to a third party (block 1434).

The exemplary process 1430 may also further include directing that the communication be sent to the virtual world environment (block 1436), and also directing that the communication be sent in a time period during which a participant or player is engaged in different participation activity involving another topic related to a category of interest (block 1438).

Figure 45:
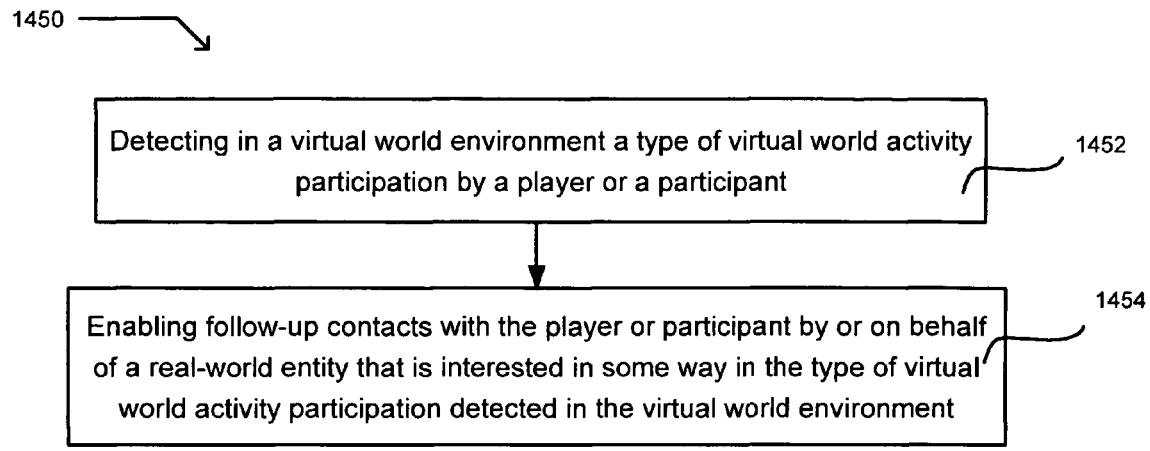
FIGS. 45-46 are high level flow charts showing exemplary processes for some embodiments.

Referring to the exemplary process 1450 shown in the high level flow chart of FIG. 45, an embodiment provides for detecting in a virtual world environment a type of virtual world activity participation by a player or a participant (block 1452), and for enabling follow-up contacts with the player or participant by or on behalf of a real-world entity that is interested in some way in the type of virtual world activity participation detected in the virtual world environment (block 1454).

Figure 46:
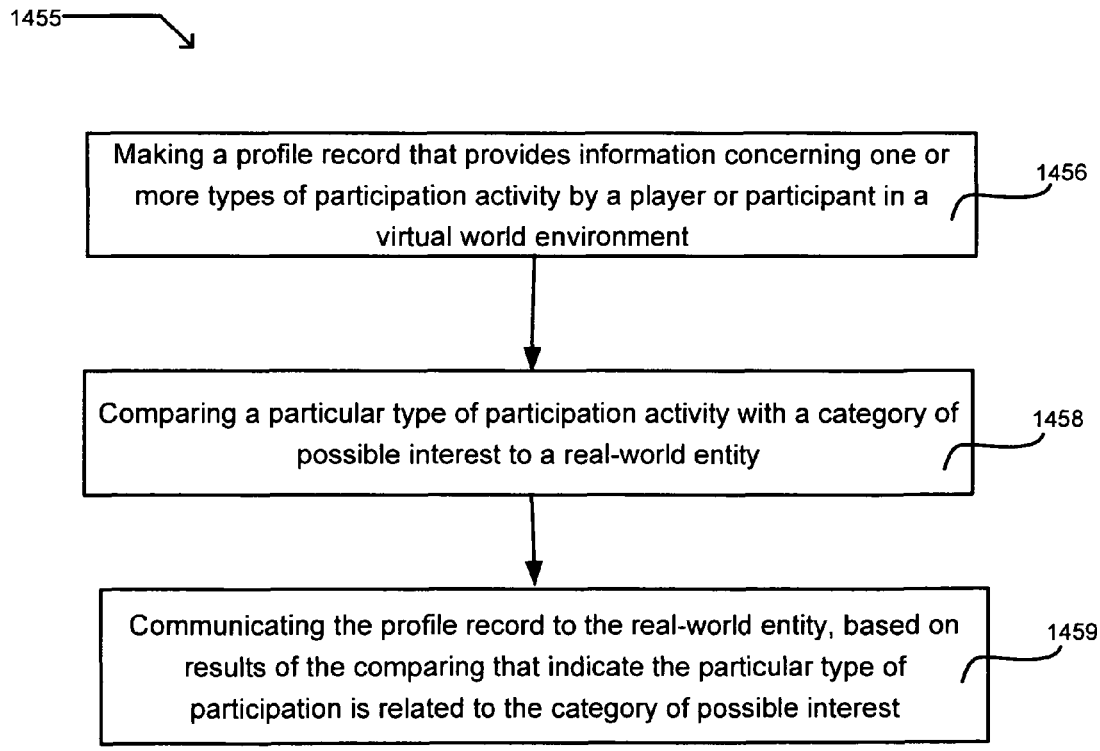

FIG. 46 shows another exemplary process 1455 illustrated in a high level flow chart, including making a profile record that provides information concerning one or more types of participation activity by a player or participant in a virtual world environment (block 1456), and comparing a particular type of participation activity with a category of possible interest to a real-world entity (block 1458). The process may further include communicating the profile record to the real-world entity, based on results of the comparing that indicate the particular type of participation is related to the category of possible interest (block 1459).

Figure 47:
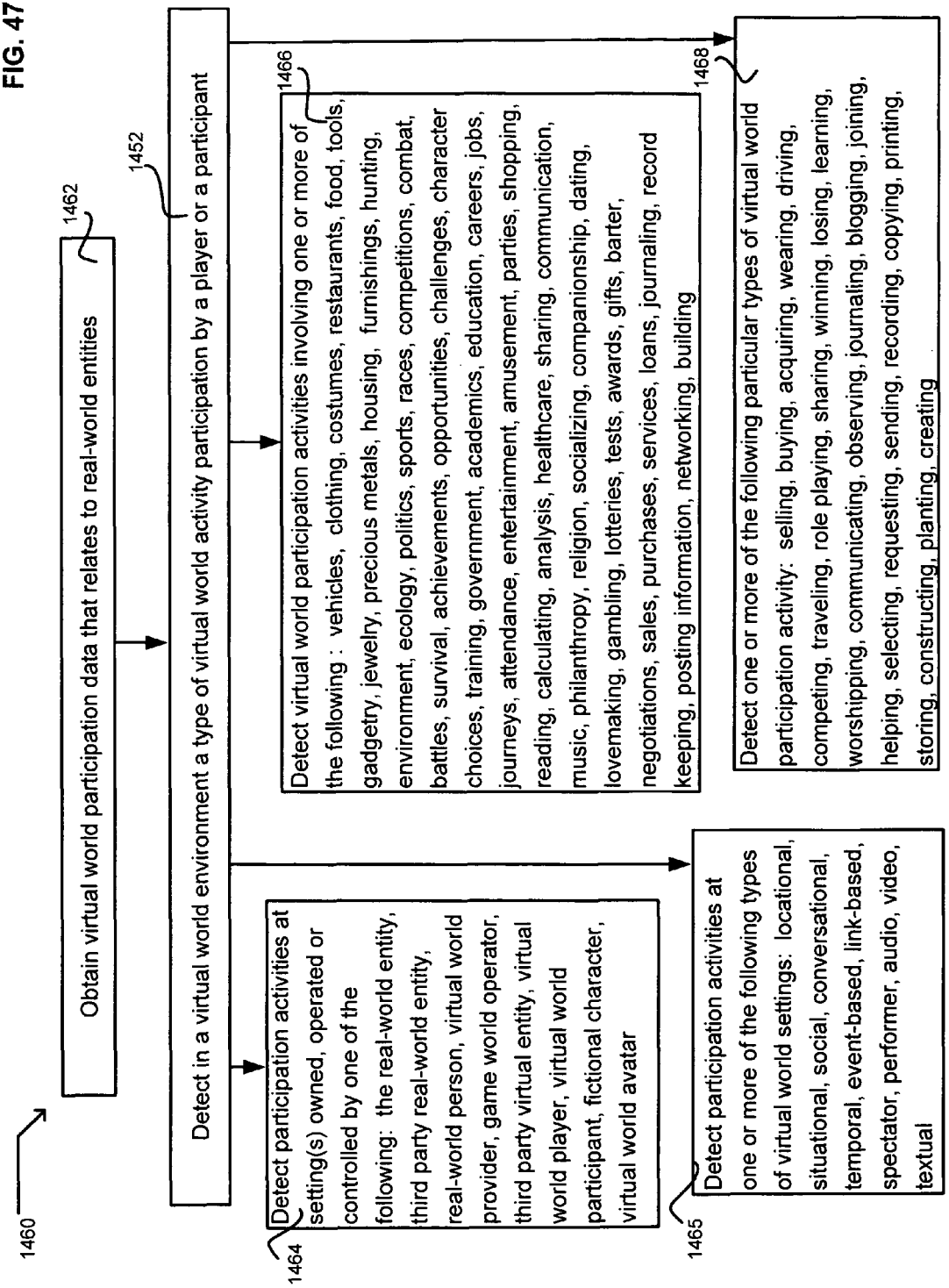
FIGS. 47-50 are detailed flow charts showing additional exemplary processes for some embodiments.

Another exemplary process 1460 is shown in the flow chart of FIG. 47, wherein an embodiment provides for obtaining virtual world participation data that relates to real-world entities (block 1462). The process may further include the previously described block 1452, as well as other features such as detecting participation activities at one or more virtual world settings owned, operated or controlled by one of the following: the real-world entity, third party real-world entity, real-world person, virtual world provider, game world operator, third party virtual entity, virtual world player, virtual world participant, fictional character, and virtual world avatar (block 1464).

Another process feature may include detecting participation activities at one or more of the following types of virtual world settings: locational, situational, social, conversational, temporal, event-based, link-based, spectator, performer, audio, video, and textual block 1465). A further process feature may include detecting one or more of the following particular types of virtual world participation activity: selling, buying, acquiring, wearing, driving, competing, traveling, role playing, sharing, winning, losing, learning, worshipping, communicating, observing, journaling, blogging, joining, helping, selecting, requesting, sending, recording, copying, printing, storing, constructing, planting, and creating (block 1468).

The exemplary process 1460 may further include detecting virtual world participation activities involving one or more of the following: vehicles, clothing, costumes, restaurants, food, tools, gadgetry, jewelry, precious metals, housing, furnishings, hunting, environment, ecology, politics, sports, races, competitions, combat, battles, survival, achievements, opportunities, challenges, character choices, training, government, academics, education, careers, jobs, journeys, attendance, entertainment, amusement, parties, shopping, reading, calculating, analysis, healthcare, sharing, communication, music, philanthropy, religion, socializing, companionship, dating, lovemaking, gambling, lotteries, tests, awards, gifts, barter, negotiations, sales, purchases, services, loans, journaling, record keeping, posting information, networking, and building (block 1468).

Figure 48:
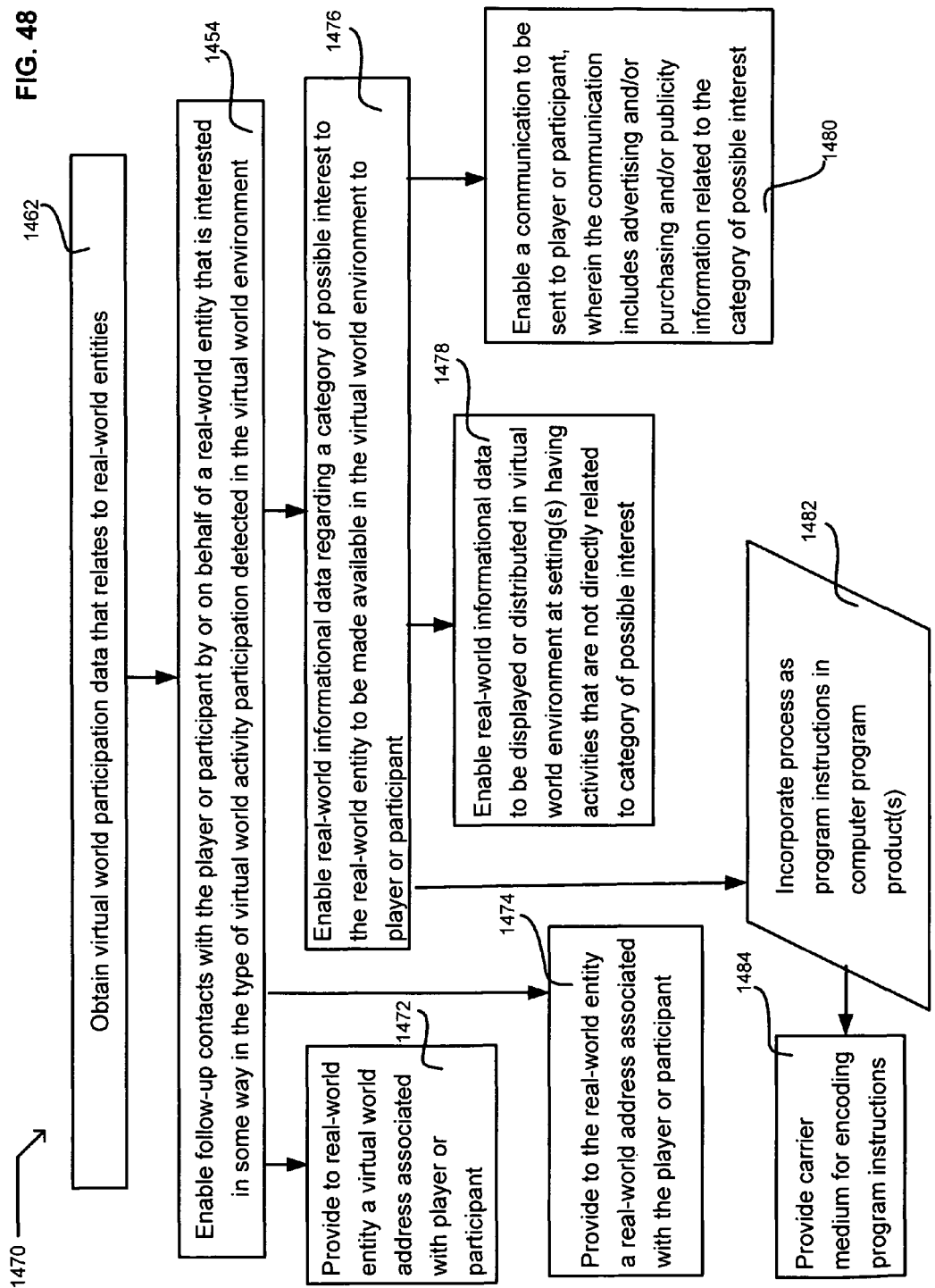

Referring to the exemplary process 1470 in FIG. 48, a flow chart shows an embodiment that includes previously described blocks 1462, 1454 and further features including providing to a real-world entity a virtual world address (block 1472) and/or a real world address (block 1474) associated with a player or participant. A further feature may include enabling real-world informational data regarding a category of possible interest to the real-world entity to be made available in the virtual world environment to the player or participant (block 1476).

Related features may include enabling the real-world informational data to be displayed or distributed in the virtual world environment at one or more settings having activities that are not directly related to the category of possible interest (block 1478), and enabling a communication to be sent to the player or participant, wherein the communication includes advertising and/or purchasing and/or publicity information related to the category of possible interest (block 1480).

It will be further understood that the methods and processes disclosed herein provide for incorporating various combinations of process steps as program instructions in one or more computer program products (e.g., block 1482), as well as providing a carrier medium for encoding the program instructions (e.g., block 1484).

Figure 49:
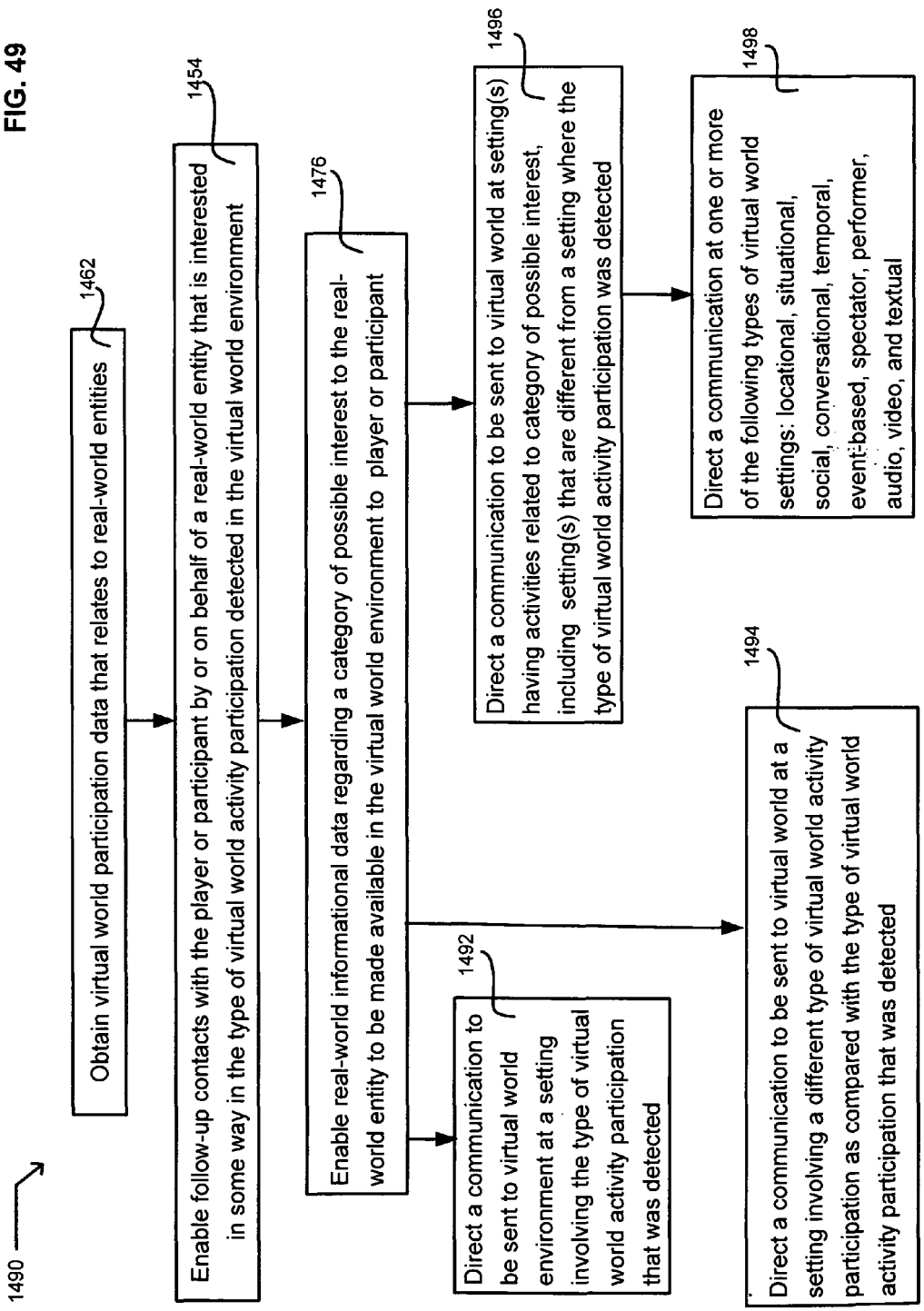

The flow chart of FIG. 49 shows an exemplary process 1490 for an embodiment that includes previously described blocks 1462, 1454, 1476 as well as features that provide for directing a communication to be sent to the virtual world environment at a setting involving the type of virtual world activity participation that was detected (block 1492). Another feature may provide for directing a communication to be sent to the virtual world at a setting involving a different type of virtual world activity participation as compared with the type of virtual world activity participation that was detected (block 1494).

The process of 1490 may also include directing a communication to be sent to the virtual world at one or more settings having activities related to the category of possible interest, including one or more settings that are different from a setting where the type of virtual world activity participation was detected (block 1496). An additional feature may include directing a communication at one or more of the following types of virtual world settings: locational, situational, social, conversational, temporal, event-based, spectator, performer, audio, video, and textual (block 1498).

Figure 50:
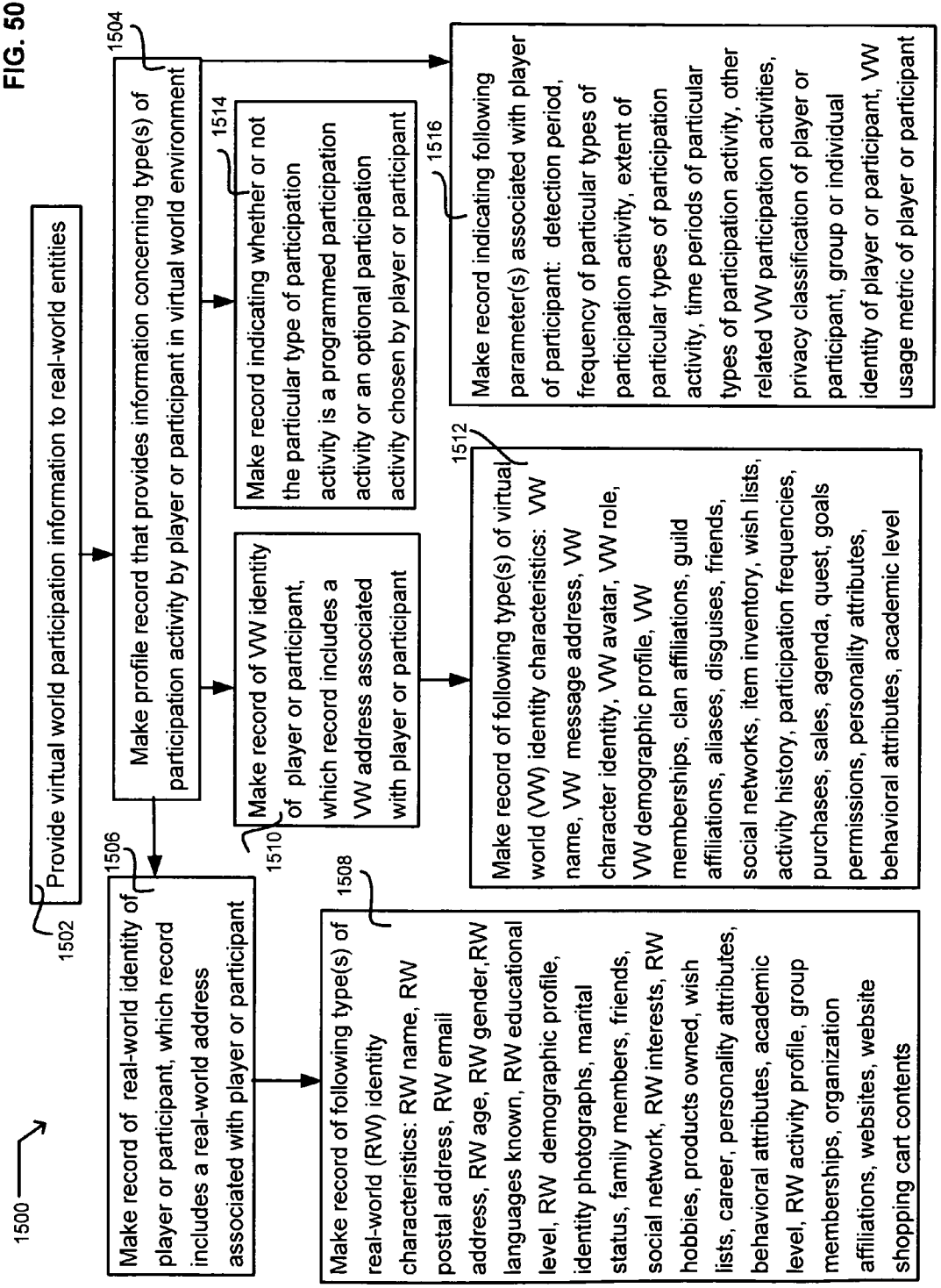
Figure 51:
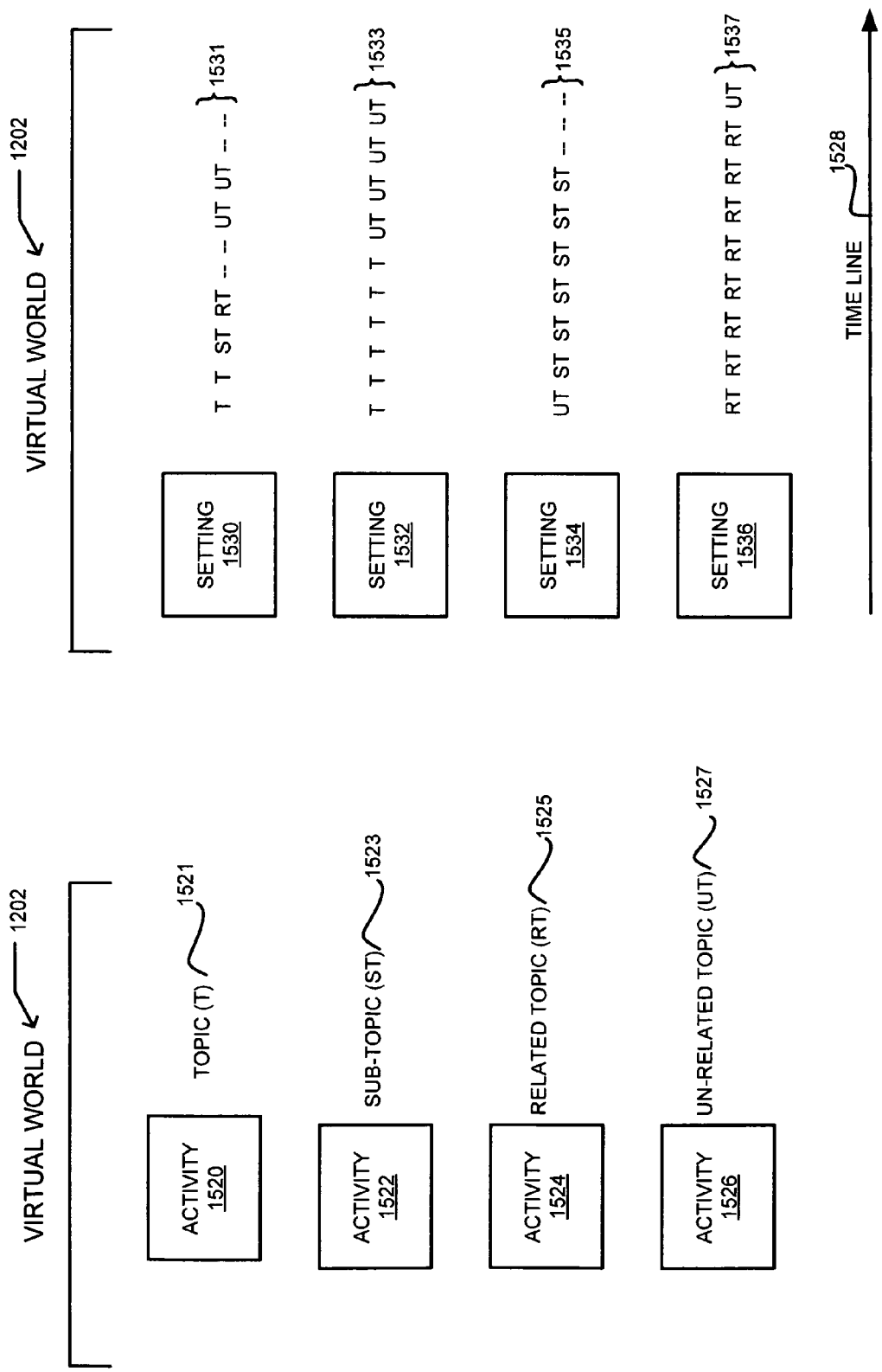
FIGS. 51A and 51B are schematic diagrams showing exemplary types of participation activities and settings in a virtual world environment.

Another exemplary process 1500 is shown in the flow chart of FIG. 50, wherein an embodiment provides virtual world participation information to real world entities (block 1502), and makes a profile record that provides information concerning one or more types of participation activity by a player or participant in a virtual world environment (block 1504). Another feature may provide for making a record of a real-world identity (block 1506) and/or a virtual world identity (block 1510) of a player or participant, which record includes a real-world address and a virtual world address, respectively.

The exemplary process 1500 may further provide for making a record of one or more of the following types of real-world identity characteristics: real-world name, real-world postal address, real-world email address, real-world age, real-world gender, real-world languages known, real-world educational level, real-world demographic profile, identity photographs, marital status, family members, friends, social network, real-world interests, real-world hobbies, products owned, wish lists, career, personality attributes, behavioral attributes, academic level, real-world activity profile, group memberships, organization affiliations, websites, and website shopping cart contents (block 1508).

An additional feature of exemplary process 1500 may include making the record of one or more of the following types of virtual world identity characteristics: virtual world name, virtual world message address, virtual world character identity, virtual world avatar, virtual world role, virtual world demographic profile, virtual world memberships, clan affiliations, guild affiliations, aliases, disguises, friends, social networks, item inventory, wish lists, activity history, participation frequencies, purchases, sales, agenda, quest, goals, permissions, personality attributes, behavioral attributes, and academic level (block 1512). Another process feature may include making a record indicating whether or not the particular type of participation activity is a programmed participation activity or an optional participation activity chosen by the player or participant (block 1514).

Additional process features may include making a record indicating one or more of the following parameters associated with the player of participant: detection period, frequency of particular types of participation activity, extent of particular types of participation activity, time periods of particular types of participation activity, other related virtual world participation activities, privacy classification of player or participant, group or individual identity of player or participant, and virtual world usage metric of player or participant (block 1516).

The schematic block diagram of FIG. 51A shows embodiment features involving a virtual world environment 1202 wherein different VW activities may involve differently related topics, such as a topic 1521 for activity 1520, sub-topic 1523 for activity 1522, related topic 1525 for activity 1524, and unrelated topic 1527 for activity 1526. Any or all of these topics may be related to a category of interest of a real-world entity, either for monitoring purposes (i.e. detection) and/or for targeting communications directed to a participant or player involved in such a topic.

The schematic block diagram of FIG. 51B shows embodiment features involving a virtual world environment 1202 wherein different VW settings may include different topical activities over a period of time shown by time line 1528 and abbreviations T, ST, RT and UT. As shown, setting 1530 may include different programmed and/or chosen activities 1531, setting 1532 may include a different menu of activities 1533, setting 1534 may include yet another menu of activities 1535, and setting 1536 may include yet another menu of activities 1537. Any or all of the settings and related topical activities may be related to a category of interest of a real-world entity, either for monitoring purposes (i.e. detection) and/or for targeting communications directed to a participant or player involved in such a topic.

Figure 52:
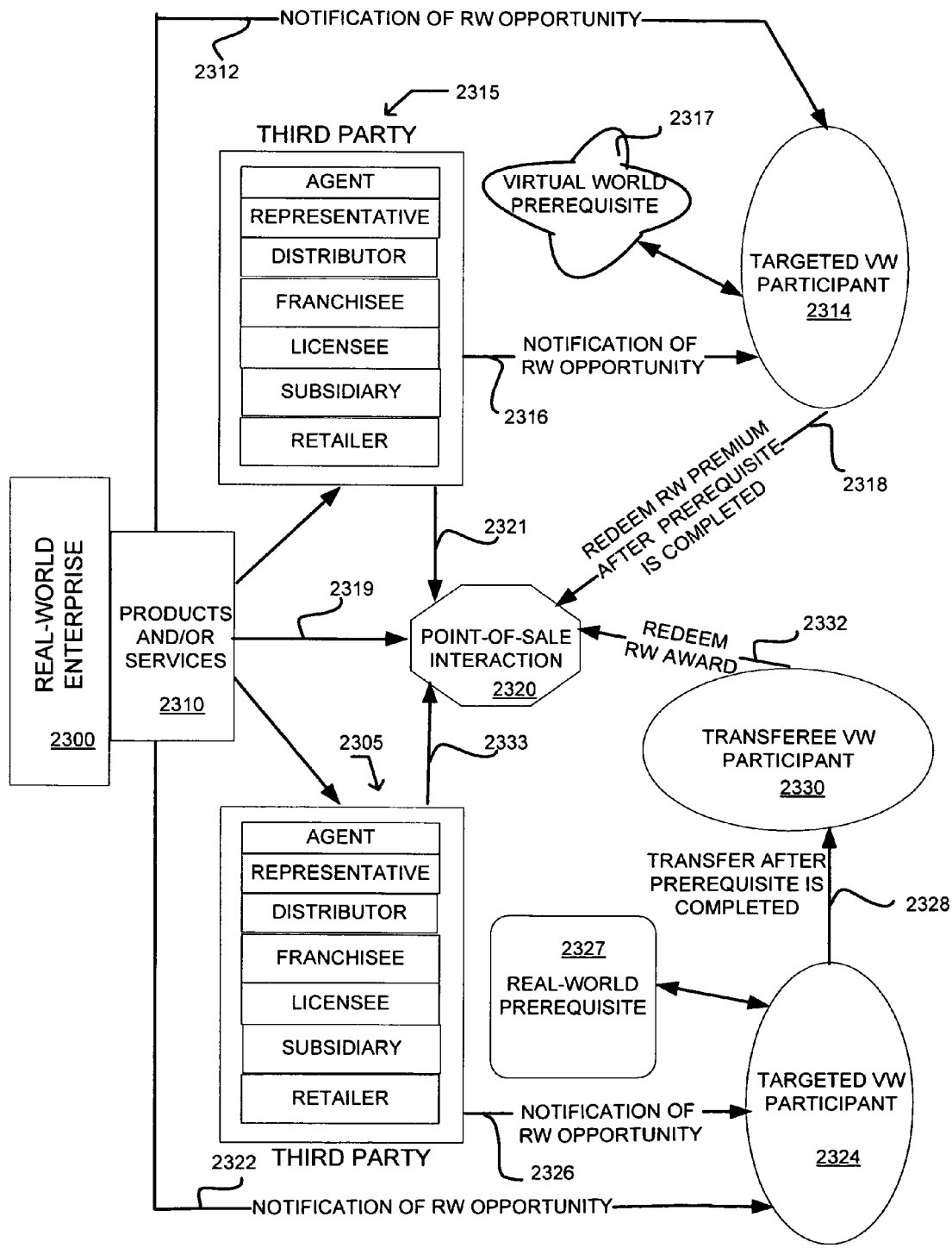
FIG. 52 is a schematic block diagram for various exemplary embodiments involving real-world premiums that may be utilized by a targeted virtual world participant in connection with products and/or services of a real-world enterprise.

Referring to the schematic block diagram of FIG. 52, various exemplary features are incorporated in an embodiment wherein a real-world enterprise 2300 provides sale and promotion of products and/or services 2310 directly to current or prospective customers as well as indirectly through one or more third parties 2305, 2315. As shown in the drawing, such third parties may include but are not limited to an agent, representative, distributor, franchisee, licensee, subsidiary and retailer.

One aspect of the embodiment of FIG. 52 includes direct notification 2312 of a real-world opportunity that may be communicated to a targeted virtual world (VW) participant 2314. Indirect notification 2316 of the real-world opportunity may also be provided by third party 2315 on behalf of the real-world enterprise 2300. In this example the real-world opportunity may include a promotional benefit such as a real-world premium that is not transferable. In other words it must be redeemed by the targeted VW recipient 2314 in order to obtain the benefit provided by the real-world premium. However, in this example a virtual world prerequisite 2317 is required to be completed (e.g., confirmed) in order to qualify for any benefits provided by the real-world premium.

It will be understood that the real-world premium may be redeemed in various ways depending on the circumstances. In the illustrated embodiment involving targeted VW participant 2314, the real-world premium can be redeemed 2318 in connection with a point-of-sale (POS) interaction 2320 with either the real-world enterprise (see arrow 2319) or a third party (see arrow 2321).

A further aspect of the embodiment of FIG. 52 includes another direct notification 2322 of a real-world opportunity that may be communicated to another targeted VW participant 2324. Indirect notification 2326 of the real-world opportunity may also be provided by third party 2305 on behalf of the real-world enterprise 2300. In this example the real-world opportunity may include a benefit such as a real-world premium that can be transferred to another party. In other words it may be redeemed by the original recipient or by a transferee party pursuant to an applicable confirmation and validation procedure. One aspect of the procedure may require that a transfer 2328 of the real-world premium to a transferee VW participant 2330 be made only after a real-world prerequisite 2327 has been completed (e.g. confirmed). As shown in this example, the transferee VW participant can be redeemed 2332 in connection with a POS interaction 2320 with either the real-world enterprise (see arrow 2319) or a third party (see arrow 2333).

Figure 53:
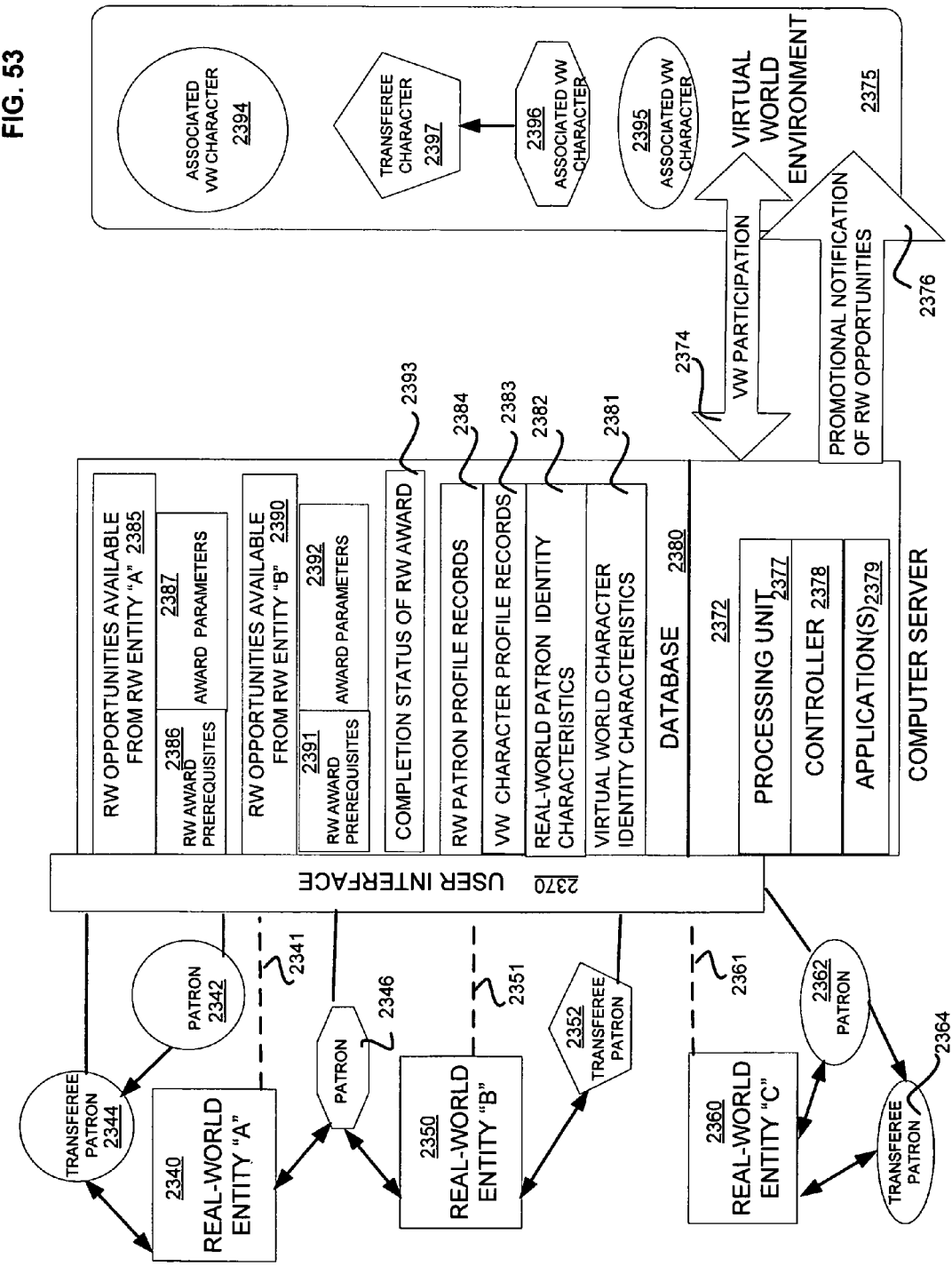
FIG. 53 is another schematic block diagram showing exemplary computerized implementation features involving real-world promotional opportunities provided to one or more virtual world characters.

Referring to the schematic block diagram of FIG. 53, a plurality of different real-world entities 2340, 2350, 2360 may individually (or in some instances collectively) provide real-world opportunities to targeted participants in a virtual world environment 2375. The various functional aspects of the virtual world environment may be provided by a computer server 2372 that includes user interface 2370, processing unit 2377, controller 2378, and one or more applications 2379. A database 2380 is operably associated with the computer server 2372.

More particularly, real-world (RW) entity "A" 2340 may arrange for providing pertinent qualification and notification information regarding a RW opportunity that is targeted for a patron 2342 who interactively participates 2374 in the VW environment 2375 through associated VW character 2394. It will be understood that such qualification and notification information will eventually be incorporated (see dotted line 2341) into database 2380 for reference purposes. Such database records may include a listing of RW opportunities 2385 available from RW entity "A", along with the applicable RW award prerequisites 2386 and related award parameters 2387.

As part of the targeting that results in a selection of VW character 2394, various RW and/or VW criteria may be collected and processed. Such criteria may be obtained from various sources. In this example certain criteria are maintained and in some instances periodically updated in database 2380, including but not limited to VW character identity characteristics 2381, RW patron identity characteristics 2382, VW character profile records 2383, and RW patron profile records 2384.

As shown schematically in FIG. 53, a promotional notification of RW opportunities is communicated 2376 to a targeted VW character 2394. Any qualification parameters and/or prerequisites that are listed in the database records associated with a particular RW promotional opportunity are correlated with a particular VW character that is pursuing a promotional opportunity. An authenticated award confirmation is not generated or issued until a completion status record 2384 indicates compliance with the applicable qualification parameters and/or prerequisites. In the illustrated embodiment patron 2342 has received an authentic confirmation (e.g. coupon) that has been transferred to transferee patron 2344. The transferee patron 2344 may submit the authentic confirmation to the RW entity 2340 for validation and implementation of a consequential result in accordance with the terms of the promotional award.

With respect to the illustrated embodiment of FIG. 53 concerning another example, real-world (RW) entity "B" 2350 may arrange for providing pertinent qualification and notification information regarding a RW opportunity that is targeted for a patron 2346 who interactively participates 2374 in the VW environment 2375 through associated VW character 2396. It will be understood that such qualification and notification information will eventually be incorporated (see dotted line 2351) into database 2380 for reference purposes. Such database records may include a listing of RW opportunities 2390 available from RW entity "B", along with the applicable RW award prerequisites 2391 and related award parameters 2392.

As part of the targeting that results in a selection of VW character 2396, various RW and/or VW criteria may be collected and processed in a manner previous described regarding targeted VW character 2394. As shown schematically in FIG. 53, a particular promotional notification of RW opportunities originating from RW entity 2350 is communicated 2376 to a targeted VW character 2396. Any qualification parameters and/or prerequisites that are listed in the database records associated with the particular RW promotional opportunity are correlated with a particular VW character that is pursuing a promotional opportunity. An authenticated award confirmation is not generated or issued until a completion status record 2384 indicates compliance with the applicable qualification parameters and/or prerequisites.

In the illustrated embodiment of FIG. 53, patron 2346 has received an authentic confirmation (e.g. coupon) that can be submitted for redemption to either RW entity 2350 or in this particular instance to RW entity 2340 which has agreed to accept some promotional awards originating from other RW entities. However, in this example only RW entity 2350 will allow an award confirmation to be transferred to another VW character prior to redemption. Therefore in the event that VW character obtains another RW promotional award sent by or on behalf of RW entity 2350, the award may be transferred to VW transferee character 2397. The transferee patron 2352 who participates in the VW environment 2375 as character 2397 can therefore submit an authenticated confirmation award to RW entity 2350 for validation and implementation of any resulting benefit.

With respect to the illustrated embodiment of FIG. 53 concerning yet another example, real-world (RW) entity "C" 2360 may arrange for providing pertinent qualification and notification information regarding a RW opportunity that is targeted for a patron 2362 who interactively participates 2374 in the VW environment 2375 through associated VW character 2395. It will be understood that such qualification and notification information will eventually be incorporated (see dotted line 2361) into database 2380 for reference purposes. In a manner similar to the previous description, such database records may include a listing of RW opportunities available from RW entity "B", along with the applicable RW award prerequisites and related award parameters. Obtaining and processing of targeting criteria in this example can be accomplished as previously described. Similarly, compliance with appropriate prerequisites and qualification may be determined and recorded in the completion status of RW award portion 2393 as previously described.

In the illustrated embodiment of FIG. 53, patron 2362 has received an authentic confirmation (e.g. coupon) that can be submitted by patron 2362 (the original VW recipient through associated VW character 2395) for redemption to RW entity 2360. However in this example the promotional award can be transferable to another party, which party is not required to be a participant in the VW environment 2375. As shown in the drawing, such a transfer may be made to transferee patron 2364 (a patron of RW entity 2360, but not yet a participant in VW environment 2375). Assuming the award confirmation is in a form and/or format suitable for validation, transferee patron 2364 can obtain the promotional award benefit by submitting the authenticated confirmation to real-world entity 2360.

It will be understood that many possibilities are available in order to provide the award confirmation in a form and/or format that can be easily authenticated and processed such as by computerized apparatus. In that regard confirmation can include an authentication technique in order to avoid forgery or other unauthorized duplication of an awarded opportunity or premium. The confirmation technique can also serve to clearly identify and in some instances encode appropriate data that automatically helps to identify the terms and conditions for a specific promotional benefit.

Figure 54:
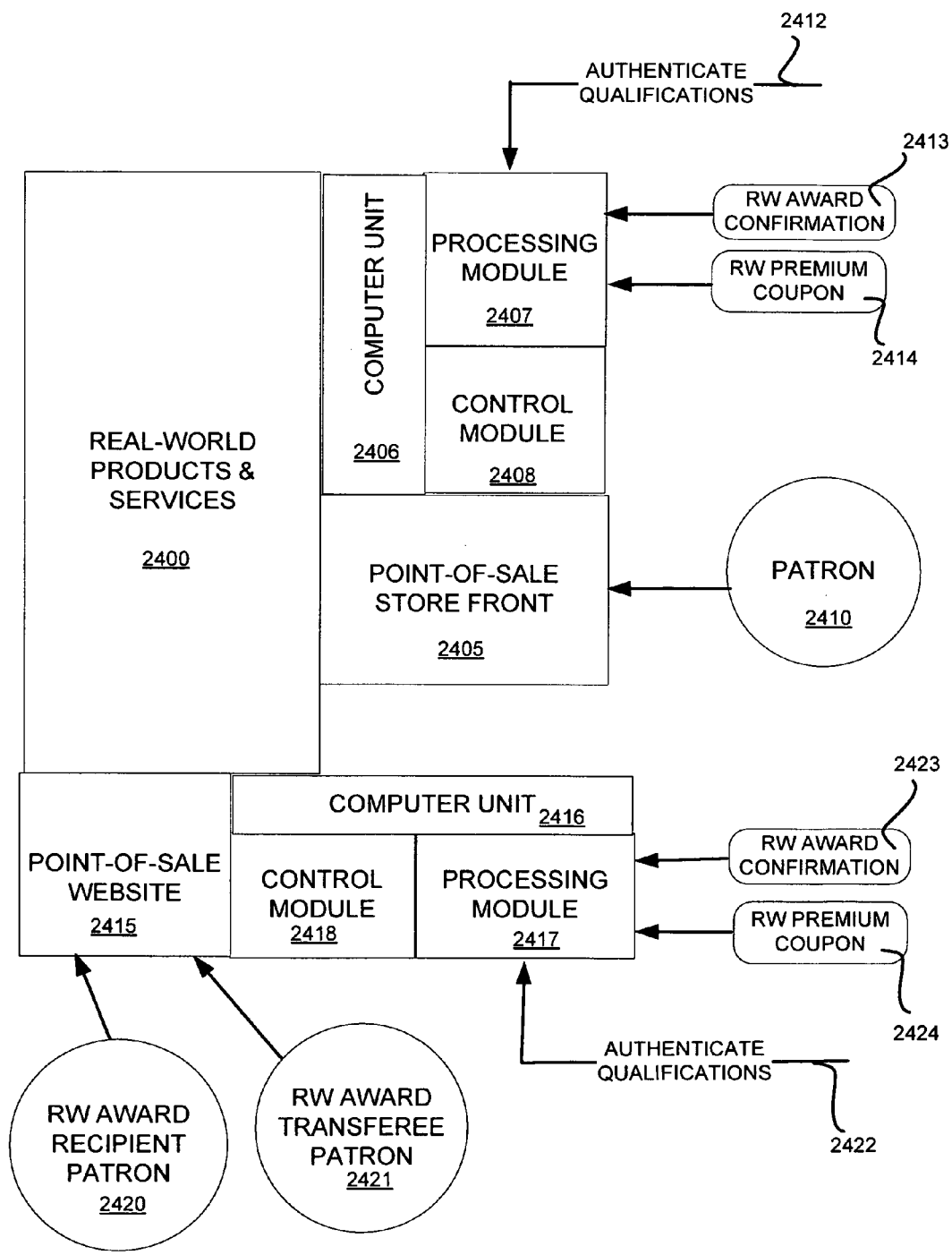
FIG. 54 is a schematic representation of exemplary ways to process an award or premium at a computerized point-of-sale location.

Further exemplary features are disclosed schematically in FIG. 54 wherein clientele of real-world products and services 2400 such as patrons 2410, 2420 are able to conduct transactions at a point-of-sale store front 2405 and also at a point-of-sale website 2415. Of course other possible interactions between patrons and a business site for the RW products and services 2400 are possible, and the disclosed embodiments herein are by way of example only.

As shown in the schematic drawing of FIG. 54, POS store front 2405 is operably associated with a computer unit 2406, processing module 2407 and control module 2408. Patron 2410 is able receive promotional award benefits based on a validation procedure that may include submission of a RW premium coupon 2414, a RW award confirmation 2413 and/or a communication that provides authenticated qualification 2412.

As also shown schematically in FIG. 54, POS website 2415 is operably associated with a computer unit 2416, processing module 2417 and control module 2418. Patron 2420 is able to receive promotional award benefits based on a validation procedure that may include submission of a RW premium coupon 2424, a RW award confirmation 2423 and/or a communication that provides authenticated qualification 2422. When authorized by the applicable qualification procedures for a particular promotional opportunity award, a RW award transferee patron 2421 may also obtain redemption of a properly validated award at a POS website 2415 or other authorized site.

As indicated in the description relating to the embodiments of FIGS. 52-54, additional flexibility as well as some control requirements may be used to affect the transfer status of the various promotional RW promotional opportunities and premiums. It will be understood that various other limitations may be incorporated into a RW promotional premium (e.g., expiration date, authentication compliance, a precondition, a transfer fee, a redemption fee, an age requirement, etc.) depending on the terms and conditions determined individually or jointly by the real-world entity and the particular virtual world environment. It will be further understood that some RW premiums may have widespread acceptability at several separately owned RW business sites, and other RW promotional opportunities may only be pursued and validated at a single real-world enterprise.

It will be further understood that in some circumstances the RW consequence of a validated RW premium may inure to the benefit of a non-recipient patron (e.g., transferee) such or to the benefit of a RW or VW group with which a transferee is associated. Of course such group benefits may also be given to a RW or VW group with which an original RW premium recipient is associated.

Figure 55:
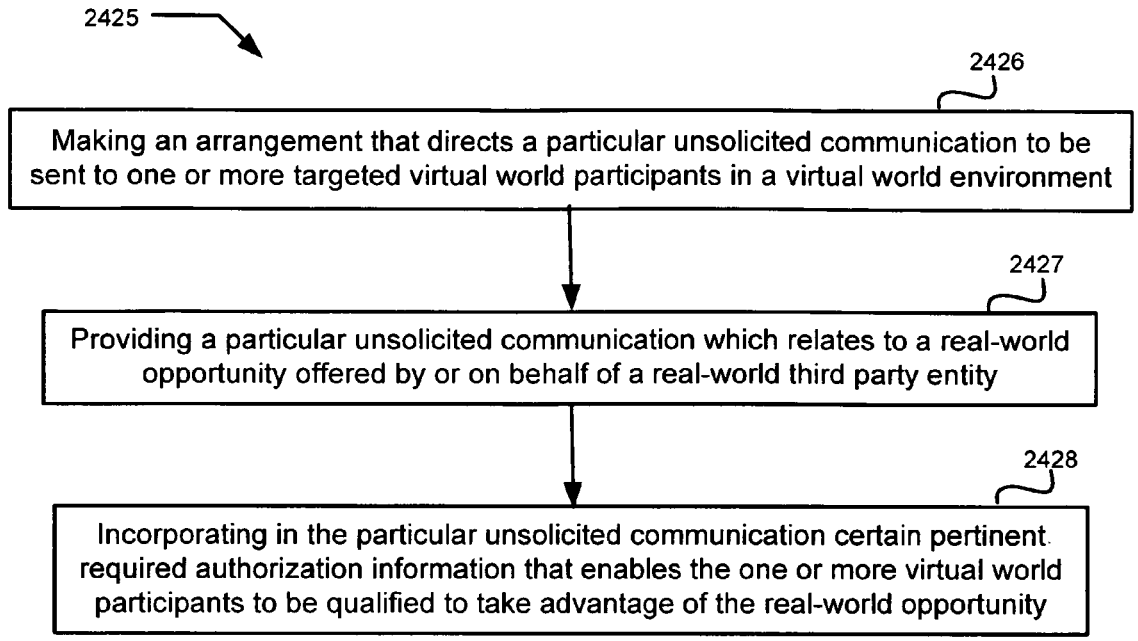
FIGS. 55-57 are high level flow charts showing exemplary process embodiments.

Referring to FIG. 55, a high level flow chart for a processing embodiment 2425 includes making an arrangement that directs a particular unsolicited communication to be sent to one or more targeted virtual world participants in a virtual world environment (block 2426), and providing a particular unsolicited communication which relates to the real-world opportunity offered by or on behalf of a real-world third party entity (block 2427). The exemplary embodiment 2425 may also include incorporating in the particular unsolicited communication certain pertinent required authorization information that enables the one or more virtual world participants to be qualified to take advantage of the real-world opportunity (block 2428).

It will be understood that a targeted virtual world participant may already have indicated an interest in the subject matter of a RW promotional opportunity and in some instances may already be a customer of the real-world enterprise that is offering the RW promotional opportunity or premium. Nevertheless, there are benefits and advantages in developing and using various real-world and/or virtual world criteria as a basis for targeting one or more virtual world participants that may be receptive to new incentives that are included in a particular unsolicited communication.

By directing a particular RW promotional opportunity to a targeted VW participant without requiring a user request as a precondition, a real-world enterprise can assure a higher probability of exposure. Also by using somewhat sophisticated criteria as a basis for selecting the VW recipients, it is easier to customize a real-world promotional offer aimed at a specific audience.

Figure 56:
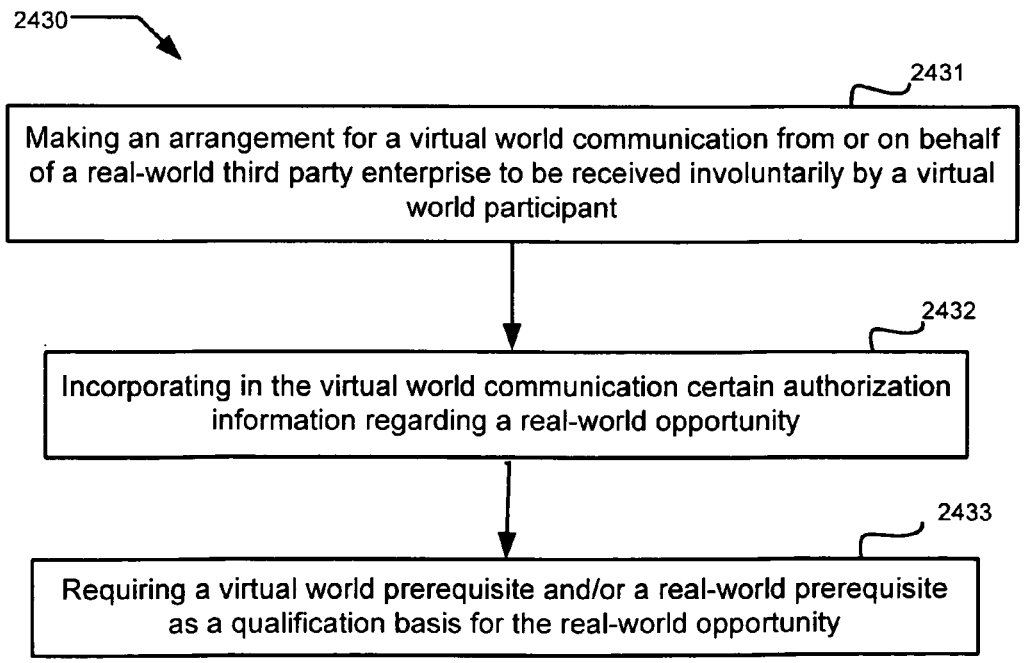

Another exemplary process embodiment 2430 shown in FIG. 56 includes making an arrangement for a virtual world communication from or on behalf of a real-world third party enterprise to be received involuntarily by the virtual world participant (block 2431), incorporating in the virtual world communication certain authorization information regarding a real-world opportunity (block 2432), and requiring a virtual world prerequisite and/or a real-world prerequisite as a qualification basis for the real-world opportunity (block 2433).

Figure 57:
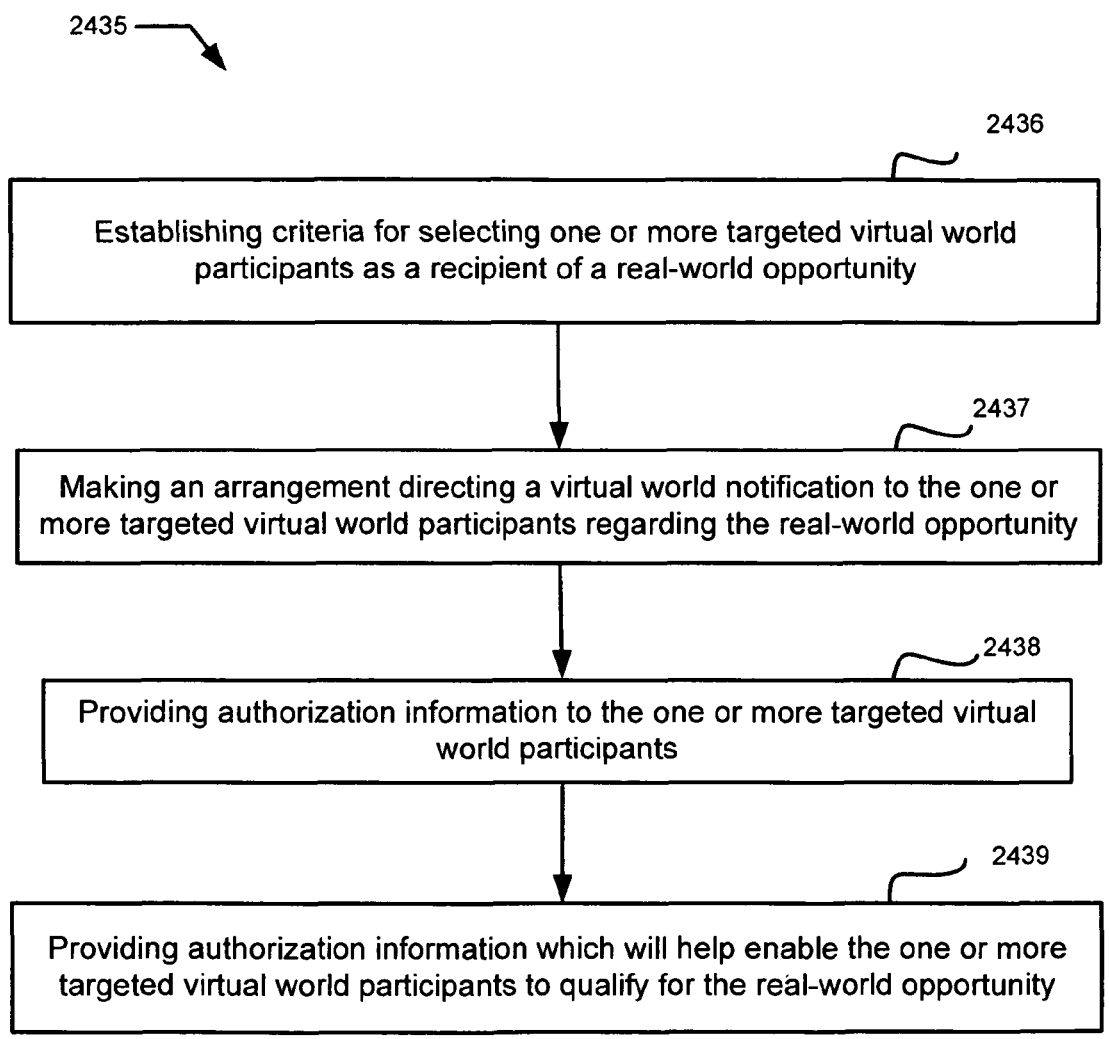

Referring to the high level flow chart of FIG. 57, an exemplary process embodiment 2435 includes establishing criteria for selecting one or more targeted virtual world participants as a recipient of a real-world opportunity (block 2436), and making an arrangement directing a virtual world notification to the one or more targeted virtual world participants regarding the real-world opportunity (block 2437). Additional process features may include providing authorization information to the one or more targeted virtual world participants (block 2438), and including authorization information which will help enable the one or more targeted virtual world participants to qualify for the real-world opportunity (block 2439).

Figure 58:
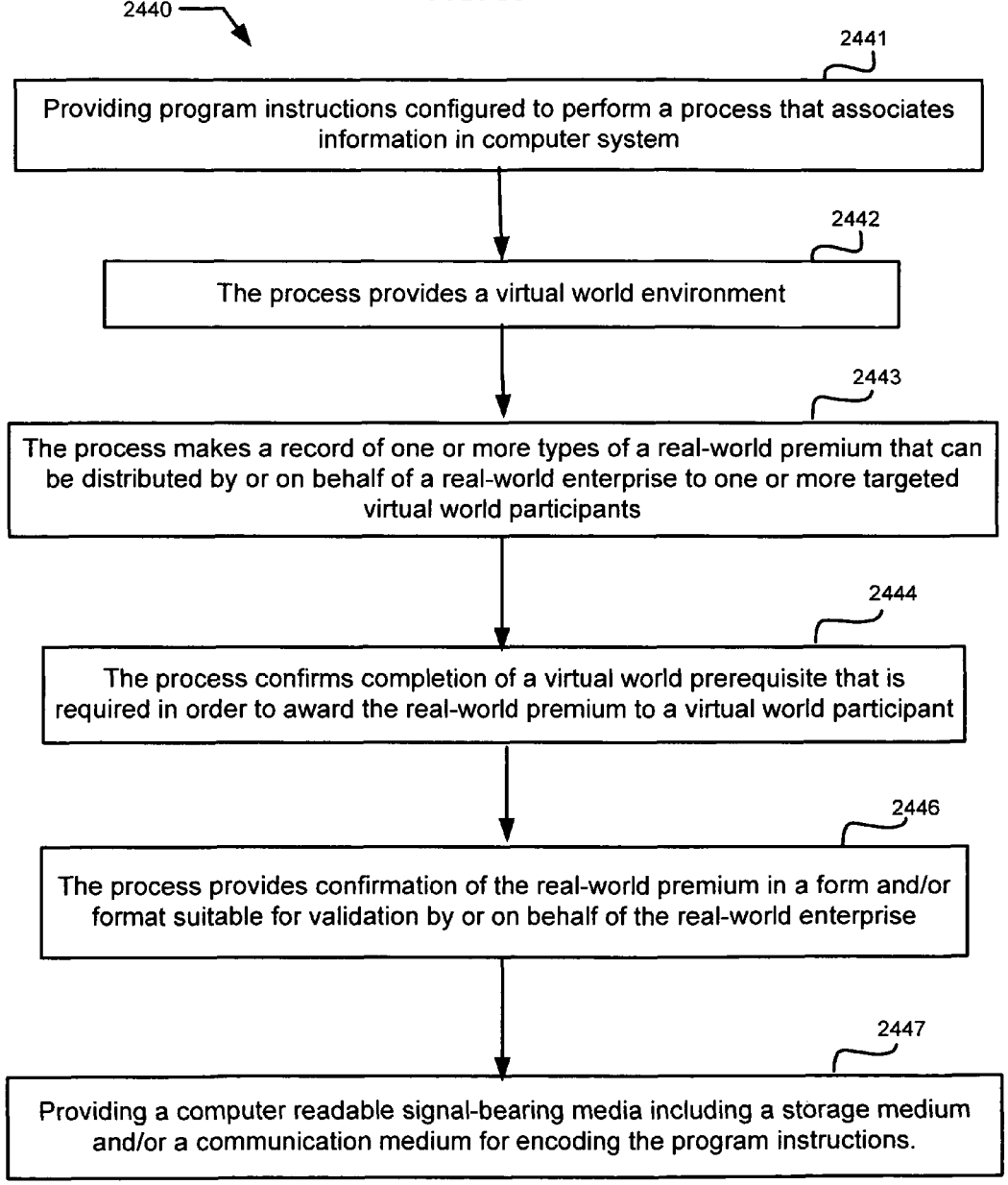
FIG. 58 is a high level flow chart for a process incorporated in an exemplary computer program product.

The computer program product embodiment 2440 of FIG. 58 provides program instructions configured to perform a process that associates information in a computer system (block 2441). An exemplary process includes providing a virtual world environment (block 2442), and making a record of one or more types of a real-world premium that can be distributed by or on behalf of a real-world enterprise to one or more targeted virtual world participants (block 2443). Other process features may include confirming completion of a virtual world prerequisite that is required in order to award the real-world premium to a virtual world participant (block 2444), and providing confirmation of the real-world premium in a form and/or format suitable for validation by or on behalf of the real-world enterprise (block 2446).

An exemplary computer program product implementation may provide a computer readable signal-bearing media that includes a storage medium and/or a communication medium for encoding the program instructions (block 2447).

Figure 59:
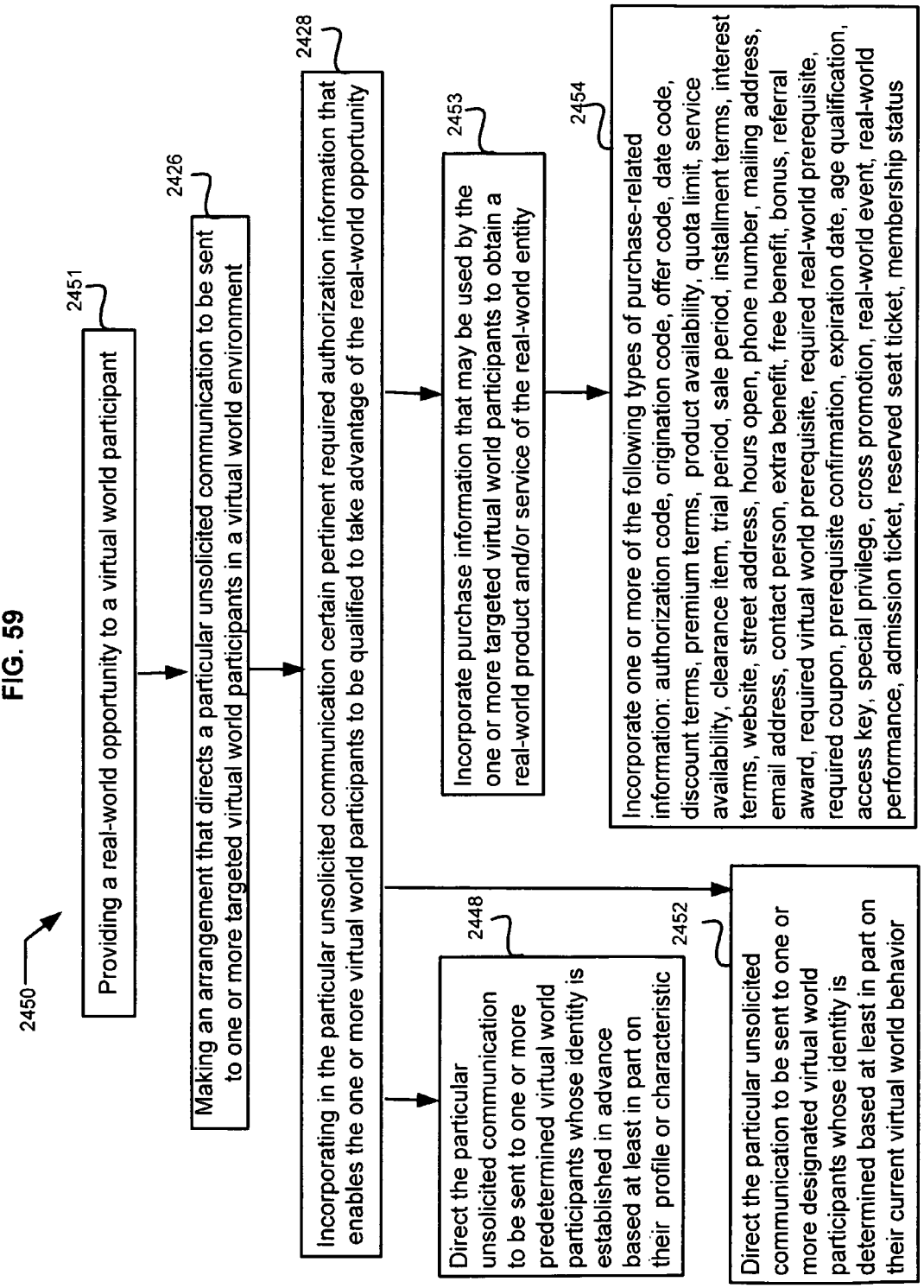
FIGS. 59-67 are detailed flow charts showing exemplary process features that may be incorporated in various different disclosed embodiments.

FIG. 59 shows a more detailed flow chart for a process embodiment 2450 that provides a real-world opportunity to a virtual world participant (block 2451), and that also includes previously described process features 2426, 2428. Other possible features relate to directing the particular unsolicited communication to be sent to one or more virtual world participants, including predetermined participants whose identity is established in advance based at least in part on their profile or characteristic (block 2448), and designated VW participants whose identity is determined based at least in part on their current VW behavior (block 2452).

A further aspect disclosed in FIG. 59 incorporates purchase information in the particular unsolicited communication, which purchase information may be used by the one or more targeted virtual world participants to obtain a real-world product and/or service of the real-world entity (block 2453). A related possible feature incorporates one or more of the following types of purchase-related information: authorization code, origination code, offer code, date code, discount terms, premium terms, product availability, quota limit, service availability, clearance item, trial period, sale period, installment terms, interest terms, website, street address, hours open, phone number, mailing address, email address, contact person, extra benefit, free benefit, bonus, referral award, required virtual world prerequisite, required real-world prerequisite, required coupon, prerequisite confirmation, expiration date, age qualification, access key, special privilege, cross promotion, real-world event, real-world performance, admission ticket, reserved seat ticket, and membership status (block 2454). Such a listing of purchase information is by way of example only and is not intended to be exhaustive. Of course it will be understood that other incentives may be provided by a real-world enterprise as a promotional inducement offered to virtual world participants.

Figure 60:
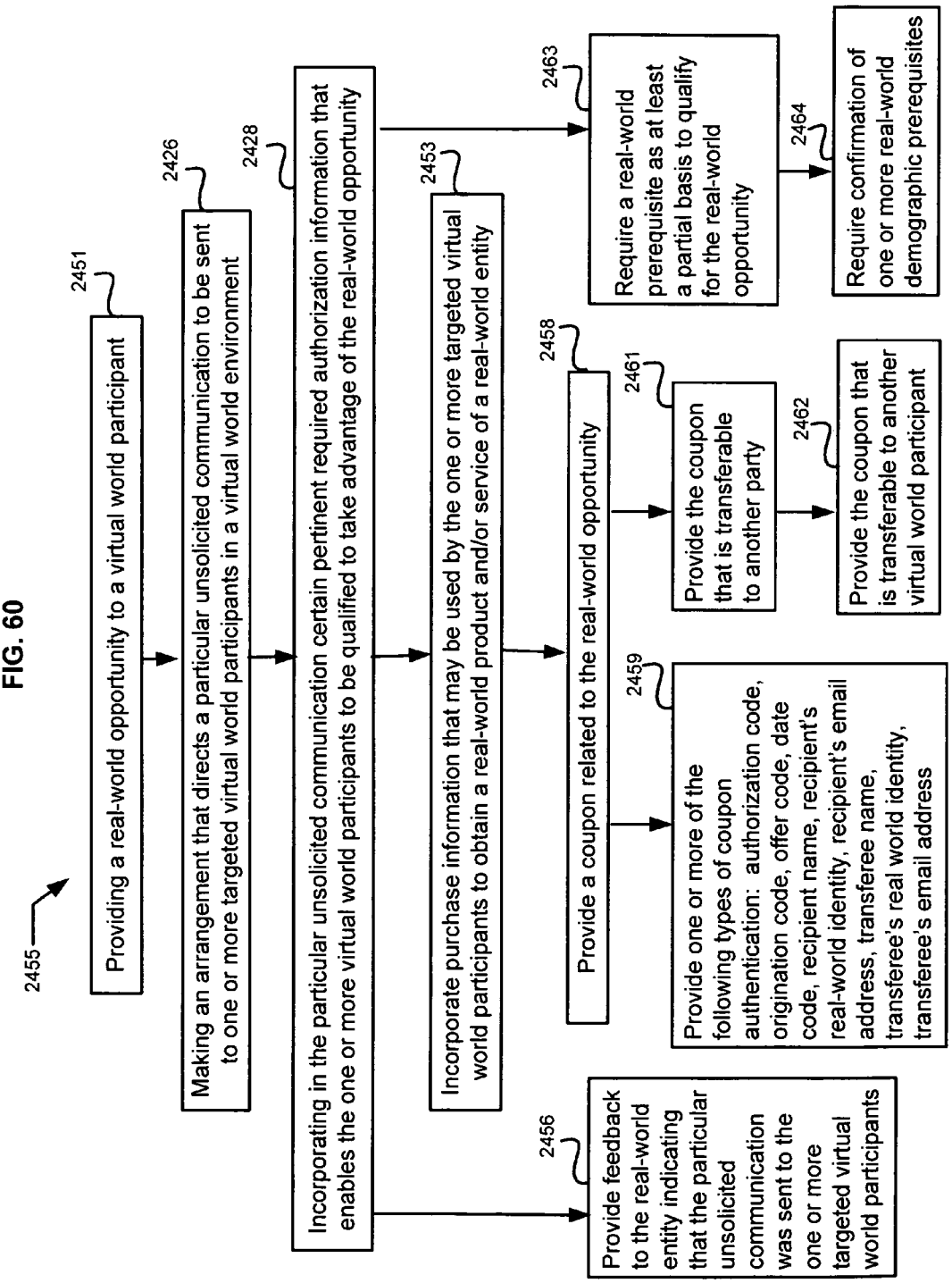

The exemplary process embodiment 2455 shown in the detailed flow chart of FIG. 60 includes previously disclosed process features 2451, 2426, 2428, 2453. Additional possible aspects involve providing a coupon related to the real-world opportunity (block 2458). In some instances the coupon is transferable to another party (block 2461), and more particularly in some instances the coupon may be transferable to another virtual world participant (block 2462).

A further process feature may provide one or more of the following types of coupon authentication: authorization code, origination code, offer code, date code, recipient name, recipient's real-world identity, recipient's email address, transferee name, transferee's real world identity, and transferee's email address (block 2459).

Another exemplary process feature provides feedback to the real-world entity indicating that the particular unsolicited communication was sent to the one or more targeted virtual world participants (block 2456). Some implementations may require a real-world prerequisite as at least a partial basis to qualify for the real-world opportunity (block 2463). A related feature may require confirmation of one or more real-world demographic prerequisites (block 2464).

Figure 61:
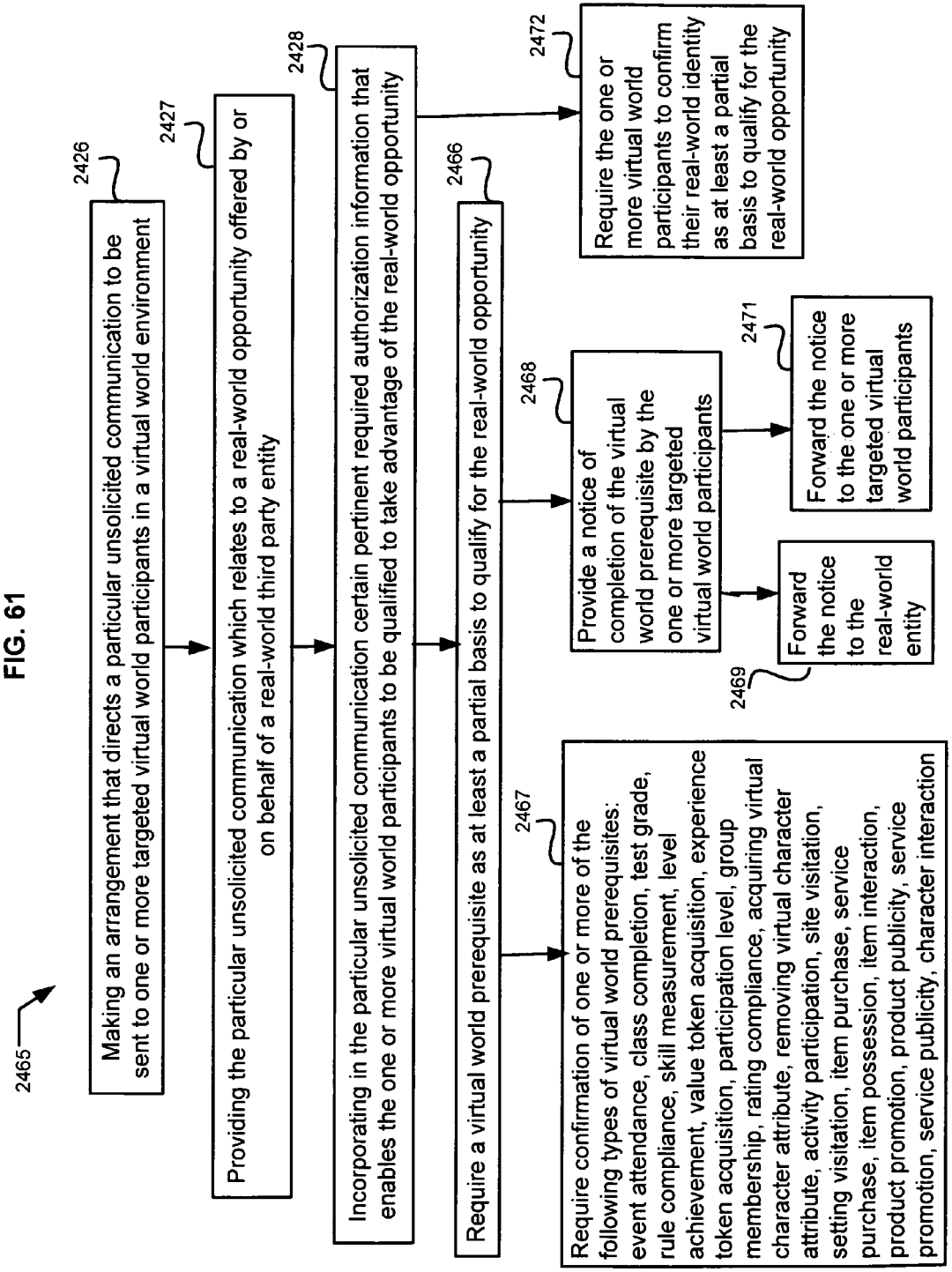

Another possible process implementation 2465 shown in FIG. 61 includes previously disclosed process features 2426, 2427, 2428 as well as additional exemplary process features concerning a requirement for a virtual world prerequisite as at least a partial basis to qualify for the real-world opportunity (block 2466). A related aspect may require confirmation of one or more of the following types of virtual world prerequisites: event attendance, class completion, test grade, rule compliance, skill measurement, level achievement, value token acquisition, experience token acquisition, participation level, group membership, rating compliance, acquiring virtual character attribute, removing virtual character attribute, activity participation, site visitation, setting visitation, item purchase, service purchase, item possession, item interaction, product promotion, product publicity, service promotion, service publicity, and character interaction (block 2467). Other prerequisites may be provided in order to achieve the advantages and benefits of the system and methods disclosed herein.

Other aspects disclosed in FIG. 61 may provide a notice of completion of the virtual world prerequisite by the one or more targeted virtual world participants (block 2468). In some implementations such a notice of completion may be forwarded to the real-world entity (block 2469). Another possible implementation may include forwarding the notice of completion to the one or more targeted virtual world participants (block 2471). Yet another aspect may require the one or more virtual world participants to confirm their real-world identity as at least a partial basis to qualify for the real-world opportunity (block 2472).

Figure 62:
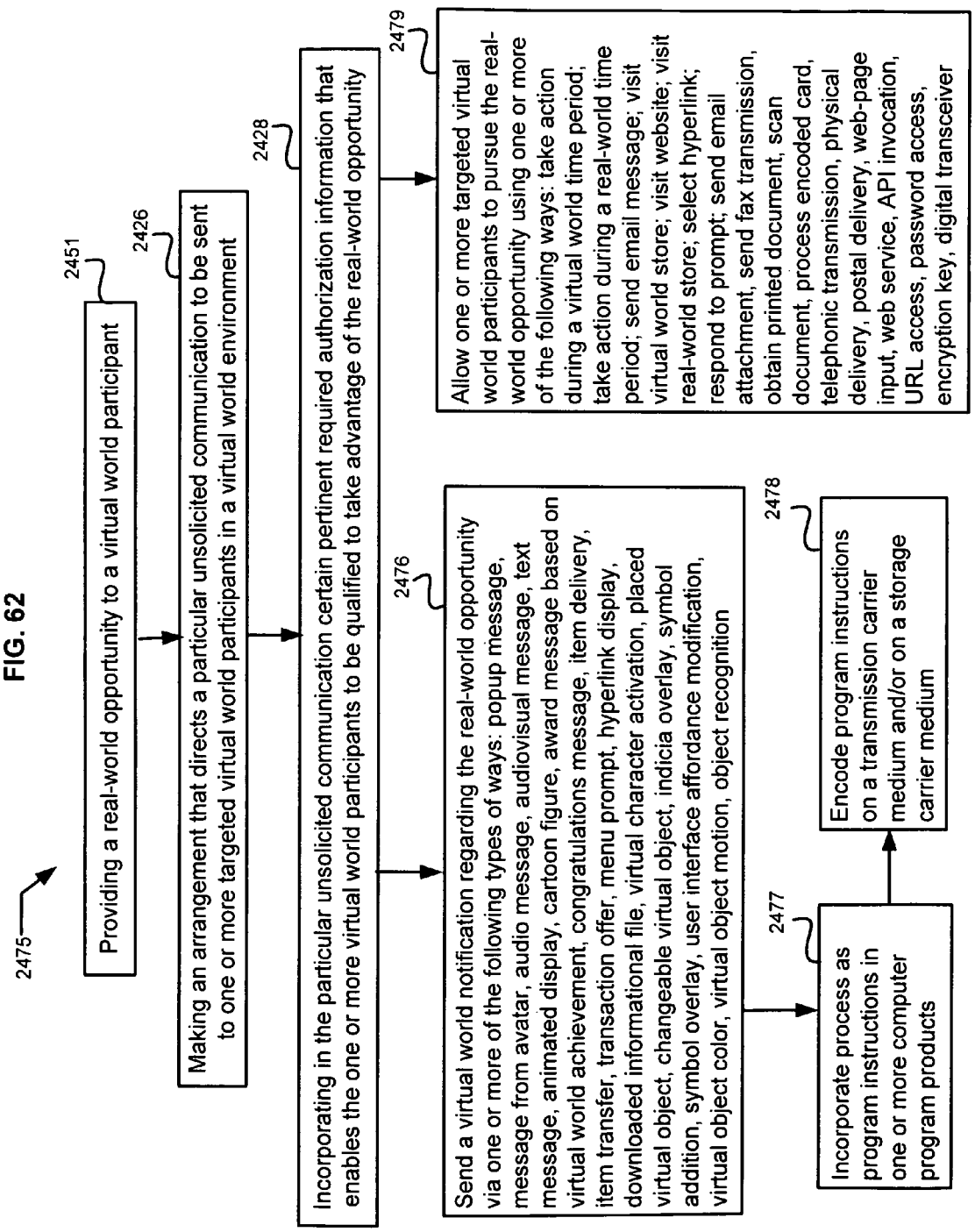

Referring to the exemplary process embodiment 2475 of FIG. 62, a detailed flow chart includes the previously described process features 2451, 2426, 2428. Other possible features include sending a virtual world notification regarding the real-world opportunity via one or more of the following types of ways: popup message, message from avatar, audio message, audiovisual message, text message, animated display, cartoon figure, award message based on virtual world achievement, congratulations message, item delivery, item transfer, transaction offer, menu prompt, hyperlink display, downloaded informational file, virtual character activation, placed virtual object, changeable virtual object, indicia overlay, symbol addition, symbol overlay, user interface affordance modification, virtual object color, virtual object motion, and object recognition (block 2476). These exemplary process features may be incorporated as program instructions in one or more computer program products (block 2477). In some instances the program instructions may be encoded on a transmission carrier medium and/or on a storage carrier medium (block 2478). It will be understood by those skilled in the art that other types of virtual world notification methods may be incorporated for obtaining promotional contact with a targeted virtual world participant.

A further aspect disclosed in FIG. 62 may allow the one or more targeted virtual world participants to pursue the real-world opportunity using one or more of the following ways:

take action during a virtual world time period; take action during a real-world time period; send email message; visit virtual world store; visit website; visit real-world store; select hyperlink; respond to prompt; send email attachment, send fax transmission, obtain printed document, scan document, process encoded card, telephonic transmission, physical delivery, postal delivery, web-page input, web service, API invocation, URL access, password access, encryption key, and digital transceiver (block 2479). Additional communication channels and links may also be utilized to facilitate pursuit and redemption of a RW promotional premium or opportunity.

Figure 63:
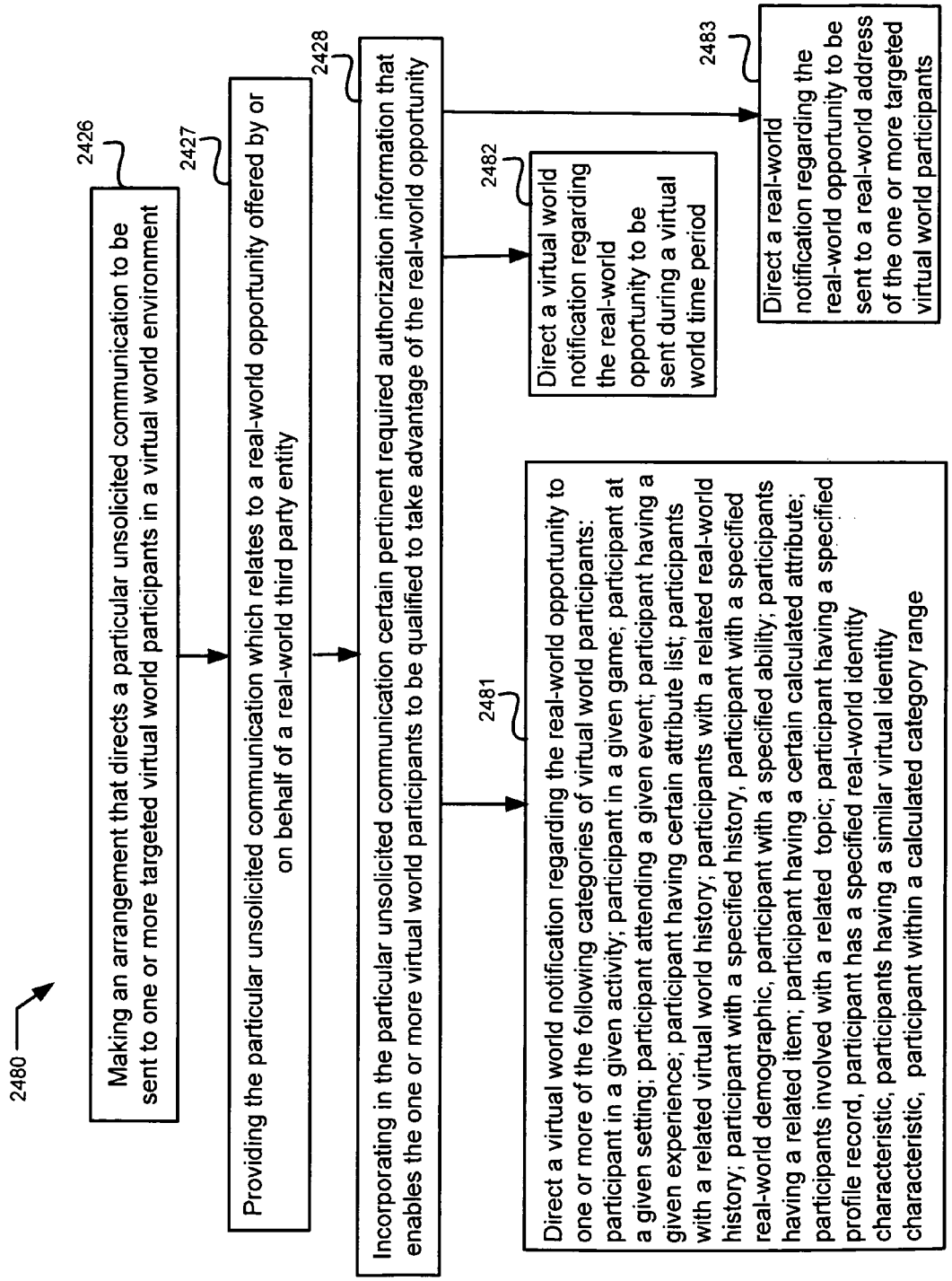

The exemplary embodiments 2480 shown in FIG. 63 include previously described process features 2426, 2427, 2428 along with additional exemplary features relating to notifications regarding the real-world opportunity. In some instances a VW notification may be directed to one or more of the following categories of virtual world participants: participant in a given activity; participant in a given game; participant at a given setting; participant attending a given event; participant having a given experience; participant having certain attribute list; participants with a related virtual world history; participants with a related real-world history; participant with a specified history, participant with a specified real-world demographic, participant with a specified ability; participants having a related item; participant having a certain calculated attribute; participants involved with a related topic; participant having a specified profile record, participant having a specified real-world identity characteristic, participants having a similar virtual identity characteristic, and participant within a calculated category range (block 2481). Other categories may be desirable based on the criteria that are used to identify the VW target recipients.

Other possible notification features include directing a virtual world notification regarding the real-world opportunity to be sent during a virtual world time period (block 2482), and in some instances directing a real-world notification regarding the real-world opportunity to be sent to a real-world address of the one or more targeted virtual world participants (block 2483).

Figure 64:
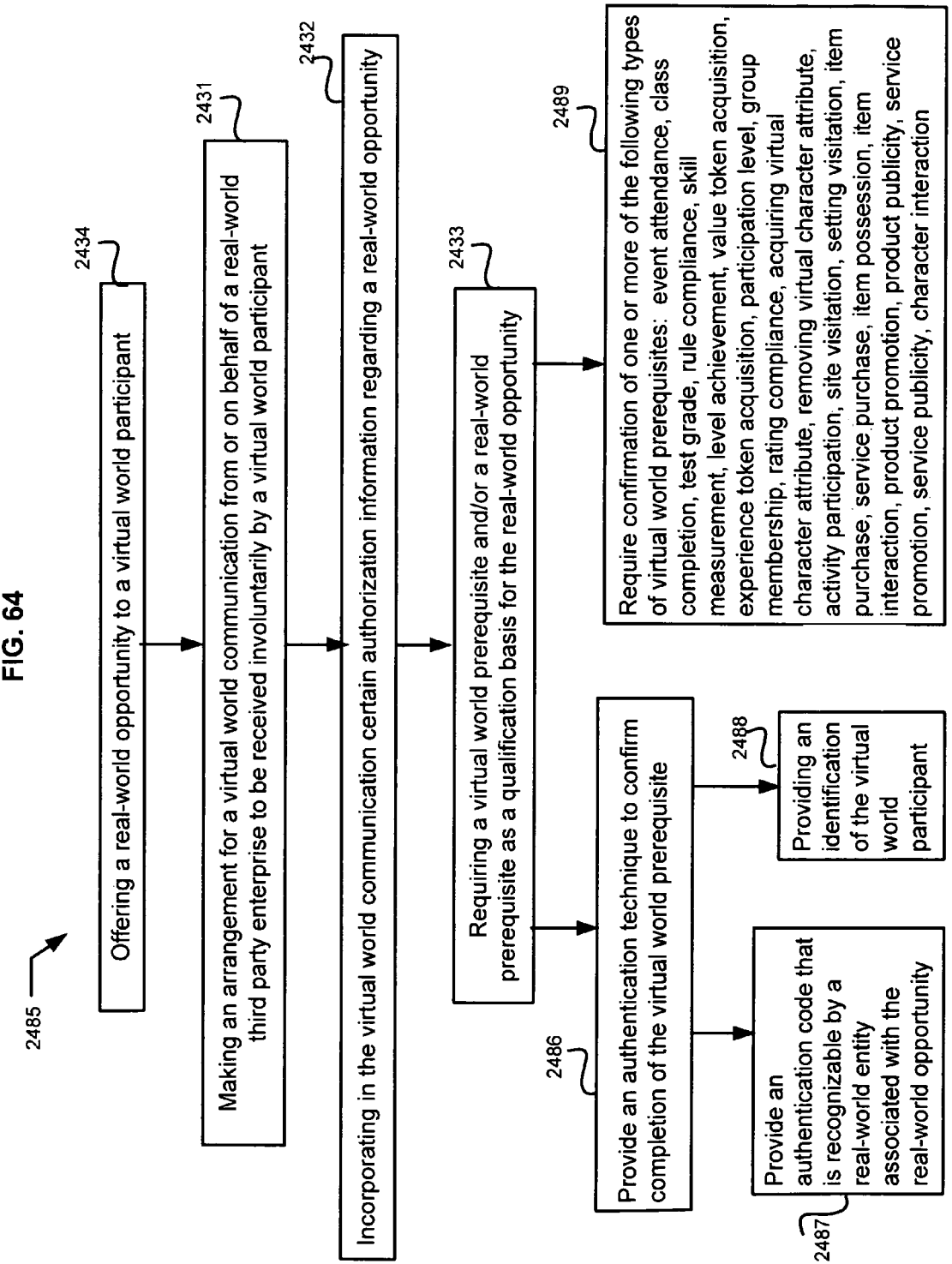

Referring to FIG. 64 showing various process embodiments 2485, a real-world opportunity may be offered to a virtual world participant (block 2486). In addition to previously described process features 2431, 2432, 2433, some implementations may require confirmation of one or more of the following types of virtual world prerequisites: event attendance, class completion, test grade, rule compliance, skill measurement, level achievement, value token acquisition, experience token acquisition, participation level, group membership, rating compliance, acquiring virtual character attribute, removing virtual character attribute, activity participation, site visitation, setting visitation, item purchase, service purchase, item possession, item interaction, product promotion, product publicity, service promotion, service publicity, and character interaction (block 2489).

Another aspect may include providing an authentication technique to confirm completion of the virtual world prerequisite (block 2486). Such an authentication technique may provide an authentication code that is recognizable by a real-world entity associated with the real-world opportunity (block 2487), and may also provide an identification of the virtual world participant (block 2488).

Figure 65:
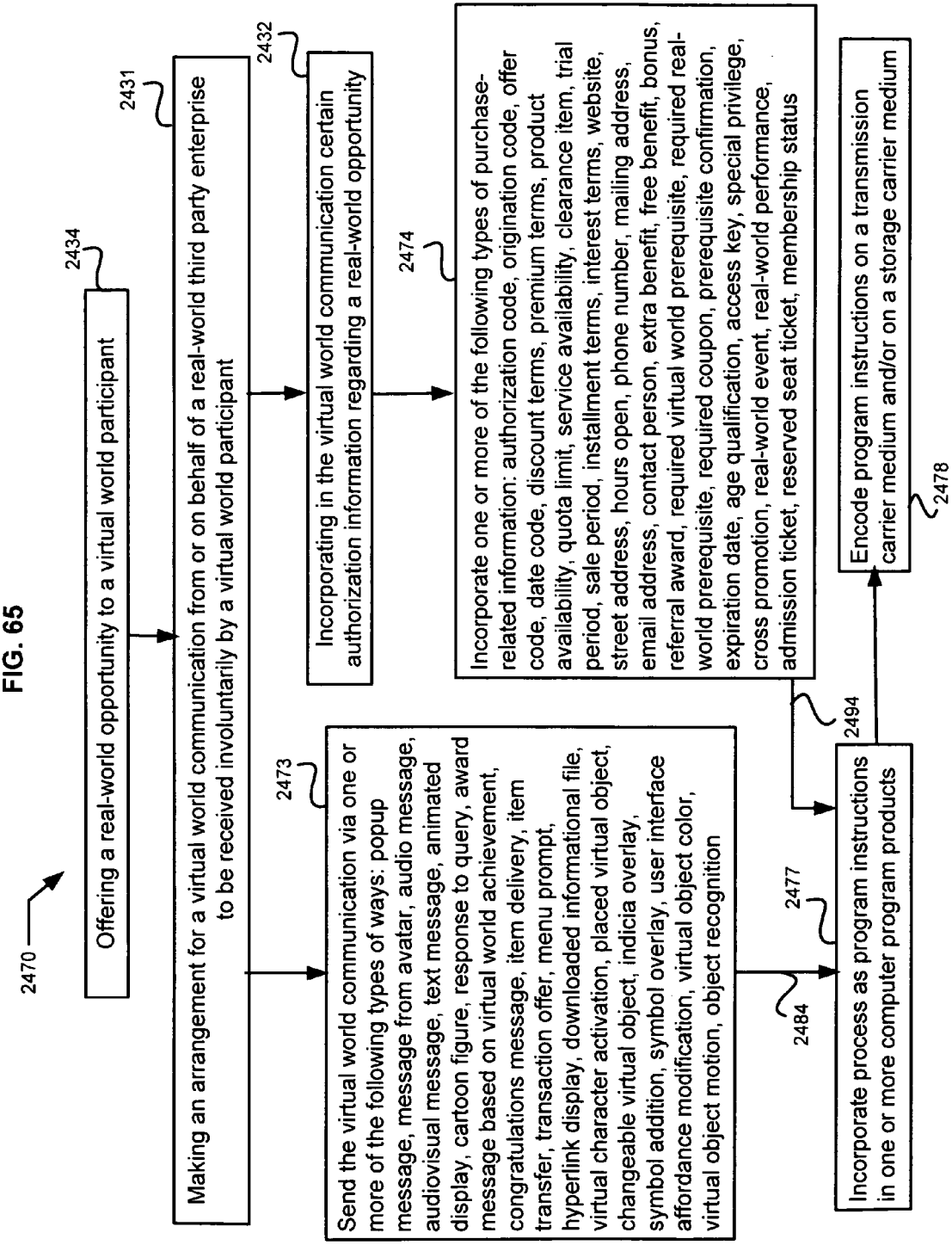

The exemplary process embodiments 2470 of FIG. 65 incorporate previously described process components 2434, 2431, 2432 along with possible aspects relating to a virtual world communication to be received by a virtual world participant. One possible aspect provides for sending the virtual world communication via one or more of the following types of ways: popup message, message from avatar, audio message, audiovisual message, text message, animated display, cartoon figure, response to query, award message based on virtual world achievement, congratulations message, item delivery, item transfer, transaction offer, menu prompt, hyperlink display, downloaded informational file, virtual character activation, placed virtual object, changeable virtual object, indicia overlay, symbol addition, symbol overlay, user interface affordance modification, virtual object color, virtual object motion, and object recognition (block 2473).

Another exemplary feature incorporates in the virtual world communication one or more of the following types of purchase-related information: authorization code, origination code, offer code, date code, discount terms, premium terms, product availability, quota limit, service availability, clearance item, trial period, sale period, installment terms, interest terms, website, street address, hours open, phone number, mailing address, email address, contact person, extra benefit, free benefit, bonus, referral award, required virtual world prerequisite, required real-world prerequisite, required coupon, prerequisite confirmation, expiration date, age qualification, access key, special privilege, cross promotion, real-world event, real-world performance, admission ticket, reserved seat ticket, and membership status (block 2474).

It will be understood by those skilled in the art that many different combinations of the process embodiment features disclosed herein may be incorporated as program instructions in various types of carrier media (e.g., see previously described process features 2477, 2478 as shown in FIGS. 62, 65). For example, in the illustrated process embodiments shown in the flow chart diagrams of FIG. 65, the process features 2434, 2431, 2473 are incorporated as program instructions (see arrow 2484) in one or more computer program products (blocks 2477, 2478). As another example shown in the illustrated process embodiments of FIG. 65, the process features 2434, 2431, 2432, 2474 are incorporated as program instructions (see arrow 2494) in one or more computer program products (blocks 2477, 2478).

Figure 66:
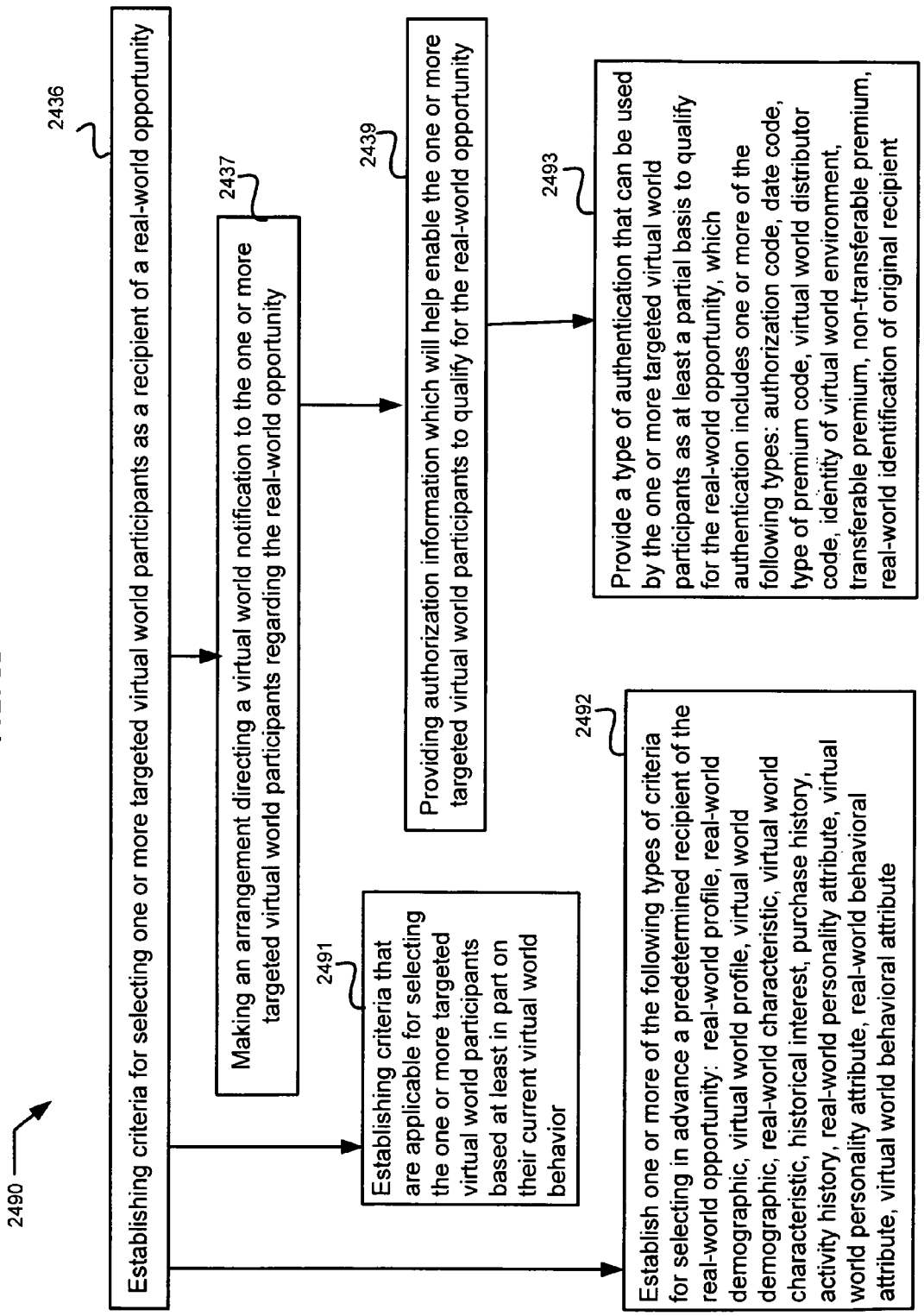

The detailed flow chart for exemplary embodiments 2490 shown in FIG. 66 include previously described process components 2436, 2437, 2439. Additional possible features relate to criteria for selecting one or more targeted virtual world participants, including establishing criteria that are applicable for selecting the one or more targeted virtual world participants based at least in part on their current virtual world behavior (block 2491). Another possible feature establishes one or more of the following types of criteria for selecting in advance a predetermined recipient of the real-world opportunity: real-world profile, real-world demographic, virtual world profile, virtual world demographic, real-world characteristic, virtual world characteristic, historical interest, purchase history, activity history, real-world personality attribute, virtual world personality attribute, real-world behavioral attribute, and virtual world behavioral attribute (block 2492).

A further exemplary process component may provide a type of authentication that can be used by the one or more targeted virtual world participants as at least a partial basis to qualify for the real-world opportunity, which authentication includes one or more of the following types: authorization code, date code, type of premium code, virtual world distributor code, identity of virtual world environment, transferable premium, non-transferable premium, and real-world identification of original recipient (block 2493).

Figure 67:
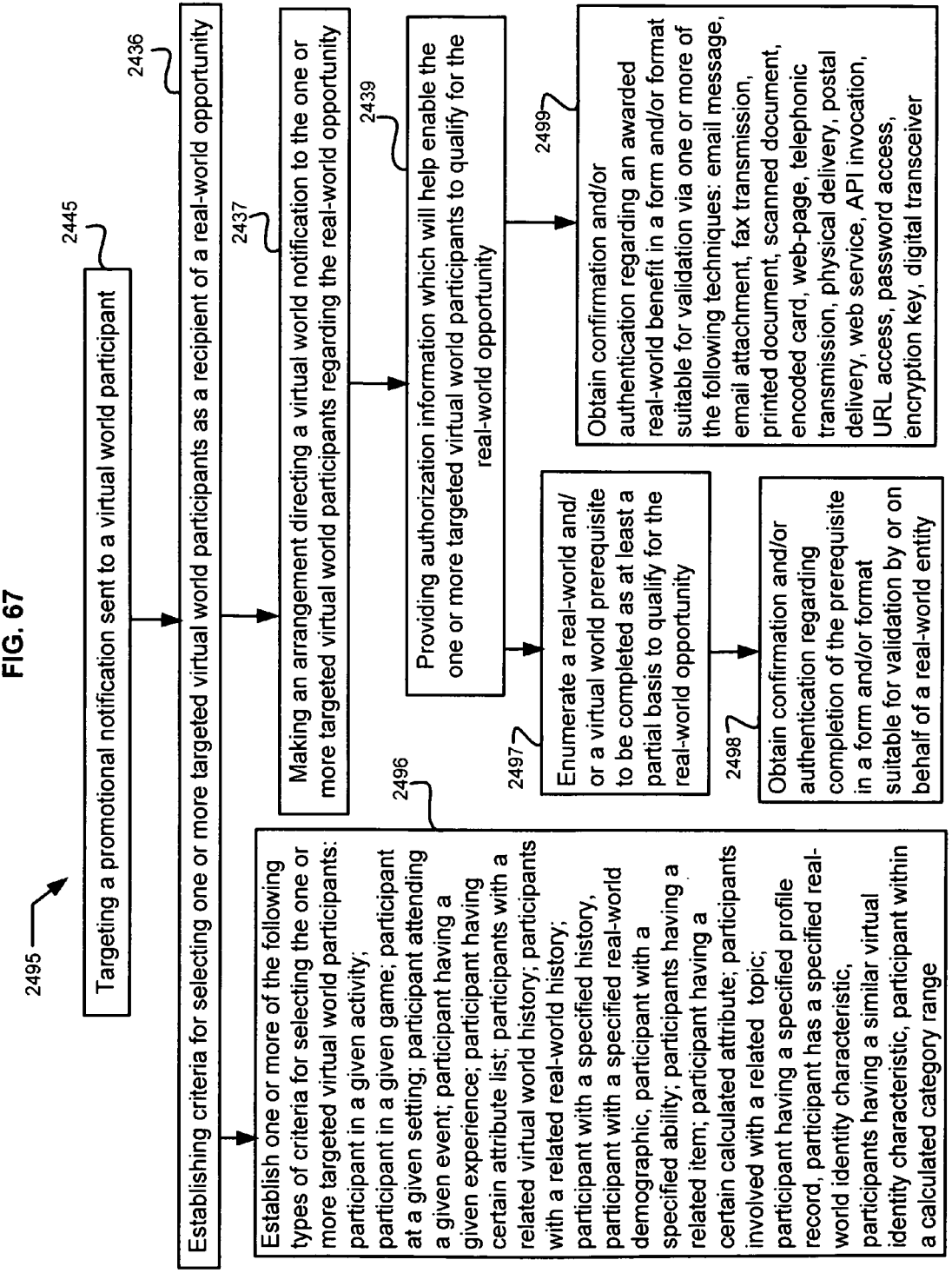

The flow chart implementation 2495 shown in FIG. 67 discloses further exemplary process embodiments that may provide for targeting a promotional notification sent to a virtual world participant (block 2445). Previously described features 2436, 2437, 2439 may be included along with other possible features that provide authorization information to the one or more targeted virtual world participants. For example, such authorization information may in some instances enumerate a real-world and/or a virtual world prerequisite to be completed as at least a partial basis to qualify for the real-world opportunity (block 2497). A related feature may include obtaining confirmation and/or authentication regarding completion of the prerequisite in a form and/or format suitable for validation by or on behalf of a real-world entity (block 2498).

Another possible feature may include obtaining confirmation and/or authentication regarding an awarded real-world benefit in a form and/or format suitable for validation via one or more of the following techniques: email message, email attachment, fax transmission, printed document, scanned document, encoded card, web-page, telephonic transmission, physical delivery, postal delivery, web service, API invocation, URL access, password access, encryption key, and digital transceiver (block 2499).

With regard to possible criteria for selecting one or more targeted virtual world participants, a further process feature may establish one or more of the following types of criteria for selecting the one or more predetermined virtual world participants: participant in a given activity; participant in a given game; participant at a given setting; participant attending a given event; participant having a given experience; participant having certain attribute list; participants with a related virtual world history; participants with a related real-world history; participant with a specified history, participant with a specified real-world demographic, participant with a specified ability; participants having a related item; participant having a certain calculated attribute; participants involved with a related topic; participant having a specified profile record, participant have a specified real-world identity characteristic, participants having a similar virtual identity characteristic, and participant within a calculated category range (block 2496).

Figure 68:
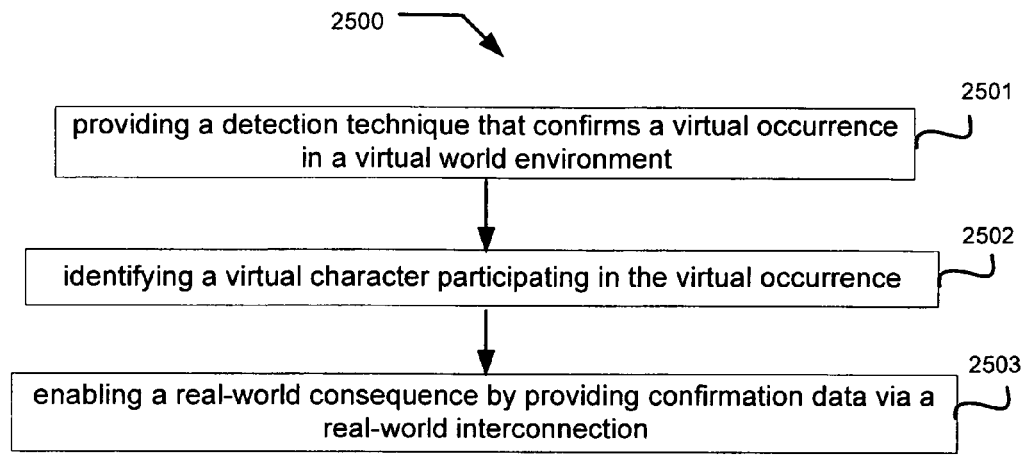
FIGS. 68-70 are high level flow charts showing additional process embodiments.

Referring to the process embodiment 2500 of FIG. 68, an exemplary implementation for interconnection with one or more characters in a virtual world includes providing a detection technique that confirms a virtual occurrence in a virtual world environment (block 2501), identifying a virtual character participating in the virtual occurrence (block 2502), and enabling a real-world consequence by providing confirmation data via a real-world interconnection (block 2503).

Figure 69:
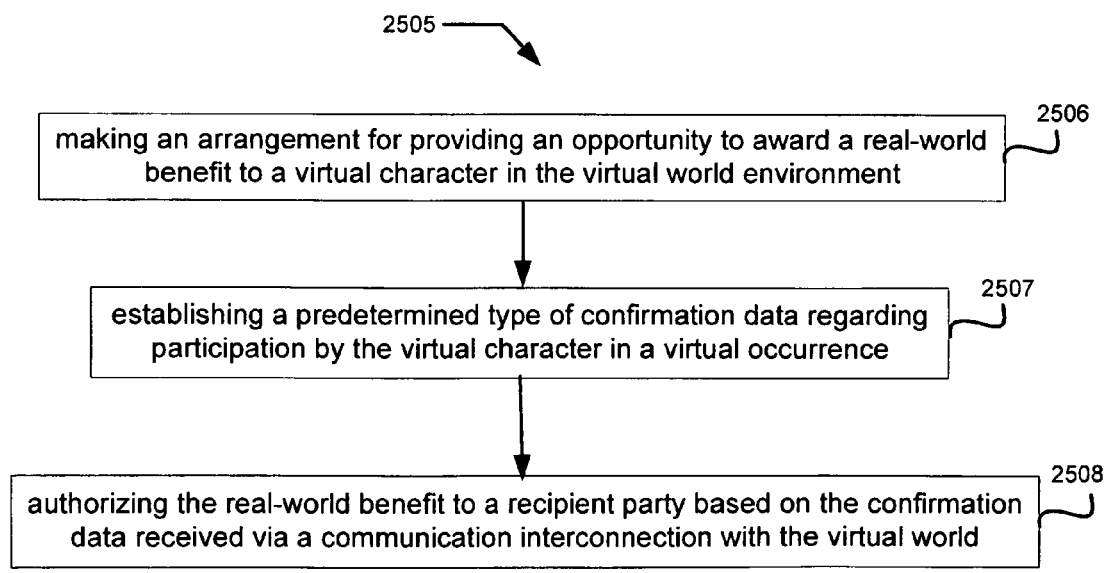

Another process embodiment 2505 is shown in FIG. 69, wherein a method of promotional activity with a virtual world environment includes making an arrangement for providing an opportunity to award a real-world benefit to a virtual character in the virtual world environment (block 2506), establishing a predetermined type of confirmation data regarding participation by the virtual character in a virtual occurrence (block 2507), and authorizing the real-world benefit to a recipient party based on the confirmation data received via a communication interconnection with the virtual world (block 2508).

Figure 70:
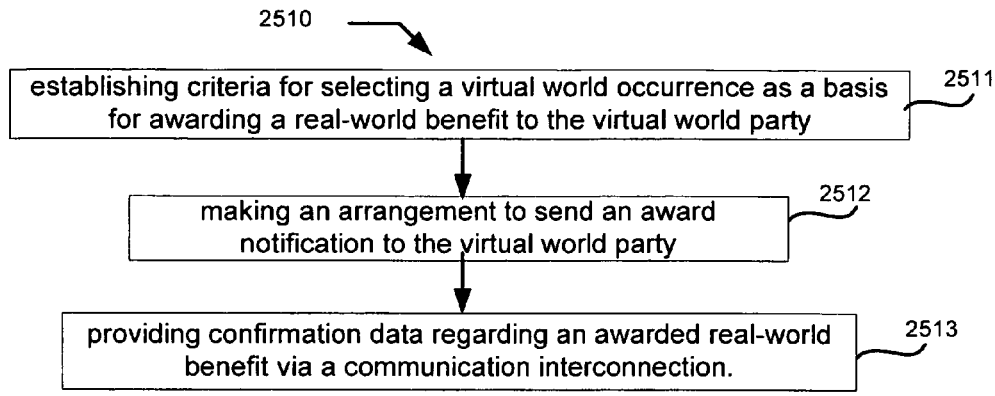
Figure 71:
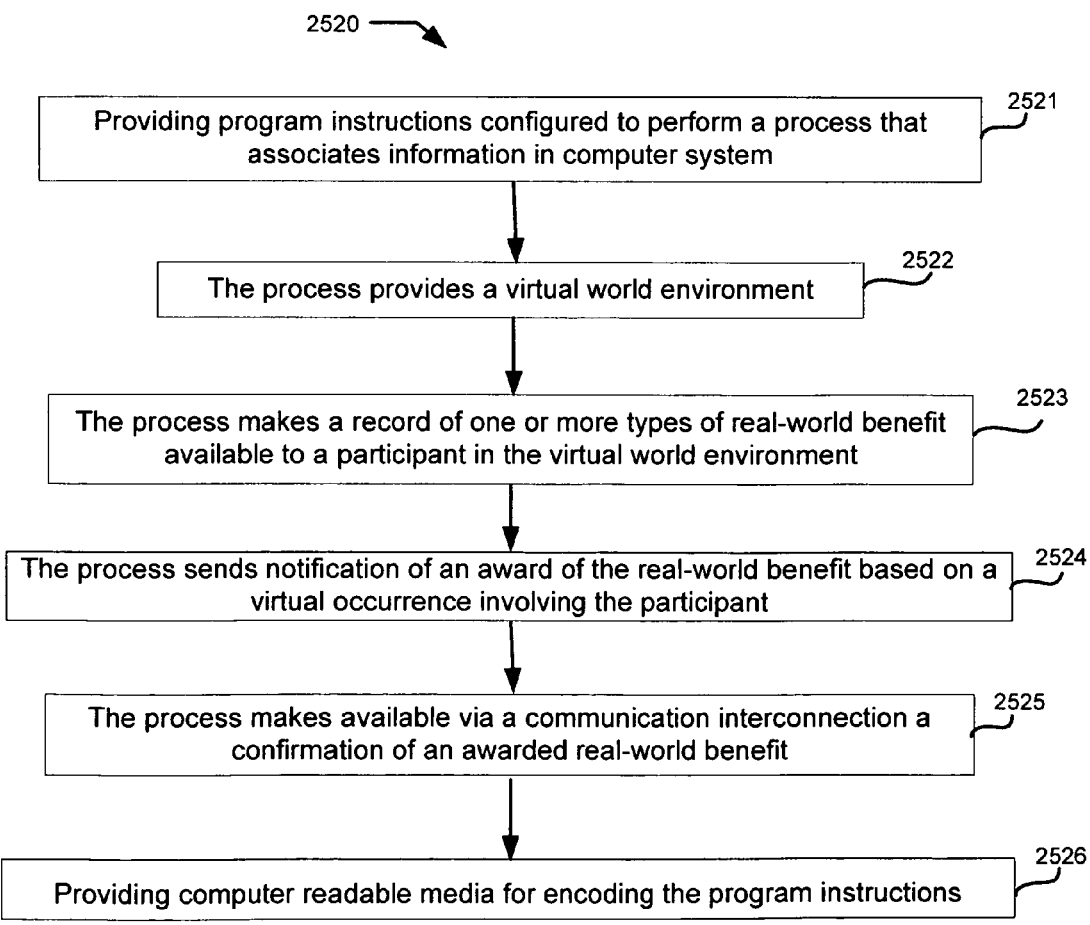
FIG. 71 is a high level flow chart for another process implementation incorporated in an exemplary computer program product.

Yet another process embodiment 2510 is illustrated in FIG. 70, wherein a method of providing a real-world opportunity in a virtual world includes establishing criteria for selecting a virtual world occurrence as a basis for awarding a real-world benefit to a virtual world party (block 2511), making an arrangement to send an award notification of the real-world benefit to the virtual world party (block 2512), and providing confirmation data regarding an awarded real-world benefit via a communication interconnection (block 2513).

Referring to the computer program product embodiment 2520 of FIG. 70, an implementation provides program instructions configured to perform a process that associates information in a computer system (block 2521). The process may include providing a virtual world environment (block 2522), making a record of one or more types of real-world benefit available to a participant in the virtual world environment (block 2523), sending notification of an award of the real-world benefit based on a virtual occurrence involving the participant (block 2524), and making available via a communication interconnection a confirmation of an awarded real-world benefit (block 2525). An additional possible feature may provide computer readable media for encoding the program instructions (block 2526).

Figure 72:
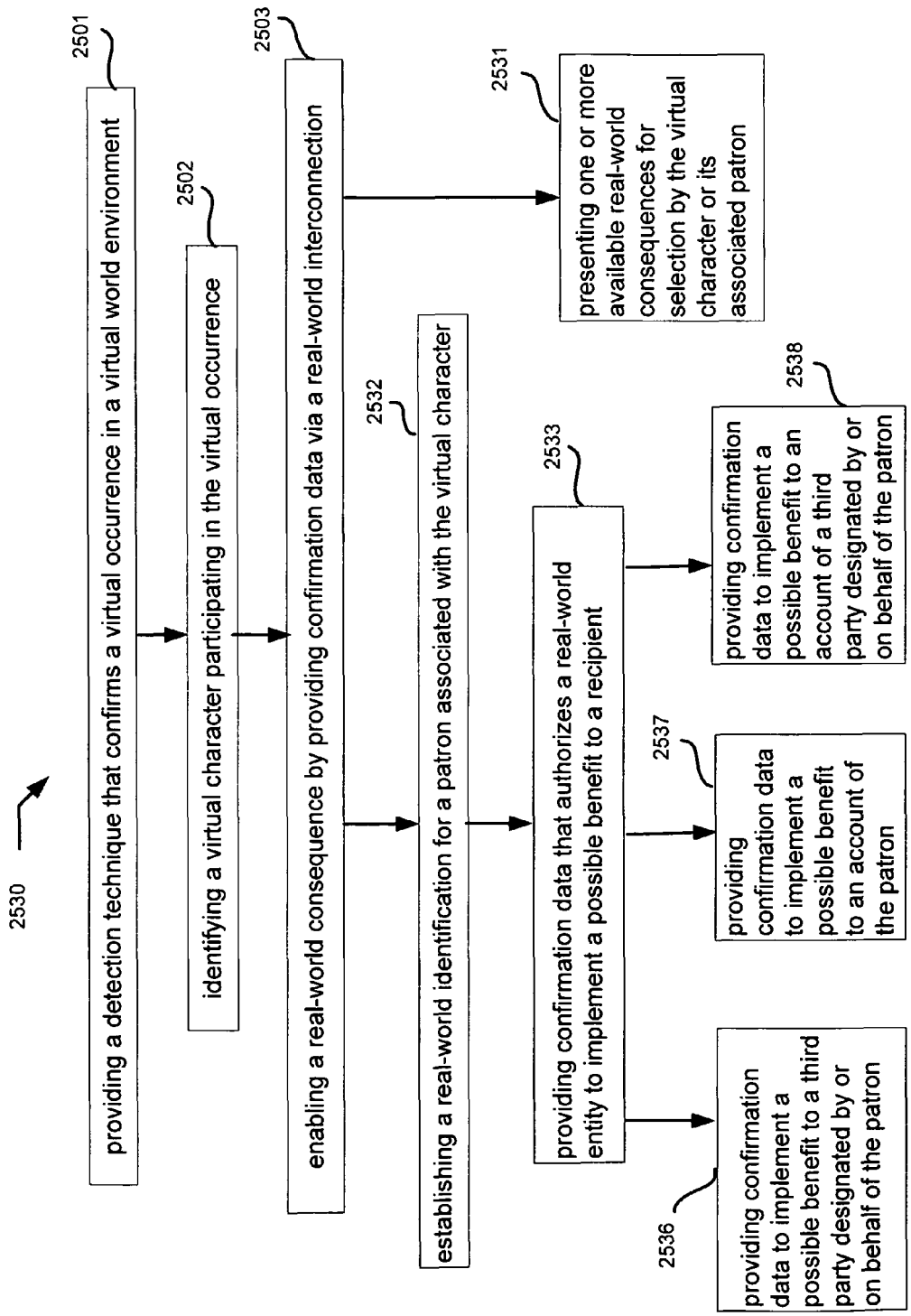
FIGS. 72-78 are detailed flow charts showing further process features that may be incorporated in other disclosed embodiments.

A more detailed disclosure of embodiments 2530 is disclosed in FIG. 72, including previously described process components 2501, 2502, 2503 as well as establishing a real-world identification for a patron associated with the virtual character (block 2532). Additional features relating to an award of possible real-world benefits includes providing confirmation data that authorizes a real-world entity to implement a possible benefit to a recipient (block 2533), and providing confirmation data to implement a possible benefit to a third party designated by or on behalf of the patron (block 2536).

Other related aspects include providing confirmation data to implement a possible benefit to an account of the patron (block 2537), and providing confirmation data to implement a possible benefit to an account of a third party designated by or on behalf of the patron (block 2538). A further aspect includes the possibility of presenting one or more available real-world consequences for selection by the virtual character or its associated patron (block 2531).

Figure 73:
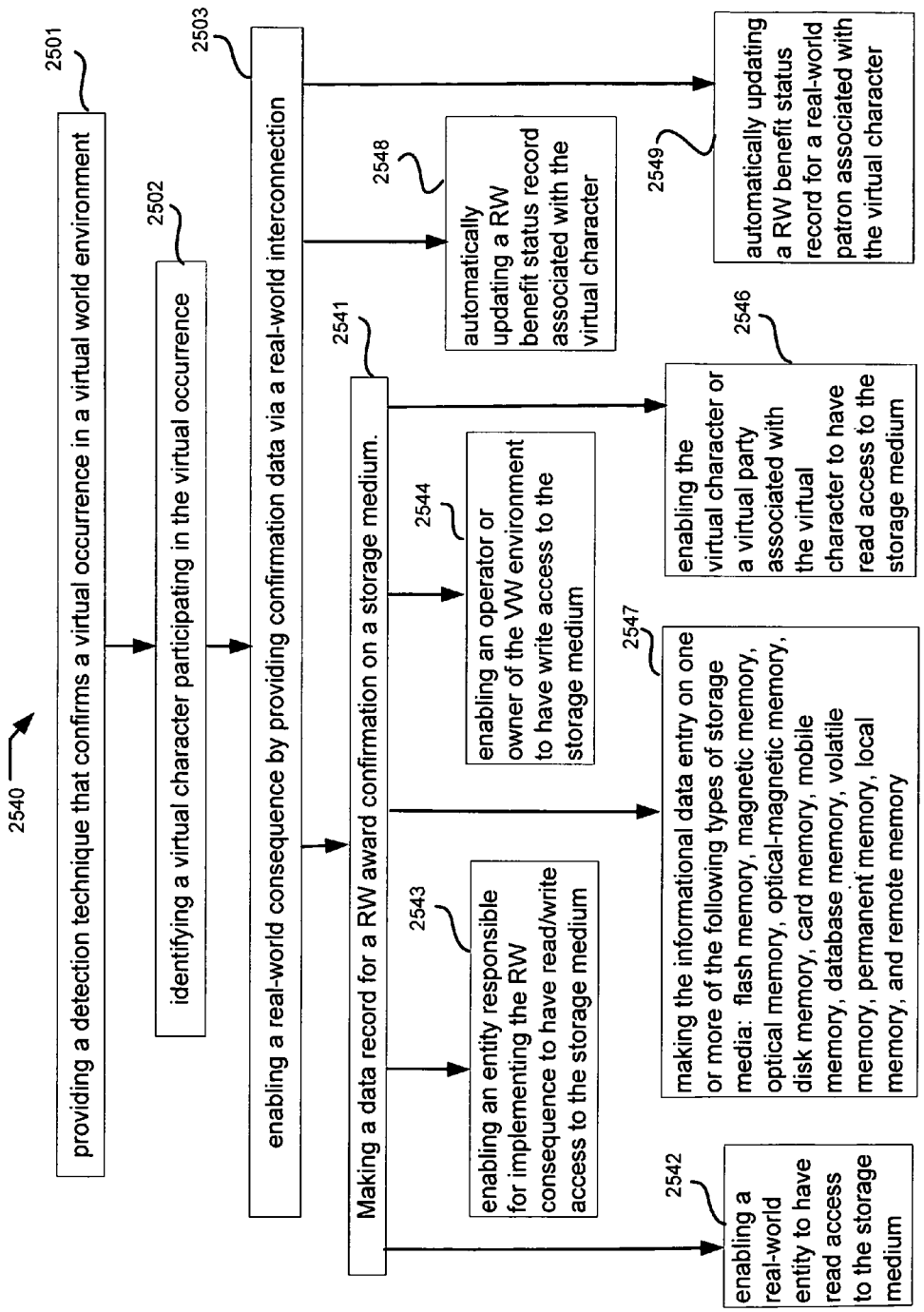

The embodiments 2540 shown in FIG. 73 include previously described process components 2501, 2502, 2503, along with making a data record for a real-world award confirmation on a storage medium (block 2541). A related aspect includes making the informational data entry on one or more of the following types of storage media: flash memory, magnetic memory, optical memory, optical-magnetic memory, disk memory, card memory, mobile memory, database memory, volatile memory, permanent memory, local memory, and remote memory (block 2547).

Other possible features relating to award confirmation data on the storage medium include enabling a real-world entity to have read access to the storage medium (block 2542), enabling an entity responsible for implementing the real-world consequence to have read/write access to the storage medium (block 2543), enabling an operator or owner of the virtual environment to have write access to the storage medium (block 2544), and enabling the virtual character or a virtual party associated with the virtual character to have read access to the storage medium (block 2546).

FIG. 73 also discloses additional possible process features including automatically updating a real-world benefit status record associated with the virtual character (block 2548), and automatically updating a real-world benefit status record for a real-world patron associated with the virtual character (block 2549).

Figure 74:
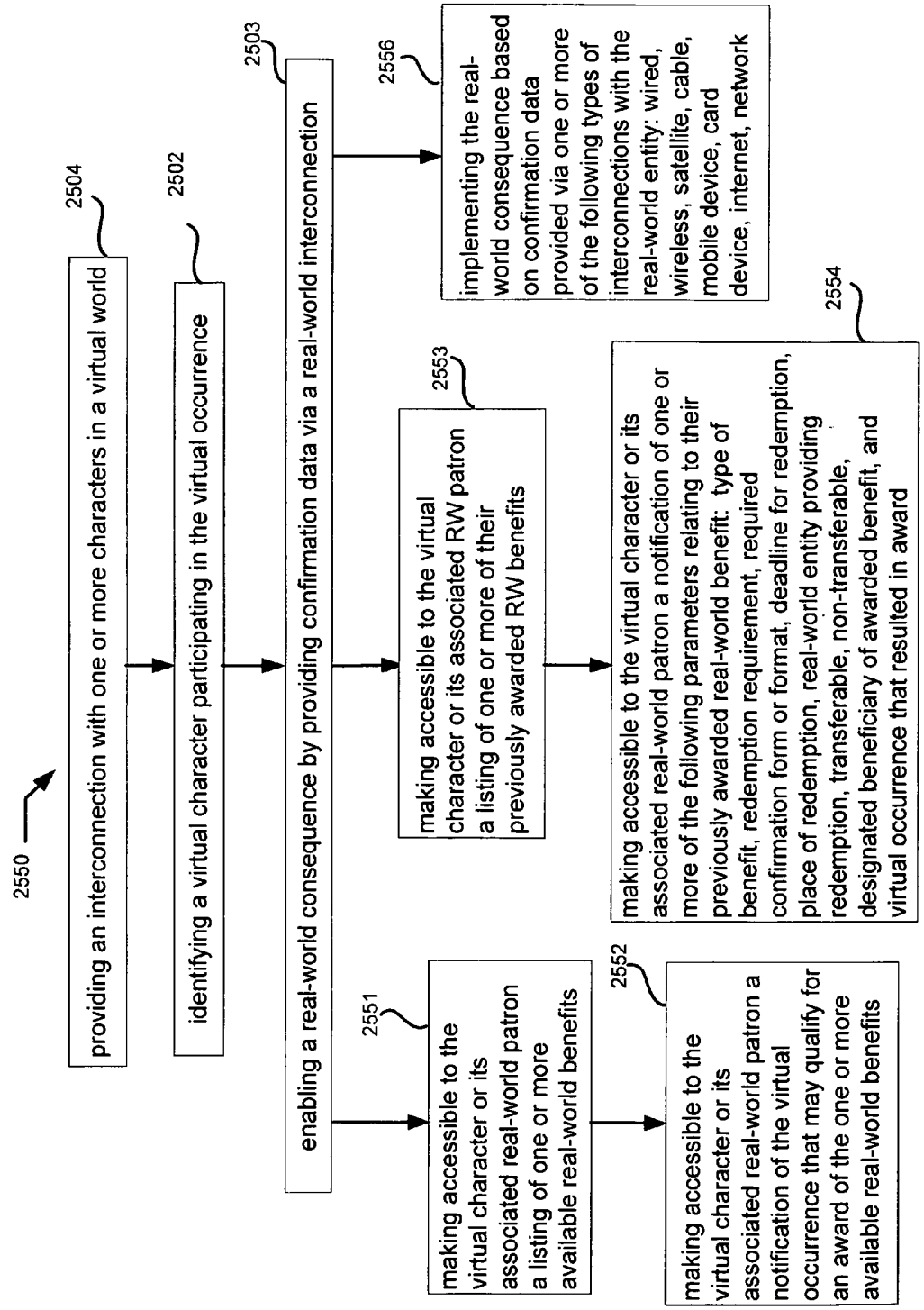

Referring to process embodiments 2550 shown in FIG. 74, an implementation that provides an interconnection with one or more characters in a virtual world (block 2504) includes previous described process components 2502, 2503. Other possible features include making accessible to the virtual character or its associated real-world patron a listing of one or more available real-world benefits (block 2551), and making accessible to the virtual character or its associated real-world patron a notification of the virtual occurrence that may qualify for an award of the one or more available real-world benefits (block 2552).

Additional related accessibility features may include making accessible to the virtual character or its associated real-world patron a listing of one or more of their previously awarded real-world benefits (block 2553). Another aspect may include making accessible to the virtual character or its associated real-world patron a notification of one or more of the following parameters relating to their previously awarded real-world benefit: type of benefit, redemption requirement, required confirmation form or format, deadline for redemption, place of redemption, real-world entity providing redemption, transferable, non-transferable, designated beneficiary of awarded benefit, and virtual occurrence that resulted in award (block 2554).

FIG. 74 also discloses a possibility of implementing the real-world consequence based on confirmation data provided via one or more of the following types of interconnections with the real-world entity: wired, wireless, satellite, cable, mobile device, card device, internet, and network (block 2556).

Figure 75:
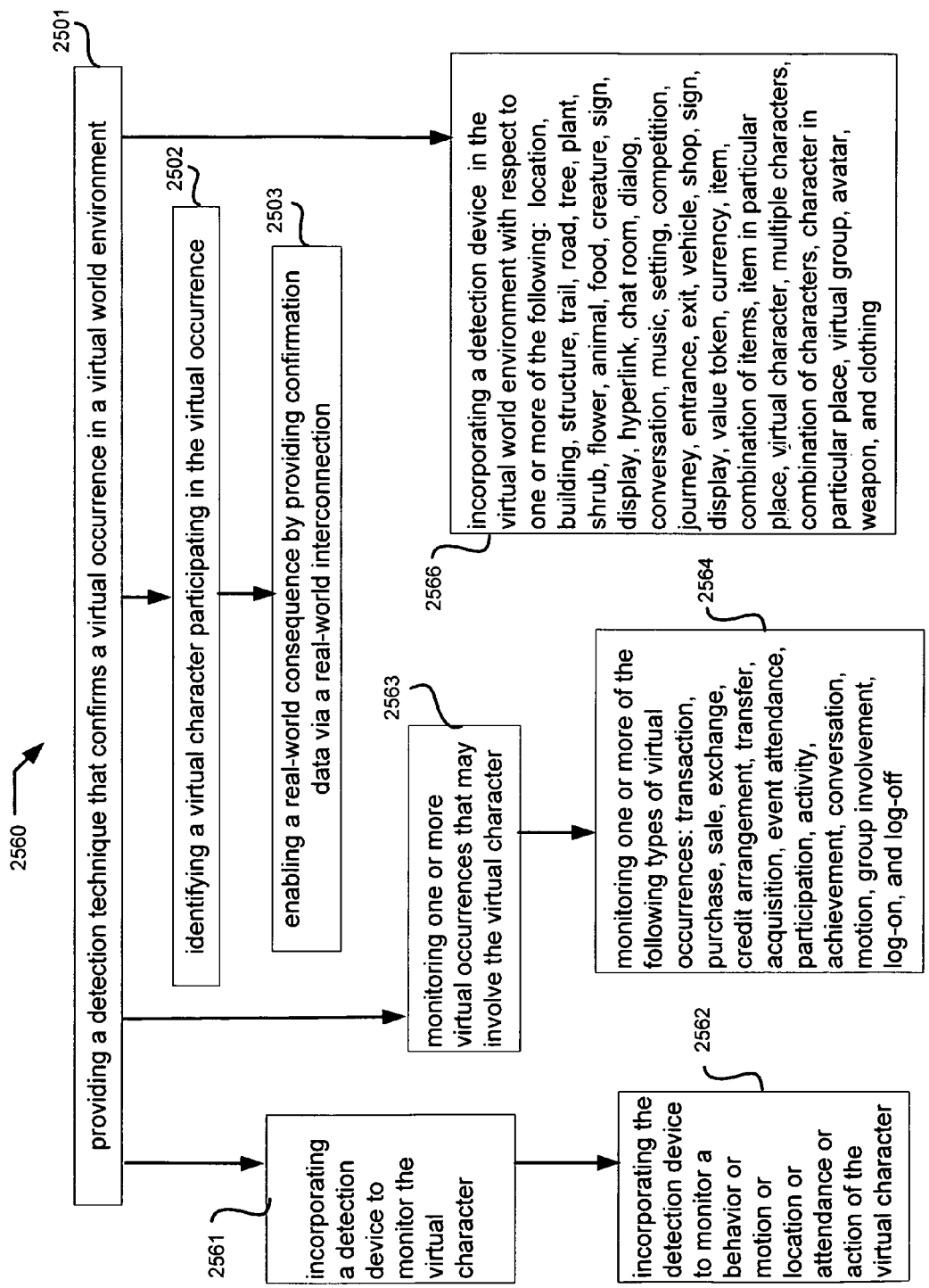

The detailed embodiments 2560 of FIG. 75 include previously described process features 2501, 2502, 2503 along with additional aspects relating to detection and/or monitoring techniques in a virtual world environment. For example, in some instances a detection device is incorporated in the virtual world environment with respect to one or more of the following: location, building, structure, trail, road, tree, plant, shrub, flower, animal, food, creature, sign, display, hyperlink, chat room, dialog, conversation, music, setting, competition, journey, entrance, exit, vehicle, shop, sign, display, value token, currency, item, combination of items, item in particular place, virtual character, multiple characters, combination of characters, character in particular place, virtual group, avatar, weapon, and clothing (block 2566).

Other exemplary features include incorporating a detection device to monitor the virtual character (block 2561), and incorporating the detection device to monitor a behavior or motion or location or attendance or action of the virtual character (block 2562). Further possibilities may include monitoring one or more virtual occurrences that may involve the virtual character (block 2563), and monitoring one or more of the following types of virtual occurrences: transaction, purchase, sale, exchange, credit arrangement, transfer, acquisition, event attendance, participation, activity, achievement, conversation, motion, group involvement, log-on, and log-off (block 2564).

Figure 76:
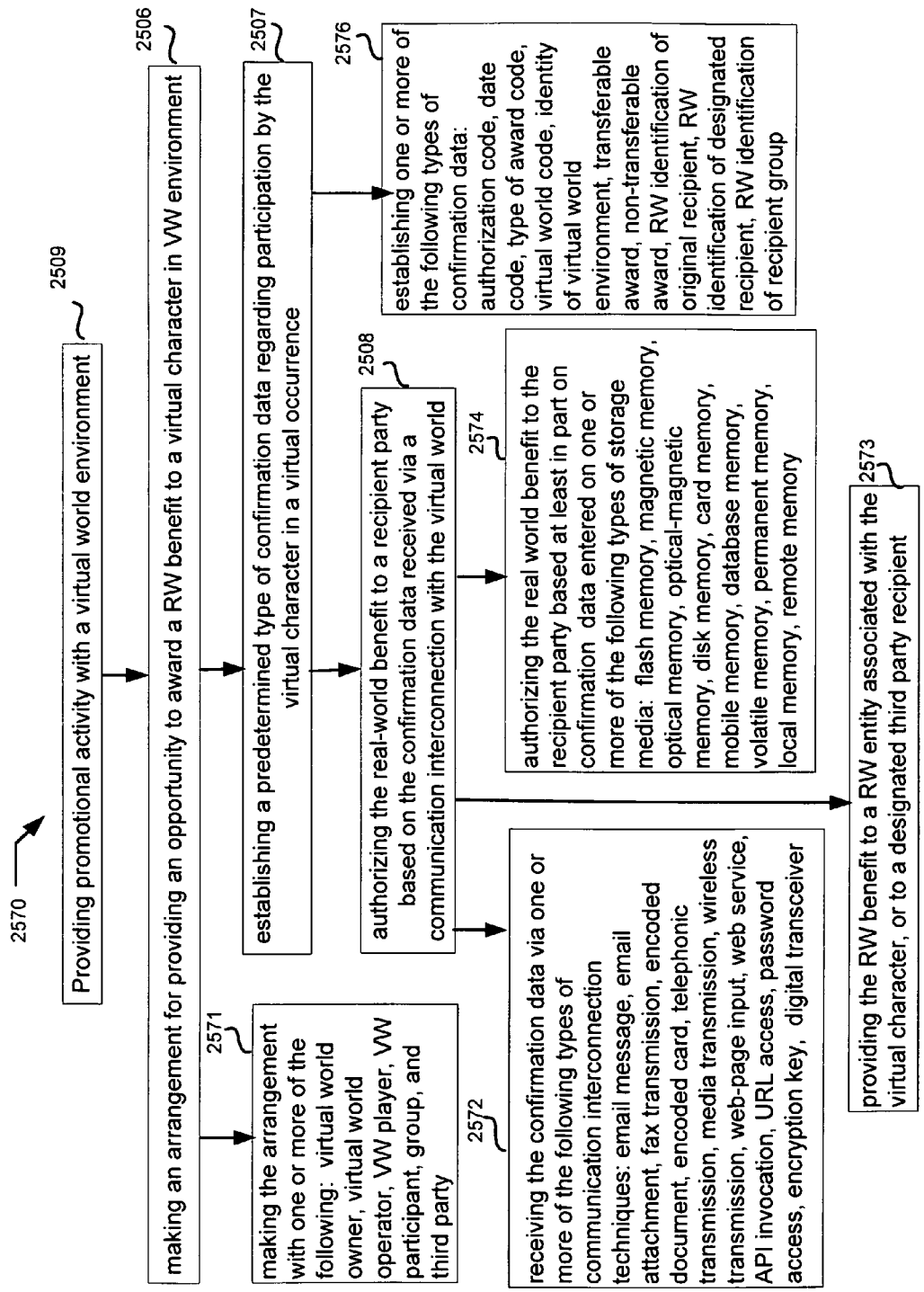

FIG. 76 illustrates process embodiments 2570 for providing promotional activity with a virtual world environment (block 2509), including previously described process features 2506, 2507, 2508. One aspect includes making an arrangement for awarding a real-world benefit with one or more of the following: virtual world owner, virtual world operator, VW player, VW participant, group, and third party (block 2571). A further possible feature includes receiving the confirmation data via one or more of the following types of communication interconnection techniques: email message, email attachment, fax transmission, encoded document, encoded card, telephonic transmission, media transmission, wireless transmission, web-page input, web service, API invocation, URL access, password access, encryption key, and digital transceiver (block 2572).

Further exemplary features shown in FIG. 76 include authorizing the real world benefit to the recipient party based at least in part on confirmation data entered on one or more of the following types of storage media: flash memory, magnetic memory, optical memory, optical-magnetic memory, disk memory, card memory, mobile memory, database memory, volatile memory, permanent memory, local memory, and remote memory (block 2574).

Another aspect provides the real world benefit to a real-world entity associated with the virtual character, or to a designated third party recipient (block 2573). An additional possible feature includes establishing one or more of the following types of confirmation data: authorization code, date code, type of award code, virtual world code, identity of virtual world environment, transferable award, non-transferable award, real-world identification of original recipient, real-world identification of designated recipient, and real-world identification of recipient group (block 2576).

Figure 77:
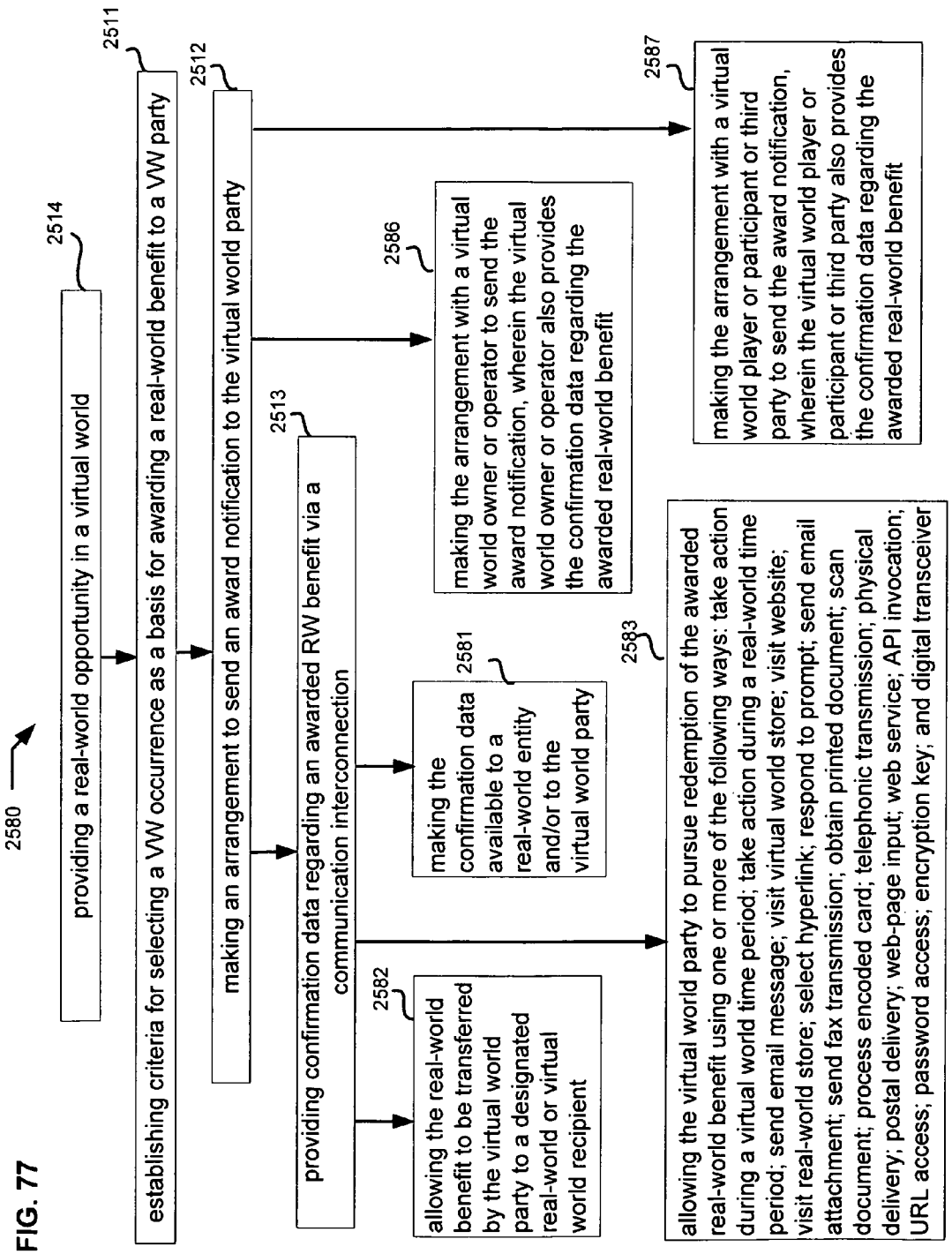

The exemplary detailed embodiments 2580 of FIG. 77 provide a real-world opportunity in a virtual world (block 2514), including previously described process features 2511, 2512, 2513. Another disclosed aspect includes making the arrangement with a virtual world owner or operator to send the award notification, wherein the virtual world owner or operator also provides the confirmation data regarding the awarded real-world benefit (block 2586). A further disclosed aspect includes making the arrangement with a virtual world player or participant or third party to send the award notification, wherein the virtual world player or participant or third party also provides the confirmation data regarding the awarded real-world benefit (block 2587).

Other exemplary features illustrated in FIG. 77 may include allowing the real-world benefit to be transferred by the virtual world party to a designated real-world or virtual world recipient (block 2582). Another possible feature includes making the confirmation data available to a real-world entity and/or to the virtual world party (block 2581).

A further aspect includes allowing the virtual world party to pursue redemption of the awarded real-world benefit using one or more of the following ways: take action during a virtual world time period; take action during a real-world time period; send email message; visit virtual world store; visit website; visit real-world store; select hyperlink; respond to prompt; send email attachment; send fax transmission; obtain printed document; scan document; process encoded card; telephonic transmission; physical delivery; postal delivery; web-page input; web service; API invocation; URL access; password access; encryption key, and digital transceiver (block 2583).

Figure 78:
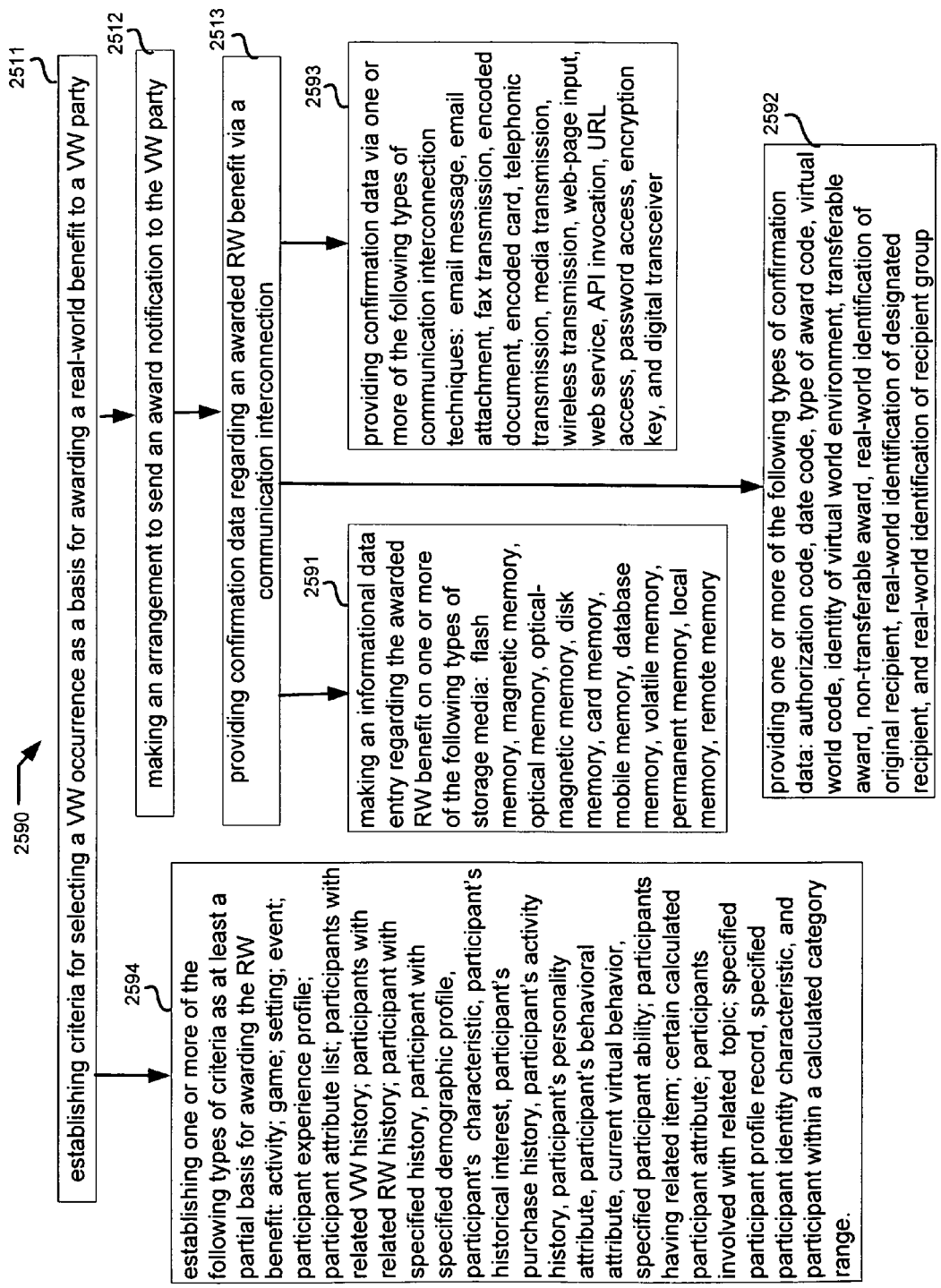

The embodiments 2590 disclosed in FIG. 78 include previously described process features 2511, 2512, 2513. Other exemplary aspects include establishing one or more of the following types of criteria as at least a partial basis for awarding the real-world benefit: activity; game; setting; event; participant experience profile; participant attribute list; participants with related virtual world history; participants with related real-world history; participant with specified history, participant with specified demographic profile, participant's characteristic, participant's historical interest, participant's purchase history, participant's activity history, participant's personality attribute, participant's behavioral attribute, current virtual behavior, specified participant ability; participants having related item; certain calculated participant attribute; participants involved with related topic; specified participant profile record, specified participant identity characteristic, and participant within a calculated category range (block 2594).

Further possible features include making an informational data entry regarding the awarded real-world benefit on one or more of the following types of storage media: flash memory, magnetic memory, optical memory, optical-magnetic memory, disk memory, card memory, mobile memory, database memory, volatile memory, permanent memory, local memory, and remote memory (block 2591).

Additional aspects may include providing one or more of the following types of confirmation data: authorization code, date code, type of award code, virtual world code, identity of virtual world environment, transferable award, non-transferable award, real-world identification of original recipient, real-world identification of designated recipient, and real-world identification of recipient group (block 2592).

Further possible aspects may provide confirmation data via one or more of the following types of communication interconnection techniques: email message, email attachment, fax transmission, encoded document, encoded card, telephonic transmission, media transmission, wireless transmission, web-page input, web service, API invocation, URL access, password access, encryption key, and digital transceiver (block 2593).

It is to be understood that the various itemized listings herein as set forth in the flow chart diagrams and related detailed descriptions are not intended to be exhaustive, but are provided only by way of example. In some implementations certain specific listings and/or types of listings may not be applicable. In other instances a particular implementation may include additional real-world and/or virtual world aspects, attributes, characteristics, parties, entities, contingencies, pre-conditions, qualifications, etc., depending on the circumstances.

Figure 79:
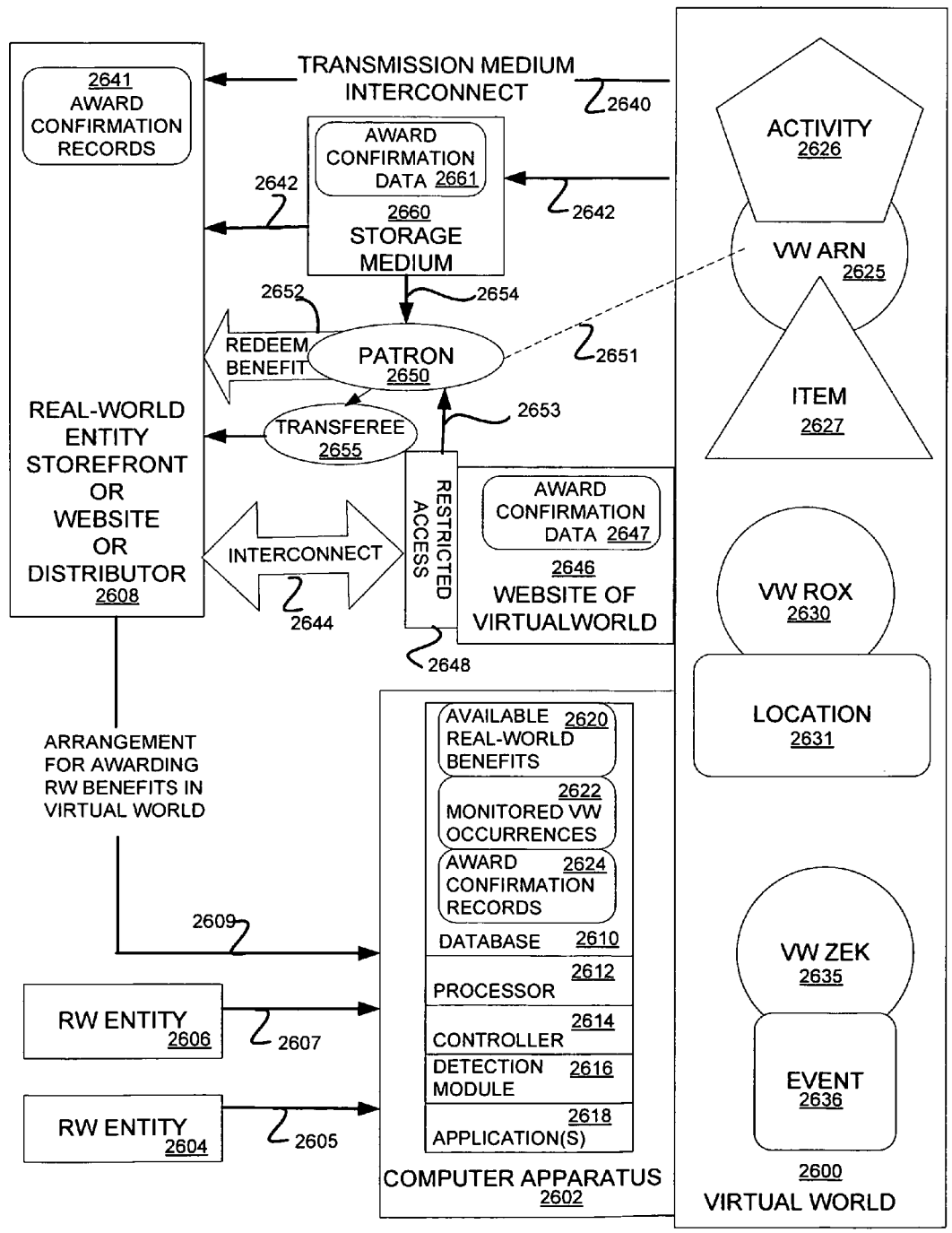
FIG. 79 is a schematic block diagram showing various exemplary aspects of communication interconnections between a virtual world and a real-world entity.

The schematic block diagram of FIG. 79 illustrates various exemplary embodiment features regarding virtual world 2600 with virtual characters Arn 2625, Rox 2630 and Zek 2635. The virtual world interactions for virtual characters 2625, 2630, 2635 are enabled by computer apparatus 2602 which includes database 2610, processor 2612, controller 2614, detection module 2616, and one or more computer program applications 2618.

One or more real-world entities 2605, 2607, 2608 can make arrangements (see arrows 2605, 2607, 2609) for awarding real-world benefits in the virtual world 2600. It will be understood that a real-world entity 2608 may conduct its transactions through a storefront or website or distributor or numerous other ways in order to make direct or indirect contact with its patrons. Such an arrangement with a party involved with virtual world 2600 may be implemented by computer apparatus 2602 based on different types of database records including but not limited to available real-world benefits 2620, monitored virtual world occurrences 2622 and award confirmation records 2624. Of course certain types of records may not be deemed necessary, and other additional records may be utilized depending on the circumstances.

Exemplary virtual occurrences which may result in a real-world consequence (e.g., benefit, premium, discount, promotional advantage, etc.) may vary depending on the terms and conditions of the arrangement. Such virtual occurrences may, for example, include an attendance by VW character Zek 2635 at event 2636 as well as a visit by VW character Rox 2630 to location 2631. Another possible virtual occurrence that may result in an awarded RW benefit may require a combined virtual occurrence such as VW character Arn 2625 acquiring or using item 2627 at a particular activity 2626. It will be understood that some RW benefits will be awarded as part of a widespread distribution scheme, while other RW benefits may be specifically targeted for a particular profiled VW character and/or those characters involved in a specified VW scenario. The listings and categories disclosed herein are not intended to be limiting but are for purposes of illustration only.

Various types of communication interconnections between the virtual world and a real-world entity may be provided in order to assure proper confirmation of an awarded RW consequence to a particular VW character (e.g., redeemable to an identifiable real-world party associated with a recipient character or perhaps redeemable by a recipient transferee). The illustrated interconnections for such confirmation data are for purposes of illustration, and are not deemed to be exhaustive.

In some instances confirmation data may be communicated directly to a virtual world entity 2608 via a transmission interconnection medium 2640 (e.g., wired, wireless, etc.). Other possible interconnection techniques may include award confirmation data 2661 entered (see arrow 2642) on a storage medium 2660. Such storage medium may be directly accessible (see arrow 2642) to the real-world entity 2608. In some embodiments such storage medium may be directly or indirectly accessible to a patron 2650 who became a recipient of the award through VW participation (see dotted line 2651) of the patron's alter-ego character Arn 2625.

As shown schematically in FIG. 79, patron 2650 may proceed to redeem the benefit (see arrow 2652) for its own use, or in some instances may transfer the benefit to a RW transferee 2655 who can then redeem the benefit. In some implementations such a RW benefit may be transferred prior to redemption to another VW entity or character. It will be understood that various types of award confirmation records 2641 may be kept by the real-world entity 2608 responsible for authorizing, receiving, processing, and/or granting a confirmed RW benefit to an appropriate recipient.

Some embodiments of a computer implemented system include a transfer-related tag or flag associated with a patron, a transferable right, or a designated successor party. A memory storage unit such as a database may identify the patron, the transferable right, the transfer authorization, date of transfer, and the designated successor party in connection with an authorized transfer. Of course other data pertinent to the authorized transfer may also be maintained and updated in a database depending on the circumstances.

Some system embodiment may provide a database related to notification, award, and/or transferability of real-world consequences (e.g., opportunity, benefit, etc.), wherein different parties may have read access or read-only access or read/write access or no access to the database records depending on the circumstances.

Some computer program product implementations as well as system and process embodiments may allow a transfer of an awarded real-world benefit to a VW successor party, and may also allow a transfer to a RW successor party. In some embodiments such a transfer may not be authorized and may result in a cancellation or withdrawal of the real-world benefit.

Another exemplary technique for providing a communication interconnection with a virtual world as illustrated in FIG. 79 may include a website 2646 operatively coupled with the virtual world 2600. Such a website may include award confirmation data records 2647 that are accessible through a restricted access 2648 to a patron (see arrow 2653) and/or to a real-world entity (see arrow 2644). In some instances a real-world entity may use the website 2646 to obtain confirmation data as well as to provide an updated input entry to the award confirmation data records 2647 (e.g., expired benefits, redeemed benefits, enhanced benefits, etc.)

Figure 80:
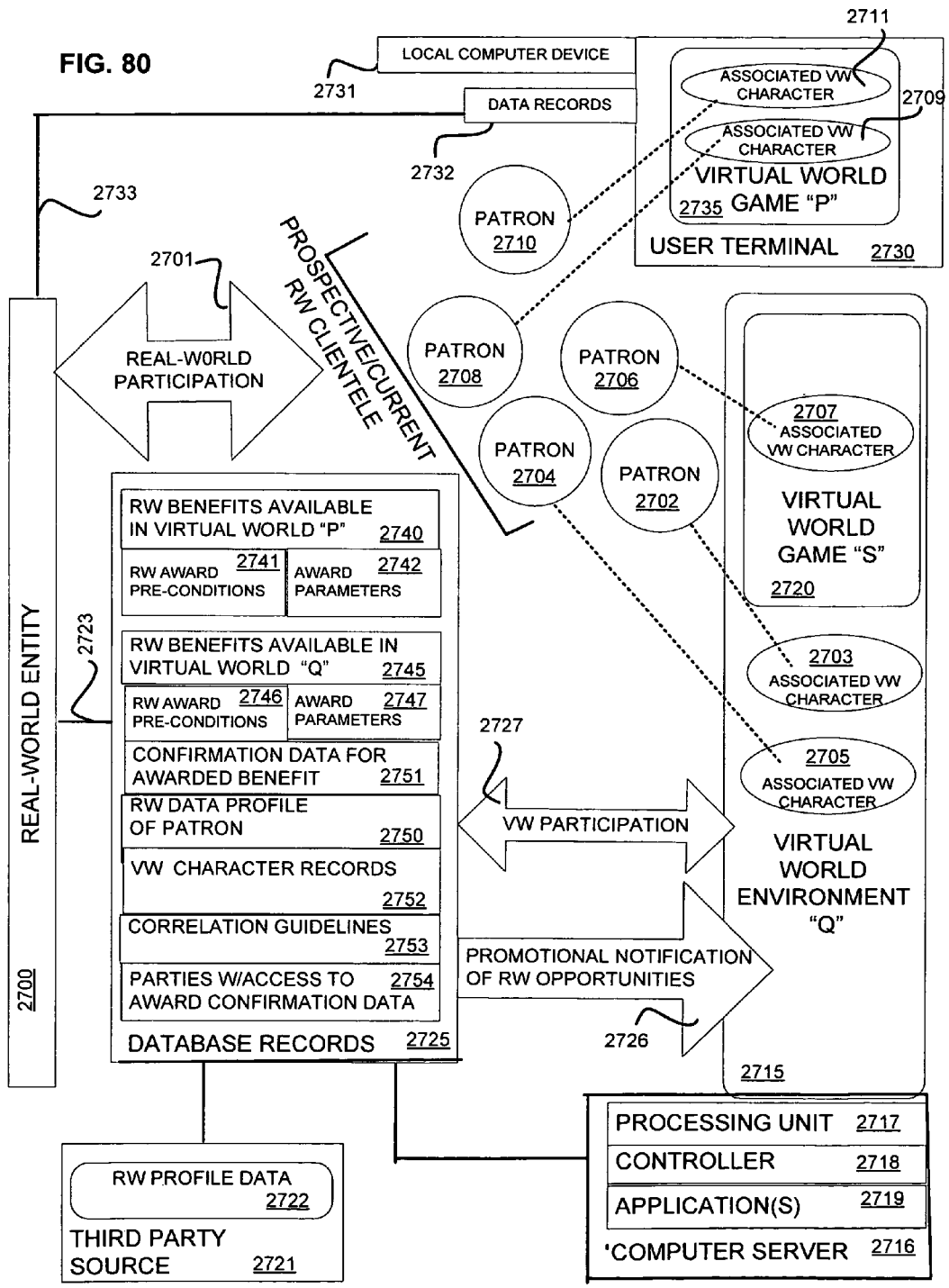
FIG. 80 is a schematic block diagram showing embodiments that may involve a use of real-world profile data in connection with a virtual world environment.

The schematic block diagram of FIG. 80 shows various possible implementations relating to a real-world entity 2700 that is interested in real-world participation 2701 involving prospective and/or current real-world clientele. Such clientele may include a patron 2702 that participates as an associated virtual character 2703 in a virtual world environment "Q" 2715, as well as another patron 2704 that participates in the same virtual world environment 2715 as an associated virtual character 2705. It will be understood that real-world entity 2700 may be interested in making an arrangement for certain database records 2725 to facilitate offering certain real-world benefits (e.g., opportunities, etc.) to patrons 2702, 2704 as part of the virtual world experience. Such an arrangement may include arranging for promotional notifications of real-world opportunities 2726 in connection with a patron's virtual world participation 2727.

The exemplary database records 2725 include RW patron data profiles 2750 which may incorporate real-world (RW) profile data 2722 from a third party source 2721, and also RW profile data provided directly or indirectly (see 2723) from the real-world entity 2700. The database records 2725 may be operatively coupled with a computer server 2716 for various processing, storage, updating and communication functions related to the virtual world environment 2715. Exemplary computer components for accomplishing such functions may include processing unit 2717, controller 2718, and one or more program applications 2719.

Referring again to FIG. 80, possible data records may include a listing 2745 of RW benefits available in virtual world environment 2715, related RW award pre-conditions 2746 and related award parameters 2747. Other types of records may include confirmation data for awarded benefits 2751, virtual world (VW) character records 2752, correlation guidelines 2753, and a listing of parties with access to award confirmation data 2754.

Of course a real-world entity 2700 may make available similar or different types of real-world benefits pursuant to arrangements with other virtual world owners or operators. For example some promotional benefits may be offered in a separate virtual world game "S" 2720 accessible to a participant already logged onto virtual world environment 2715. A patron 2706 may have participation access to virtual world game 2720 in a role as associated virtual character 2207. Database records such as 2725 could be used to facilitate the availability of such promotional benefits in virtual world game 2720.

A further example shown in FIG. 80 provides a user terminal 2730 having its own local computer device 2731 for loading virtual world game "P" 2735. Appropriate data records 2732 accessible to local computer device 2731 may include profile data and related award status information for patron 2708 who participates in virtual world game 2735 in a role as associated virtual character 2709. The data records 2732 may also include profile data and related award status information for patron 2710 who is also a participant in virtual world game 2735 as associated virtual character 2711. Such profile data may be provided from a third party source such as 2721, as well as from real-world entity 2700 (see 2733).

It will be understood by those skilled in the art that pertinent data records need not be maintained in only one location, but can be located locally or remotely as well as separately or centralized so long as security, data integrity, and appropriate accessibility is provided. As shown in the exemplary embodiments of FIG. 80, centralized database records 2725 may include a listing 2740 of RW benefits available in virtual world game 2735 along with related RW award pre-conditions 2741 and award parameters 2742. Also, other types of data records may be helpful, and certain data records may be deemed as optional depending on the circumstances.

Figure 81:
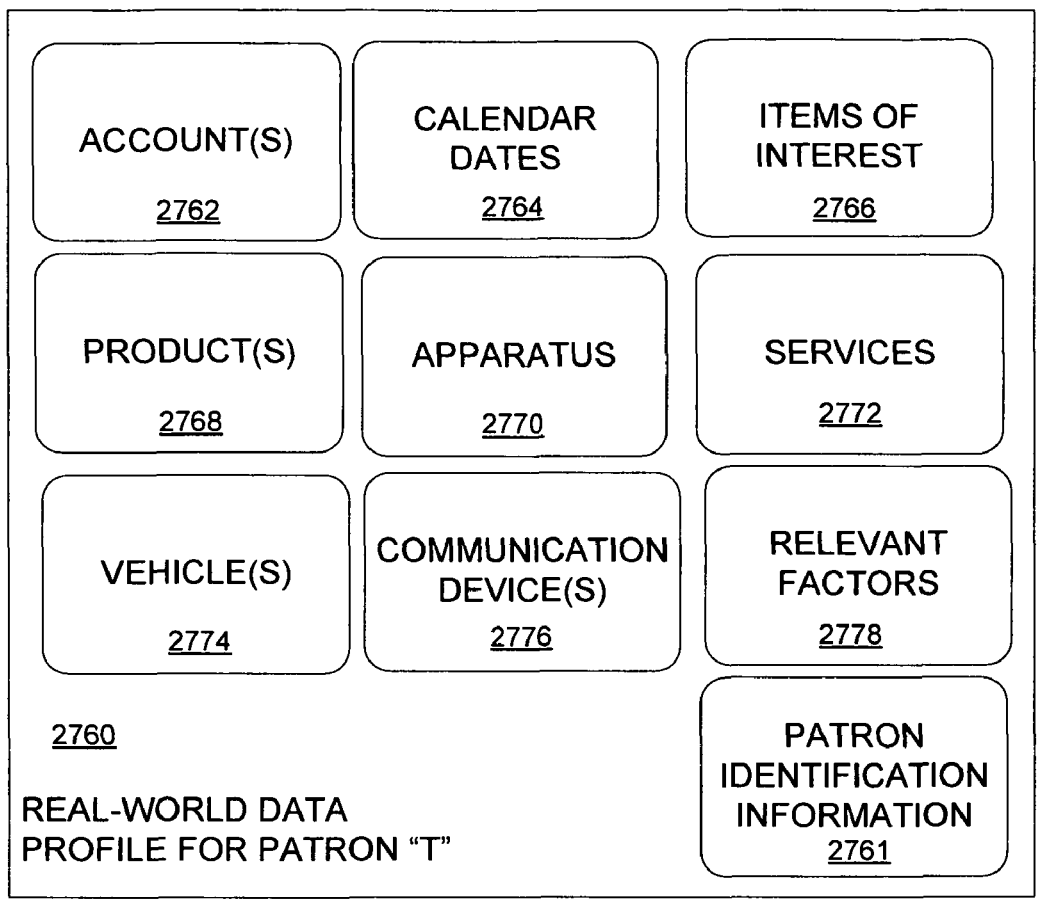
FIG. 81 illustrates exemplary types of real-world profile data records.

The schematic diagram of FIG. 81 shows an exemplary real-world data profile 2760 for patron "T" that includes a listing of patron identification information 2761. Other possible file topics related to patron "T" include one or more accounts 2762, calendar dates 2764, items of interest 2766, and one or more products 2768. Additional possible real-world data profile topics may include apparatus 2770, services 2772, one or more vehicles 2774 and one or more communication devices 2776. Of course various other data elements may be included in records of diverse relevant factors 2778 related to patron "T". The real-world data profile records may be applicable to only an individual patron; however database sorting techniques may be used in order to collect common profile data characteristics for a group of patrons. It will be understood that some promotional benefit offers may be targeted to a broad virtual world audience, while others may be directed to a limited number of virtual participants, all in accordance with selected correlation guidelines (see 2753).

Figure 82:
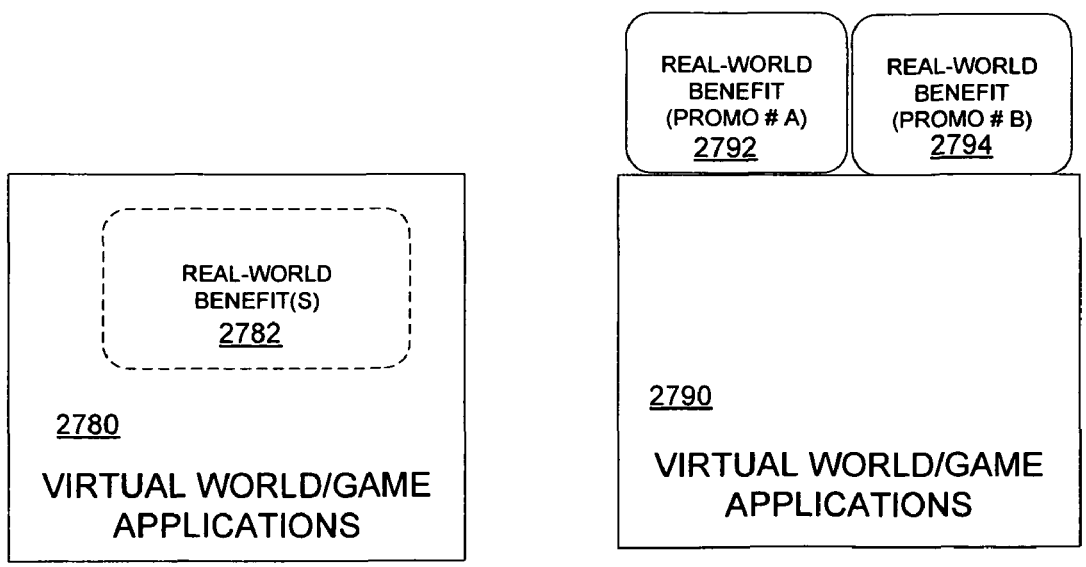
FIG. 82 illustrates exemplary implementations for virtual world applications.

Referring to the schematic block diagram of FIG. 82, some implementations may include one or more programmed real-world benefits 2782 that are incorporated within virtual world program applications 2780 (e.g., individual and multi-player games, etc.). In other instances an implementation may include one kind of programmed real-world benefit 2792 identified as "promo # A" that operates separately from a virtual world/game application 2790 (e.g., individual and multi-player games, etc.), as well as a different kind of programmed real-world benefit 2794 identified as "promo # B" that also operates separately from the virtual world/game application 2790. Of course, various combinations of incorporated and/or separately operated benefit award schemes may be implemented for making communication contacts with virtual world participants regarding available real-world benefits.

The listing of possible types of RW benefits that may be promoted and offered to parties in a virtual world environment (e.g., single player or multiplayer virtual world game) is for purposes of illustration only, and is not intended to be complete or otherwise limiting with respect to various implementations of the features disclosed herein.

It will be understood that a computerized database system disclosed herein may include a set of records for storing programmed virtual world participation topics and their related settings in the virtual world environment.

The database system may further include records of optional virtual world participation topics which can be chosen by a player or participant, and their related settings in the virtual world environment.

The database system may further include records for storing category lists associated with real-world entities that have potential interest in sending real-world informational data to the player or participant.

The database system may further include category lists for real-world entities that may have potential interest in receiving participation profiles for the player or participant.

The database system may further include category lists for real-world entities that have requested participation profiles for the player or participant.

The database system may further include a list of players or participants whose participation profiles have been communicated to the real-world entity.

The database system may further include records for one or more of the following parameters associated with the player of participant: detection period, frequency of particular types of participation activity, extent of particular types of participation activity, time periods of particular types of participation activity, other related virtual world participation activities, privacy classification of player or participant, group or individual identity of player or participant, and virtual world usage metric of player or participant.

The methods and processes disclosed herein may be encoded in various carrier media including but not limited to wave signals (e.g., optical, electrical, electro magnetic), memory systems (e.g., cartridge, tape, disk), as well as other communication and storage media.

It will be understood that designations "real-world entity", "real-world third party", "real-world person", "real-world enterprise", "customer", "clientele", "patron", "party", "recipient", "donor", "agent", "trustee", "claimant", "obligor", "beneficiary", "donee", "transferee", "third party", and the like as used herein are intended to include individuals, families, groups of people, clubs, organizations, partnerships, corporations, companies, etc. that are typically recognized as being identifiable in the real-world.

Figure 83:
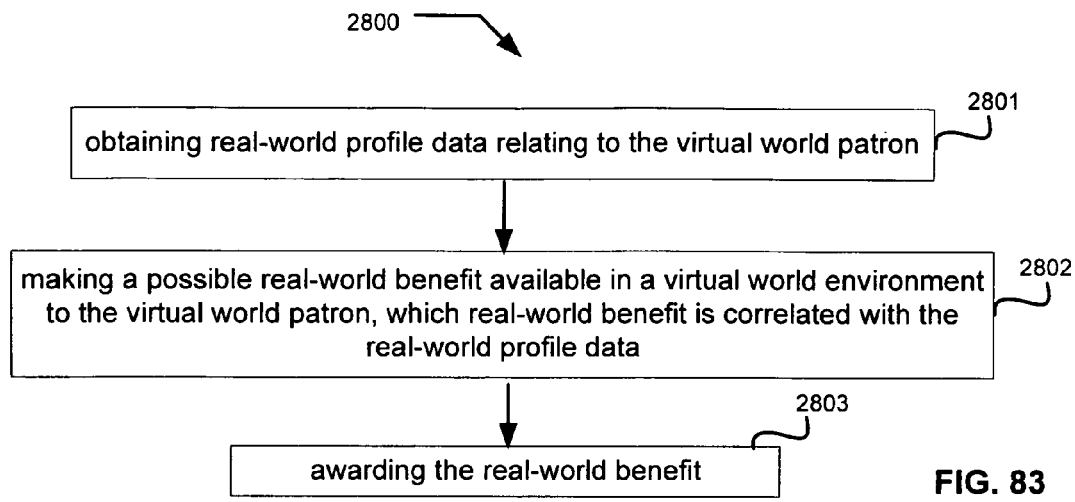
FIGS. 83-84 are high level flow charts illustrating exemplary process embodiments.

The high level process embodiment 2800 shown in FIG. 83 includes obtaining real-world profile data relating to the virtual world patron (block 2801). Additional features may include making a possible real-world benefit available in a virtual world environment to the virtual world patron, which real-world benefit is correlated with the real-world profile data (block 2802); and awarding the real-world benefit (block 2803).

Figure 84:
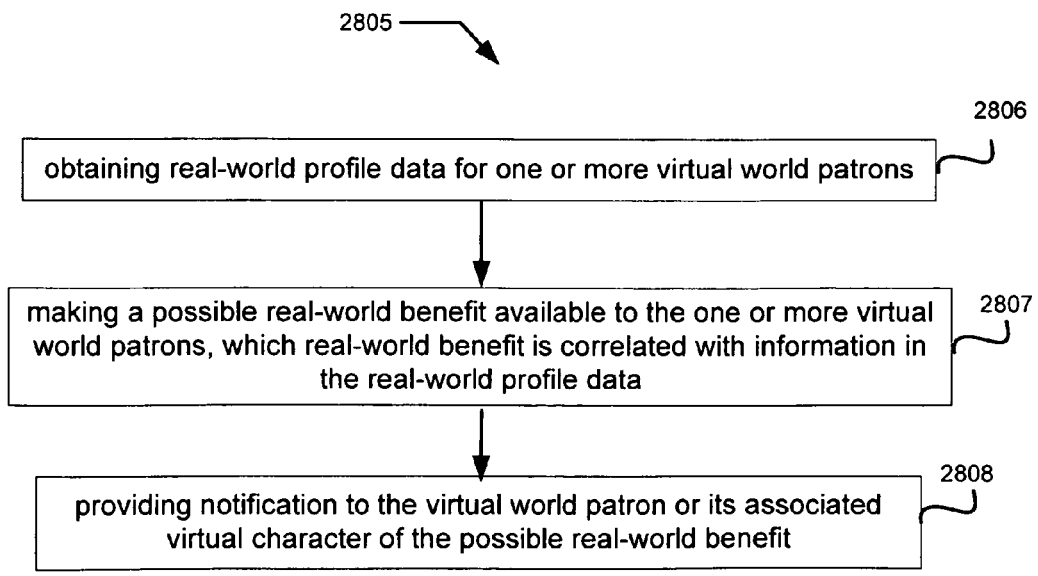

Another high level process embodiment 2805 shown in FIG. 84 includes obtaining real-world profile data for one or more virtual world patrons (block 2806). Other possible features may include making a possible real-world benefit available to the one or more virtual world patrons, which real-world benefit is correlated with information in the real-world profile data (block 2807); and providing notification to the virtual world patron or its associated virtual character of the possible real-world benefit (block 2808).

Figure 85:
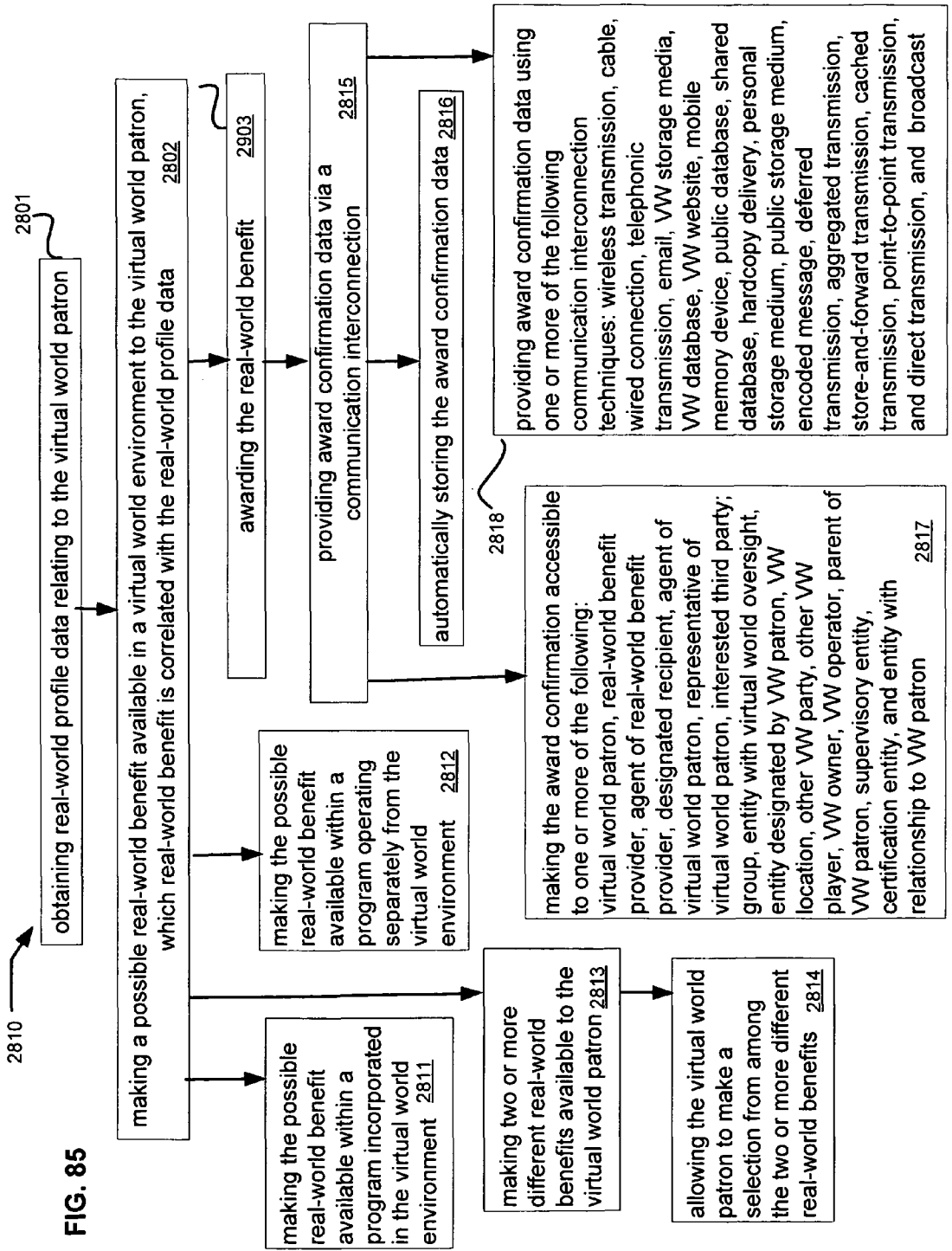
FIGS. 85-90 are detailed flow charts showing additional process features that may be implemented.

The embodiments 2810 illustrated in FIG. 85 include previously described process components 2801, 2802, 2803 as well as other features relating to the availability of possible real-world benefits. Some implementations may include making the possible real-world benefit available within a program incorporated in the virtual world environment (block 2811). Other implementation may include making the possible real-world benefit available within a program operating separately from the virtual world environment (block 2812).

One process aspect may include making two or more different real-world benefits available to the virtual world patron (block 2813). A related aspect may allow the virtual world patron to make a selection from among the two or more different real-world benefits (block 2814). Further aspects relating to an award of the real-world benefit may include providing award confirmation data via a communication interconnection (block 2815), and automatically storing the award confirmation data (block 2816).

FIG. 85 also discloses a possible process feature that makes the award confirmation accessible to one or more of the following: virtual world patron, real-world benefit provider, agent of real-world benefit provider, designated recipient, agent of virtual world patron, representative of virtual world patron, interested third party; group, entity with virtual world oversight, entity designated by VW patron, VW location, other VW party, other VW player, VW owner, VW operator, parent of VW patron, supervisory entity, certification entity, and entity with relationship to VW patron (block 2817).

A further possible process feature may include providing award confirmation data using one or more of the following communication interconnection techniques: wireless transmission, cable, wired connection, telephonic transmission, email, VW storage media, VW database, VW website, mobile memory device, public database, shared database, hardcopy delivery, personal storage medium, public storage medium, encoded message, deferred transmission, aggregated transmission, store-and-forward transmission, cached transmission, point-to-point transmission, and direct transmission, and broadcast (block 2818).

Figure 86:
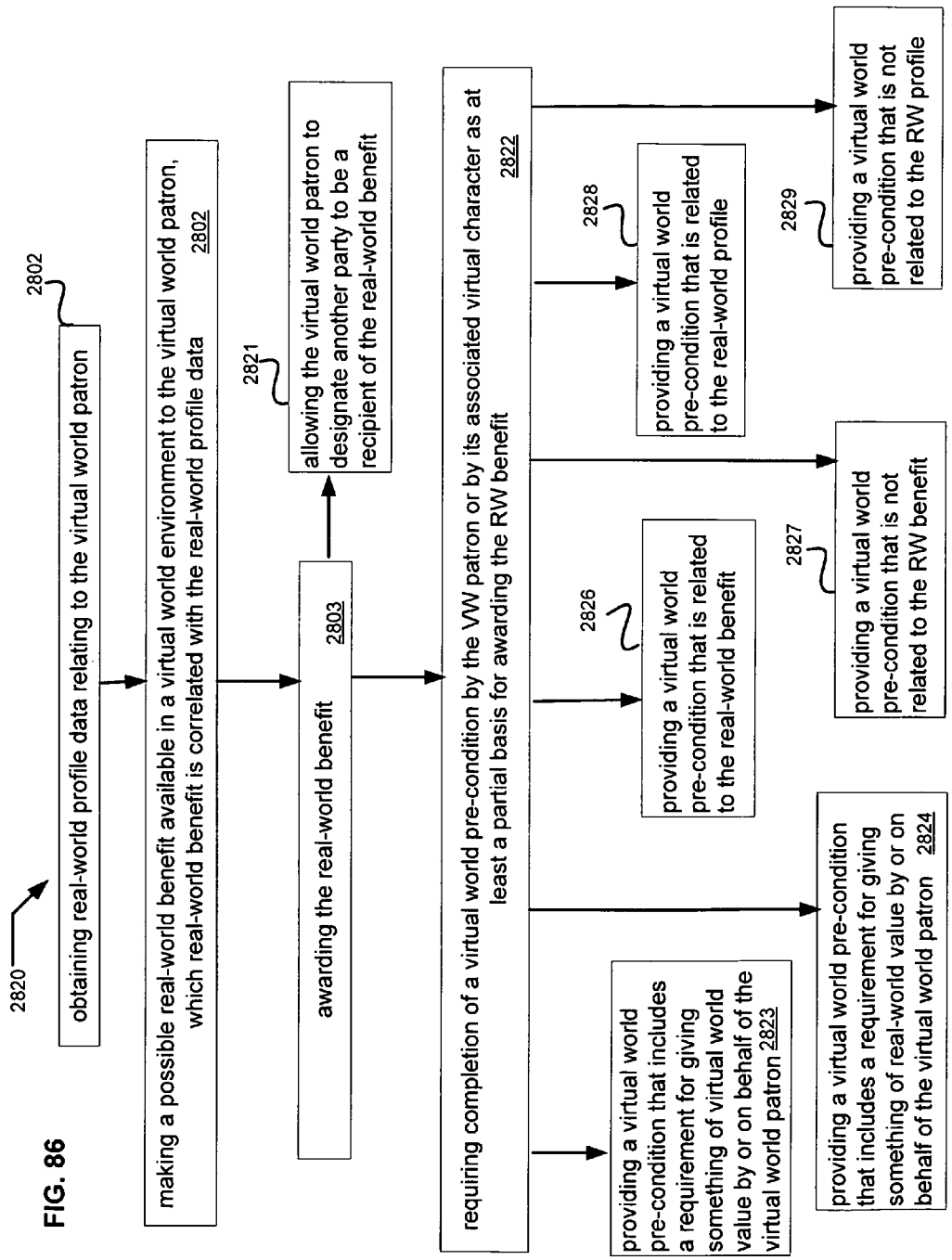

Referring to the embodiments 2820 of FIG. 86, another exemplary detailed implementation includes previously described components 2801, 2802, 2803 as well as allowing the virtual world patron to designate another party to be a recipient of the real-world benefit (block 2821). Another process feature may require completion of a virtual world pre-condition by the virtual world patron or by its associated virtual character as at least a partial basis for awarding the real-world benefit (block 2822).

Additional possible aspects relating to virtual world pre-conditions include providing a virtual world pre-condition that includes a requirement for giving something of virtual world value (block 2823) or of real-world value (block 2824) by or on behalf of the virtual world patron. Other aspects include providing a virtual world pre-condition that is related to the real-world benefit (block 2826), or in some instances not related to the real-world benefit (block 2827). Further aspects include providing a virtual world pre-condition that is related to the real-world profile (block 2828) or in some instances not related to the real-world profile (block 2829).

Figure 87:
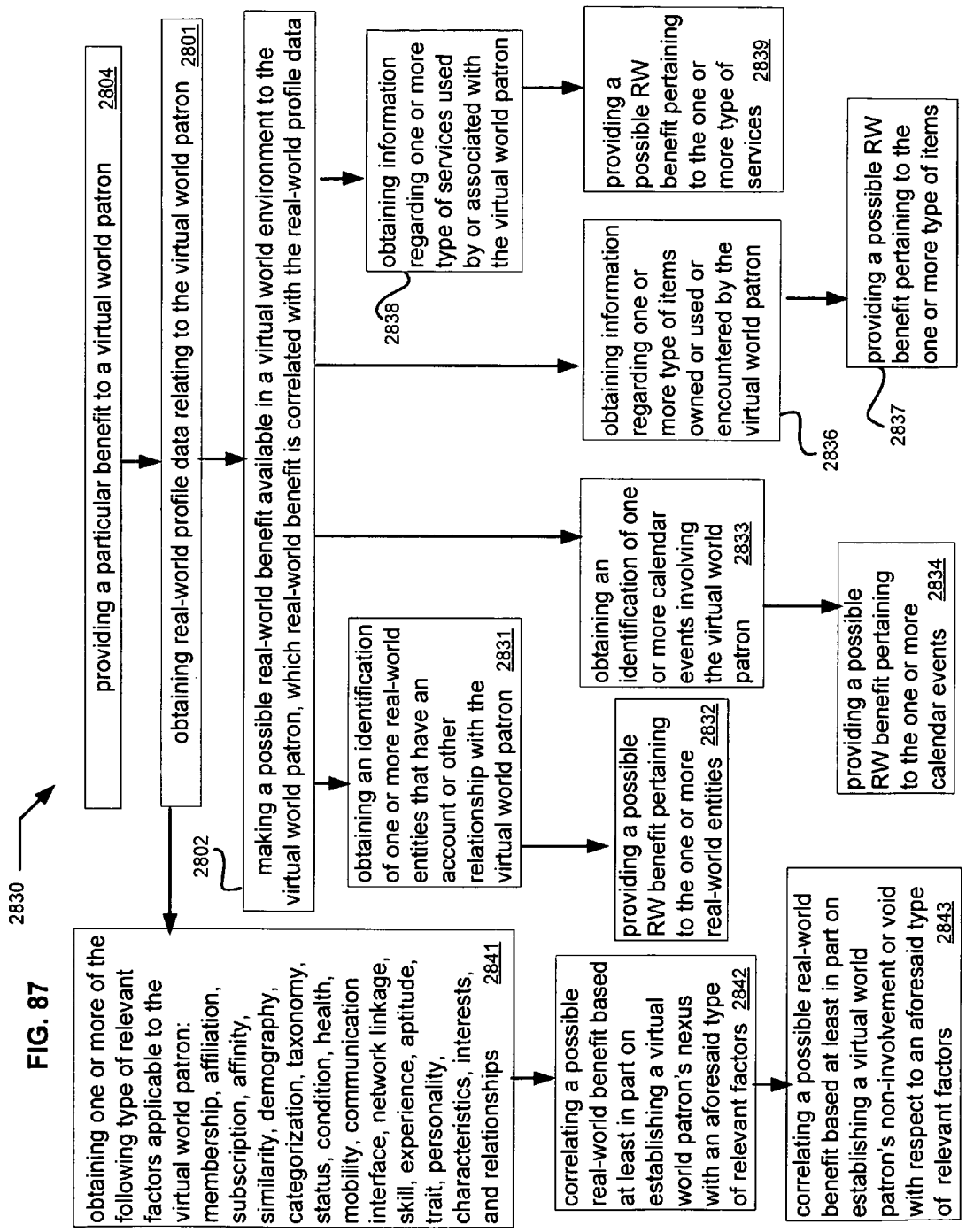

The flow chart of FIG. 87 discloses exemplary embodiments 2830 that relate to providing a particular benefit to a virtual world patron (block 2804). In addition to previously described components 2801, 2802, other process features related to patron profile data may include obtaining an identification of one or more real-world entities that have an account or other relationship with the virtual world patron (block 2831), and providing a possible real-world benefit pertaining to the one or more real-world entities (block 2832).

Further aspects related to patron profile data may include obtaining an identification of one or more calendar events involving the virtual world patron (block 2833), and providing a possible real-world benefit pertaining to the one or more calendar events (block 2834). Other aspects may include obtaining information regarding one or more type of items owned or used or encountered by the virtual world patron (block 2836), and providing a possible real-world benefit pertaining to the one or more type of items (block 2837).

Other possible process features may include obtaining information regarding one or more type of services used by or associated with the virtual world patron (block 2838), and providing a possible real-world benefit pertaining to the one or more type of services (block 2839).

As disclosed in FIG. 87, an additional exemplary process feature includes obtaining one or more of the following type of relevant factors applicable to the virtual world patron: membership, affiliation, subscription, affinity, similarity, demography, categorization, taxonomy, status, condition, health, mobility, communication interface, network linkage, skill, experience, aptitude, trait, personality, characteristics, interests, and relationships (block 2841). Some related aspects may include correlating a possible real-world benefit based at least in part on establishing a virtual world patron's nexus with one of the aforesaid type of relevant factors (block 2842). In contrast other related aspects may include correlating a possible real-world benefit based at least in part on establishing a virtual world patron's non-involvement or void with respect to one of the aforesaid type of relevant factors (block 2843).

Figure 88:
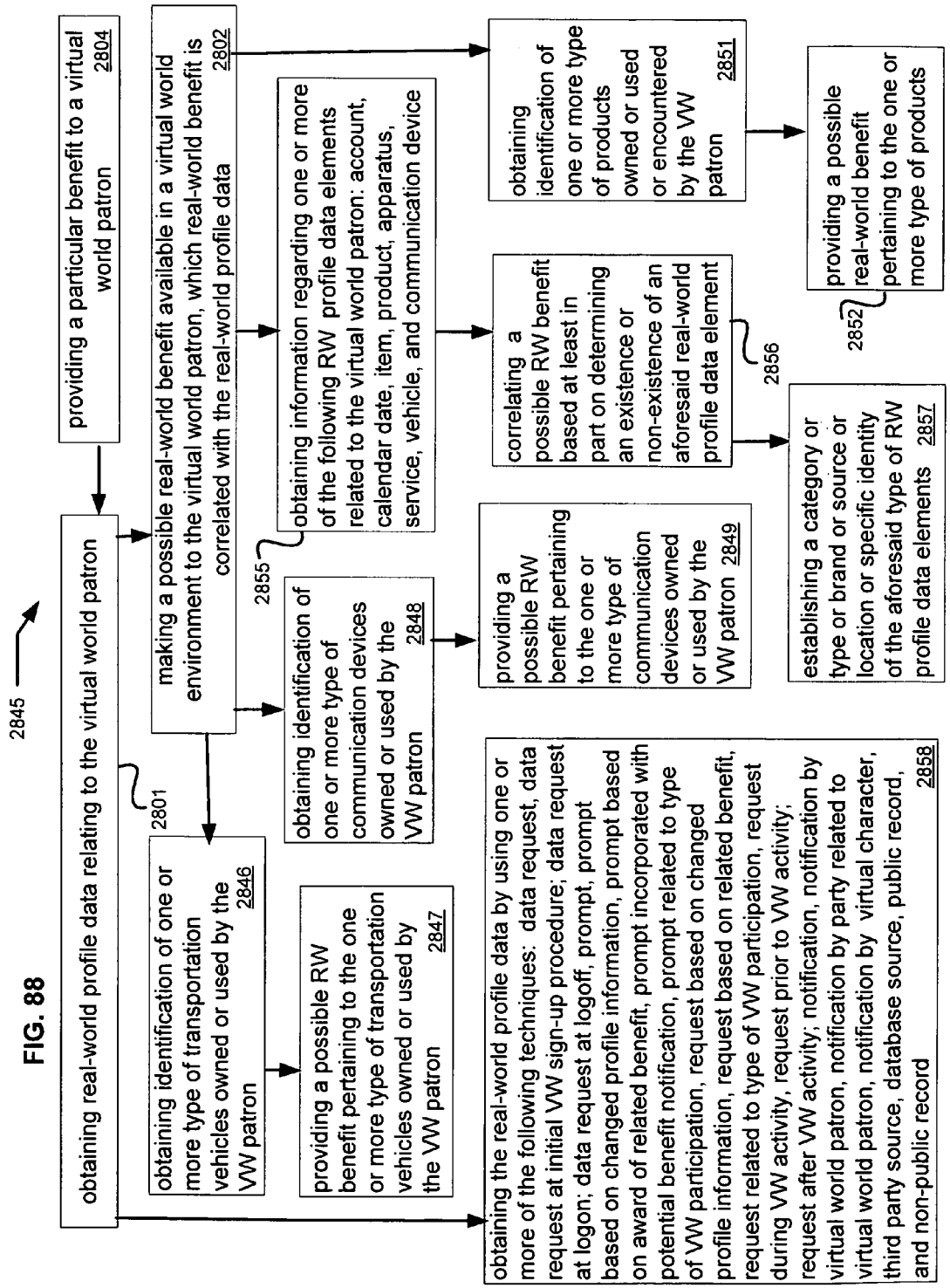

Referring to FIG. 88, various embodiments 2845 include previously described process components 2804, 2801, 2802, as well as other aspects related to the real-world profile data. For example, some implementations may include obtaining identification of one or more type of transportation vehicles owned or used by the virtual world patron (block 2846), and providing a real-world benefit pertaining to the one or more type of transportation vehicles (block 2847). Other implementations may include obtaining identification of one or more type of communication devices owned or used by the virtual world patron (block 2848), and providing a possible real-world benefit pertaining to the one or more type of communication devices owned or used by the virtual world patron (block 2849).

A further aspect shown in FIG. 88 includes obtaining identification of one or more type of products owned or used or encountered by the virtual world patron (block 2851), and providing a possible real-world benefit pertaining to the one or more type of products (block 2852).

Some implementations may include obtaining information regarding one or more of the following real-world profile data elements related to the virtual world patron: account, calendar date, item, product, apparatus, service, vehicle, and communication device (block 2855), and correlating a possible real-world benefit based at least in part on determining an existence or non-existence of one of the aforesaid real-world profile data elements (block 2856). A related aspect may include establishing a category or type or brand or source or location or specific identity of the aforesaid type of RW profile data elements (block 2857).

A further possible implementation features includes obtaining the real-world profile data by using one or more of the following techniques: data request, data request at initial VW sign-up procedure; data request at logon; data request at logoff, prompt, prompt based on changed profile information, prompt based on award of related benefit, prompt incorporated with potential benefit notification, prompt related to type of VW participation, request based on changed profile information, request based on related benefit, request related to type of VW participation, request during VW activity, request prior to VW activity; request after VW activity; notification, notification by virtual world patron, notification by party related to virtual world patron, notification by virtual character, third party source, database source, public record, and non-public record (block 2858).

Figure 89:
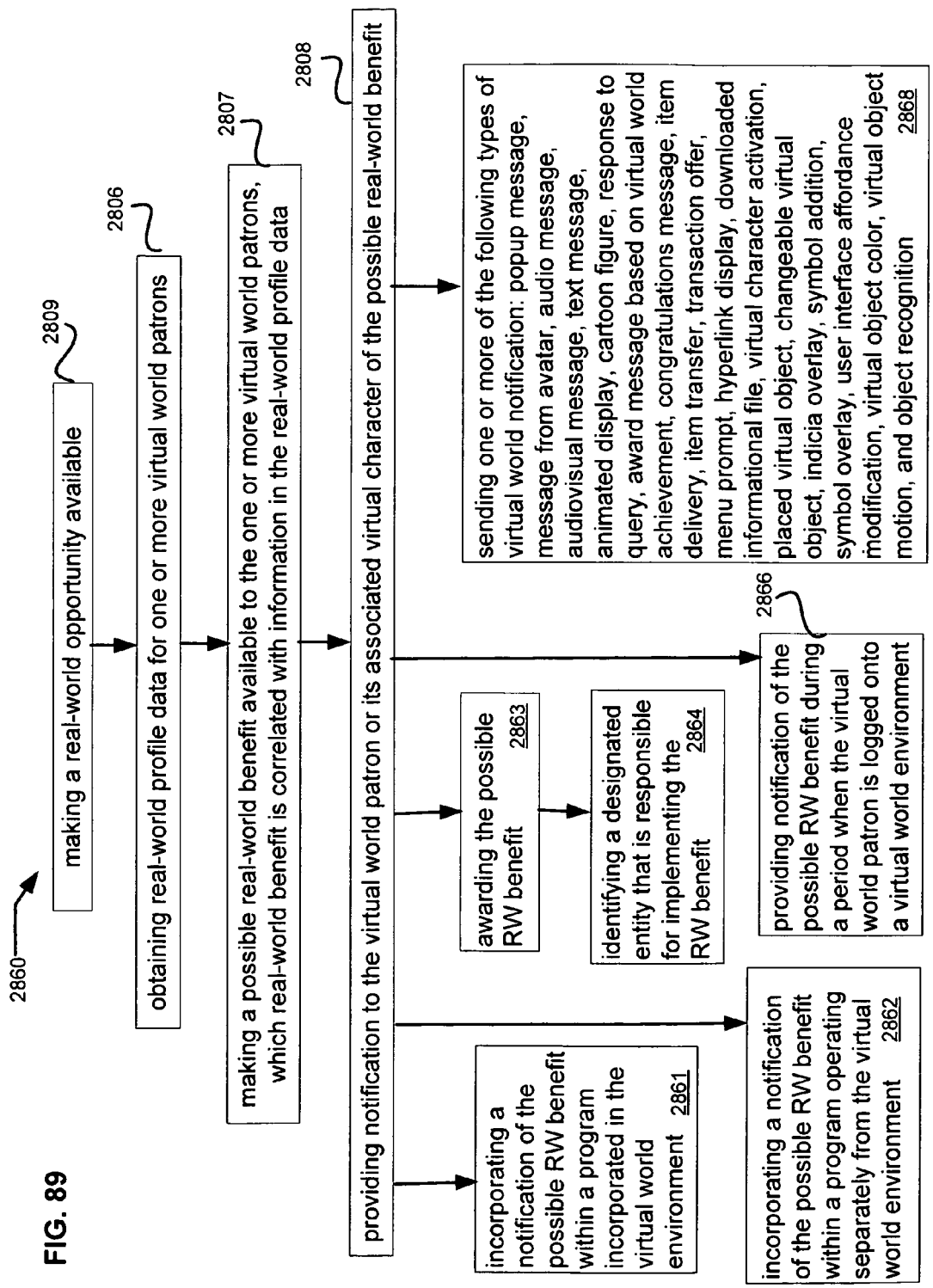

The detailed embodiments 2860 shown in FIG. 89 relate to making a real-world opportunity available (block 2809), including previously described process features 2806, 2807, 2708. Other aspects include incorporating a notification of the possible real-world benefit within a program incorporated in the virtual world environment (block 2861), and incorporating a notification of the possible real-world benefit within a program operating separately from the virtual world environment (block 2862).

Additional possible process features includes awarding the possible real-world benefit (block 2863), and identifying a designated entity that is responsible for implementing the real-world benefit (block 2864). Another aspect may include providing notification of the possible real-world benefit during a period when the virtual world patron is logged onto a virtual world environment (block 2866).

FIG. 89 also discloses an implementation feature that includes sending one or more of the following types of virtual world notification: popup message, message from avatar, audio message, audiovisual message, text message, animated display, cartoon figure, response to query, award message based on virtual world achievement, congratulations message, item delivery, item transfer, transaction offer, menu prompt, hyperlink display, downloaded informational file, virtual character activation, placed virtual object, changeable virtual object, indicia overlay, symbol addition, symbol overlay, user interface affordance modification, virtual object color, virtual object motion, and object recognition (block 2868).

Figure 90:
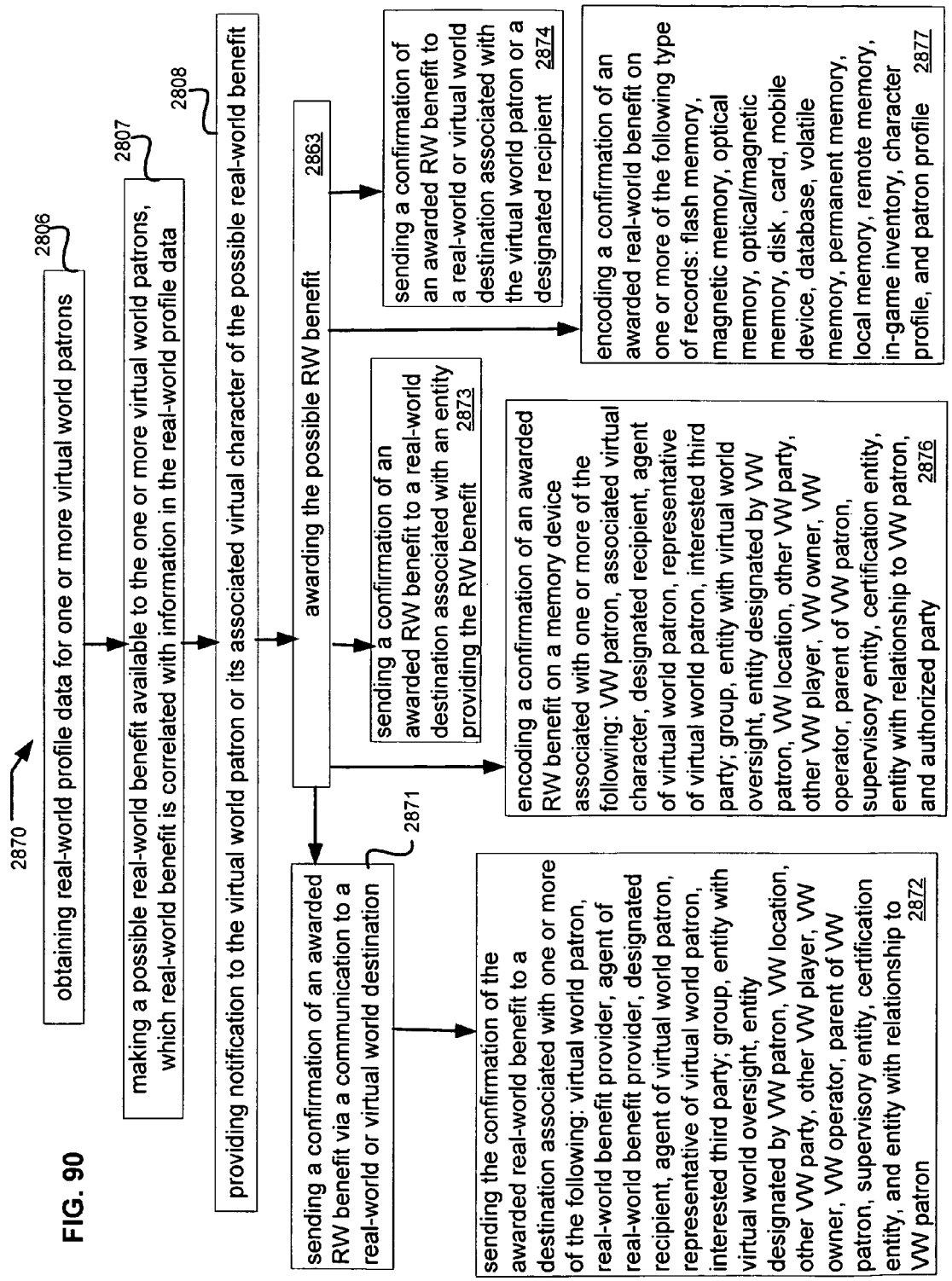

Referring to the embodiments 2870 of FIG. 90, previously described components 2806, 2807, 2808, 2863 may be included along with various other aspects relating to confirmation of an awarded RW benefit. For example, some implementations may include sending a confirmation of an awarded real-world benefit via a communication to a real-world or virtual world destination (block 2871). A related feature may include sending the confirmation of the awarded real-world benefit to a destination associated with one or more of the following: virtual world patron, real-world benefit provider, agent of real-world benefit provider, designated recipient, agent of virtual world patron, representative of virtual world patron, interested third party; group, entity with virtual world oversight, entity designated by VW patron, VW location, other VW party, other VW player, VW owner, VW operator, parent of VW patron, supervisory entity, certification entity, and entity with relationship to VW patron (block 2872).

Other implementations may include sending a confirmation of an awarded real-world benefit to a real-world destination associated with an entity providing the real-world benefit (block 2873). Another aspect may include sending a confirmation of an awarded real-world benefit to a real-world or virtual world destination associated with the virtual world patron or a designated recipient (block 2874).

It will be understood from the various embodiments disclosed herein that providing or sending confirmation of an awarded real-world benefit may not necessarily involve directly informing a party or entity. In some implementations such confirmation may be stored or transmitted without obtaining any acknowledgement that such party or entity has actual notice of the confirmation. In other words such confirmation may in some circumstances only be indirectly accessible to a party or entity pursuant to various security and data integrity protective schemes. Also a recipient of such confirmation may not take the time or effort to access, read or be aware of such an award confirmation.

Further exemplary process features shown in FIG. 90 include encoding a confirmation of an awarded real-world benefit on a memory device associated with one or more of the following: VW patron, associated virtual character, designated recipient, agent of virtual world patron, representative of virtual world patron, interested third party; group, entity with virtual world oversight, entity designated by VW patron, VW location, other VW party, other VW player, VW owner, VW operator, parent of VW patron, supervisory entity, certification entity, entity with relationship to VW patron, and authorized party (block 2876).

Another possible process feature includes encoding a confirmation of an awarded real-world benefit on one or more of the following type of records: flash memory, magnetic memory, optical memory, optical/magnetic memory, disk, card, mobile device, database, volatile memory, permanent memory, local memory, remote memory, in-game inventory, character profile, and patron profile (block 2877).

The system and methods disclosed herein may be incorporated in a computerized database system that may include first database records storing one or more of the following types of virtual world identity characteristics: virtual world name, virtual world message address, virtual world character identity, virtual world avatar, virtual world role, virtual world demographic profile, virtual world memberships, clan affiliations, guild affiliations, aliases, disguises, friends, social networks, item inventory, wish lists, activity history, participation frequencies, purchases, sales, agenda, quest, goals, permissions, personality attributes, behavioral attributes, and academic level.

The database records may also provide for storing one or more of the following types of real-world identity characteristics: real-world name, real-world postal address, real-world email address, real-world age, real-world gender, real-world languages known, real-world educational level, real-world demographic profile, identity photographs, marital status, family members, friends, social network, real-world interests, real-world hobbies, products owned, wish lists, career, personality attributes, behavioral attributes, academic level, real-world activity profile, group memberships, organization affiliations, and website shopping cart contents.

Figure 91:
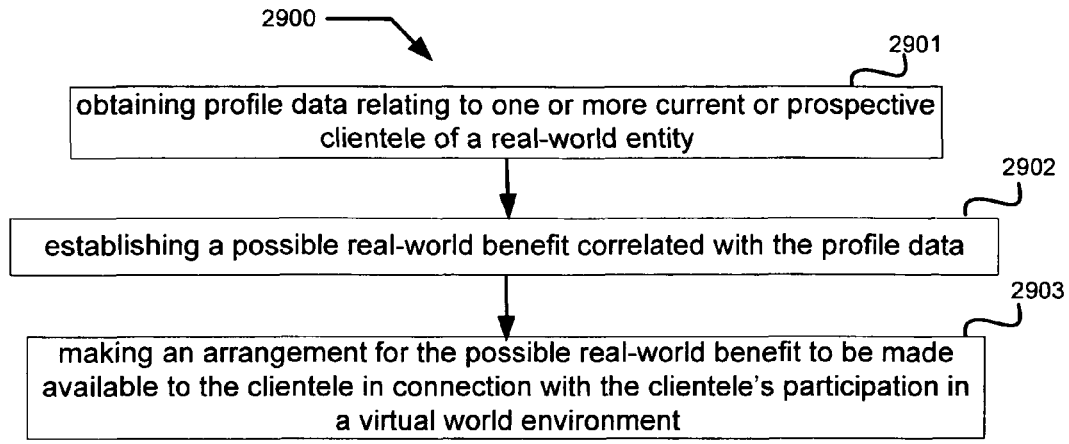
FIGS. 91-92 are high level flow charts illustrating other exemplary process embodiments.

Referring to the high level flow chart of FIG. 91, an exemplary process embodiment 2900 for making a particular benefit available to a party includes obtaining profile data relating to one or more current or prospective clientele of a real-world entity (block 2901), establishing a possible real-world benefit correlated with the profile data (block 2902), and making an arrangement for the possible real-world benefit to be made available to the clientele in connection with the clientele's participation in a virtual world environment (block 2903).

Figure 92:
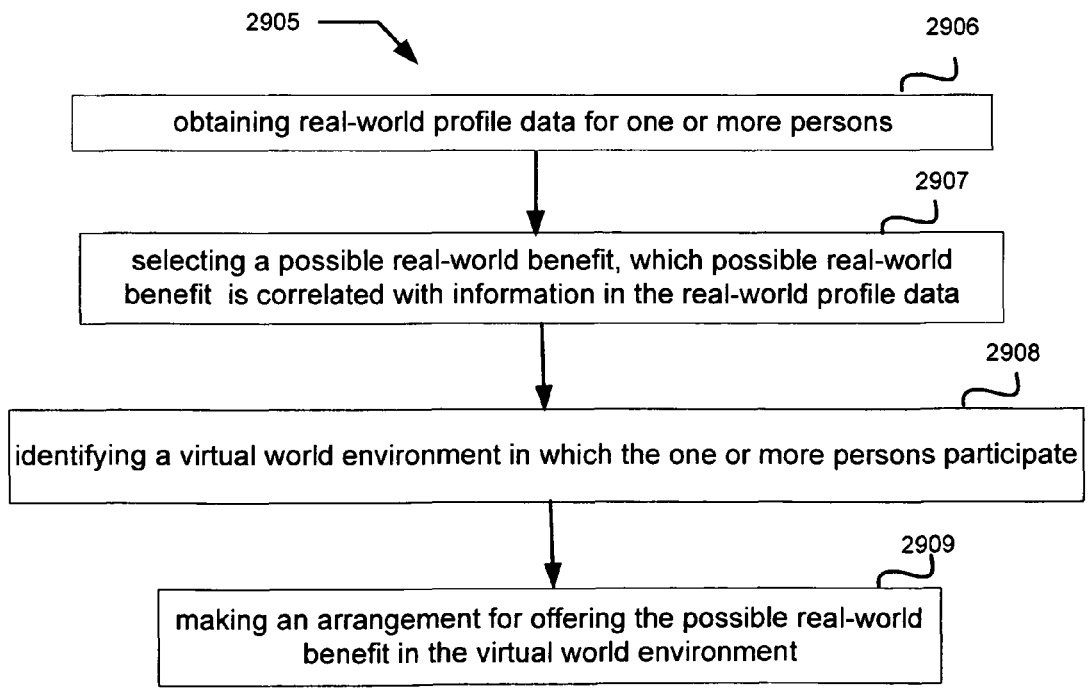

Another process embodiment 2905 is shown in FIG. 92, wherein an exemplary method of providing a real-world opportunity includes obtaining real-world profile data for one or more persons (block 2906); and selecting a possible real-world benefit, which possible real-world benefit is correlated with information in the real-world profile data (block 2907). Additional features may include identifying a virtual world environment in which the one or more persons participate (block 2908), and making an arrangement for offering the possible real-world benefit in the virtual world environment (block 2909).

Figure 93:
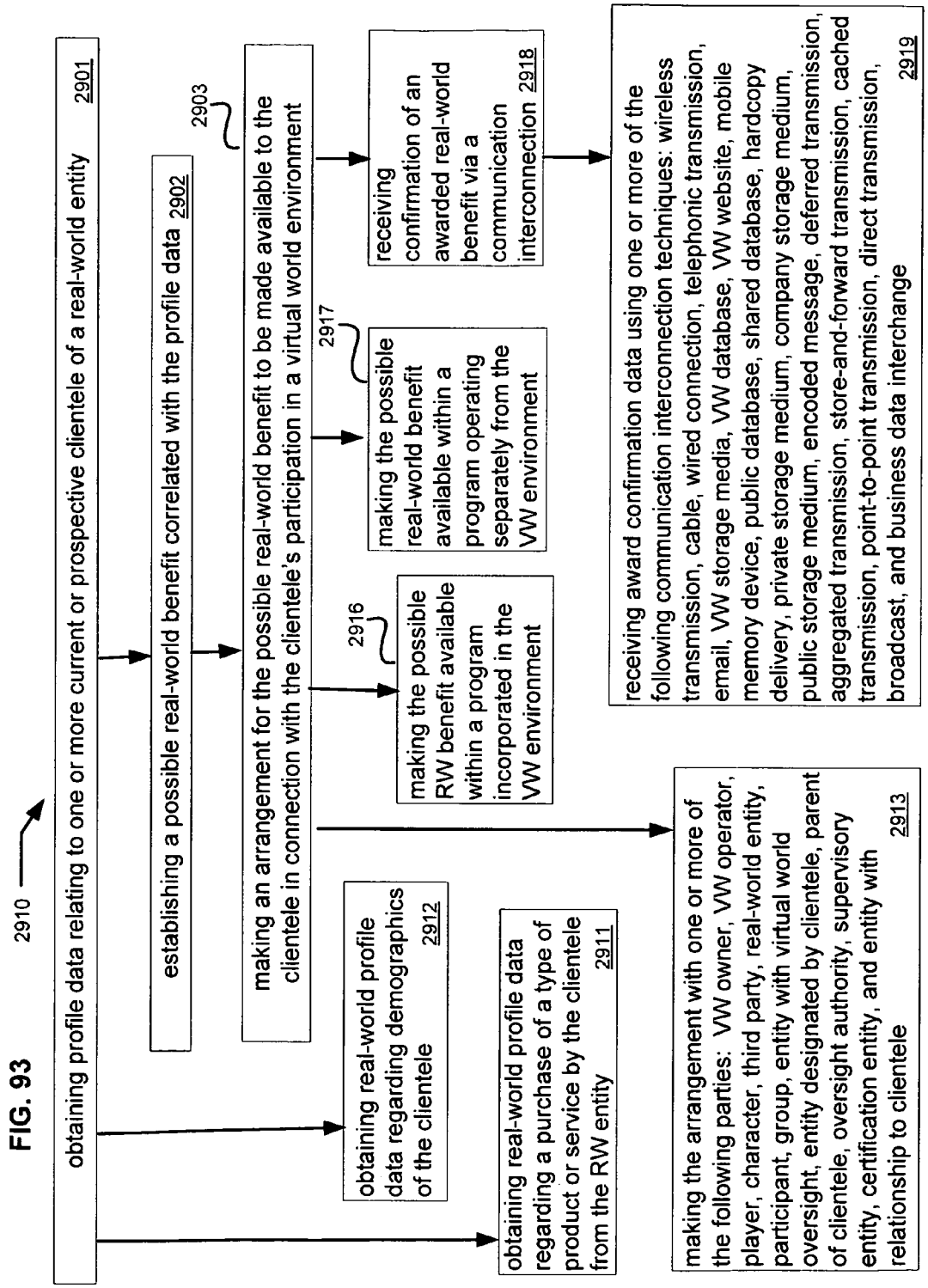
FIGS. 93-100 are detailed flow charts showing further process features that may be implemented.

Referring to FIG. 93, various embodiments 2910 are shown which include previously described process features 2901, 2902, 2903 as well as other related aspects regarding real-world profile data of clientele of a real-world entity. For example, component features may include obtaining real-world profile data regarding a purchase of a type of product or service by the clientele from the real-world entity (block 2911), and obtaining real-world profile data regarding demographics of the clientele (block 2912).

Other possible aspects may include making the arrangement regarding the possible real-world benefit with one or more of the following parties: virtual world owner, virtual world operator, player, character, third party, real-world entity, participant, group, entity with virtual world oversight, entity designated by clientele, parent of clientele, oversight authority, supervisory entity, certification entity, and entity with relationship to clientele (block 2913). Other possible process features may include making the possible real-world benefit available within a program incorporated in the virtual world environment (block 2916), and making the possible real-world benefit available within a program operating separately from the virtual world environment (block 2917).

Another aspect may include receiving confirmation of an awarded real-world benefit via a communication interconnection (block 2918). A related aspect includes receiving award confirmation data using one or more of the following communication interconnection techniques: wireless transmission, cable, wired connection, telephonic transmission, email, virtual world storage media, virtual world database, virtual world website, mobile memory device, public database, shared database, hardcopy delivery, private storage medium, company storage medium, public storage medium, encoded message, deferred transmission, aggregated transmission, store-and-forward transmission, cached transmission, point-to-point transmission, direct transmission, broadcast, and business data interchange (block 2919).

Figure 94:
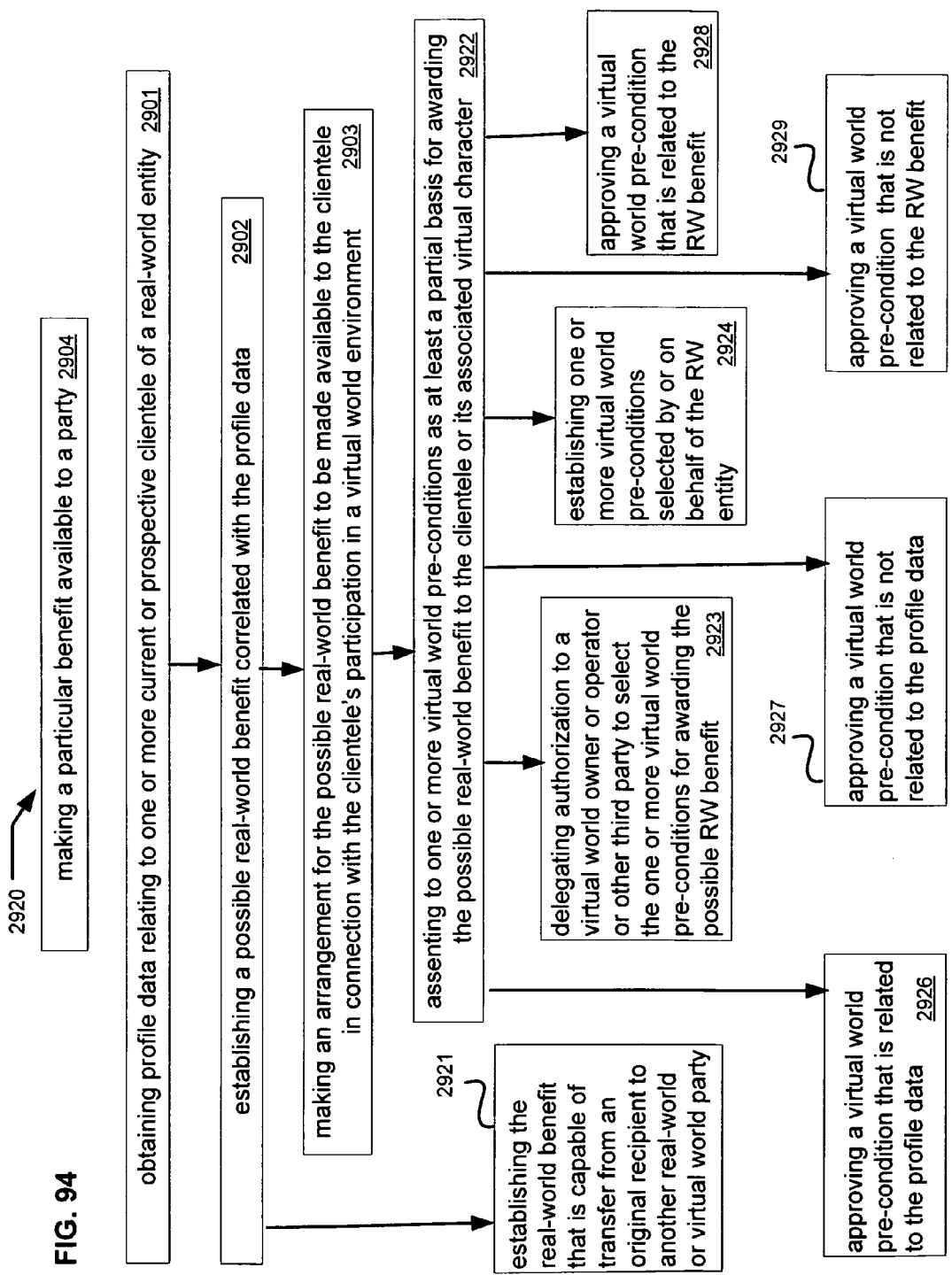

Referring to FIG. 94, various process embodiments 2920 are shown for making a particular benefit available to a party (block 2904). In addition to previously described process features 2901, 2902, 2903, an implementation may include establishing the real-world benefit that is capable of transfer from an original recipient to another real-world or virtual world party (block 2921).

A further possible feature includes assenting to one or more virtual world pre-conditions as at least a partial basis for awarding the possible real-world benefit to the clientele or its associated virtual character (block 2922). Other related aspects may include delegating authorization to a virtual world owner or operator or other third party to select the one or more virtual world pre-conditions for awarding the possible real-world benefit (block 2923), and establishing one or more virtual world pre-conditions selected by or on behalf of the real-world entity (block 2924).

Some implementations may include approving a virtual world pre-condition that is related to the profile data (block 2926), or in some instances not related to the profile data (block 2927). Other implementations may include approving a virtual world pre-condition that is related to the real-world benefit (block 2928), or in some instances not related to the real-world benefit (block 2929).

Figure 95:
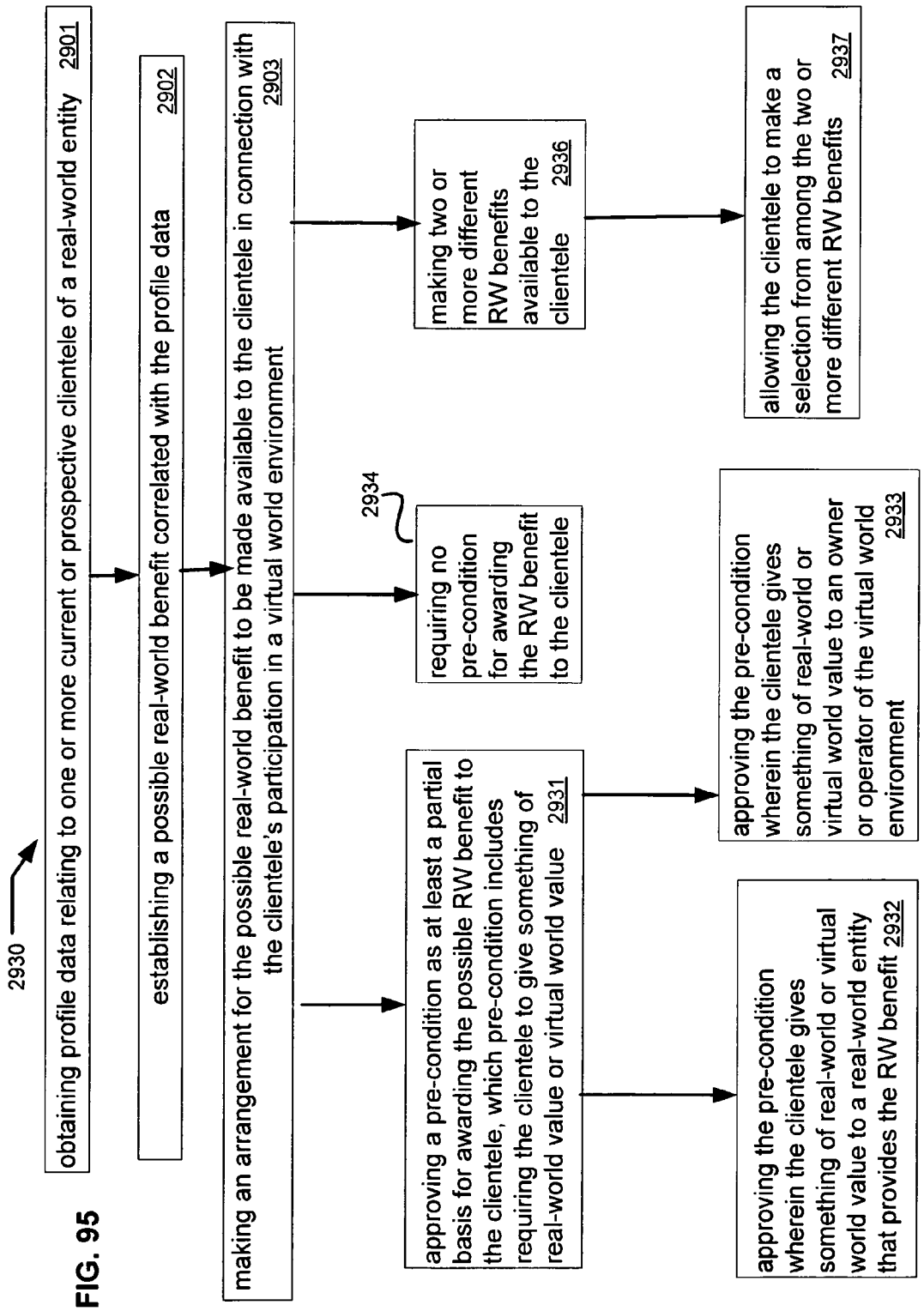

The flow chart of FIG. 95 illustrates various embodiments 2930 that include previously described process features 2901, 2902, 2903 along with additional possible pre-conditions relating to the possible real-world benefit. For example, a possible aspect may include approving a pre-condition as at least a partial basis for awarding the possible real-world benefit to the clientele, which pre-condition includes requiring the clientele to give something of real-world value or virtual world value (block 2931).

Additional related aspects may include approving the pre-condition wherein the clientele gives something of real-world or virtual world value to a real-world entity that provides the real-world benefit (block 2932), and also may include approving the pre-condition wherein the clientele gives something of real-world or virtual world value to an owner or operator of the virtual world environment (block 2933).

Further possible feature components illustrated in FIG. 95 include requiring no pre-condition for awarding the real-world benefit to the clientele (block 2934). Other possible feature components include making two or more different real-world benefits available to the clientele (block 2936), and allowing the clientele to make a selection from among the two or more different real-world benefits (block 2937).

Figure 96:
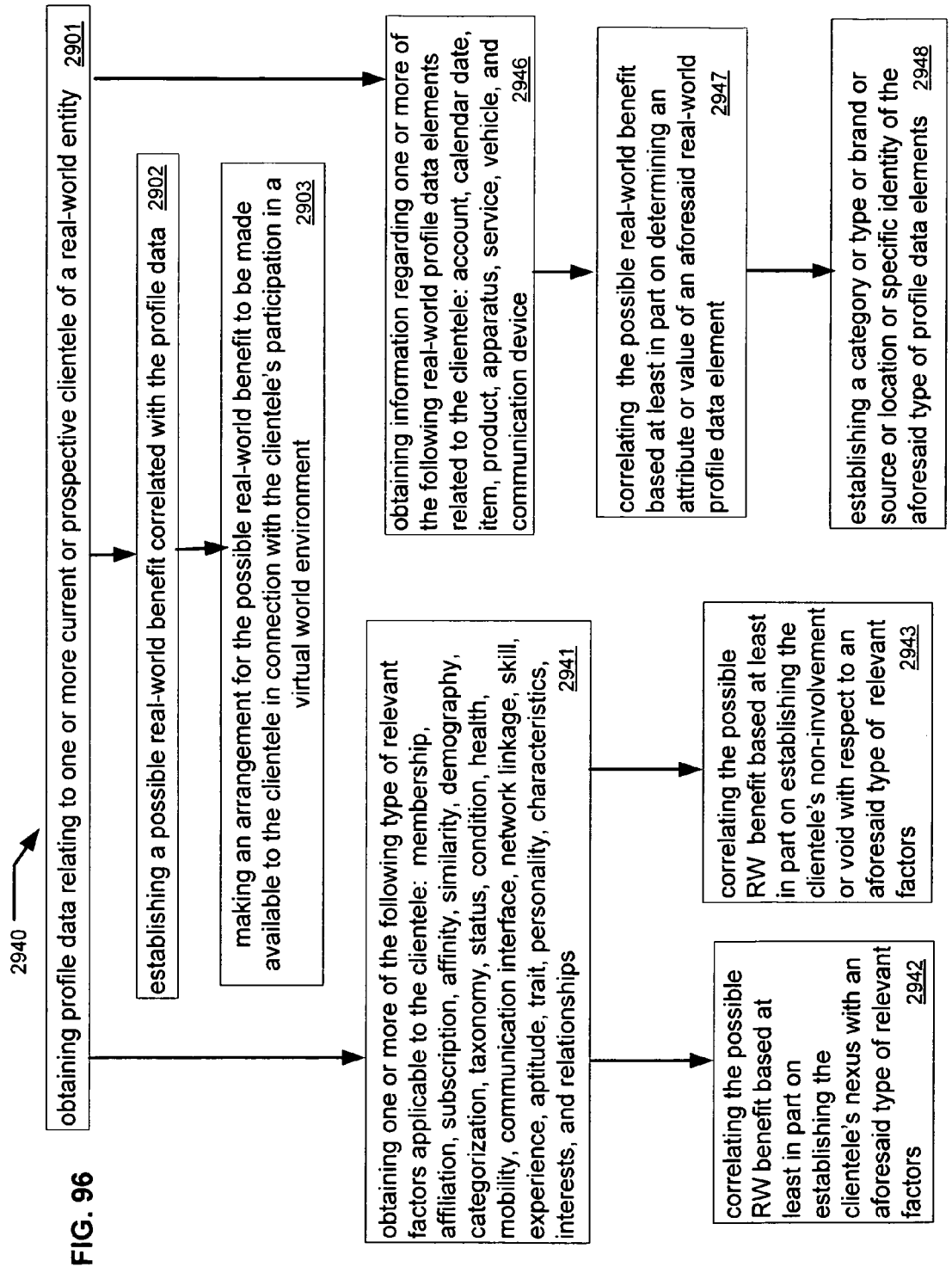

Referring to the embodiments 2940 of FIG. 96, previously described process features 2901, 2902, 2903 are shown along with other aspects relating to profile data. One aspect may include obtaining one or more of the following type of relevant factors applicable to the clientele: membership, affiliation, subscription, affinity, similarity, demography, categorization, taxonomy, status, condition, health, mobility, communication interface, network linkage, skill, experience, aptitude, trait, personality, characteristics, interests, and relationships (block 2941).

Additional possible features may relate to correlation with various relevant factors applicable to the clientele. For example, some implementations may include correlating the possible real-world benefit based at least in part on establishing the clientele's nexus with an aforesaid type of relevant factors (block 2942). For purposes of illustration, a person's interest in snow sport recreation may be a relevant factor in targeting them for a winter lodge vacation promotional real-world benefit. Similarly, a person's professional career (e.g., teacher or professor) may be a relevant factor in targeting them for a book club, or summer cruise promotional real-world benefit. It will be understood that the types of relevant factors may be simple or complex, depending on the circumstances.

In some instances an implementation may include correlating the possible real-world benefit based at least in part on establishing the clientele's non-involvement or void with respect to an aforesaid type of relevant factors (block 2943). For purposes of illustration, a person's non-membership in a group or organization may be a relevant factor in targeting them for a possible real-world benefit. Similarly, a person not having a portable communication device may be a relevant factor in targeting them for an introductory offer of such a device.

Further possible aspects illustrated in FIG. 96 include obtaining information regarding one or more of the following real-world profile data elements related to the clientele: account, calendar date, item, product, apparatus, service, vehicle, and communication device (block 2946). A related aspect may include correlating the possible real-world benefit based at least in part on determining an attribute or value of an aforesaid real-world profile data element (block 2947). It will be understood that in some instances a person's hobby attribute (e.g., hunter) may be of primary interest to a real-world entity, while in other instances a value (e.g., variable) associated with such attribute (duck hunter, bow hunter, etc.) may be a critical profile data element for targeting a real-world opportunity.

Another related aspect may include establishing a category or type or brand or source or location or specific identity of the aforesaid type of profile data elements (block 2948). Such varied profile data elements may help determine a optimum virtual world setting, virtual world activity or virtual world topic to be used for providing notification of the real-world benefit to a virtual world participant or virtual character.

Figure 97:
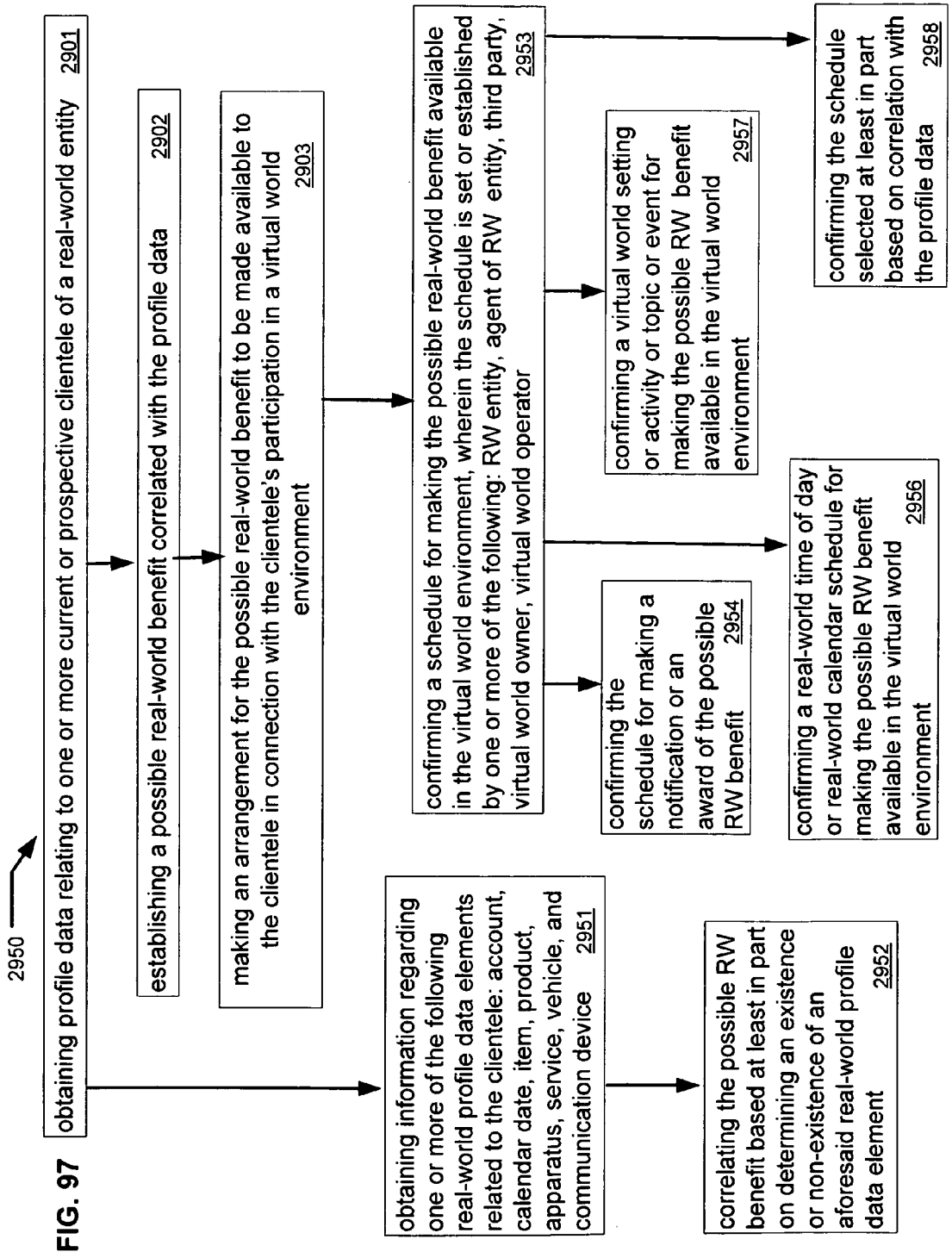

As shown in FIG. 97, some embodiments 2950 may include previously described process features 2901, 2902, 2903 along with other possible aspects such as obtaining information regarding one or more of the following real-world profile data elements related to the clientele: account, calendar date, item, product, apparatus, service, vehicle, and communication device (block 2951). A related possible aspect includes correlating the possible real-world benefit based at least in part on determining an existence or non-existence of an aforesaid real-world profile data element (block 2952).

It will be understood that the existence of a specific profile data element (e.g., Ford SUV model XYZ) may be the basis for many different kinds of correlation to a possible real-world benefit. For example, clientele with such a specific vehicle profile data element may be a likely target for a promotional competitive offer (e.g., Toyota SUV model ABC), a generalized accessory offer (e.g., snow/mud tires, car club membership), or a particularized offer (e.g., special trade-in value for latest model Ford SUV). Of course such examples disclosed herein are not intended to be limiting but are provided by way of illustration only.

Other exemplary process components may include confirming a schedule for making the possible real-world benefit available in the virtual world environment, wherein the schedule is set or established by one or more of the following: real-world entity, agent of real-world entity, third party, virtual world owner, and virtual world operator (block 2953). A further process component may include confirming the schedule for making a notification or an award of the possible real-world benefit (block 2954).

Additional possible aspects include confirming a real-world time of day or real-world calendar schedule for making the possible real-world benefit available in the virtual world environment (block 2956). Other possible aspects include confirming a virtual world setting or activity or topic or event for making the possible real-world benefit available in the virtual world environment (block 2957). A further aspect may include confirming the schedule selected at least in part based on correlation with the profile data (block 2958).

Figure 98:
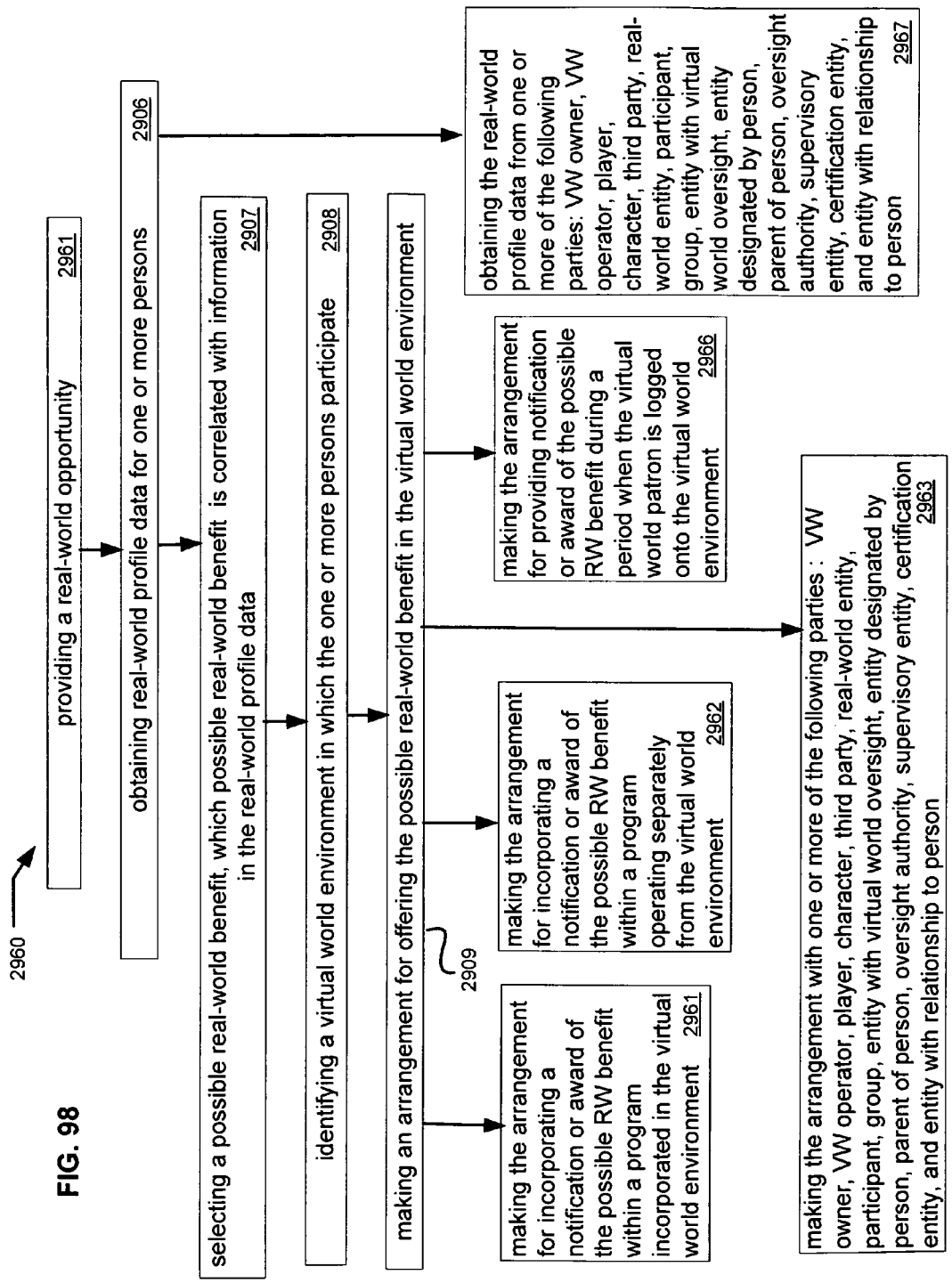

The flow chart of FIG. 98 shows various embodiments 2960 that include component features for providing a real-world opportunity (block 2961) along with previously described process features 2906, 2907, 2908, 2909 that relate to real-world profile data for one or more persons. Additional aspects may include making the arrangement for incorporating a notification or award of the possible real-world benefit within a program incorporated in the virtual world environment (block 2961), and also may include making the arrangement for incorporating a notification or award of the possible real-world benefit within a program operating separately from the virtual world environment (block 2962).

Additional process components related to an arrangement for offering the possible real-world benefit in the virtual world environment may include making the arrangement with one or more of the following parties: virtual world owner, virtual world operator, player, character, third party, real-world entity, participant, group, entity with virtual world oversight, entity designated by person, parent of person, oversight authority, supervisory entity, certification entity, and entity with relationship to person (block 2963). Of course such arrangement may involve virtual world and/or real-world communications and negotiations between the parties.

Other possible features shown in FIG. 98 include making the arrangement for providing notification or award of the possible real-world benefit during a period when the virtual world patron is logged onto the virtual world environment (block 2966). Another possible feature includes obtaining the real-world profile data from one or more of the following parties: virtual world owner, virtual world operator, player, character, third party, real-world entity, participant, group, entity with virtual world oversight, entity designated by person, parent of person, oversight authority, supervisory entity, certification entity, and entity with relationship to person (block 2967). It will be understood that usage of such real-world profile data may be pursuant to actual direct approval by a real-world entity, or by implied approval, or pursuant to a delegation of approval authority, or acquiescence, etc.

Figure 99:
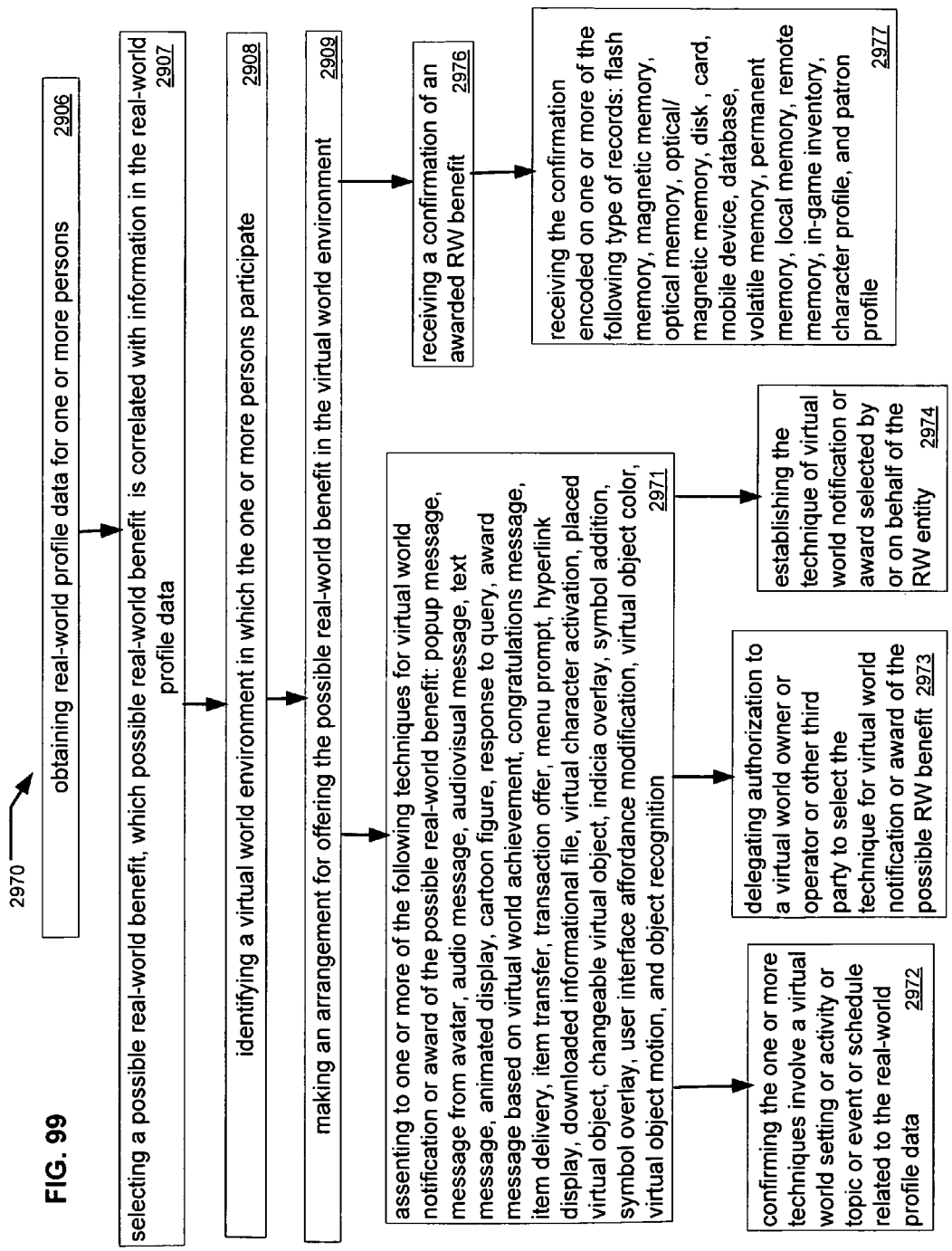

Referring to the exemplary embodiments 2970 of FIG. 99, the previously described process components 2906, 2907, 2908, 2909 are shown along with other aspects that may be included. For example, some process implementations may include assenting to one or more of the following techniques for virtual world notification or award of the possible real-world benefit: popup message, message from avatar, audio message, audiovisual message, text message, animated display, cartoon figure, response to query, award message based on virtual world achievement, congratulations message, item delivery, item transfer, transaction offer, menu prompt, hyperlink display, downloaded informational file, virtual character activation, placed virtual object, changeable virtual object, indicia overlay, symbol addition, symbol overlay, user interface affordance modification, virtual object color, virtual object motion, and object recognition (block 2971). It will be similarly understood that implementation of such notification and award techniques in a virtual world environment may be pursuant to actual direct approval by a real-world entity, or by implied approval, or pursuant to a delegation of approval authority, or acquiescence, etc.

Other related aspects may include confirming the one or more techniques for virtual world notification or award involve a virtual world setting or activity or topic or event or schedule related to the real-world profile data (block 2972). Additional possible aspects include delegating authorization to a virtual world owner or operator or other third party to select the technique for virtual world notification or award of the possible real-world benefit (block 2973), and establishing the technique of virtual world notification or award selected by or on behalf of the real-world entity (block 2974).

FIG. 99 also shows further aspects that involve receiving a confirmation of an awarded real-world benefit (block 2976). For example, a related aspect may include receiving the confirmation encoded on one or more of the following type of records: flash memory, magnetic memory, optical memory, optical/magnetic memory, disk, card, mobile device, database, volatile memory, permanent memory, local memory, remote memory, in-game inventory, character profile, and patron profile (block 2977).

Figure 100:
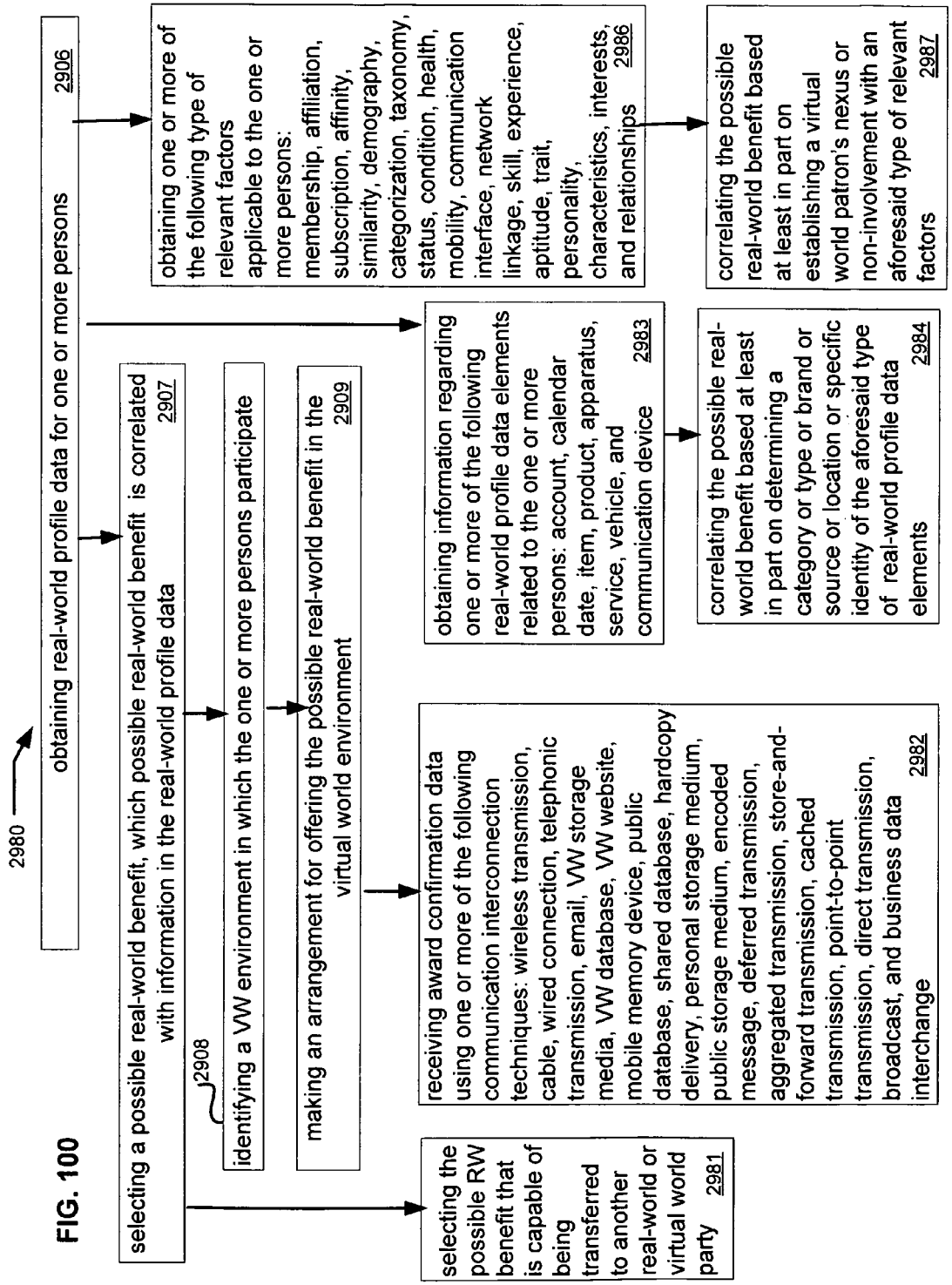

The flow chart of FIG. 100 shows various embodiments 2980 that include previously described features 2906, 2907, 2908, 2909 as well as other possible aspects including selecting the possible real-world benefit that is capable of being transferred to another real-world or virtual world party (block 2981). Another implementation feature may include receiving award confirmation data using one or more of the following communication interconnection techniques: wireless transmission, cable, wired connection, telephonic transmission, email, virtual world storage media, virtual world database, virtual world website, mobile memory device, public database, shared database, hardcopy delivery, personal storage medium, public storage medium, encoded message, deferred transmission, aggregated transmission, store-and-forward transmission, cached transmission, point-to-point transmission, direct transmission, broadcast, and business data interchange (block 2982).

It is to be expected that encoding information such as award confirmation data may be accomplished via a directly and immediate interconnection (e.g., in conjunction with a local computer terminal, resident application program, or VW client server) as well as indirectly and delayed (e.g., batch or packet data transmission for processing at a centralized or remote location) as well as via portable/mobile devices (encoded account card, etc.). Such examples disclosed herein are not intended to be limited but are for purposes of illustration only.

Additional features may include obtaining information regarding one or more of the following real-world profile data elements related to the one or more persons: account, calendar date, item, product, apparatus, service, vehicle, and communication device (block 2983). A related feature may include correlating the possible real-world benefit based at least in part on determining a category or type or brand or source or location or specific identity of the aforesaid type of real-world profile data elements (block 2984).

Further possible implementation features shown in FIG. 100 include obtaining one or more of the following type of relevant factors applicable to the one or more persons: membership, affiliation, subscription, affinity, similarity, demography, categorization, taxonomy, status, condition, health, mobility, communication interface, network linkage, skill, experience, aptitude, trait, personality, characteristics, interests, and relationships (block 2986). A related feature may include correlating the possible real-world benefit based at least in part on establishing a virtual world patron's nexus or non-involvement with an aforesaid type of relevant factors (block 2987).

Figure 101:
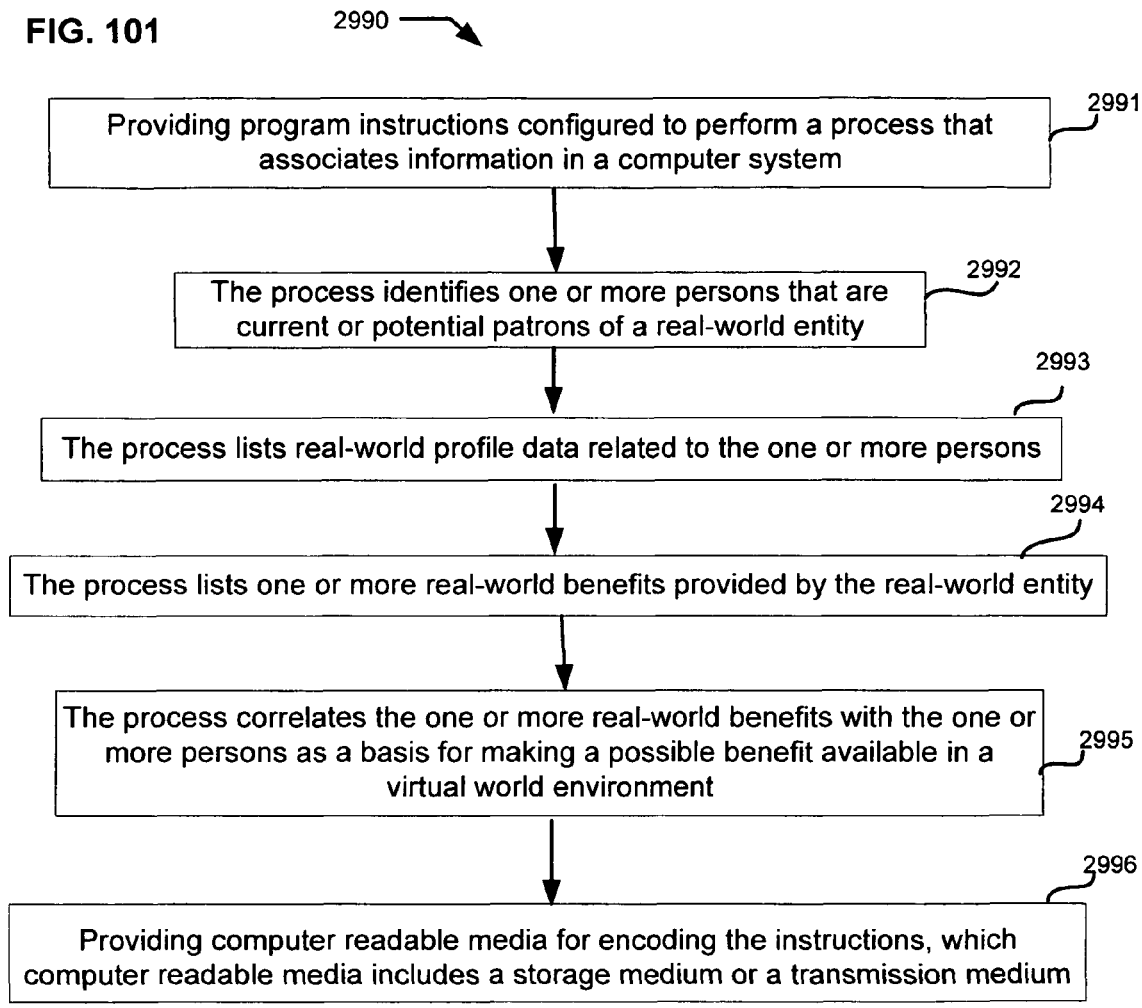
FIG. 101 is a high level flow chart for another process implementation incorporated in an exemplary computer program product.

The exemplary embodiment 2990 shown in FIG. 101 includes providing program instructions configured to perform a process that associates information in a computer system (block 2991). The process may include identifying one or more persons that are current or potential patrons of a real-world entity (block 2992), listing real-world profile data related to the one or more persons (block 2993), listing one or more real-world benefits provided by the real-world entity (block 2994), and correlating the one or more real-world benefits with the one or more persons as a basis for making a possible benefit available in a virtual world environment (block 2995).

The computer program product implementation may provide computer readable media for encoding the instructions, which computer readable media may include a storage medium or a transmission medium (block 2996).

It is to be understood that the various references herein to specific types or categories of informational data that may be maintained in databases, data records or other memory devices are not intended to be exhaustive. In some implementations certain data entries may not be deemed necessary or desirable. Other implementations may provide for retention of additional or more comprehensive data files depending on the circumstances.

The computer system embodiments may process information that enables the communications including advertising and/or purchasing and/or publicity information related to the topic of interest. The exemplary computer system may also process information that enables the communications to be displayed or distributed in the virtual world environment and/or in a real-world environment.

Some computerized system embodiments may include controller components for requiring a real-world identification of the virtual world patron before providing confirmation of an awarded real-world benefit. Some controller components may be configured to provide the confirmation data of an awarded real-world benefit via one or more of the following types of communication interconnection techniques: wireless transmission, cable, wired connection, telephonic transmission, email, VW storage media, VW database, VW website, mobile memory device, public database, shared database, hardcopy delivery, personal storage medium, public storage medium, encoded message, deferred transmission, aggregated transmission, store-and-forward transmission, cached transmission, point-to-point transmission, and direct transmission, and broadcast.

A computer program product may provide a possible real-world benefit available within a program incorporated in the virtual world environment, and also may provide a possible real-world benefit available within a program operating separately from the virtual world environment. Other computer program implementations may provide for awarding the possible real-world benefit based on a correlation with one or more of the following real-world profile data factors applicable to the virtual world patron: membership, affiliation, subscription, affinity, similarity, demography, categorization, taxonomy, status, condition, health, mobility, communication interface, network linkage, skill, experience, aptitude, trait, personality, characteristics, interests, and relationships.

Other aspects of a computer program product may make confirmation information of an awarded real-world benefit accessible to one or more of the following: virtual world patron, real-world benefit provider, agent of real-world benefit provider, designated recipient, agent of virtual world patron, representative of virtual world patron, interested third party; group, entity with virtual world oversight, entity designated by VW patron, VW location, other VW party, other VW player, VW owner, VW operator, parent of VW patron, supervisory entity, certification entity, and entity with relationship to VW patron.

A computer program product embodiment as disclosed herein may provide for storing an address existing in the virtual world environment, which address is associated with the participant or player. The computer program product embodiments may also provide for storing an address existing in a real-world environment, which address is associated with the participant or player.

The computer program product embodiments disclosed herein may also provide for obtaining informational data for enabling a communication to be sent to the participant or player, which communication includes advertising and/or purchasing and/or publicity information related to the topic. Such a computer program product may include a carrier medium that carries or stores encoded program instructions for executing the computer process.

Some aspects of process, system and computer program product implementations may include making confirmation data regarding an awarded virtual world benefit available to a real-world entity and/or the participant via one or more of the following types of communication interconnection techniques: email message, email attachment, fax transmission, encoded document, encoded card, telephonic transmission, media transmission, wireless transmission, web-page input, web service, API invocation, URL access, password access, encryption key, and digital transceiver. Making such confirmation data available may in some instances be facilitated by a controller unit in a computer apparatus.

Other aspects of process, system and computer program product implementations may include sending one or more of the following types of virtual world notification to the participant regarding the availability of the real-world benefit: popup message, message from avatar, audio message, audiovisual message, text message, animated display, cartoon figure, response to query, award message based on virtual world achievement, congratulations message, item delivery, item transfer, transaction offer, menu prompt, hyperlink display, downloaded informational file, virtual character activation, placed virtual object, changeable virtual object, indicia overlay, symbol addition, symbol overlay, user interface affordance modification, virtual object color, virtual object motion, and object recognition. Sending such virtual world notification may in some instances be facilitated by a controller unit in a computer apparatus.

A computerized system embodiment may include notification means for making accessible to the virtual world patron for preview in the virtual world environment the listing of the one or more real-world benefits available. Such notification means may also be used for making accessible to the virtual world patron the listing of one or more previously awarded real-world benefits. Such notification means may include a combination of computer components including for example a program application, database records, a processor unit and a controller module.

A computerized system embodiment may include a software component and/or a controller module that requires a real-world identification of the virtual world patron before providing the confirmation data. In some instants such a software component and/or controller module may be capable of providing one or more of the following types of award confirmation data: authorization code, date code, type of award code, virtual world code, identity of virtual world environment, transferable award, non-transferable award, real-world identification of original recipient, real-world identification of designated beneficiary, and real-world identification of group to receive benefit of award.

In some implementations a computerized system embodiment may further include a software component and/or a processing unit configured to establish one or more of the following types of virtual occurrence criteria as at least a partial basis for awarding the real-world benefit: activity; game; setting; event; participant experience profile; participant attribute list; participants with related virtual world history; participants with related real-world history; participant with specified history, participant with specified demographic profile, participant's characteristic, participant's historical interest, participant's purchase history, participant's activity history, participant's personality attribute, participant's behavioral attribute, current virtual behavior, specified participant ability; participants having related item; certain calculated participant attribute; participants involved with related topic; specified participant profile record, specified participant identity characteristic, and participant within a calculated category range.

Some system embodiments may provide program instructions for implementing a technique of virtual world notification or award of the one or more real-world benefits in the selected virtual world environment, wherein the technique involves a virtual world setting or activity or topic or event or schedule related to the profile information. An exemplary program module may include program instructions for generating an award confirmation to the clientele or its associated virtual character, an also to the real-world entity that is a provider of the one or more real-world benefits.

Some system implementations may provide a communication interconnection configured to receive and process the award confirmation, wherein the communication interconnection incorporates one or more of the following techniques: wireless transmission, cable, wired connection, telephonic transmission, email, virtual world storage media, virtual world database, virtual world website, mobile memory device, public database, shared database, hardcopy delivery, personal storage medium, public storage medium, encoded message, deferred transmission, aggregated transmission, store-and-forward transmission, cached transmission, point-to-point transmission, direct transmission, broadcast, and business data interchange.

The exemplary system, apparatus, and computer program product embodiments shown in FIGS. 51-54 and 79-82 along with other components, devices, know-how, skill and techniques that are known in the art have the capability of implementing and practicing the methods and processes shown in FIGS. 83-90 and FIGS. 91-101. It is to be understood that the methods and processes can be incorporated in one or more different types of computer program products with carrier media such as a storage medium and/or a transmission (e.g., communication) medium having program instructions encoded thereon. However it is to be further understood by those skilled in the art that other systems, apparatus and technology may be used to implement and practice such methods and processes.

It will be understood from the foregoing disclosure that a virtual reality environment may include a simulated world having a monetary system based on putative value symbols that constitute a medium of exchange, wherein the simulated world allows a virtual world arrangements to receipt or payment of one or more putative value symbols.

An aspect of the simulated world may allow an arrangement to provide for receipt or payment of one or more of the following types of value symbols: virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, license permissions, decryption codes, bonus vouchers, test certificates, game time credits, additional characters, control over other player characters, control over non-player characters, aliases, privacy levels, visibility levels, and disguises.

Another aspect of the simulated world may allow an arrangement for receipt or payment of a value symbol that can be acquired in connection with one or more of the following types of events or activities occurring in the simulated world: sports, races, competitions, combat, battles, survival, achievements, opportunities, challenges, character choices, training, academics, education, careers, jobs, journeys, attendance, entertainment, amusement, parties, shopping reading, calculating, analysis, healthcare, sharing communication, music, philanthropy, religion, socializing, companionship, dating, lovemaking, gambling, lotteries, tests, awards, gifts, barter, negotiations, sales, purchases, services, loans, journaling, record keeping, posting information, networking, and building. It will be understood from the disclosure herein that such events or activities occurring in the simulated world includes events or activities that occur wholly in the simulated world as well as events or activities that are only initiated or partly pursued in the simulated world, or combinations of both of these.

The simulated world may provide a game environment for one or more players, wherein a virtual world arrangement includes the transfer or acquisition of one or more of the following types of things of potential value: products, services, items, virtual value tokens, virtual currency, monetary chips, discount coupons, award points, access rights, entrance keys, experience medals, level permits, bonus vouchers, skill merits, character traits, health benefits, success awards, entrance tickets, authorization passes, eligibility credentials, benefit tokens, vested rights, license permissions, decryption codes, bonus vouchers, and test certificates.

A user interface communication link to the simulated world may in some implementations enable a player or participant to be a participant in various types of activities in many different virtual world settings.

Various embodiments of the simulated world allow the virtual world arrangement to be based on a commitment with a real-world due date for resolution. In some embodiments, the virtual world arrangement may be based on a commitment for real-world compensation.

It will also be understood by those skilled in the art in view of the present disclosure that a user interface communication link to a simulated world may include login and logoff capability for the player of participant; wherein a memory device maintains the record of the virtual world activities after the player or participant has logged off or become dormant in the simulated world. Such a user interface communication link may be accessible via wired and/or wireless links.

Some embodiments of the simulated world environment may include a communication link that provides disclosure of sufficient information necessary to decrypt, decode, or otherwise obtain the identification of a real-world person or real-world entity responsible for obligations arising in a virtual world environment.

In some implementations, multiple players at different locations can use virtual charge accounts and/or real world accounts for arranging or resolving a virtual world transaction. Some embodiments include a computer means that provides a fictional game environment capable of having multiple players individually participate in virtual world transactions with each other. One aspect provides a fictional game environment capable of having the one or more players participate in virtual world transactions with a non-player entity in the fictional game environment.

The fictional game environment may be capable of providing virtual world activities or transactions involving one or more non-player entities taken from the following group: real-world credit entity, real-world third party, virtual world provider, game environment operator, third party virtual entity, virtual world credit entity, fictional character, and virtual world avatar.

The fictional game environment may also be capable of having multiple players collectively participate as a group entity in virtual world transactions in the fictional game environment. A further aspect provides a fictional game environment capable of having a player share with another player or entity a risk or benefit resulting from a virtual world transaction. For example, a participant creditor may receive some extra value based on a participant's successful use of a virtual item, product, service or thing of value acquired in a virtual world transaction.

A virtual world system embodiment may include a fictional game environment capable of having the multiple players share real-world and/or virtual world benefits arising from the virtual world transaction.

Some implementations provide a player interface link that includes multiple bi-directional communication links enabling players at different locations to participate in the virtual world environment. A further implementation of a virtual world environment includes one or more of the following communication links accessible to the one or more players while participating in the virtual world environment: a communication link to another different virtual world environment, and a communication link to a real-world environment.

As disclosed herein, various embodiments of a method and system provide arrangements creating a relationship between a real-world entity and a virtual world environment. A participant or player can participate in various virtual world activities including transactions to acquire virtual products, virtual services, and/or virtual items of value. Feedback may be provided and records kept regarding the virtual world activities and transactions. The participant or player may also have an opportunity of engaging in related real-world activities and transactions. In some implementations, multiple players at different locations can be involved in the virtual world and real-world activities and transactions. Some embodiments include arrangements for real-world informational data to be made available in the virtual world environment to a participant or player, based on virtual world activities related to a topic of interest to a real-world entity.

A further feature in some embodiments provides a computer means that creates a virtual world environment capable of having an individual player periodically logged on the system for participation in one or more virtual world transactions with a non-player entity.

Some virtual world embodiments provide consequences, such as benefits or penalties, based on a player's performance record of compliance or non-compliance with an obligation arising from a simulated credit transaction.

One aspect of the system and method disclosed herein provides for awarding a real-world benefit based on a performance record showing compliance with terms of a virtual world transaction. Another aspect of some embodiments provides for imposing a real-world penalty based on a performance record showing non-compliance with terms of a virtual world transaction.

Some exemplary computerized system embodiments provide a database record having a first listing that includes multiple types of real-world premiums, and a second listing of one or more virtual world environments providing distribution of the multiple types of real-world premiums, respectively.

The computer apparatus may include a control module operably connected to a processing module and configured to implement a consequential result from a submission of the one or more real-world premiums. The control module may require a real-world identification of a party making the submission of an awarded premium before implementing the consequential result.

In some implementation the processing module is configured to recognize one or more of the following parameters as part of an authentication and/or validation procedure for the real-world premium: authorization code, date code, type of premium code, distributor code, identity of virtual world distributor, transferable premium, non-transferable premium, real-world identification of original recipient, real-world identification of submitter, and real-world identification of group to receive benefit of premium.

The processing module may also be configured to receive confirmation and/or authentication of the real-world premium via one or more of the following techniques: email message, email attachment, fax transmission, printed document, scanned document, encoded card, telephonic transmission, physical delivery, postal delivery, web-page input, web service, API invocation, URL access, password access, encryption key, and digital transceiver. It will be understood that such confirmation and/or authentication processing of the real-world premium may be provided by a computer program product that is executed by computer apparatus.

It will be further understood from the system embodiment disclosures herein that some computer apparatus may be operably coupled to a processing unit and a database that together provide a capability of generating a confirmation of an award of a real-world premium in a form and/or format suitable for validation by a real-world third party entity. Such a processing unit may provide one or more of the following types of parameters as part of an authentication of an awarded premium: authorization code, date code, type of premium code, distributor code, identity of virtual world environment, transferable premium, non-transferable premium, and real-world identification of original recipient.

Further benefits may be provided in an exemplary system implementation by including a controller for sending an unsolicited virtual world communication regarding the availability of the real-world premium via one or more of the following types of ways: popup message, message from avatar, audio message, audiovisual message, text message, animated display, cartoon figure, response to query, award message based on virtual world achievement, congratulations message, item delivery, item transfer, transaction offer, menu prompt, hyperlink display, downloaded informational file, virtual character activation, placed virtual object, changeable virtual object, indicia overlay, symbol addition, symbol overlay, user interface affordance modification, virtual object color, virtual object motion, and object recognition.

An exemplary process incorporated in a computer program product may provide notice of completion of the virtual world prerequisite and/or processing of the real-world premium in a form or format suitable for transmission to a destination authorized by a real-world enterprise via one or more of the following techniques: email message, email attachment, fax transmission, printed document, scanned document, encoded card, telephonic transmission, physical delivery, postal delivery, web-page input, web service, API invocation, URL access, password access, encryption key, and digital transceiver.

Some computer program product implementations may encode a process for providing a virtual world notification or a virtual world award of the one or more real-world benefits to a virtual character associated with the one or more persons. In some instances the process will generate an award confirmation. The program instruction features may include encoding the award confirmation on one or more of the following types of records: flash memory, magnetic memory, optical memory, optical/magnetic memory, disk, card, mobile device, database, volatile memory, permanent memory, local memory, remote memory, in-game inventory, character profile, in-game inventory, character profile, and patron profile.

The computer program products related to real-world promotional opportunities may encode certain process features on storage and/or signal transmission media accessible to multiple virtual world patrons having logon capabilities at different locations. Some computer program product implementations may encode certain process features on storage and/or signal transmission media capable of functional operation on localized computer apparatus accessible to an individual virtual world patron.

The exemplary method and system embodiments disclosed herein provide arrangements creating a relationship between a real-world entity and a virtual participants and players. A participant or player can participate in various virtual world activities including transactions to acquire virtual products, virtual services, and/or virtual items of value. Feedback may be provided and records kept regarding the virtual world activities and transactions. The participant or player may also have an opportunity of engaging in related real-world activities and transactions. In some implementations, multiple players at different locations can be involved in the virtual world and real-world activities and transactions. Some embodiments include arrangements for real-world informational data to be made available in the virtual world environment to a participant or player, based on virtual world activities related to a topic or category of interest to a real-world entity. Other embodiments provide for making a profile record for use by a real-world entity, wherein the profile record may include particular types of participation activity by a participant or player in the virtual world environment.

Other aspects of exemplary process and system disclosed herein provide arrangements creating a relationship between a real-world entity and a virtual world environment. A virtual world patron can participate in various virtual world activities including transactions to acquire virtual products, virtual services, and/or virtual items of value. Feedback may be provided and records kept regarding the virtual world activities and transactions. The virtual world patron may also have an opportunity of engaging in related real-world activities and transactions. One or more selected patrons are targeted to receive notification of a real-world opportunity that includes authorization information, which authorization information may disclose a required real-world or virtual world prerequisite. In some implementations, multiple participants at different locations may be involved in virtual world and/or real-world activities and transactions that are related to the real-world opportunity.

Additional aspects may relate to a virtual world patron participating in various virtual world activities and transactions. Feedback may be provided and records kept regarding the virtual world activities and transactions. The virtual world patron may be a possible recipient of a real-world consequence or benefit based on a virtual world occurrence. In some instances confirmation of an awarded real-world benefit may be provided via a communication interconnection. Real-world profile data may be used in connection with promotional activities in a virtual world environment.

It will be understood that the various aforementioned features and aspects can be incorporated in various combinations implemented in different technology systems, apparatus and products including computer program products that include a carrier medium that carries encoded program instructions for executing the computer process. Of course, a carrier medium carrying the encoded program instructions may be a communication medium such as modulated signals and/or a storage medium such as memory storage devices.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further definition of "open" terms in the present specification and claims, it will be understood that usage of a language construction "A or B" is generally interpreted as a non-exclusive "open term" meaning: A alone, B alone, A and B together.

Although various features have been described in considerable detail with reference to certain preferred embodiments, other embodiments are possible. Therefore, the spirit or scope of the appended claims should not be limited to the description of the embodiments contained herein.

The invention claimed is:

1. A method of making a particular benefit available to a party, comprising:
obtaining real-world profile data relating to one or more current or prospective clientele of a real-world entity, wherein the real-world profile data relating to the one or more current or prospective clientele includes a real-world name and real-world address associated with one or more real-world factors including at least one of the following real-world categories:
- real-world membership, real-world affiliation, real-world subscription, real-world status, real-world condition, real-world health, real-world skill, real-world experience, or real-world aptitude;

establishing a possible real-world benefit to be provided by or on behalf of the real-world entity, wherein the real-world benefit is correlated with the real-world profile data;

making an arrangement for the possible real-world benefit to be made available to the clientele in connection with the clientele's participation in a virtual-world environment, wherein the clientele's participation in the virtual-world environment includes participation in at least one of the following virtual-world categories related to the real-world categories:
- a virtual-world membership a virtual-world affiliation a virtual-world subscription a virtual-world status a virtual-world condition a virtual-world health a virtual-world skill, a virtual-world experience, or a virtual-world aptitude; and accepting input approving, via a processor, a pre-condition as at least a partial basis for awarding the possible real-world benefit to the clientele, which pre-condition includes requiring the clientele to give something of virtual-world value.

2. The method of claim 1 wherein said obtaining real-world profile data includes:
obtaining real-world profile data regarding a purchase by the clientele of a type of product or service from the real-world entity.

3. The method of claim I wherein said obtaining real-world profile data includes:
obtaining real-world profile data regarding real-world demographics of the clientele.

4. The method of claim I wherein said making the arrangement includes:
making an arrangement with one or more of the following parties: a virtual-world owner, a virtual-world operator, a player, a character, a real-world third party, a participant, a group, an entity with virtual-world oversight, an entity designated by clientele, a parent of clientele, an oversight authority, a supervisory entity, a certification entity, and an entity with relationship to clientele.

5. The method of claim 1 wherein said making the arrangement includes:
making the possible real-world benefit available to the clientele within a program incorporated in the virtual-world environment.

6. The method of claim I wherein said making the arrangement includes:
making the possible real-world benefit available to the clientele within a program operating separately from the virtual-world environment.

7. The method of claim 1 further comprising:
receiving award confirmation data of an awarded real-world benefit via a communication interconnection medium accessible to the real-world entity.

8. The method of claim 7 wherein said receiving the award confirmation data includes:
receiving award confirmation data from the virtual-world environment using one or more of the following communication interconnection techniques: a wireless transmission, cable, a wired connection, a telephonic transmission, an email, a virtual-world storage medium, a virtual-world database, a virtual world website, a mobile memory device, a public database, a shared database, a hardcopy delivery, a private storage medium, a company storage medium, a public storage medium, an encoded message, a deferred transmission, an aggregated transmission, a store-and-forward transmission, a cached transmission, a point-to-point transmission, a direct transmission, a broadcast, and a business data interchange.

9. The method of claim 1 further comprising:
receiving an assent to one or more virtual-world pre-conditions as at least a partial basis for awarding the possible real-world benefit to the clientele or its associated virtual character.

10. The method of claim 9 wherein said receiving an assent to the one or more virtual-world pre-conditions includes:
receiving a delegating authorization to a virtual-world owner or operator or other third party to select the one or more virtual-world pre-conditions for awarding the possible real-world benefit.

11. The method of claim 9 wherein said receiving an assent to the one or more virtual-world pre-conditions includes:
receiving at least one criterion establishing one or more virtual-world pre-conditions selected by or on behalf of the real-world entity.

12. The method of claim 9 wherein said receiving an assent to the one or more virtual-world pre-conditions includes:
receiving a selection of a virtual-world pre-condition that is related to the real-world benefit.

13. The method of claim 9 wherein said receiving an assent to the one or more virtual-world pre-conditions includes:
receiving a selection of a virtual-world pre-condition that is not related to the real-world benefit.

14. The method of claim 9 wherein said receiving an assent to the one or more virtual-world pre-conditions includes:
accepting input approving a virtual-world pre-condition that is related to the profile data.

15. The method of claim 9 wherein said receiving an assent to the one or more virtual-world pre-conditions includes:
accepting input approving a virtual-world pre-condition that is not related to the profile data.

16. The method of claim 1 further comprising:
accepting input approving a pre-condition as at least a partial basis for awarding the possible real-world benefit to the clientele, which pre-condition includes requiring the clientele to give something of real-world value.

17. The method of claim 1 wherein said accepting input approving the pre-condition includes:
accepting input approving a pre-condition wherein the clientele gives something of virtual-world value to the real-world entity that provides the real-world benefit.

18. The method of claim 1 wherein said accepting input approving the pre-condition includes:
accepting input approving a pre-condition wherein the clientele gives something of virtual-world value to an owner or operator of the virtual-world environment.

19. The method of claim 1 wherein said making the arrangement for the possible real-world benefit to be made available to the clientele in connection with the clientele's participation in a virtual-world environment includes:
making two or more different real-world benefits available to the clientele; and
accepting input allowing the clientele to make a selection from among the two or more different real-world benefits.

20. The method of claim 1 wherein said establishing the possible real-world benefit to be provided by or on behalf of the real-world entity includes:
establishing a real-world benefit that is capable of transfer from the clientele to a virtual-world party.

* * * * *